(12) United States Patent
Abhyanker

(10) Patent No.: US 9,459,622 B2
(45) Date of Patent: Oct. 4, 2016

(54) DRIVERLESS VEHICLE COMMERCE NETWORK AND COMMUNITY

(71) Applicant: Raj V. Abhyanker, Cupertino, CA (US)

(72) Inventor: Raj V. Abhyanker, Cupertino, CA (US)

(73) Assignee: LEGALFORCE, INC., Mountain View, CA (US)

( * ) Notice: Subject to any disclaimer, the term of this patent is extended or adjusted under 35 U.S.C. 154(b) by 447 days.

(21) Appl. No.: 14/142,764

(22) Filed: Dec. 28, 2013

(65) Prior Publication Data

US 2015/0185034 A1 Jul. 2, 2015

Related U.S. Application Data

(63) Continuation-in-part of application No. 11/653,194, filed on Jan. 12, 2007, and a continuation-in-part of application No. 11/827,400, filed on Jul. 10, 2007, now Pat. No. 9,098,545, and a continuation-in-part of application No. 11/731,465, filed on Mar. 29, 2007, now abandoned.

(51) Int. Cl.
*G01C 21/34* (2006.01)
*G05D 1/00* (2006.01)
(Continued)

(52) U.S. Cl.
CPC .............. *G05D 1/0088* (2013.01); *G01C 21/36* (2013.01); *G06Q 30/0645* (2013.01); *G06Q 50/01* (2013.01)

(58) Field of Classification Search
CPC .............. G01C 21/36; G01C 21/3453; G05D 1/0088; G06Q 20/3224; G06Q 30/0645; G06Q 50/01; G06Q 50/30; G08G 1/123; G08G 1/202
See application file for complete search history.

(56) References Cited

U.S. PATENT DOCUMENTS 2,035,218 A 3/1936 Bloom
3,253,806 A 5/1966 Eickmann
(Continued)

FOREIGN PATENT DOCUMENTS

EP 1426876 A1 6/2004
KR 101069834 B1 10/2010
(Continued)

OTHER PUBLICATIONS

"Crowdsourcing: Those that are willing to test & learn will be those that will win", Newsline, Mar. 1, 2011 by Neil Perkin http://mediatel.co.uk/newsline/2011/03/01/crowdsourcing-those-that-are-willing-to-test-learn-will-be-those-that-will-win/.
(Continued)

*Primary Examiner* — Thomas G Black
*Assistant Examiner* — Ce Li
(74) *Attorney, Agent, or Firm* — Raj Abhyanker, P.C.

(57) ABSTRACT

A method, device, and system of a driverless automobile commerce network and community is disclosed. Disclosed are methods and a system of associating a unique identifier associated with a driverless vehicle (DV) with an automobile sharing server, periodically analyzing a location of the DV based on a geospatial data associated with the location of the DV, and declaring a non-transitory location of the DV based on a predictable behavior algorithm. An owner of the DV is permitted to list the DV on an automobile sharing network. The methods and system comprise processing a payment of a renter of the DV in a threshold radial distance from the DV when the DV is at the non-transitory location for a predictably available period of time and crediting a financial account of the owner of the DV with the payment of the renter in the threshold radial distance from the DV when the DV is at the non-transitory location for the predictably available period of time.

34 Claims, 45 Drawing Sheets

(51) Int. Cl.
  *G06Q 30/06* (2012.01)
  *G06Q 50/00* (2012.01)
  *G01C 21/36* (2006.01)

(56) References Cited

U.S. PATENT DOCUMENTS

| | | | |
|---|---|---|---|
| 3,556,438 A | 1/1971 | Meditz |
| 3,762,669 A | 10/1973 | Curci |
| 4,119,163 A | 10/1978 | Ball |
| 4,161,843 A | 7/1979 | Hui |
| 4,375,354 A | 3/1983 | Henriksson |
| 4,556,198 A | 12/1985 | Tominaga |
| 4,779,203 A | 10/1988 | McClure et al. |
| 4,914,605 A | 4/1990 | Loughmiller, Jr. et al. |
| 4,996,468 A | 2/1991 | Field et al. |
| 5,032,989 A | 7/1991 | Tornetta |
| 5,050,844 A | 9/1991 | Hawk |
| 5,199,686 A | 4/1993 | Fletcher |
| 5,208,750 A | 5/1993 | Kurami et al. |
| 5,325,294 A | 6/1994 | Keene |
| 5,372,211 A | 12/1994 | Wilcox et al. |
| 5,521,817 A | 5/1996 | Burdoin et al. |
| 5,577,567 A | 11/1996 | Johnson et al. |
| 5,581,630 A | 12/1996 | Bonneau, Jr. |
| 5,584,025 A | 12/1996 | Keithley et al. |
| 5,590,062 A | 12/1996 | Nagamitsu et al. |
| 5,617,319 A | 4/1997 | Arakawa et al. |
| 5,630,103 A | 5/1997 | Smith et al. |
| 5,671,342 A | 9/1997 | Millier et al. |
| 5,720,363 A | 2/1998 | Kipp |
| 5,751,245 A | 5/1998 | Janky et al. |
| 5,774,133 A | 6/1998 | Neave et al. |
| 5,794,207 A | 8/1998 | Walker et al. |
| 5,805,810 A | 9/1998 | Maxwell |
| 5,819,269 A | 10/1998 | Uomini |
| 5,826,244 A | 10/1998 | Huberman |
| 5,831,664 A | 11/1998 | Wharton et al. |
| 5,835,896 A | 11/1998 | Fisher et al. |
| 5,852,810 A | 12/1998 | Sotiroff et al. |
| 5,904,214 A | 5/1999 | Lin |
| 5,905,499 A | 5/1999 | McDowall et al. |
| 5,907,322 A | 5/1999 | Kelly et al. |
| 5,926,765 A | 7/1999 | Sasaki |
| 5,930,474 A | 7/1999 | Dunworth et al. |
| 5,937,413 A | 8/1999 | Hyun et al. |
| 5,940,806 A | 8/1999 | Danial |
| 5,991,737 A | 11/1999 | Chen |
| 6,024,288 A | 2/2000 | Gottlich et al. |
| 6,029,141 A | 2/2000 | Bezos et al. |
| 6,029,195 A | 2/2000 | Herz |
| 6,034,618 A | 3/2000 | Tatebayashi et al. |
| 6,036,601 A | 3/2000 | Heckel |
| 6,047,194 A | 4/2000 | Andersson |
| 6,047,236 A | 4/2000 | Hancock et al. |
| 6,049,778 A | 4/2000 | Walker et al. |
| 6,059,263 A | 5/2000 | Otema et al. |
| 6,073,138 A | 6/2000 | de l'Etraz et al. |
| 6,078,906 A | 6/2000 | Huberman |
| 6,088,702 A | 7/2000 | Plantz et al. |
| 6,092,076 A | 7/2000 | McDonough et al. |
| 6,092,105 A | 7/2000 | Goldman |
| 6,101,484 A | 8/2000 | Halbert et al. |
| 6,108,639 A | 8/2000 | Walker et al. |
| 6,122,592 A | 9/2000 | Arakawa et al. |
| 6,134,486 A | 10/2000 | Kanayama |
| 6,148,260 A | 11/2000 | Musk et al. |
| 6,148,289 A | 11/2000 | Virdy |
| 6,175,831 B1 | 1/2001 | Weinreich et al. |
| 6,199,076 B1 | 3/2001 | Logan et al. |
| 6,229,533 B1 | 5/2001 | Farmer et al. |
| 6,236,990 B1 | 5/2001 | Geller et al. |
| 6,269,369 B1 | 7/2001 | Robertson |
| 6,308,177 B1 | 10/2001 | Israni et al. |
| 6,317,718 B1 | 11/2001 | Fano |
| 6,336,111 B1 | 1/2002 | Ashby et al. |
| 6,339,745 B1 | 1/2002 | Novik |
| 6,356,834 B2 | 3/2002 | Hancock et al. |
| 6,381,537 B1 | 4/2002 | Chenault et al. |
| 6,401,085 B1 | 6/2002 | Gershman et al. |
| 6,405,123 B1 | 6/2002 | Rennard et al. |
| 6,408,307 B1 | 6/2002 | Semple et al. |
| 6,445,983 B1 | 9/2002 | Dickson et al. |
| 6,453,339 B1 | 9/2002 | Schultz et al. |
| 6,470,268 B1 | 10/2002 | Ashcraft et al. |
| 6,480,885 B1 | 11/2002 | Olivier |
| 6,487,583 B1 | 11/2002 | Harvey et al. |
| 6,498,982 B2 | 12/2002 | Bellesfield et al. |
| 6,507,776 B1 | 1/2003 | Fox, III |
| 6,513,069 B1 | 1/2003 | Abato et al. |
| 6,519,629 B2 | 2/2003 | Harvey et al. |
| 6,532,007 B1 | 3/2003 | Matsuda |
| 6,542,813 B1 | 4/2003 | Kovacs |
| 6,542,817 B2 | 4/2003 | Miyaki |
| 6,542,936 B1 | 4/2003 | Mayle et al. |
| 6,557,013 B1 | 4/2003 | Ziff et al. |
| 6,587,787 B1 | 7/2003 | Yokota |
| 6,597,983 B2 | 7/2003 | Hancock |
| 6,600,418 B2 | 7/2003 | Francis et al. |
| 6,611,751 B2 | 8/2003 | Warren |
| 6,615,039 B1 | 9/2003 | Eldering |
| 6,622,086 B2 | 9/2003 | Polidi |
| 6,629,136 B1 | 9/2003 | Naidoo |
| 6,633,311 B1 | 10/2003 | Douvikas et al. |
| 6,636,803 B1 | 10/2003 | Hartz, Jr. et al. |
| 6,640,187 B1 | 10/2003 | Chenault et al. |
| 6,643,663 B1 | 11/2003 | Dabney et al. |
| 6,646,568 B2 | 11/2003 | MacPhail et al. |
| 6,647,383 B1 | 11/2003 | August et al. |
| 6,654,800 B1 | 11/2003 | Rieger, III |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,684,196 B1 | 1/2004 | Mini et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,907,405 B2 | 6/2005 | Brett |
| 6,918,576 B2 | 7/2005 | Finkbeiner |
| 6,926,233 B1 | 8/2005 | Corcoran, III |
| 6,931,419 B1 | 8/2005 | Lindquist |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B2 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,050,909 B2 | 5/2006 | Nichols et al. |
| 7,068,309 B2 | 6/2006 | Toyama et al. |

(56) References Cited

U.S. PATENT DOCUMENTS

| | | |
|---|---|---|
| 7,069,308 B2 | 6/2006 | Abrams |
| 7,072,849 B1 | 7/2006 | Filepp et al. |
| 7,076,409 B2 | 7/2006 | Agrawala et al. |
| 7,076,741 B2 | 7/2006 | Miyaki |
| 7,079,943 B2 | 7/2006 | Flann et al. |
| 7,080,019 B1 | 7/2006 | Hurzeler |
| 7,080,096 B1 | 7/2006 | Imamura |
| 7,085,650 B2 | 8/2006 | Anderson |
| 7,099,745 B2 | 8/2006 | Ebert |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger, III |
| 7,155,336 B2 | 12/2006 | Dorfman et al. |
| 7,158,878 B2 | 1/2007 | Rasmussen et al. |
| 7,174,301 B2 | 2/2007 | Florance et al. |
| 7,177,872 B2 | 2/2007 | Schwesig et al. |
| 7,178,720 B1 | 2/2007 | Strubbe et al. |
| 7,184,990 B2 | 2/2007 | Walker et al. |
| 7,188,056 B2 | 3/2007 | Kagarlis |
| 7,188,080 B1 | 3/2007 | Walker et al. |
| 7,188,153 B2 | 3/2007 | Lunt et al. |
| 7,209,803 B2 | 4/2007 | Okamoto et al. |
| 7,218,993 B2 | 5/2007 | Yasukawa et al. |
| 7,228,232 B2 | 6/2007 | Bodin et al. |
| 7,233,942 B2 | 6/2007 | Nye |
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,254,559 B2 | 8/2007 | Florance et al. |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | DiStefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 | 9/2009 | Olson et al. |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,702,545 B1 | 4/2010 | Compton et al. |
| 7,725,492 B2 | 5/2010 | Sittig et al. |
| 7,734,254 B2 | 6/2010 | Frost et al. |
| 7,751,971 B2 | 7/2010 | Chang et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 | 11/2010 | Zhong |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,703 B1 | 8/2011 | Watkins |
| 7,996,109 B2 | 8/2011 | Zini et al. |
| 7,996,270 B2 | 8/2011 | Sundaresan |
| 8,010,230 B2 | 8/2011 | Zini et al. |
| 8,027,943 B2 | 9/2011 | Juan et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,095,430 B2 | 1/2012 | Abhyanker |
| 8,103,734 B2 | 1/2012 | Galli et al. |
| 8,107,879 B2 | 1/2012 | Pering et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,661 B1 | 3/2012 | Billman et al. |

(56) References Cited

U.S. PATENT DOCUMENTS

| | | |
|---|---|---|
| 8,145,703 B2 | 3/2012 | Frishert et al. |
| 8,149,113 B2 | 4/2012 | Diem |
| 8,167,234 B1 | 5/2012 | Moore |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 | 6/2012 | Zini et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,326,091 B1 | 12/2012 | Jing et al. |
| 8,326,315 B2 | 12/2012 | Phillips et al. |
| 8,328,130 B2 | 12/2012 | Goossen |
| 8,352,183 B2 | 1/2013 | Thota et al. |
| 8,364,757 B2 | 1/2013 | Scott et al. |
| 8,370,003 B2 | 2/2013 | So et al. |
| 8,380,382 B2 | 2/2013 | Sung et al. |
| 8,380,638 B1 | 2/2013 | Watkins |
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski et al. |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,504,284 B2 | 8/2013 | Brülle-Drews et al. |
| 8,504,512 B2 | 8/2013 | Herzog et al. |
| 8,510,268 B1 | 8/2013 | Laforge et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 | 12/2013 | McAndrew et al. |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,626,699 B2 | 1/2014 | Xie et al. |
| 8,627,506 B2 | 1/2014 | Vera et al. |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,660,897 B2 | 2/2014 | Abhyanker |
| 8,666,660 B2 | 3/2014 | Sartipi et al. |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,091 B1 | 5/2014 | Abhyanker |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,738,545 B2 | 5/2014 | Abhyanker |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,825,226 B1 | 9/2014 | Worley, III et al. |
| 8,832,556 B2 | 9/2014 | Steinberg |
| 2001/0005829 A1 | 6/2001 | Raveis |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0033176 A1 | 2/2003 | Hancock |

(56) References Cited

U.S. PATENT DOCUMENTS

| | | |
|---|---|---|
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0002871 A1 | 1/2004 | Geranio |
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0039581 A1 | 2/2004 | Wheeler |
| 2004/0054428 A1 | 3/2004 | Sheha et al. |
| 2004/0056762 A1 | 3/2004 | Rogers |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1 | 5/2005 | Bodin et al. |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino et al. |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058921 A1 | 3/2006 | Okamoto |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |

(56) References Cited

U.S. PATENT DOCUMENTS

| | | |
|---|---|---|
| 2006/0100892 A1 | 5/2006 | Ellanti |
| 2006/0113425 A1 | 6/2006 | Rader |
| 2006/0123053 A1 | 6/2006 | Scannell |
| 2006/0125616 A1 | 6/2006 | Song |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1 | 9/2006 | Lyon |
| 2006/0217885 A1* | 9/2006 | Crady .................. G01C 21/00 701/469 |
| 2006/0218225 A1 | 9/2006 | Hee Voon et al. |
| 2006/0218226 A1 | 9/2006 | Johnson et al. |
| 2006/0223518 A1 | 10/2006 | Haney |
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112461 A1 | 5/2007 | Zini et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219659 A1 | 9/2007 | Abhyanker et al. |
| 2007/0219712 A1 | 9/2007 | Abhyanker |
| 2007/0220174 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1* | 10/2007 | Abhyanker .......... G06Q 10/087 705/28 |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |

(56) References Cited

U.S. PATENT DOCUMENTS

| | | |
|---|---|---|
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | DaCosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |
| 2008/0077464 A1 | 3/2008 | Gottlieb et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1 | 4/2008 | Jhanji |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1 | 7/2008 | Murphy et al. |
| 2008/0162211 A1 | 7/2008 | Addington |
| 2008/0162260 A1 | 7/2008 | Rohan et al. |
| 2008/0167771 A1 | 7/2008 | Whittaker et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0228719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243378 A1 | 10/2008 | Zavoli |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018850 A1 | 1/2009 | Abhyanker |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0282353 A1 | 11/2009 | Halbherr et al. |
| 2009/0284530 A1 | 11/2009 | Lester et al. |
| 2009/0287682 A1 | 11/2009 | Fujioka et al. |
| 2009/0299551 A1 | 12/2009 | So et al. |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0070075 A1 | 3/2010 | Chirnomas |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082683 A1 | 4/2010 | Law et al. |
| 2010/0083125 A1 | 4/2010 | Zafar et al. |
| 2010/0088015 A1 | 4/2010 | Lee |

(56) References Cited

U.S. PATENT DOCUMENTS

| | | |
|---|---|---|
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0255899 A1 | 10/2010 | Paulsen |
| 2010/0275033 A1 | 10/2010 | Gillespie et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1 | 7/2011 | Zini et al. |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0126974 A1 | 5/2012 | Phillips et al. |
| 2012/0138732 A1 | 6/2012 | Olm et al. |
| 2012/0163206 A1 | 6/2012 | Leung et al. |
| 2012/0166935 A1 | 6/2012 | Abhyanker |
| 2012/0191606 A1 | 7/2012 | Milne |
| 2012/0191797 A1 | 7/2012 | Masonis et al. |
| 2012/0209775 A1 | 8/2012 | Milne |
| 2012/0221470 A1 | 8/2012 | Lyon |
| 2012/0224076 A1 | 9/2012 | Niedermeyer et al. |
| 2012/0232958 A1 | 9/2012 | Silbert |
| 2012/0239483 A1 | 9/2012 | Yankovich et al. |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0331002 A1 | 12/2012 | Carrington |
| 2013/0005307 A1 | 1/2013 | Kim et al. |
| 2013/0024108 A1 | 1/2013 | Grün |
| 2013/0041761 A1 | 2/2013 | Voda |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0080217 A1 | 3/2013 | Abhyanker |
| 2013/0103437 A1 | 4/2013 | Nelson |
| 2013/0105635 A1 | 5/2013 | Alzu'bi et al. |
| 2013/0110631 A1 | 5/2013 | Mitchell et al. |
| 2013/0151455 A1 | 6/2013 | Odom et al. |
| 2013/0159127 A1 | 6/2013 | Myslinski |
| 2013/0204437 A1 | 8/2013 | Koselka et al. |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Fuste Vilella et al. |
| 2013/0303197 A1 | 11/2013 | Chandra et al. |
| 2013/0317999 A1 | 11/2013 | Zimberoff et al. |
| 2014/0032034 A1 | 1/2014 | Raptopoulos et al. |
| 2014/0040179 A1 | 2/2014 | Shai Herzog et al. |
| 2014/0067167 A1 | 3/2014 | Levien et al. |
| 2014/0067704 A1 | 3/2014 | Abhyanker |
| 2014/0074736 A1 | 3/2014 | Carrington |
| 2014/0081450 A1 | 3/2014 | Kuehnrich et al. |
| 2014/0087780 A1 | 3/2014 | Abhyanker et al. |
| 2014/0095293 A1 | 4/2014 | Abhyanker |
| 2014/0100900 A1 | 4/2014 | Abhyanker |
| 2014/0108540 A1 | 4/2014 | Crawford |
| 2014/0108556 A1 | 4/2014 | Abhyanker |
| 2014/0108613 A1 | 4/2014 | Randall |
| 2014/0114866 A1 | 4/2014 | Abhyanker |
| 2014/0115671 A1 | 4/2014 | Abhyanker |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0135039 A1 | 5/2014 | Sartipi et al. |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1 | 6/2014 | Abhyanker et al. |
| 2014/0204360 A1 | 7/2014 | Dowski, Jr. et al. |
| 2014/0222908 A1 | 8/2014 | Park et al. |
| 2014/0254896 A1 | 9/2014 | Zhou et al. |
| 2014/0277834 A1 | 9/2014 | Levien et al. |
| 2014/0316243 A1 | 10/2014 | Niedermeyer |

FOREIGN PATENT DOCUMENTS

| | | |
|---|---|---|
| KR | 1020120121376 A | 7/2012 |
| WO | 9808055 A1 | 2/1998 |
| WO | 9956143 A1 | 11/1999 |
| WO | 0054170 A2 | 9/2000 |
| WO | 0163423 A1 | 8/2001 |
| WO | 0201455 A2 | 1/2002 |
| WO | 0219236 A1 | 3/2002 |
| WO | 0241115 A2 | 5/2002 |
| WO | 03058540 A1 | 7/2003 |
| WO | 2005103624 A2 | 11/2005 |
| WO | 2006020471 A1 | 2/2006 |
| WO | 2007108927 A2 | 9/2007 |
| WO | 2007108928 A2 | 9/2007 |
| WO | 2007113844 A1 | 10/2007 |
| WO | 2008103149 A1 | 8/2008 |
| WO | 2008105766 A1 | 9/2008 |
| WO | 2008108772 A1 | 9/2008 |
| WO | 2008118119 A1 | 10/2008 |
| WO | 2008123851 A1 | 10/2008 |
| WO | 2008111929 A3 | 11/2008 |

(56) References Cited

FOREIGN PATENT DOCUMENTS

| WO | 2009138559 A1 | 11/2009 |
|----|---------------|---------|
| WO | 2010103163 A1 | 9/2010  |
| WO | 2013188762 A1 | 12/2013 |
| WO | 2014121145 A1 | 8/2014  |

OTHER PUBLICATIONS http://www.zdnet.com/news/perspective-social-networking-for-all/149441.
http://www.remax.com/advancedsearch/.
http://global.remax.com/AdvancedListingSearch.aspx.
http://www.magicbricks.com/property-requirement-to-buy-rent/residential-commercial.
http://www.mapmyindia.com/solutions/tracking-lbs/vehicle-tracking.
http://www.mapmyindia.com/solutions/tracking-lbs/asset-tracking.
http://www.mapmyindia.com/solutions/enterprises/geo-tagging.
http://www.zillow.com/.
http://www.zillow.com/homes/for$_{13}$ rent/.
http://www.zillow.com/homes/for_sale/days_sort/53.409532,-64.072266,19.352611,-129.550781_rect/3_zm/.
http://www.trulia.com/home_prices/.
http://www.trulia.com/for_rent/New_York,NY.
http://www.realtor.com/rentals.
http://www.realtor.com/realestateforsale.
http://www.househunt.com/.
http://www.coldwellbanker.com/real_estate_search;jsessionid=S8ok3kaZtBh5GKHoo-Yzo28Z.sky-node04.
http://www.switchboard.com/.
http://www.anywho.com/whitepages.
http://wp.superpages.com/.
http://www.whitepages.com/.
http://www-personal.umich.edu/~ladamic/papers/socialsearch/adamicsocialsearch.pdf.
http://cs.wellesley.edu/~cs315/315_PPTs/L19-SocialNetworks/Stuff/wellesley.pdf.
http://citeseerx.ist.psu.edu/viewdoc/download?doi=10.1.1.98.5230&rep=rep1&type=pdf.
http://www.ece.Isu.edu/xinli/Research/HeatMap_TVCG06.pdf.
http://www.usa-people-search.com/.
https://www.i-neighbors.org/.
Benchmark-Backed Nextdoor Launches as a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.
Fatdoor Founder Sues Benchmark Capital, Saying It Stole His Idea for Nextdoor, All Things Digital Article, Nov. 11, 2011, by Liz Gannes (7 Pages) http://allthingsd.com/20111111/fatdoor-founder-sues-benchmark-capital-saying-it-stole-his-idea-for-nextdoor/.
Fatdoor CEO Talks About Balancing Security with Community, Wired Magazine, May 31, 2007, by Terrence Russell (2 Pages) http://www.wired.com/2007/05/fatdoor_ceo_tal/.
Fatdoor Launches Social Network for Your Neighborhood, Mashable Article, May 28, 2007, by Kristen Nicole (3 Pages) http://mashable.com/2007/05/28/fatdoor/.
Screenshots of Nextdoor website and its features—as submitted in Case5:14-cv-02335-BLF on Jul. 15, 2014 (pp. 19) http://www.nextdoor.com/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum. screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF Complaint *Fatdoor v. Nextdoor*, Northern District of California, with Exhibits A, B and C {Part 1 (pp. 258)} and Exhibits D, E, F, G and H {Part 2 (pp. 222)}, Jul. 15, 2014.
Expert Report—Forensics of Jon Berryhill, Report, *Nextdoor v. Abhyanker*, Aug. 8, 2014, by Berryhill Computer forensics Inc. (pp. 23).
Case No. 3:12-cv-05667-EMC Complaint *Nextdoor v. Abhyanker*, Northern District of California, Nov. 5, 2012 (pp. 46).
Expert Report—Patent of Jeffrey G. Sheldon, *Nextdoor v. Abhyanker*, Aug. 8, 2014 (pp. 7).
Exhibits of Expert Report—Patent of Jeffrey G. Sheldon, *Nextdoor v. Abhyanker*, with Attachments A, B, C, D and E (1/2) {Part 1 (pp. 46)} and Attachments E (2/2) and F {Part 2 (pp. 41)}.
Case No. 111-CV-212924 *Abhyanker v. Benchmark Capital Partners L.P.*, Superior Court of California, County of Santa Clara, Nov. 10, 2011 (pp. 78) http://www.scribd.com/doc/72441873/Stamped-COMPLAINT-Abhyanker-v-Benchmark-Capital-Et-Al-FILED-PUBLIC.
Neighbors Stop Diaper and Formula Thief in his Tracks, Nextdoor Blog, Aug. 15, 2014, by Anne Dreshfield (pp. 12) http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc. v. IP Analytics LLC and Google Inc.*,Northern District of California, Aug. 25, 2014, (pp. 16).
Screenshot of Meetey on Crunch Base, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on Crunch Base, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry the Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.

(56) References Cited

OTHER PUBLICATIONS

Screenshot of Facebook website for groups, Aug. 27, 2014, (p. 1) https://www.facebook.com/about/groups.
Facebook Engineers bring Google-F Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
"Friends and Neighbors on the Web", 2001 by Lada A. Adamic et al. (pp. 9) http://www.hpl.hp.com/research/idl/papers/web10/fnn2.pdf.
"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.
"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.
"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.
"Notification for Shared Annotation of Digital Documents", Technical Report MSR-TR-2001-87, Sep. 19, 2001 by A. J. Bernheim Brush et al. (pp. 9) http://research.microsoft.com/pubs/69880/tr-2001-87.pdf.
"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.
"Computer Systems and the Design of Organizational Interaction", by Fernando Flores et al. (pp. 20) http://cpe.njit.edu/dlnotes/CIS/CIS735/ComputerSystemsandDesign.pdf.
"ChipIn—the easy way to collect money", Louis' Really Useful Finds, Mar. 12. (p. 1) http://reallyusefulthings.tumblr.com/post/28688782/chipin-the-easy-way-to-collect-money.

\* cited by examiner

| EMAIL ADDRESS: | | ~2502
|---|---|
| REPEAT EMAIL ADDRESS: | |
| FIRST NAME: | |
| LAST NAME: | |
| PASSWORD: | |
| REPEAT PASSWORD: | |
| GENDER: | ○ MALE   ○ FEMALE |
| INTERESTED IN MEETING PEOPLE FOR: ☑ HOBBIES              ○ FAMILIES  ○ SINGLES ☑ NEIGHBORHOOD WATCH  ○ STUDENTS ☑ FRIENDS ☑ HELP ☐ JUST HERE FOR HELP | |

DID A NEIGHBOR REFER YOU TO FATDOOR?
NEIGHBORS EMAIL ADDRESS: [     ]
(TO AUTOMATICALLY CONNECT TO YOUR NEIGHBOR AND YOUR NEIGHBOR'S FRIENDS.)

| GROUPS: | ○ SCRAPBOOK CLUB<br>○ BIBLE STUDY GROUP<br>○ LONE STAR GROUP<br>○ NEIGHBORHOOD PROTECTORS CLUB |
|---|---|
| DATE OF BIRTH: | ▼ ▼ ▼ |
| COUNTRY: | ▼ |
| ZIP/POSTAL CODE: | (U.S. & CANADA ONLY) |
| HOME TOWN: | (WHERE YOU GREW UP) |
| OCCUPATION: | |
| INTERESTS: | (SEPARATE INTERESTS WITH COMMAS) |
| VEHICLE: | (FOR RENT) |

2202 — USER INTERFACE
2504

FIGURE 25

| SUBJECT: | INVITATION TO JOIN FATDOOR FROM JOHN DOE, A NEIGHBOR TO YOU |
|---|---|
| FROM: | USER@DOMAIN.COM |
| TO: | (SEPARATE MULTIPLE ADDRESSES WITH COMMAS) <br> [IMPORT FROM YOUR ADDRESS BOOK] |
| OPTIONAL PERSONAL MESSAGE: | |
| MESSAGE BODY: | JOHN DOE HAS INVITED YOU TO JOIN JOHN'S PERSONAL AND PRIVATE COMMUNITY AT FATDOOR, WHERE YOU AND JOHN CAN NETWORK WITH EACH OTHER'S NEIGHBORS. <br><br> FATDOOR IS AN ONLINE COMMUNITY THAT CONNECTS NEIGHBORS THROUGH NETWORKS OF OTHER NEIGHBORS FOR COMMUNITY SERVICE, SAFETY AND MAKING NEW FRIENDS. <br><br> YOU CAN USE FATDOOR TO: <br> * MEET NEW NEIGHBORS TO TALK WITH, THROUGH YOUR NEIGHBORS AND THEIR FRIENDS <br> * MAKE NEW FRIENDS <br> * HELP YOUR NEIGHBORS MEET NEW PEOPLE <br><br> ONCE YOU JOIN FATDOOR, YOU WILL BE AUTOMATICALLY CONNECTED TO YOUR NEIGHBOR JOHN, AND ALL OF JOHN'S FRIENDS. <br><br> CLICK BELOW TO JOIN FATDOOR <br> HTTP://WWW.FATDOOR.COM/JOIN.JSP?INVITE=140807 |

USER INTERFACE

FIGURE 27

DRIVERLESS VEHICLE COMMERCE NETWORK AND COMMUNITY

FIELD OF TECHNOLOGY

This disclosure relates generally to data processing devices and, more particularly, to a method and/or a system of a driverless automobile commerce network and community is disclosed.

BACKGROUND

An proprietor may own and/or lease a driverless vehicle (e.g., a self-driving vehicle, an autonomous vehicle requiring no human driver). The driverless vehicle may remain unused for a portion of a day, a week, a month and/or a year. For example, the driverless vehicle may remain idle (e.g., stationary, unutilized) when the proprietor is at home, work and/or on vacation.

Other individuals may wish to rent the driverless vehicle from the proprietor when the driverless vehicle is idle. The proprietor may be willing to share (e.g., rent) his/her driverless vehicle to the other individuals when the driverless vehicle is idle. However, the proprietor may not know who wants to borrow/rent the driverless vehicle when it is predictably idle (e.g., at a home location and/or a work location at a predictable time of day). In addition, the proprietor may not have a clear idea about how long a rental time of the driverless vehicle might be and/or an expected time of return. In addition, the proprietor may not trust the other individuals. Even still, the other individuals may not be able to pay the proprietor when renting the driverless vehicle. Therefore, valuable monetization opportunities of the driverless vehicle may be lost.

SUMMARY

A method, device, and system of a driverless automobile commerce network and community is disclosed. In one aspect, a method of an automobile sharing server includes associating a unique identifier associated with a driverless vehicle with the automobile sharing server, periodically analyzing a location of the driverless vehicle based on a geospatial data associated with a location of the driverless vehicle, and declaring a non-transitory location of the driverless vehicle based on a predictable behavior algorithm. The method permits an owner of the driverless vehicle to list the driverless vehicle on an automobile sharing network. In addition, the method processes a payment of a renter of the driverless vehicle in a threshold radial distance from the driverless vehicle when the driverless vehicle is predictable at the non-transitory location for a predictably available period of time. Furthermore, a financial account of the owner of the driverless vehicle is credited with the payment of the renter of the driverless vehicle in the threshold radial distance from the driverless vehicle when the driverless vehicle is predictable at the non-transitory location for a predictably available period of time.

The unique identifier of the driverless vehicle may be a license plate of the driverless vehicle, and/or a social networking profile of the user in a geo-spatial social community. The method may include automatically recommending connections to the owner of the driverless vehicle based on the non-transitory location. The connections may be associated with other users of the geo-spatial social community based on other users of the geo-spatial social community sharing a common interest with the owner in the threshold radial distance from the non-transitory location, and/or other driverless vehicles of the geo-spatial social community whose owners share the common interest with the owner in the threshold radial distance from the non-transitory location. The method may include automatically instructing the driverless car to navigate to a location of the renter, and/or periodically updating the owner and/or the renter based on a time in transit, a time to arrival, a time to destination, and/or the payment earned status. A criteria associated with an automotive listing data including a description, a photograph, a video, a rental fee, a category, a vehicle make, a vehicle model, and/or a functional status may be processed.

In addition, an availability chart may be populated when the driverless vehicle associated with the listing criteria is posted. The availability chart may include an operation area radius, a start timing, an end timing, an hours per day, and/or an hours per user. The method may further include determining that the automotive listing data is generated by the verified user of the neighborhood broadcast system when validating that the automotive listing data is associated with the mobile device. It may be determined that an application on the mobile device is communicating the automotive listing data to the automobile sharing network when the automotive listing data may processed.

The verified user may be associated with a verified user profile in the automobile sharing network through the application on the mobile device. The automotive listing data generated through the mobile device may be presented as an automobile sharing alert pushpin of the automotive listing data in a geospatial map surrounding pre-populated residential and/or business listings in a surrounding vicinity, such that the automobile sharing alert pushpin of the automotive listing data may automatically presented on the geospatial map in addition to being presented on the set of user profiles having associated verified addresses in the threshold radial distance from the set of geospatial coordinates associated with the automotive listing data generated through the mobile device of the verified user of the automobile sharing server.

The automotive listing data generated through the mobile device may be radially distributed through an on-page posting, an electronic communication, and/or a push notification delivered to desktop and/or mobile devices associated with users and/or their user profiles around an epicenter defined at the set of geospatial coordinates associated with the automotive listing data that may be generated through the mobile device to all subscribed user profiles in a circular geo-fenced area (defined by the threshold distance from the set of geospatial coordinates associated with the automotive listing data generated through the mobile device) through the radial algorithm of the automobile sharing network that measures a distance away of each address associated with each user profile from the current geospatial location at the epicenter.

The method may include permitting the verified user to drag and/or drop the automobile sharing alert pushpin on any location on the geospatial map, and/or automatically determining a latitude and/or a longitude associated a placed location. The method may further include automatically notifying a user, a business, and/or an automobile rental agency in a surrounding geospatial area to the set of geospatial coordinates associated with the automotive listing data generated through the mobile device. The geospatial coordinates may be extracted from a metadata associated with the automotive listing data generated through the mobile device when verifying that the set of geospatial coordinates associated with the automotive listing data generated through the mobile device are trusted based on the claimed geospatial location of the verified user of the automobile sharing server.

A relative match between a persistent clock associated with the automobile sharing server and/or a digital clock of the mobile device may be determined to determine that the time stamp associated with the creation date and/or time of the automotive listing data generated through the mobile device may accurate and/or therefore trusted. A publishing of the automotive listing data generated through the mobile device may be automatically deleted on a set of user profiles having associated verified addresses in the threshold radial distance from the set of geospatial coordinates associated with the automotive listing data generated through the mobile device of the verified user of the automobile sharing server based on an automobile sharing alert expiration time.

The method may also include geocoding a set of residential addresses each of which may be associated with a resident name in a neighborhood surrounding the mobile device. The set of residential addresses each associated with the resident name may be prepopulated as the set of user profiles in the threshold radial distance from the claimed geospatial location of the verified user of the automobile sharing server in a neighborhood curation system communicatively coupled with the automobile sharing server. The verified user may be permitted to modify content in each of the set of user profiles. The modified content may be tracked through the neighborhood curation system. A reversible history journal associated with each of the set of user profiles may be generated such that a modification of the verified user can be undone on a modified user profile page.

An editing credibility of the verified user may be determined based on an edit history of the verified user and/or a community contribution validation of the verified user by other users of the neighborhood curation system. The method may include automatically publishing the automotive listing data generated through the mobile device to a set of user profiles having associated verified addresses in a threshold radial distance from the claimed geospatial location of the verified user of the automobile sharing server using the radial algorithm.

A claim request of the verified user generating the automotive listing data generated through the mobile device to be associated with an address of the neighborhood curation system may be processed. It may be determined if the claimable neighborhood in the neighborhood curation system may be associated with a private neighborhood community in the claimable neighborhood of the neighborhood curation system. The verified user may be associated with the private neighborhood community in the claimable neighborhood of the neighborhood curation system if the private neighborhood community has been activated by the verified user and/or a different verified user. The verified user may be permitted to draw a set of boundary lines in a form of a geospatial polygon such that the claimable neighborhood in a geospatial region surrounding the claim request may create the private neighborhood community in the neighborhood curation system if the private neighborhood community may be inactive.

The method may verify the claim request of the verified user generating the automotive listing data generated through the mobile device to be associated with a neighborhood address of the neighborhood curation system when the address may be determined to be associated with a work address and/or a residential address of the verified user. The automotive listing data generated through the mobile device may be simultaneously published on the private neighborhood community associated with the verified user generating the automotive listing data generated through the mobile device in the threshold radial distance from the address associated with the claim request of the verified user of the neighborhood curation system when automatically publishing the automotive listing data generated through the mobile device on a set of user profiles having associated verified addresses in a threshold radial distance from the claimed geospatial location of the verified user of the automobile sharing server based on a set of preferences of the verified user using the radial algorithm.

A set of profiles may be automatically downloaded to the mobile device. A driverless car owner may the verified user. An interface may be provided to the owner of the driverless car such that the owner of the driverless car may be able to use a haptic 'flick' gesture in a horizontal and/or a vertical fashion to switch a viewing pane associated with a profile. The method may include analyzing a response of the driverless car owner being a dismiss, a save, a rating, a review and/or a rental acceptance of a renter associated with the automotive listing data through the automobile sharing server. A video communication and/or an audio communication may be automatically initiated between the mobile device of the driverless car owner and/or another mobile device the renter through the automobile sharing server based on the profile of the renter associated with the automotive listing data through the automobile sharing server.

The renter and/or other renters may be permitted to view the rating and/or the review provided by the driverless car owner for each of the renters based on a participation criteria set by the driverless car owner and/or the renter, such that each renter may able to view ratings and/or reviews of each participating candidate for the rental associated with the automotive listing data. Each renter for the rental of the driverless vehicle associated with the automotive listing data may be permitted to communicate with each other and/or form social connections with each other based on the participation criteria set by the driverless car owner and/or the renter, such that each renter may able to form social connections with each participating candidate for the rental associated with the automotive listing data.

The method may also include permitting participating driverless car owners in the automobile sharing server to see previous ratings, comments, reviews, prescreen questions, and/or background checks of across a plurality of renters applying for a plurality driverless car rentals through the automobile sharing server (such that different driverless car owners benefit from previous diligence of at one of previous ratings, comments, reviews, prescreen questions, and/or background checks by participating driverless car owners with each renter that has previously rented through the automobile sharing server). A summary data may be provided to the driverless car owner generating the automotive listing data generated through the mobile device of how many user profile pages were updated with an alert of the automotive listing data generated through the mobile device when publishing the automotive listing data generated through the mobile device in the private neighborhood community and/or the set of user profiles having associated verified addresses in the threshold radial distance from the claimed geospatial location of the verified user of the automobile sharing server based on the set of preferences of the verified user.

The automotive listing data generated through the mobile device may be live broadcasted to the different verified user and/or other verified users in the private neighborhood community (and/or currently within the threshold radial distance from the current geospatial location) through the automobile sharing server through a multicast algorithm such that a live broadcast multicasts to a plurality of data processing systems associated with each of the different user and/or the other verified users simultaneously (when the mobile device of the verified user generating the live-broadcast enables broadcasting of the automotive listing data generated through the mobile device to any one of a geospatial vicinity around the mobile device of the verified user generating the broadcast and/or in any private neighborhood community in which the verified user has a non-transitory connection). The different verified user and/or other verified users in the private neighborhood community may be permitted to bi-directionally communicate with the verified user generating the broadcast through the automobile sharing server.

Any private neighborhood community in which the verified user has a non-transitory connection may be a residential address of the verified user and/or a work address of the verified user that has been confirmed by the automobile sharing server as being associated with the verified user. The threshold distance may between 0.2 and/or 0.4 miles from the set of geospatial coordinates associated with the automotive listing data generated through the mobile device to optimize a relevancy of the live-broadcast. The automobile sharing server may include a crowd-sourced moderation algorithm in which multiple neighbors in a geospatial area determine what content contributed to the automobile sharing server persists and/or which may deleted.

The automobile sharing server may permit users to mute messages of specific verified users to prevent misuse of the automobile sharing server. The automobile sharing server may permit the automotive listing data to be disseminated to adjacent neighborhoods that have been claimed by different users in a manner such that the automotive listing data may optionally disseminated to the surrounding claimed neighborhoods based on a preference of the verified user. A claimed neighborhood of the verified user may be activated based on a minimum number of other verified users in the threshold radial distance that have been verified through a primary residential address associated with each of the other verified users through a post card verification, a utility bill verification, a privately-published access code, and/or a neighbor vouching method. Access to the automotive listing data may be restricted to the claimed neighborhood of the verified user. Access to the automotive listing data may denied to users having verified addresses outside the claimed neighborhood of the verified user.

In another aspect, the method of the driverless vehicle includes communicating a unique identifier associated with the driverless vehicle with an automobile sharing server and periodically determining a location of the driverless vehicle based on a geospatial data associated with a location of the driverless vehicle. The method further includes automatically setting a navigation route of the driverless vehicle when the driverless vehicle is located at a non-transitory location of the driverless vehicle based on a predictable behavior algorithm. In addition, a payment of a renter of the driverless vehicle in a threshold radial distance from the driverless vehicle is processed when the renter is picked up by the driverless vehicle.

A unique identifier associated with a driverless vehicle may be associated with the automobile sharing server. A location of the driverless vehicle may be periodically analyzed based on a geospatial data associated with a location of the driverless vehicle. A non-transitory location of the driverless vehicle may be declared based on a predictable behavior algorithm. An owner of the driverless vehicle may be permitted to list the driverless vehicle on an automobile sharing network, wherein the driverless car the navigation route automatically instructed to navigate to a location of the renter.

In yet another aspect, a system includes a network and an autonomous vehicle to automatically set a navigation route of the autonomous vehicle to a location of a renter of the autonomous vehicle when the autonomous vehicle is located at a non-transitory location of the autonomous vehicle based on a predictable behavior algorithm. The system also includes an automobile sharing server communicatively coupled with the autonomous vehicle to credit a financial account of an owner of the autonomous vehicle with a payment of the renter of the autonomous vehicle in the threshold radial distance from the autonomous vehicle when the autonomous vehicle is predictable at the non-transitory location for a predictably available period of time.

A unique identifier associated with a driverless vehicle may be associated with the automobile sharing server. A location of the driverless vehicle may be periodically analyzed based on a geospatial data associated with a location of the driverless vehicle. A non-transitory location of the driverless vehicle may be declared based on a predictable behavior algorithm. An owner of the driverless vehicle may be permitted to list the driverless vehicle on an automobile sharing network, wherein the driverless car the navigation route automatically instructed to navigate to a location of the renter.

The unique identifier may be a license plate of the autonomous vehicle, and/or a social networking profile of the user in a geo-spatial social community. A connection recommendation module may automatically recommend connections to the owner of the autonomous vehicle based on the non-transitory location. The connections may be associated with other users of the geo-spatial social community based on other users of the geo-spatial social community sharing a common interest with the owner in the threshold radial distance from the non-transitory location, and/or other autonomous vehicles of the geo-spatial social community whose owners share the common interest with the owner in the threshold radial distance from the non-transitory location. A navigation module may automatically instruct the autonomous vehicle to navigate to a location of the renter. An update module may periodically update the owner and/or the renter based on a time in transit, a time to arrival, a time to destination, and/or the payment earned status.

A criteria module may process a criteria associated with an automotive listing data including a description, a photograph, a video, a rental fee, a category, a vehicle make, a vehicle model, and/or a functional status. A charting module may populate an availability chart when the autonomous vehicle associated with the listing criteria is posted. The availability chart may include an operation area radius, a start timing, an end timing, an hours per day, and/or an hours per user. A validation module may determine that the automotive listing data is generated by the verified user of the neighborhood broadcast system when validating that the automotive listing data is associated with the mobile device. An application module may determine that an application on the mobile device is communicating the automotive listing data to the automobile sharing network when the automotive listing data is processed.

An association module may associate the verified user with a verified user profile in the automobile sharing network through the application on the mobile device. A pushpin module may present the automotive listing data generated through the mobile device as an automobile sharing alert pushpin of the automotive listing data in a geospatial map surrounding pre-populated residential and/or business listings in a surrounding vicinity (such that the automobile sharing alert pushpin of the automotive listing data may be automatically presented on the geospatial map in addition to being presented on the set of user profiles having associated verified addresses in the threshold radial distance from the set of geospatial coordinates associated with the automobile listing data generated through the mobile device of the verified user of the automobile sharing server).

The automotive listing data generated through the mobile device may be radially distributed through an on-page posting, an electronic communication, and/or a push notification delivered to desktop and/or mobile devices associated with users and/or their user profiles around an epicenter defined at the set of geospatial coordinates associated with the automotive listing data generated through the mobile device to all subscribed user profiles in a circular geo-fenced area (defined by the threshold distance from the set of geospatial coordinates associated with the automotive listing data generated through the mobile device) through the radial algorithm of the automobile sharing network that may measure a distance away of each address associated with each user profile from the current geospatial location at the epicenter. A placement module may permit the verified user to drag and/or drop the automobile sharing alert pushpin on any location on the geospatial map, and/or automatically determine a latitude and/or a longitude associated a placed location. A notification module may automatically notify a user, a business, and/or an automobile rental agency in a surrounding geospatial area to the set of geospatial coordinates associated with the automotive listing data generated through the mobile device.

An extraction module may extract the geospatial coordinates from a metadata associated with the automotive listing data generated through the mobile device when verifying that the set of geospatial coordinates associated with the automotive listing data generated through the mobile device are trusted based on the claimed geospatial location of the verified user of the automobile sharing server. A matching module may determine a relative match between a persistent clock associated with the automobile sharing server and/or a digital clock of the mobile device to determine that the time stamp associated with the creation date and/or time of the automotive listing data generated through the mobile device may accurate and/or therefore trusted. A deletion module may automatically delete a publishing of the automotive listing data generated through the mobile device on a set of user profiles having associated verified addresses in the threshold radial distance from the set of geospatial coordinates associated with the automotive listing data generated through the mobile device of the verified user of the automobile sharing server based on an automobile sharing alert expiration time.

A plotting module may geocode a set of residential addresses each associated with a resident name in a neighborhood surrounding the mobile device. A data-seeding module may prepopulate the set of residential addresses each associated with the resident name as the set of user profiles in the threshold radial distance from the claimed geospatial location of the verified user of the automobile sharing server in a neighborhood curation system communicatively coupled with the automobile sharing server. A modification module may permit the verified user to modify content in each of the set of user profiles. A discovery module may track the modified content through the neighborhood curation system. An undo module may generate a reversible history journal associated with each of the set of user profiles such that a modification of the verified user can be undone on a modified user profile page. A reputation module may determine an editing credibility of the verified user based on an edit history of the verified user and/or a community contribution validation of the verified user by other users of the neighborhood curation system. A publication module may automatically publish the automotive listing data generated through the mobile device to a set of user profiles having associated verified addresses in a threshold radial distance from the claimed geospatial location of the verified user of the automobile sharing server using the radial algorithm.

A claiming module may process a claim request of the verified user generating the automotive listing data generated through the mobile device to be associated with an address of the neighborhood curation system. A private-neighborhood module may determine if the claimable neighborhood in the neighborhood curation system may be associated with a private neighborhood community in the claimable neighborhood of the neighborhood curation system. An association module may associate the verified user with the private neighborhood community in the claimable neighborhood of the neighborhood curation system if the private neighborhood community has been activated by the verified user and/or a different verified user. A boundary module may permit the verified user to draw a set of boundary lines in a form of a geospatial polygon such that the claimable neighborhood in a geospatial region surrounding the claim request may create the private neighborhood community in the neighborhood curation system if the private neighborhood community may inactive.

An address type module may verify the claim request of the verified user generating the automotive listing data generated through the mobile device to be associated with a neighborhood address of the neighborhood curation system when the address is determined to be associated with a work address and/or a residential address of the verified user. A concurrency module may simultaneously publish the automotive listing data generated through the mobile device on the private neighborhood community associated with the verified user generating the automotive listing data generated through the mobile device in the threshold radial distance from the address associated with the claim request of the verified user of the neighborhood curation system (when automatically publishing the automotive listing data generated through the mobile device on a set of user profiles having associated verified addresses in a threshold radial distance from the claimed geospatial location of the verified user of the automobile sharing server based on a set of preferences of the verified user using the radial algorithm).

A download module may automatically download a set of profiles to the mobile device, wherein an owner of the autonomous vehicle may the verified user. A flick module may provide an interface to the owner of the autonomous vehicle such that the owner of the autonomous vehicle can use a haptic 'flick' gesture in a horizontal and/or a vertical fashion to switch a viewing pane associated with a profile. A response module may analyze a response of the owner of the autonomous vehicle being a dismiss, a save, a rating, a review and/or a rental acceptance of a renter associated with the automotive listing data through the automobile sharing server.

A communication module may automatically initiate a video communication and/or an audio communication between the mobile device of the owner of the autonomous vehicle and/or another mobile device of the renter through the automobile sharing server based on the profile of the renter associated with the automotive listing data through the automobile sharing server. A review module may permit the renter and/or other renters to view the rating and/or the review provided by the owner of the autonomous vehicle for each of the renters based on a participation criteria set by the owner of the autonomous vehicle and/or the renter, such that each renter may be able to view ratings and/or reviews of each participating candidate for the rental associated with the automotive listing data. A social connection module may permit each renter for the rental of the autonomous vehicle associated with the automotive listing data to communicate with each other and/or form social connections with each other based on the participation criteria set by the owner of the autonomous vehicle and/or the renter, such that each renter may able to form social connections with each participating candidate for the rental associated with the automotive listing data.

A diligence module may permit participating owners of the autonomous vehicles in the automobile sharing server to see previous ratings, comments, reviews, prescreen questions, and/or background checks of across a plurality of renters applying for a plurality autonomous vehicle rentals through the automobile sharing server such that different owner of the autonomous vehicles benefit from previous diligence of at one of previous ratings, comments, reviews, prescreen questions, and/or background checks by participating owner of the autonomous vehicles with each renter that has previously rented through the automobile sharing server. A summary module may provide a summary data to the owner of the autonomous vehicle generating the automotive listing data generated through the mobile device of how many user profile pages were updated with an alert of the automotive listing data generated through the mobile device when publishing the automotive listing data generated through the mobile device in the private neighborhood community and/or the set of user profiles having associated verified addresses in the threshold radial distance from the claimed geospatial location of the verified user of the automobile sharing server based on the set of preferences of the verified user.

A live broadcast module may live broadcast the automotive listing data generated through the mobile device to the different verified user and/or other verified users in the private neighborhood community and/or currently within the threshold radial distance from the current geospatial location through the automobile sharing server through a multicast algorithm such that a live broadcast multicasts to a plurality of data processing systems associated with each of the different user and/or the other verified users simultaneously (when the mobile device of the verified user generating the live-broadcast enables broadcasting of the automotive listing data generated through the mobile device to any one of a geospatial vicinity around the mobile device of the verified user generating the broadcast and/or in any private neighborhood community in which the verified user has a non-transitory connection).

A bi-directional communication module may permit the different verified user and/or other verified users in the private neighborhood community to bi-directionally communicate with the verified user generating the broadcast through the automobile sharing server. Any private neighborhood community in which the verified user has a non-transitory connection may be a residential address of the verified user and/or a work address of the verified user that has been confirmed by the automobile sharing server as being associated with the verified user. The threshold distance may be between 0.2 and/or 0.4 miles from the set of geospatial coordinates associated with the automotive listing data generated through the mobile device to optimize a relevancy of the live-broadcast. The automobile sharing server may include a crowd-sourced moderation algorithm in which multiple neighbors in a geospatial area may determine what content contributed to the automobile sharing server persists and/or which may be deleted. The automobile sharing server may permit users to mute messages of specific verified users to prevent misuse of the automobile sharing server.

The automobile sharing server may permit the automotive listing data to be disseminated to adjacent neighborhoods that have been claimed by different users in a manner such that the automotive listing data may be optionally disseminated to the surrounding claimed neighborhoods based on a preference of the verified user. A claimed neighborhood of the verified user may be activated based on a minimum number of other verified users in the threshold radial distance that have been verified through a primary residential address associated with each of the other verified users through a post card verification, a utility bill verification, a privately-published access code, and/or a neighbor vouching system. Access to the automotive listing data may be restricted to the claimed neighborhood of the verified user. Access to the automotive listing data may be denied to users having verified addresses outside the claimed neighborhood of the verified user.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this disclosure are illustrated by way of example and not limitation in the figures of the accompanying drawings, in which like references indicate similar elements and in which:

FIG. 25 is an exemplary graphical user interface view for data collection, according to one embodiment.

FIG. 27 is an exemplary graphical user interface view of an invitation, according to one embodiment.

Other features of the present embodiments will be apparent from the accompanying drawings and from the detailed description that follows.

DETAILED DESCRIPTION

A method, device, and system of a driverless automobile commerce network and community are disclosed. Example embodiments, as described below, may be used to provide a method, a system and/or a device of automotive listing data 102 generation and publication in a constrained geospatial vicinity around a broadcast location of a neighborhood social network. Although the present embodiments have been described with reference to specific example embodiments, it will be evident that various modifications and changes may be made to these embodiments without departing from the broader spirit and scope of the various embodiments.

Figure 1:
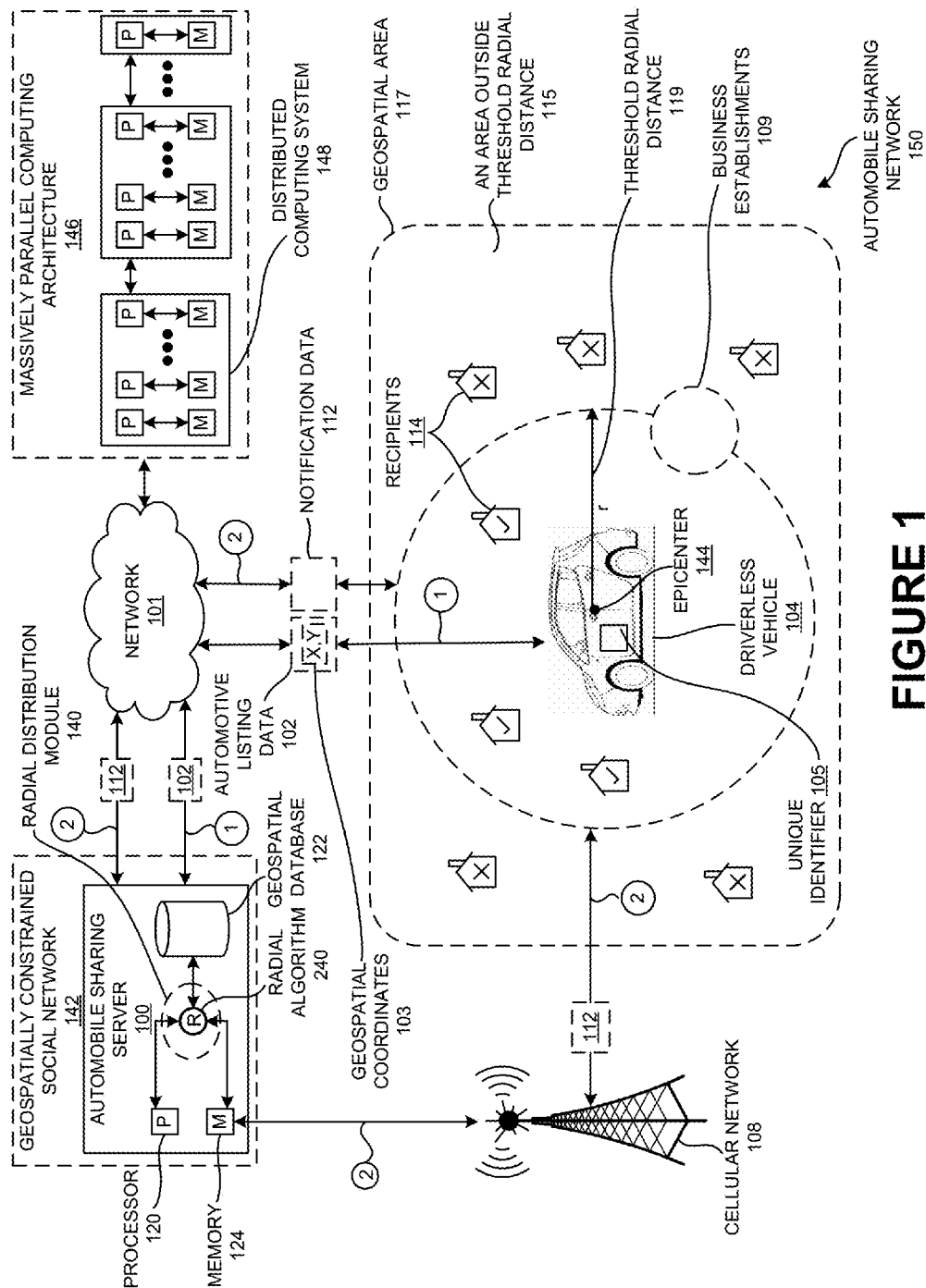
FIG. 1 is a network view of an automobile sharing server having a radial distribution module communicating with a device that generates a radial broadcast through an internet protocol network using a radial algorithm of the radial distribution module of the automobile sharing server, according to one embodiment.

FIG. 1 is a network view of as automobile sharing server 100 having a radial distribution module 140 communicating with a device that generates a radial broadcast through an internet protocol network using a radial algorithm of the radial distribution module of the automobile sharing server 100, according to one embodiment.

Particularly, FIG. 1 illustrates an automobile sharing network 150, according to one embodiment. The embodiment of FIG. 1 describes an automobile sharing server 100, a network 101, an automotive listing data 102, a set of geospatial coordinates 103, a driverless vehicle 104, a cellular network 108, a set of business establishments 109 (including a business 309A, an automobile rental agency 309B and a taxi business 309C as will be described in FIG. 3), a notification data 112, a set of recipients 114, an area outside the threshold radial distance 115, a geospatial area 117, a threshold radial distance 119, a processor 120, a geospatial database 122, a memory 124, a radial distribution module 140 (e.g., that applies a radial algorithm 240 of FIG. 2 using a series of modules working in concert as described in FIG. 2), a geospatially constrained social network 142, an epicenter 144, a massively parallel computing architecture 146, and a distributed computing system 148.

The automobile sharing server 100 includes a processor 120, a memory 124, and a geospatial database 122, according to the embodiment of FIG. 1. The automobile sharing server 100 may be one or more server side data processing systems (e.g., web servers operating in concert with each other) that operate in a manner that provide a set of instructions to any number of client side devices (e.g., the driverless vehicle 104, a mobile device 303) communicatively coupled with the automobile sharing server 100 through the network 101. For example, the automobile sharing server 100 may be a computing system (e.g., or a group of computing systems) that operates in a larger client-server database framework (e.g., such as in a social networking software such as Nextdoor.com, Fatdoor.com, Facebook.com, etc.).

The driverless vehicle 104 (e.g., driverless car, driverless motorcycle, driverless aerial vehicle, autonomous vehicle) may access the automobile sharing server 100 through the network 101 using a browser application of the mobile device (e.g., Google® Chrome) and/or through a client-side application downloaded to the driverless vehicle 104 (e.g., a Nextdoor.com mobile application, a Fatdoor.com mobile application). In an alternate embodiment, a mobile device (e.g., a mobile device 303, recipient device 505) may access the automobile sharing server 100 through the network 101 using a browser application of the mobile device (e.g., Google® Chrome) and/or through a client-side application downloaded to the driverless vehicle 104 (e.g., a Nextdoor.com mobile application, a Fatdoor.com mobile application). In another embodiment, a non-mobile computing device, such as a desktop computer (not shown) may access the automobile sharing server 100 through the network 101.

The automotive listing data 102 may be communicated from the driverless vehicle 104 and/or mobile device to the automobile sharing server 100 through the network 101. The automotive listing data 102 may include information about a rental status of a driverless vehicle to recipients 114 and/or the business establishments 109 through the network 101. For example, the automobile sharing broadcast may relate to an availability of the vehicle, a price of rental, a conditions of rental, an operating radius, a description of the vehicle etc.

The automotive listing data 102 may be generated and distributed through an application of the radial distribution module 140 (e.g., that applies the radial algorithm 240 of FIG. 2 using a series of modules working in concert as described in FIG. 2) of the automobile sharing server 100. The radial distribution module 140 (e.g., that applies the radial algorithm 240 of FIG. 2 using a series of modules working in concert as described in FIG. 2) may be a series of software functions/processes that simulates the experience of transmitting and receiving local broadcasts for the verified user, according to one embodiment.

Using an internet protocol based network (e.g., the network 101), the automobile sharing server 100 may be able to use the radial distribution module 140 (e.g., that applies the radial algorithm 240 of FIG. 2 using a series of modules working in concert as described in FIG. 2) to simulate a radio frequency (RF) based communication network using an IP network topology of the network 101. Therefore, the automotive listing data 102 can be distributed using the automobile sharing server 100 to a geo-constrained area (e.g., the recipients 114 in the geospatial area 117 and/or the business establishments 109 in a geo-constrained area around an area in which the driverless vehicle 104 operates without requiring expensive broadcast towers, transceivers, transmitters, amplifiers, antennas, tuners and/or wave generating and interpreting hardware (e.g., as may be required in local ham radio communication, frequency modulation (FM) audio systems, etc.).

The radial distribution module 140 (e.g., that applies the radial algorithm 240 of FIG. 2 using a series of modules working in concert as described in FIG. 2) may recreate an experience of communication between parties in a geospatially restricted area (e.g., for example in the same city, in the surrounding neighborhood, in the same zip code, in the same building, in the same claimed neighborhood) through the use of an Internet protocol network. The automobile sharing server 100 may overcome technical challenges of determining a user's geospatial location, calculating distance to other verified users based on relative geospatial locations, and/or coordinating information with a database of geo-coded information of interest (e.g., using the geospatial database 122) using the radial distribution module 140 (e.g., that applies the radial algorithm 240 of FIG. 2 using a series of modules working in concert as described in FIG. 2).

The radial distribution module 140 (e.g., that applies the radial algorithm 240 of FIG. 2 using a series of modules working in concert as described in FIG. 2), as a function/module of the automobile sharing server 100, may determine the location of the user, the distance between the user and/or the driverless vehicle 104 and/or other verified users, and the distance between the user and locations of interest. With that information, the radial distribution module 140 (e.g., that applies the radial algorithm 240 of FIG. 2 using a series of modules working in concert as described in FIG. 2) may further determine which verified users are within a predetermined vicinity of a user and/or driverless vehicle 104. This set of verified users within the vicinity of another verified user and/or driverless vehicle 104 may then be determined to be receptive to broadcasts transmitted by the user and to be available as transmitters of broadcasts to the user.

The radial distribution module 140 (e.g., that applies the radial algorithm 240 of FIG. 2 using a series of modules working in concert as described in FIG. 2) in effect may create a link between verified users and/or driverless vehicles 104 of the network 101 that allows the users and/or driverless vehicles 104 to communicate with each other, and this link may be based on the physical distance between the users as measured relative to a current geospatial location of the driverless vehicle 104 and/or mobile device with a claimed and verified (e.g., through a verification mechanism such as a postcard verification, a utility bill verification, and/or a vouching of the user with other users) non-transitory location (e.g., a home location, a work location) of the user and/or other users. In an alternate embodiment, the transitory location of the user (e.g., their current location, a current location of their vehicle and/or mobile phone) and/or the driverless vehicle 104 and/or the other users may also be used by the radial algorithm to determine an appropriate threshold distance for broadcasting a message.

Furthermore, the radial distribution module 140 (e.g., that applies the radial algorithm 240 of FIG. 2 using a series of modules working in concert as described in FIG. 2) may automatically update a set of pages associated with profiles of individuals and/or businesses that have not yet joined the network based on preseeded address information. In effect, the radial distribution module 140 (e.g., that applies the radial algorithm 240 of FIG. 2 using a series of modules working in concert as described in FIG. 2) may update preseeded pages in a geo-constrained radial distance from where a broadcast originates (e.g., using an epicenter 144 calculated from the current location of the driverless vehicle 104 and/or a mobile device 303 (e.g., the mobile device of the owner of the driverless vehicle 301) and/or the recipient device 505 with information about the automotive listing data 102. In effect, through this methodology, the radial distribution module 140 (e.g., that applies the radial algorithm 240 of FIG. 2 using a series of modules working in concert as described in FIG. 2) may leave 'inboxes' and/or post 'alerts' on pages created for users that have not yet signed up based on a confirmed address of the users through a public and/or a private data source (e.g., from Infogroup®, from a white page directory, etc.).

The radial distribution module 140 (e.g., that applies the radial algorithm 240 of FIG. 2 using a series of modules working in concert as described in FIG. 2) of the automobile sharing server 100 may be different from previous implementations because it is the first implementation to simulate the experience of local radio transmission between individuals using the internet and non-radio network technology by basing their network broadcast range on the proximity of verified users to one another, according to one embodiment.

FIG. 1 illustrates a number of operations between the driverless vehicle 104 and the recipients 114 and/or the business establishments 109. Particularly, circle '1' of FIG. 1 illustrates that the user of the driverless vehicle 104 communicates the automotive listing data 102 to the automobile sharing server 100 using the network 101. Then, after applying the radial algorithm 240 utilizing the radial distribution module 140, the automobile sharing server 100 generates and communicates an appropriate notification data (e.g., the notification data 112) associated with the automotive listing data 102 to a geospatially distributed set of recipients 114 in a radial area (radius represented as 'r' of FIG. 1) in a geospatial vicinity from an epicenter 144 associated a present geospatial location with the driverless vehicle 104 as illustrated as circle '2' in FIG. 1.

The radial algorithm 240 may operate as follows, according to one embodiment. The radial algorithm may utilize a radial distribution function (e.g., a pair correlation function)

$$g(r)$$

in the automobile sharing network 150. The radial distribution function may describe how density varies as a function of distance from a user, according to one embodiment.

If a given user is taken to be at the origin O (e.g., the epicenter 144), and if $$\rho = N/V$$

is the average number density of recipients 114 in the automobile sharing network 150, then the local time-averaged density at a distance r from O is $$\rho g(r)$$

according to one embodiment. This simplified definition may hold for a homogeneous and isotropic type of recipients 114, according to one embodiment of the radial algorithm 240.

A more anisotropic distribution (e.g., exhibiting properties with different values when measured in different directions) of the recipients 114 will be described below, according to one embodiment of the radial algorithm 240. In simplest terms it may be a measure of the probability of finding a recipient at a distance of r away from a given user, relative to that for an ideal distribution scenario, according to one embodiment. The anisotropic algorithm involves determining how many recipients 114 are within a distance of r and r+dr away from the user, according to one embodiment. The radial algorithm 240 may be determined by calculating the distance between all user pairs and binning them into a user histogram, according to one embodiment.

The histogram may then be normalized with respect to an ideal user at the origin o, where user histograms are completely uncorrelated, according to one embodiment. For three dimensions (e.g., such as a building representation in the geospatially constrained social network 142 in which there are multiple residents in each floor), this normalization may be the number density of the system multiplied by the volume of the spherical shell, which mathematically can be expressed as $$g(r)_I = 4\pi r^2 \rho dr,$$

where ρ may be the user density, according to one embodiment of the radial algorithm 240.

The radial distribution function of the radial algorithm 240 can be computed either via computer simulation methods like the Monte Carlo method, or via the Ornstein-Zernike equation, using approximative closure relations like the Percus-Yevick approximation or the Hypernetted Chain Theory, according to one embodiment.

This may be important because by confining the broadcast reach of a verified user in the automobile sharing network 150 to a specified range, the radial distribution module 140 (e.g., that applies the radial algorithm 240 of FIG. 2 using a series of modules working in concert as described in FIG. 2) may replicate the experience of local radio broadcasting and enable verified users to communicate information to their immediate neighbors as well as receive information from their immediate neighbors in areas that they care about, according to one embodiment. Such methodologies can be complemented with hyperlocal advertising targeted to potential users of the automobile sharing server 100 on preseeded profile pages and/or active user pages of the automobile sharing server 100. Advertisement communications thus may become highly specialized and localized resulting in an increase in their value and interest to the local verified users of the network through the automobile sharing server 100. For example, advertisers may wish to communicate deals on driverless vehicles and/or taxi services to frequent users.

The radial distribution module 140 (e.g., that applies the radial algorithm 240 of FIG. 2 using a series of modules working in concert as described in FIG. 2) may also have wide application as it may solve the problem of trying to locate a receptive audience to a verified user's broadcasts, whether that broadcast may be a request to rent, a one's personal music, an advertisement for a vehicle for rent, a solicitation for a new employee, and/or a recommendation for a good restaurant in the area. This radial distribution module 140 (e.g., that applies the radial algorithm 240 of FIG. 2 using a series of modules working in concert as described in FIG. 2) may eliminate unnecessarily broadcasting that information to those who are not receptive to it, both as a transmitter and as a recipient of the broadcast. The radial algorithm saves both time (which may be limited in a situation in which a user requires transportation) and effort of every user involved by transmitting information only to areas that a user cares about, according to one embodiment.

In effect, the radial algorithm of the automobile sharing server 100 enables users to notify people around locations that are cared about (e.g., around where they live, work, and/or where they are physically located). In one embodiment, the user can be provided 'feedback' and/or a communication that the recipient 114 may be responding to the broadcast after the automotive listing data 102 may be delivered to the recipients 114 and/or to the business establishments 109 using the radial distribution module 140 (e.g., that applies the radial algorithm 240 of FIG. 2 using a series of modules working in concert as described in FIG. 2) of the automobile sharing server 100. For example, after the automotive listing data 102 may be delivered, the driverless vehicle 104 and/or mobile device may display a message saying: "3256 neighbors around a 1 radius from you have been notified on their profile pages of your automobile sharing broadcast in Menlo Park and 4 people are responding" and/or "8356 neighbors around a 2.7 radius from you have been notified of your live broadcast."

In one embodiment, users may be able to organize deliveries and/or pick-ups from a 'neighborhood drone' (e.g., an unmanned aerial vehicle such as the drone 311) operated by the geospatially constrained social network 142. For example, Fatdoor.com may operate a set of drones (e.g., the drone 311 of FIG. 3) that can be dispatched and automatically instructed to pick up various items and deliver them to a resident of a home. The drone 311 may be aircraft without a human pilot on board. A flight path of the drone 311 may be a server of the geo-spatially constrained social network 142 either autonomously by computers in the drone 311 and/or through an automated navigation system based on a mapping algorithm.

In one embodiment, a neighbor offering a used item may request that a drone operated by Fatdoor.com be summoned by clicking on 'request pickup' on their mobile device. This may instruct the drone to fly to a backyard and/or front yard the a home of a neighbor and physically pick up the used the item and deliver it to a borrower, minimizing time to do neighborhood errands. A neighbor who is selling and/or giving away an item may receive an alert when a drone arrives through their mobile device. Similarly, the recipient of the item may receive an alert when the drone delivery is ready. Furthermore, this way, a limited set of drones can be shared by a set of users. Alternative to drones, Fatdoor and/or neighbors themselves may instruct driverless vehicles (e.g., the driverless vehicle 104 of FIG. 3) that they operate to pick up and deliver items to each other through their mobile device using the geo-spatial social network 142. The driverless vehicles may be personally owned and/or owned by the geospatially constrained social network.

For example the driverless vehicle 104 may be an autonomous vehicle (e.g., a self-driving vehicle, robot vehicle) that is an autonomous vehicle capable of fulfilling the transportation capabilities of a traditional vehicle. As an autonomous vehicle, the driverless vehicle 104 may be capable of sensing its environment and navigating without human input.

The driverless vehicle 104 may be an autonomous vehicle that senses its surroundings with such techniques as radar, lidar, GPS, and computer vision. Advanced control systems may interpret sensory information to identify appropriate navigation paths, as well as obstacles and relevant signage to/from a home offering a driverless automobile for rent in the geospatially constrained social network 142. The driverless vehicle 104 may update its maps based on sensory input, thereby permitting the driverless vehicle 104 to keep track of their position even when conditions change or when they enter uncharted environments in the neighborhood.

The various embodiments described herein of the automobile sharing server 100 using the radial distribution module 140 (e.g., that applies the radial algorithm 240 of FIG. 2 using a series of modules working in concert as described in FIG. 2) may solve a central problem of internet radio service providers (e.g., Pandora) by retaining cultural significance related to a person's locations of association. For example, the radial distribution module 140 (e.g., that applies the radial algorithm 240 of FIG. 2 using a series of modules working in concert as described in FIG. 2) may be used to 'create' new radio stations, television stations, and/or mini alert broadcasts to a geospatially constrained area on one end, and provide a means for those 'tuning in' to consume information posted in a geospatial area that the listener vehicles about and/or associates themselves with. The information provided can be actionable in that the user may be able to secure new opportunities through face to face human interaction and physical meeting not otherwise possible in internet radio scenarios.

The radial algorithm may be a set of instructions that may enable users (e.g., verified users, non-verified users, driverless vehicles) of the Nextdoor.com and Fatdoor.com websites and applications to broadcast their activities (e.g., rental availability, Easter egg hunt, garage sale, t-shirt sale, crime alert) to surrounding neighbors within a claimed neighborhood and to guests of a claimed neighborhood, according to one embodiment. The radial algorithm may be new because current technology does not allow for users of a network (e.g., Nextdoor.com, Fatdoor.com) to locally broadcast their activity to a locally defined geospatial area. With the radial algorithm, users of the network may communicate with one another in a locally defined manner, which may present more relevant information and activities, according to one embodiment.

For example, if a verified user of the network broadcasts an availability of a driverless vehicle, locally defined neighbors of the verified user may be much more interested in responding than if they observed a vehicle for rent on a general news broadcast on traditional radio, according to one embodiment. The radial distribution module 140 may solve the problem of neighbors living in the locally defined geospatial area who don't typically interact, and allows them to connect within a virtual space that did not exist before, according to one embodiment. Prior to this embodiment of the radial algorithm 240 operating through the radial distribution module 140, community boards (e.g., stolen or missing item boards) may have been a method of distributing content in a surrounding neighborhood effectively. However, there may have been little ways to easily distribute content related to exigent circumstances and/or with urgency in a broadcast-like manner to those listening around a neighborhood through mobile devices until the various embodiments applying the radial distribution module 140 as described herein.

A radial algorithm 240 may be a method of calculating a sequence of operations, and in this case a sequence of radio operations, according to one embodiment. Starting from an initial state and initial input, the radial algorithm 240 describes a computation that, when executed, proceeds through a finite number of well-defined successive states, eventually producing radial patterned distribution (e.g., simulating a local radio station), according to one embodiment.

The automobile sharing server 100 may solve technical challenges through the radial distribution module 140 (e.g., that applies the radial algorithm 240 of FIG. 2 using a series of modules working in concert as described in FIG. 2) by implementing a vigorous screening process to screen out any lewd or vulgar content in one embodiment. For example, what may be considered lewd content sometimes could be subjective, and verified users could argue that the operator of the automobile sharing server 100 is restricting their constitutional right to freedom of speech (e.g., if the automobile sharing server 100 is operated by a government entity) through a crowd-moderation capability enabled by the radial distribution module 140 (e.g., that applies the radial algorithm 240 of FIG. 2 using a series of modules working in concert as described in FIG. 2), according to one embodiment. In one embodiment, verified users may sign an electronic agreement to screen their content and agree that the automobile sharing network 150 may delete any content that it deems inappropriate for broadcasting, through the radial distribution module 140 (e.g., that applies the radial algorithm 240 of FIG. 2 using a series of modules working in concert as described in FIG. 2) according to one embodiment. For example, it may be determined that a lost item such as a lost dog does not qualify as am automobile sharing related item that should be broadcast.

The radial distribution module 140 (e.g., that applies the radial algorithm 240 of FIG. 2 using a series of modules working in concert as described in FIG. 2), in addition to broadcasts, may allow verified users to create and broadcast their own radio show, e.g., music, talk show, commercial, instructional contents, etc., and to choose their neighborhood(s) for broadcasting based on a claimed location, according to one embodiment. The radial distribution module 140 (e.g., that applies the radial algorithm 240 of FIG. 2 using a series of modules working in concert as described in FIG. 2) may allow users to choose the neighborhoods that they would want to receive the broadcasts, live and recorded broadcasts, and/or the types and topics (e.g., vehicle rental) of broadcasts that interest them.

The radial distribution module 140 (e.g., that applies the radial algorithm 240 of FIG. 2 using a series of modules working in concert as described in FIG. 2) based approach of the automobile sharing server 100 may be a completely different concept from the currently existing neighborhood (e.g., geospatial) social networking options. The radial distribution module 140 (e.g., that applies the radial algorithm 240 of FIG. 2 using a series of modules working in concert as described in FIG. 2) may also allow the user to create his/her own radio station, television station and/or other content such as the automotive listing data 102 and distribute this content around locations to users and preseeded profiles around them. For example, the user may wish to broadcast their live reporting of an available driverless vehicle 104. The radial distribution module 140 (e.g., that applies the radial algorithm 240 of FIG. 2 using a series of modules working in concert as described in FIG. 2) can allow verified users to create their content and broadcast in the selected geospatial area. It also allows verified listeners to listen to only the relevant local broadcasts of their choice.

The radial distribution module 140 (e.g., that applies the radial algorithm 240 of FIG. 2 using a series of modules working in concert as described in FIG. 2) may be important because it may provide any verified user the opportunity to create his/her own radial broadcast message (e.g., can be audio, video, pictoral and/or textual content) and distribute this content to a broad group. Radial distribution module 140 (e.g., that applies the radial algorithm 240 of FIG. 2 using a series of modules working in concert as described in FIG. 2) may also allow verified listeners to listen to any missed live broadcasts through the prerecorded features, according to one embodiment.

Through this, the radial distribution module 140 (e.g., that applies the radial algorithm 240 of FIG. 2 using a series of modules working in concert as described in FIG. 2) changes the way social networks (e.g., Nextdoor, Fatdoor, Facebook, Path, etc.) operate by enabling location centric broadcasting to regions that a user vehicles about, according to one embodiment. Radial distribution module 140 (e.g., that applies the radial algorithm 240 of FIG. 2 using a series of modules working in concert as described in FIG. 2) may solve a technical challenge by defining ranges based on a type of an automobile listing broadcast, a type of neighborhood, and/or boundary condition of a neighborhood by analyzing whether the automotive listing data 102 may be associated with a particular kind of recipient, a particular neighborhood, a temporal limitation, and/or through another criteria.

By using the radial distribution module 140 (e.g., that applies the radial algorithm 240 of FIG. 2 using a series of modules working in concert as described in FIG. 2) of the automobile sharing server 100 the user may be able to filter irrelevant offers and information provided by broadcasts. In one embodiment, only the broadcasting user (e.g., the driverless vehicle 104, the owner of the driverless vehicle 301, the renter (e.g., the recipient 114)) may be a verified user to create accountability for a particular broadcast and/or credibility of the broadcaster. In this embodiment, recipients 114 of the broadcast may not need to be verified users of the automobile sharing network. By directing traffic and organizing the onslaught of broadcasts, the radial distribution module 140 (e.g., that applies the radial algorithm 240 of FIG. 2 using a series of modules working in concert as described in FIG. 2) of the automobile sharing server 100 may be able to identify the origins and nature of each group of incoming information and locate recipients 114 that are relevant/interested in the automotive listing data 102, maximizing the effective use of each broadcast. For example, the recipient 114 may be able to specify that they do like SUVs so that they would be a relevant recipient 114 for broadcast data regarding an SUV for rent. In another example, a recipient 114 may specify that they do not like SUVs and/or do not want to rent from and/or to a user with a certain rating so they would not be included in related broadcasts, according to one embodiment.

The radial distribution module 140 (e.g., that applies the radial algorithm 240 of FIG. 2 using a series of modules working in concert as described in FIG. 2) of the automobile sharing server 100 may process the input data from the driverless vehicle 104 and/or mobile device (e.g., the mobile device 303, the recipient device 505) in order to identify which notification(s) to broadcast to which individual(s). This may be separate from a traditional radio broadcast as it not only geographically constrains broadcasters and recipients 114 but also makes use of user preferences in order to allow broadcasters to target an optimal audience and allow recipients 114 to alter and customize what they consume. The user may associate his/herself with a non-transitory address in order to remain constantly connected to their neighborhood and/or neighbors even when they themselves or their neighbors are away. The radial algorithm 240 may be also unique from a neighborhood social network (e.g., the geospatially constrained social network 142) as it permits users to broadcast emergencies, information, audio, video etc. to other users, allowing users to create their own stations.

In order to implement the radial distribution module 140 (e.g., that applies the radial algorithm 240 of FIG. 2 using a series of modules working in concert as described in FIG. 2), geospatial data may need to be collected and amassed in order to create a foundation on which users may sign up and verify themselves by claiming a specific address, associating themselves with that geospatial location. The radial distribution module 140 (e.g., that applies the radial algorithm 240 of FIG. 2 using a series of modules working in concert as described in FIG. 2) may then be able to utilize the geospatial database 122 to filter out surrounding noise and deliver only relevant data to recipients 114.

In order to accomplish this, the radial distribution module 140 (e.g., that applies the radial algorithm 240 of FIG. 2 using a series of modules working in concert as described in FIG. 2) may be able to verify the reliability of geospatial coordinates, time stamps, and user information associated with the driverless vehicle 104 and/or mobile device. In addition, threshold geospatial radii, private neighborhood boundaries, and personal preferences may be established in the automobile sharing server 100 and accommodated using the radial distribution module 140 (e.g., that applies the radial algorithm 240 of FIG. 2 using a series of modules working in concert as described in FIG. 2). The geospatial database 122 may work in concert with the radial distribution module 140 (e.g., that applies the radial algorithm 240 of FIG. 2 using a series of modules working in concert as described in FIG. 2) to store, organize, and manage broadcasts, pushpins, user profiles, preseeded user profiles, metadata, and epicenter 144 locations associated with the geospatially constrained social network 142 (e.g., a neighborhood social network such as Fatdoor.com, Nextdoor.com).

The radial algorithm 240 may be used to calculate relative distances between each one of millions of records as associated with each placed geo-spatial coordinate in the geospatially constrained social network 142 (e.g., a neighborhood social network such as Fatdoor.com, Nextdoor.com). Calculations of relative distance between each geospatial coordinate can be a large computational challenge because of the high number of reads, writes, modify, and creates associated with each geospatial coordinate added to the geospatially constrained social network 142 and subsequent recalculations of surrounding geospatial coordinates associated with other users and/or other profile pages based a relative distance away from a newly added set of geospatial coordinates (e.g., associated with the automotive listing data 102 and/or with other pushpin types). To overcome this computational challenge, the radial algorithm may leverage a massively parallel computing architecture 146 through which processing functions are distributed across a large set of processors accessed in a distributed computing system 148 through the network 101.

In order to achieve the utilization of the massively parallel computing architecture 146 in a context of a radial distribution function of a geospatially constrained social network 142, a number of technical challenges have been overcome in at least one embodiment. Particularly, the radial distribution module 140 constructs a series of tables based on an ordered geospatial ranking based on frequency of interaction through a set of 'n' number of users simultaneously interacting with the geospatially constrained social network 142, in one preferred embodiment. In this manner, sessions of access between the automobile sharing server 100 and users of the automobile sharing server 100 (e.g., the user) may be monitored based on geospatial claimed areas of the user (e.g., a claimed work and/or home location of the user and/or the non-transitory location of the driverless vehicle 3508), and/or a present geospatial location of the user. In this manner, tables associated with data related to claimed geospatial areas of the user (e.g., the user, the user's driverless vehicle) and/or the present geospatial location of the user may be anticipatorily cached in the memory 124 to ensure that a response time of the geospatially constrained social network 142 may be not constrained by delays caused by extraction, retrieval, and transformation of tables that are not likely to be required for a current and/or anticipated set of sessions between users and the automobile sharing server 100.

In a preferred embodiment, an elastic computing environment may be used by the radial distribution module 140 to provide for increase/decreases of capacity within minutes of a database function requirement. In this manner, the radial distribution module 140 can adapt to workload changes based on number of requests of processing simultaneous and/or concurrent requests associated with automotive listing data 102 by provisioning and deprovisioning resources in an autonomic manner, such that at each point in time the available resources match the current demand as closely as possible.

The radial distribution module 140 (e.g., that applies the radial algorithm 240 of FIG. 2 using a series of modules working in concert as described in FIG. 2) may be a concept whereby a server communicating data to a dispersed group of recipients 114 over a network 101, which may be an internet protocol based wide area network (as opposed to a network communicating by radio frequency communications) communicates that data only to a geospatially-constrained group of recipients 114. The radial distribution module 140 (e.g., that applies the radial algorithm 240 of FIG. 2 using a series of modules working in concert as described in FIG. 2) may apply a geospatial constraint related to a radial distance away from an origin point, or a constraint related to regional, state, territory, county, municipal, neighborhood, building, community, district, locality, and/or other geospatial boundaries.

The radial distribution module 140 (e.g., that applies the radial algorithm 240 of FIG. 2 using a series of modules working in concert as described in FIG. 2) may be new as applied to data traveling over wide area networks using internet protocol topology in a geospatial social networking and commerce context, according to one embodiment. While radio broadcasts, by their nature, are transmitted in a radial pattern surrounding the origin point, there may be no known mechanism for restricting access to the data only to verified users of a service subscribing to the broadcast. As applied to wired computer networks, while techniques for applying geospatial constraints have been applied to search results, and to other limited uses, there has as yet been no application of geospatial constraint as applied to the various embodiments described herein using the radial distribution module 140 (e.g., that applies the radial algorithm 240 of FIG. 2 using a series of modules working in concert as described in FIG. 2).

The radial distribution module 140 (e.g., that applies the radial algorithm 240 of FIG. 2 using a series of modules working in concert as described in FIG. 2) may be roughly analogous to broadcast radio communications such as a) in broadcast radio, b) in wireless computer networking, and c) in mobile telephony. However, all of these systems broadcast their information promiscuously, making the data transmitted available to anyone within range of the transmitter who may be equipped with the appropriate receiving device. In contrast, the radial distribution module 140 (e.g., that applies the radial algorithm 240 of FIG. 2 using a series of modules working in concert as described in FIG. 2) herein describes a system in which networks are used to transmit data in a selective manner in that information may be distributed around a physical location of homes or businesses in areas of interest/relevancy.

The radial distribution module 140 (e.g., that applies the radial algorithm 240 of FIG. 2 using a series of modules working in concert as described in FIG. 2) may solve a problem of restricting data transmitted over networks to specific users who are within a specified distance from the individual who originates the data. In a broad sense, by enabling commerce and communications that are strictly limited within defined neighborhood boundaries, the radial distribution module 140 (e.g., that applies the radial algorithm 240 of FIG. 2 using a series of modules working in concert as described in FIG. 2) may enable the geospatially constrained social network 142 (e.g., a neighborhood social network such as Fatdoor.com, Nextdoor.com) communications, attacking the serious social conditions of anonymity and disengagement in community that afflict the nation and, increasingly, the world.

The radial distribution module 140 (e.g., that applies the radial algorithm 240 of FIG. 2 using a series of modules working in concert as described in FIG. 2) may comprise one or more modules that instruct the automobile sharing server 100 to restrict the broadcasting of the automotive listing data 102 to one or more parts of the geospatial area 117. For example, in the embodiment of FIG. 1, the radial distribution module 140 (e.g., that applies the radial algorithm 240 of FIG. 2 using a series of modules working in concert as described in FIG. 2) may instruct the automobile sharing server 100 to broadcast the automotive listing data 102 to the recipients 114 but not to the area outside the threshold radial distance 119.

In one or more embodiments, the radial distribution module 140 (e.g., that applies the radial algorithm 240 of FIG. 2 using a series of modules working in concert as described in FIG. 2) may allow the automobile sharing server 100 to function in manner that simulates a traditional radio broadcast (e.g., using a radio tower to transmit a radio frequency signal) in that both the automobile sharing server 100 and the radio broadcast are restricted in the geospatial scope of the broadcast transmission. In one or more embodiments, the radial distribution module 140 (e.g., that applies the radial algorithm 240 of FIG. 2 using a series of modules working in concert as described in FIG. 2) may prevent the broadcast of the automotive listing data 102 to any geospatial area to which the user does not wish to transmit the automotive listing data 102, and/or to users that have either muted and/or selectively subscribed to a set of broadcast feeds.

The radial distribution module 140 (e.g., that applies the radial algorithm 240 of FIG. 2 using a series of modules working in concert as described in FIG. 2) may analyze the automotive listing data 102 to determine which recipients 114 may receive notification data 112 within the threshold radial distance 119 (e.g., set by the user and/or auto calculated based on a type of broadcast). The radial distribution module 140 (e.g., that applies the radial algorithm 240 of FIG. 2 using a series of modules working in concert as described in FIG. 2) may use a variety of parameters, including information associated with the automotive listing data 102 (e.g., location of the driverless vehicle 104 for rent, type of vehicle, rental price etc.) to determine the threshold radial distance 119.

The radial distribution module 140 (e.g., that applies the radial algorithm 240 of FIG. 2 using a series of modules working in concert as described in FIG. 2) may also determine which verified addresses associated with recipients 114 having verified user profiles are located within the threshold radial distance 119. The radial distribution module 140 (e.g., that applies the radial algorithm 240 of FIG. 2 using a series of modules working in concert as described in FIG. 2) may then broadcast the notification data 112 to the profiles and/or mobile devices of the verified users having verified addresses within the threshold radial distance 119.

The radial distribution module 140 (e.g., that applies the radial algorithm 240 of FIG. 2 using a series of modules working in concert as described in FIG. 2) may therefore simulate traditional radio broadcasting (e.g., from a radio station transmission tower) over the IP network. Thus, the radial distribution module 140 (e.g., that applies the radial algorithm 240 of FIG. 2 using a series of modules working in concert as described in FIG. 2) may allow the broadcast to include information and data that traditional radio broadcasts may not be able to convey, for example geospatial coordinates and/or real-time bi-directional communications. Additionally, the radial distribution module 140 (e.g., that applies the radial algorithm 240 of FIG. 2 using a series of modules working in concert as described in FIG. 2) may allow individual users low-entry broadcast capability without resort to expensive equipment and/or licensing by the Federal Communications Commission (FCC).

Another advantage of this broadcast via the radial distribution module 140 (e.g., that applies the radial algorithm 240 of FIG. 2 using a series of modules working in concert as described in FIG. 2) may be that it may bypass obstructions that traditionally disrupt radio waves such as mountains and/or atmospheric disturbances. Yet another advantage of the radial distribution module 140 (e.g., that applies the radial algorithm 240 of FIG. 2 using a series of modules working in concert as described in FIG. 2) may be that it may expand the physical distance of broadcast capability without resort to the expense ordinarily associated with generating powerful carrier signals. In yet another advantage, the radial distribution module 140 (e.g., that applies the radial algorithm 240 of FIG. 2 using a series of modules working in concert as described in FIG. 2) may allow for almost unlimited channels and/or stations as compared to traditional radio where only a narrow band of electromagnetic radiation has been appropriated for use among a small number of entities by government regulators (e.g., the FCC).

The user may be an individual who owns the driverless vehicle 104 and/or operates the mobile device to generate the automotive listing data 102. It will be understood by those skilled in the art that the verified nature of the user may be an optional characteristic in an alternate embodiment. This means that in an alternate embodiment, any user (whether verified or not) may generate the automotive listing data 102 through the driverless vehicle 104 and/or mobile device (e.g., the mobile device 303). In another alternative embodiment, the user may be an electronic sensor, such as a detection sensor device (e.g., a traffic camera etc.), and/or an appliance (e.g., a refrigerator, a home security network, and/or a motion detector). It should also be noted that the 'mobile' nature of the mobile device 303 may be optional in yet another alternative embodiment. In such an alternate embodiment, any computing device, whether mobile/portable or fixed in location may generate the automotive listing data 102.

The cellular network 108 may be associated with a telephone carrier (e.g., such as AT&T, Sprint, etc.) that provides an infrastructure through which communications are generated between the automobile sharing server 100 and the business establishments 109 using the radial algorithm 240. For example, the cellular network 108 may provide a communication infrastructure through which the automotive listing data 102 may be communicated as voice and/or text messages through telephones (e.g., standard telephones and/or smart phones) operated by at least some of the business establishments 109 of FIG. 1. It should be understood that in one embodiment, the business establishments 109 are paid subscribers/customers of the geospatially constrained social network 142 in a manner such that each of the business establishments 109 may pay a fee per received automotive listing data 102, and/or each hired engagement to the geospatially constrained social network 142. The business establishments 109 may pay extra to be permitted access to receive the automotive listing data 102 even when they do not have a transitory and/or non-transitory connection to a neighborhood if they service that neighborhood area. For this reason, FIG. 1 visually illustrates that the business establishments 109 may be located (e.g., principal business address) outside the threshold radial distance 119.

The cellular network 108 (e.g., a mobile network) may be a wireless network distributed over land areas called cells, each served by at least one fixed-location transceiver, known as a cell site or base station through which the automotive listing data 102 is distributed from the automobile sharing server 100 to telephones of the business establishments 109 using the radial distribution module 140 (e.g., that applies the radial algorithm 240 of FIG. 2 using a series of modules working in concert as described in FIG. 2), according to one embodiment. The cellular network 108 may use a set of frequencies from neighboring cells, to avoid interference and provide guaranteed bandwidth within each cell, in one embodiment.

When joined together these cells of the cellular network 108 may provide radio coverage over a wide geographic area through the cellular network 108 in a manner that ensures that the automotive listing data 102 may be simultaneously communicated via both IP networks (e.g., to the recipients 114) and/or to the business establishments 109 through the cellular network 108. It will be appreciated that the radial distribution module 140 (e.g., that applies the radial algorithm 240 of FIG. 2 using a series of modules working in concert as described in FIG. 2) in effect permits simultaneous updates to claimed user pages, unclaimed (preseeded) user pages in a geospatially constrained social network 142 (e.g., neighborhood social network) based on a geospatial location of the driverless vehicle 104 and/or mobile device in a manner that simulates a radio (RF) based network separately from the concepts described in conjunction with the cellular network 108. However, it will be understood that the radial distribution module 140 (e.g., that applies the radial algorithm 240 of FIG. 2 using a series of modules working in concert as described in FIG. 2) may be not restricted to such topology and can multimodally communicate through different networks, such as through the cellular network 108 described in FIG. 1.

The business establishments 109 may be locations, devices, and/or mobile phones associated with individuals and/or agencies associated with businesses (e.g., a car rental establishment, a taxi/limo service, a delivery service, an office building with employees that may require transportation). The business establishments 109 may be notified when an automobile sharing broadcast in an area that they service including a non-transitory location (e.g., around where they live and/or work, regardless of where they currently are) and a transitory location (e.g., where they currently are) is posted using the driverless vehicle 104 and/or mobile device (e.g., the mobile device 303) as the automotive listing data 102.

Figure 2:
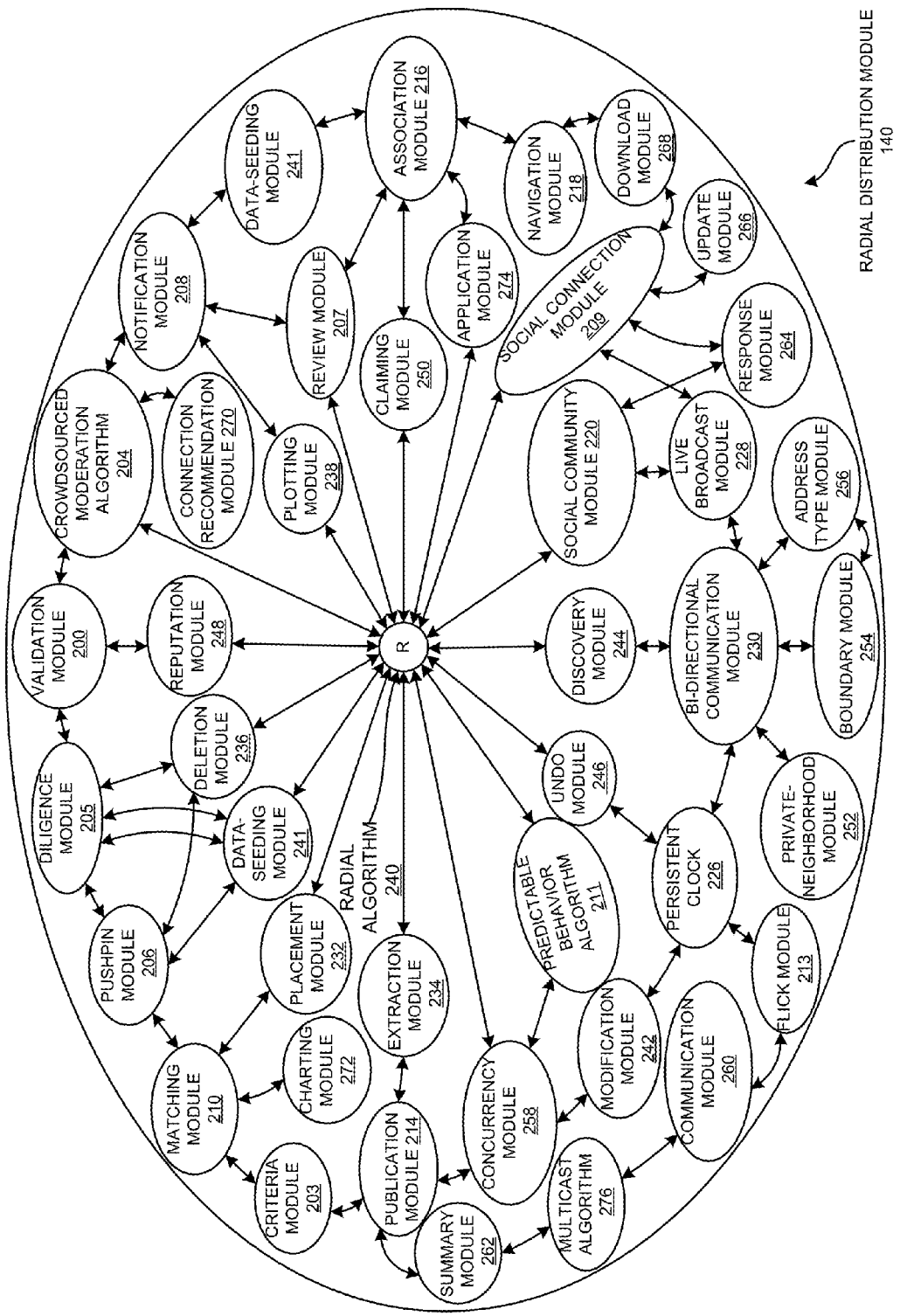
FIG. 2 is an exploded view of the radial distribution module of FIG. 1 that applies the radial algorithm, according to one embodiment.
Figure 3:
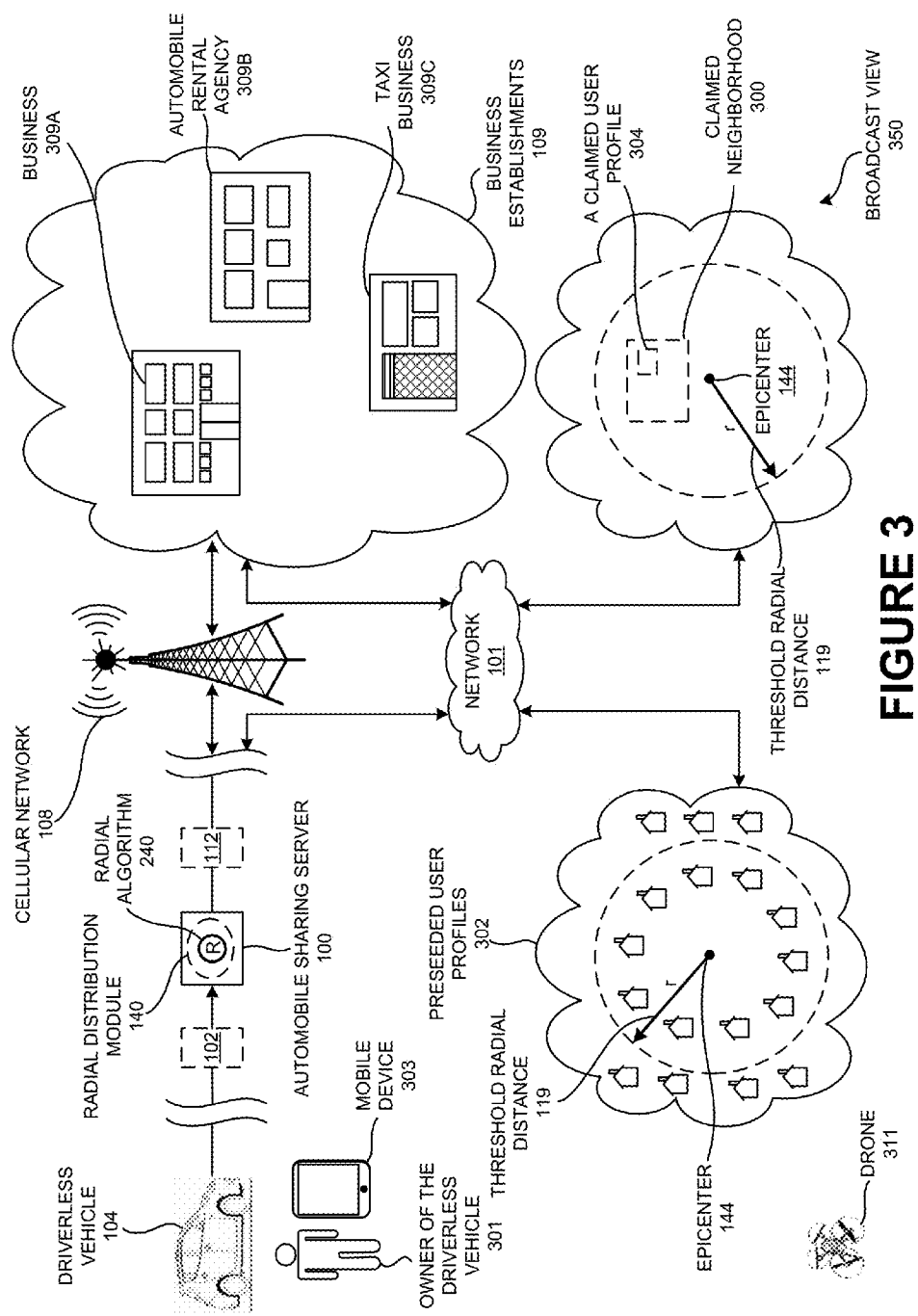
FIG. 3 is a broadcast view that demonstrates how the radial distribution module of FIG. 1 is used to communicate an automotive listing data to claimed user profiles, pre-seeded user profiles, and to telephone devices or internet-enabled devices of business establishments through a heterogeneous network formed through the internet protocol network of FIG. 1 and through a cellular network, according to one embodiment.

The business establishments 109 are illustrated in FIG. 3 as including a business 309A, an automobile rental agency 309B, and a taxi business 309C. In this manner, mobile devices and/or desktop computers operated by the business establishments 109 may be alerted whenever the automotive listing data 102 is posted in and/or around their neighborhood through a push notification (e.g., an alert popping up on their phone), through an email, a telephone call, and/or a voice message delivered to the particular mobile device operated by each of the business establishments 109 using the radial distribution module 140 (e.g., that applies the radial algorithm 240 of FIG. 2 using a series of modules working in concert as described in FIG. 2).

The automotive listing data 102 may be delivered as notification data 112 (which may include a number of attributes) from the automobile sharing server 100 to the recipients 114 and/or to the business establishments 109 using the radial distribution module 140 (e.g., that applies the radial algorithm 240 of FIG. 2 using a series of modules working in concert as described in FIG. 2) of the automobile sharing server 100.

The recipients 114 may be individuals that have claimed a profile (e.g., verified their profile through a postcard, a telephone lookup, a utility bill) associated with a particular non-transitory address (e.g., a home address, a work address) through a geospatial social network (e.g., a geospatially constrained social network 142 (e.g., a neighborhood social network such as Fatdoor.com, Nextdoor.com)) through which the automobile sharing server 100 operates. The recipients 114 may be in a geo-fenced area, in that an epicenter 144 of a broadcast message from the driverless vehicle 104 and/or mobile device may be a center through which a radial distance is calculated based on a characteristic of the automotive listing data 102. For example, a vehicle for rent by the user's work may be delivered only to an immediate 0.1 mile radius, whereas vehicle for rent by the user's home may be automatically delivered to a broader 0.6 mile radius either automatically and/or through a user defined preference (e.g., set by the user).

It should be appreciated that individuals in an area outside the threshold radial distance 115 may not receive the automotive listing data 102 because their geospatial address may be outside a radial boundary surrounding an epicenter 144 in which the automotive listing data 102 originates. Additionally, the threshold radial distance 119 may be confined on its edges by a geospatial polygon at a juncture between the area defined by recipients 114 and the area outside the threshold radial distance 119, according to one embodiment.

FIG. 2 is an exploded view of the radial distribution module 140 of FIG. 1 that applies the radial algorithm 240, according to one embodiment.

Particularly, FIG. 2 illustrates an exploded view of the radial distribution module 140, according to one embodiment. A variety of software instruction sets and/or hardware components form the radial distribution module 140, according to one embodiment. Select ones of these software instruction sets and/or hardware components utilize the radial algorithm 240 to perform functions related to radially distributing information to pre-seeded user profiles, user profiles, and telephone devices (e.g., land based phones, circuit switched phones).

A validation module 200 may determine that an automotive listing data 102 generated through a mobile device 303 may be associated with a verified user (e.g., the user of FIG. 1 as described as the verified user 706 in FIG. 7) of the automobile sharing server 100) using a processor 120 and/or a memory 124. In addition, the validation module 200 may determine that the broadcast data (e.g., the automotive listing data 102) is generated by the validated user (e.g., the user of FIG. 1 as described as the verified user 706 in FIG. 7) of the neighborhood broadcast system (e.g., of the geospatially constrained social network 142) when analyzing that the broadcast data (e.g., the automotive listing data 102) is associated with the mobile device 303. The validation module 200 may apply the radial algorithm 240 to determine if the verified user 706 may be in a validated geospatial location based on previous history of the verified user 706, according to one embodiment.

Figure 6B:
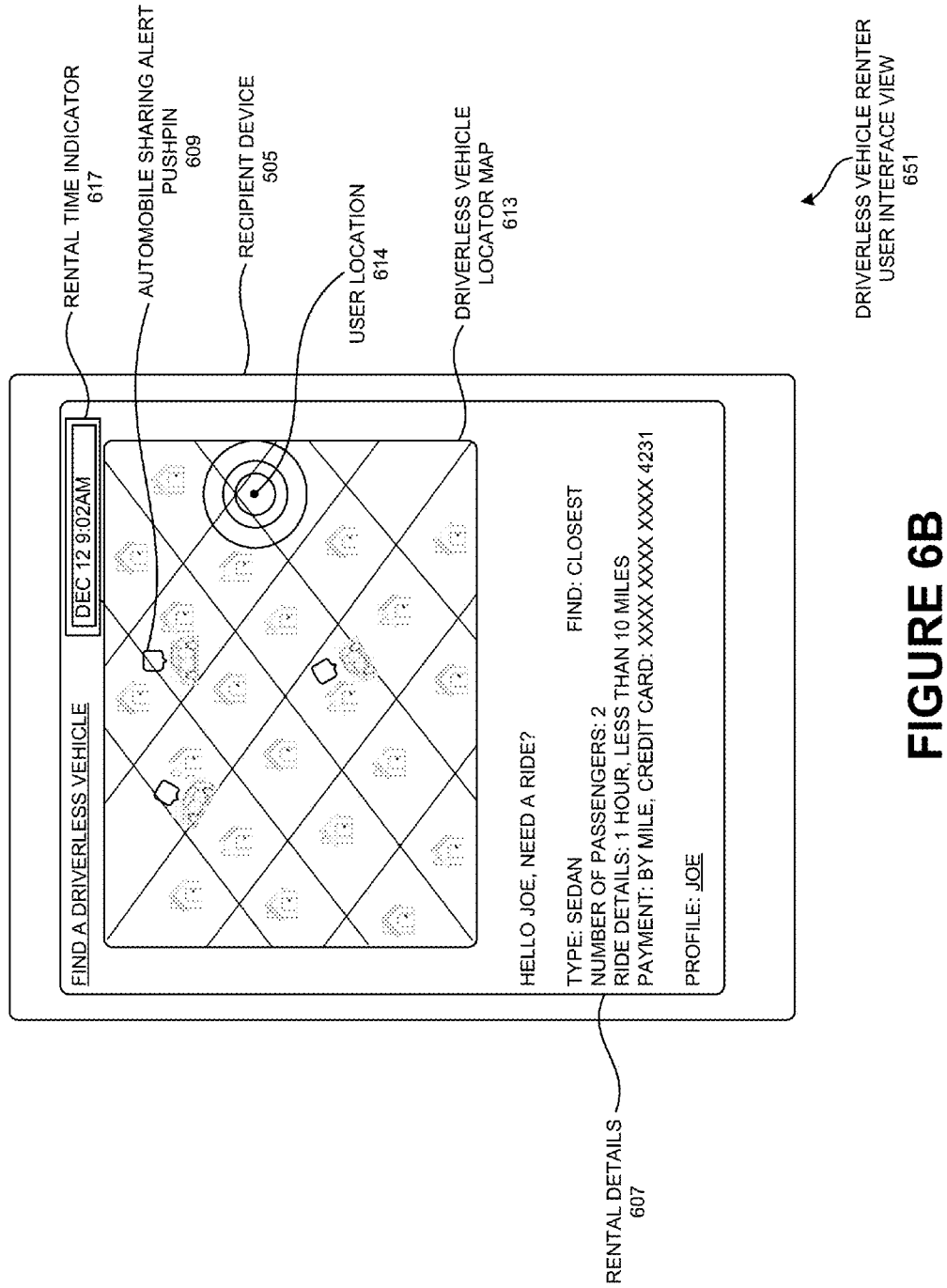
FIG. 6B is a driverless vehicle renter user interface view of the recipient device of FIG. 5, in which a broadcast data generated through the user interface of FIG. 6A enables the user to request a rental of the driverless vehicle, according to one embodiment.
Figure 7:
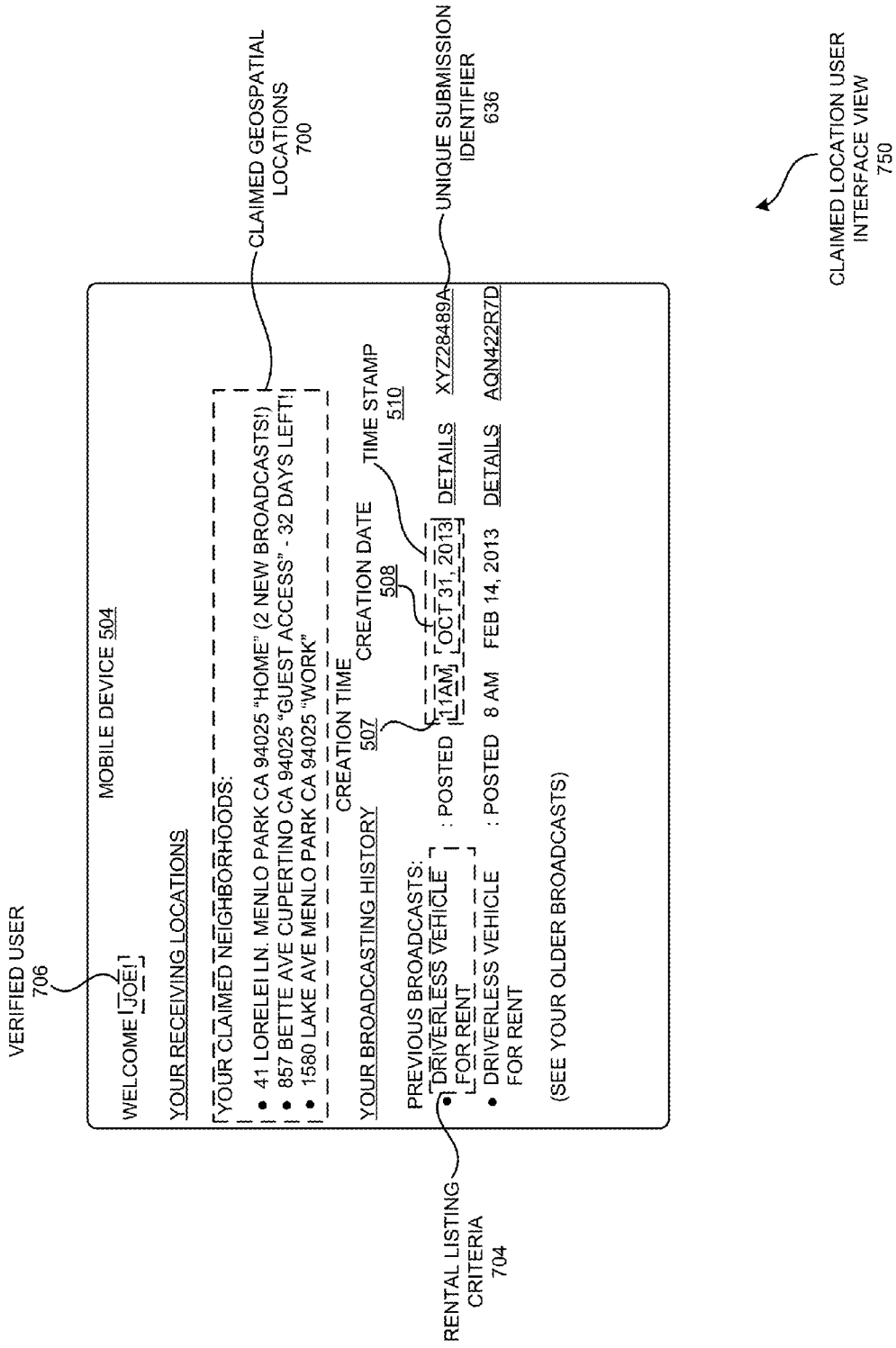
FIG. 7 is a claimed location user interface view that explains how a claimed user reviews their broadcasts that they made and manages the neighborhoods that they have claimed, according to one embodiment.

In addition, the validation module 200 may ensure that a set of geospatial coordinates 103 associated with the automotive listing data 102 generated through the mobile device 303 and/or driverless vehicle 104 are trusted based on a claimed geospatial location (e.g., any of the claimed geospatial locations 700 as described in FIG. 7 of the verified user (e.g., the user of FIG. 1 as described as the verified user 706 in FIG. 7) of the automobile sharing server 100). The validation module 200 may also determine that the automotive listing data 102 is generated by the verified user of the neighborhood broadcast system when validating that the automotive listing data 102 is associated with the mobile device A charting module 272 may populate an availability chart when the autonomous vehicle (e.g., the driverless vehicle 104) associated with the listing criteria 604 is posted. The availability chart may include an operation area radius, a start timing, an end timing, an hours per day, and/or an hours per user. A pushpin module 206 may present the automotive listing data 102 generated through the mobile device 303 and/or driverless vehicle 104 as an automobile sharing pushpin of the automobile sharing broadcast in a geospatial map surrounding pre-populated residential and/or business listings in a surrounding vicinity, such that the automobile sharing alert pushpin 609 (shown in FIG. 6B) of the automobile sharing broadcast may be automatically presented on the geospatial map in addition to being presented on the set of user profiles (e.g., preseeded user profiles 302 and/or claimed user profiles 304 as described in FIG. 3) having associated verified addresses in the threshold radial distance 119 from the set of geospatial coordinates 103 associated with the automotive listing data 102 generated through the mobile device 303 and/or driverless vehicle 104 and/or driverless vehicle 104 of the verified user (e.g., the user of FIG. 1 as described as the verified user 706 in FIG. 7) of the automobile sharing server 100).

A radial distribution module 140 may radially distribute the automotive listing data 102 generated through the mobile device 303 and/or driverless vehicle 104 through an on-page posting, an electronic communication, and/or a push notification delivered to desktop and/or mobile devices 504 associated with users and/or their user profiles (e.g., preseeded user profiles 302 and/or claimed user profiles 304 as described in FIG. 3) around an epicenter defined at the set of geospatial coordinates 103 associated with the automotive listing data 102 generated through the mobile device 303 and/or driverless vehicle 104 to all subscribed user profiles (e.g., preseeded user profiles 302 and/or claimed user profiles 304 as described in FIG. 3) in a circular geo-fenced area defined by the threshold distance from the set of geospatial coordinates 103 associated with the automotive listing data 102 generated through the mobile device 303 and/or driverless vehicle 104 through the radial algorithm 240 of the automobile sharing network 150 that measures a distance away of each address associated with each user profile from the current geospatial location at the epicenter. A placement module 232 may permit the verified user (e.g., the user of FIG. 1 as described as the verified user 706 in FIG. 7) to drag and/or drop the automobile sharing alert pushpin 609 on any location on the geospatial map, and/or automatically determining a latitude and/or a longitude associated a placed location.

A notification module 208 may automatically notify a user, business 309A, an automobile rental agency 309B and a taxi business 309C in a surrounding geospatial area to the set of geospatial coordinates 103 associated with the automotive listing data 102 generated through the mobile device 303 and/or driverless vehicle 104. An extraction module 234 may separate the geospatial coordinates 103 from a metadata associated with the automotive listing data 102 generated through the mobile device 303 and/or driverless vehicle 104 when verifying that the set of geospatial coordinates 103 associated with the automotive listing data 102 generated through the mobile device 303 and/or driverless vehicle 104 are trusted based on the claimed geospatial location (e.g., any of the claimed geospatial locations 700 as described in FIG. 7 of the verified user (e.g., the user of FIG. 1 as described as the verified user 706 in FIG. 7) of the automobile sharing server 100).

A persistent clock 226 may enable the automobile sharing server 100 to determine a relative match between the persistent clock and a digital clock of the driverless vehicle 104 and/or mobile device 303. A social community module 220 may permit the user to view profiles and/or locations in their claimed neighborhood and/or build a building, floor, room representation of a structure in their claimed neighborhood. A navigation module 218 may automatically instruct the autonomous vehicle to navigate to a location of the renter. A matching module 210 may determine a relative match between a persistent clock associated with the automobile sharing server 100 and/or a digital clock of the driverless vehicle 104 and/or mobile device 303 to determine that the time stamp 510 associated with the creation date 508 and/or time of the automotive listing data 102 generated through the mobile device 303 and/or driverless vehicle 104 may be accurate and/or therefore trusted.

A deletion module 236 may automatically remove a publishing of the automotive listing data 102 generated through the mobile device 303 and/or driverless vehicle 104 on a set of user profiles (e.g., preseeded user profiles 302 and/or claimed user profiles 304 as described in FIG. 3 having associated verified addresses in the threshold radial distance 119 from the set of geospatial coordinates 103 associated with the automotive listing data 102 generated through the mobile device 303 and/or driverless vehicle 104 of the verified user (e.g., the user of FIG. 1 as described as the verified user 706 in FIG. 7) of the automobile sharing server 100) based on an automobile sharing alert expiration time 629. A flick module 213 may provide an interface to the user (e.g., verified user 706, the owner of the driverless vehicle 301, the recipient 114 (e.g., the renter)) such that the owner of the autonomous vehicle can use a haptic 'flick' gesture in a horizontal and/or a vertical fashion to switch a viewing pane associated with a profile. A plotting module 238 may geocode a set of residential addresses each associated with a resident name in a neighborhood surrounding the mobile device 303 and/or driverless vehicle 104.

A data-seeding module 241 may prepopulate the set of residential addresses each associated with the resident name as the set of user profiles (e.g., preseeded user profiles 302 and/or claimed user profiles 304 as described in FIG. 3 in the threshold radial distance 119 from the claimed geospatial location (e.g., any of the claimed geospatial locations 700 as described in FIG. 7 of the verified user (e.g., the user of FIG. 1 as described as the verified user 706 in FIG. 7) of the automobile sharing server 100) in a neighborhood curation system (e.g., part of the geospatially constrained social network 142) communicatively coupled with the automobile sharing server 100. A modification module 242 may alter content in each of the set of user profiles (e.g., preseeded user profiles 302 and/or claimed user profiles 304 as described in FIG. 3).

A discovery module 244 may track the modified content through the neighborhood curation system (e.g., part of the geo spatially constrained social network 142). An undo module 246 may generate a reversible history journal associated with each of the set of user profiles (e.g., preseeded user profiles 302 and/or claimed user profiles 304 as described in FIG. 3 such that a modification of the verified user (e.g., the user of FIG. 1 as described as the verified user 706 in FIG. 7) can be undone on a modified user profile page. A reputation module 248 may determine an editing credibility of the verified user (e.g., the user of FIG. 1 as described as the verified user 706 in FIG. 7) based on an edit history of the verified user (e.g., the user of FIG. 1 as described as the verified user 706 in FIG. 7) and/or a community contribution validation of the verified user (e.g., the user of FIG. 1 as described as the verified user 706 in FIG. 7) by other users of the neighborhood curation system (e.g., part of the geospatially constrained social network 142).

A publication module 214 may automatically communicate the automotive listing data 102 generated through the mobile device 303 and/or driverless vehicle 104 to a set of user profiles (e.g., preseeded user profiles 302 and/or claimed user profiles 304 as described in FIG. 3 having associated verified addresses in a threshold radial distance 119 from the claimed geospatial location (e.g., any of the claimed geospatial locations 700 as described in FIG. 7 of the verified user (e.g., the user of FIG. 1 as described as the verified user 706 in FIG. 7) of the automobile sharing server 100) using the radial algorithm 240. A claiming module 250 may process a claim request of the verified user (e.g., the user of FIG. 1 as described as the verified user 706 in FIG. 7) generating the automotive listing data 102 generated through the mobile device 303 and/or driverless vehicle 104 to be associated with an address of the neighborhood curation system (e.g., part of the geospatially constrained social network 142). A private-neighborhood module 252 may determine if the claimable neighborhood in the neighborhood curation system (e.g., part of the geo spatially constrained social network 142) may be associated with a private neighborhood community in the claimable neighborhood of the neighborhood curation system (e.g., part of the geospatially constrained social network 142).

An association module 216 may associate the verified user (e.g., the user of FIG. 1 as described as the verified user 706 in FIG. 7) with the private neighborhood community in the claimable neighborhood of the neighborhood curation system (e.g., part of the geospatially constrained social network 142) if the private neighborhood community has been activated by the verified user (e.g., the user of FIG. 1 as described as the verified user 706 in FIG. 7) and/or a different verified user (e.g., the user of FIG. 1 as described as the verified user 706 in FIG. 7). A boundary module 254 may permit the verified user (e.g., the user of FIG. 1 as described as the verified user 706 in FIG. 7) to draw a set of boundary lines in a form of a geospatial polygon such that the claimable neighborhood in a geospatial region surrounding the claim request creates the private neighborhood community in the neighborhood curation system (e.g., part of the geospatially constrained social network 142) if the private neighborhood community may be inactive. An address type module 256 may verify the claim request of the verified user (e.g., the user of FIG. 1 as described as the verified user 706 in FIG. 7) generating the automotive listing data 102 generated through the mobile device 303 and/or driverless vehicle 104 to be associated with a neighborhood address of the neighborhood curation system (e.g., part of the geo spatially constrained social network 142) when the address may be determined to be associated with a work address and/or a residential address of the verified user (e.g., the user of FIG. 1 as described as the verified user 706 in FIG. 7).

A concurrency module 258 may simultaneously publish the automotive listing data 102 generated through the mobile device 303 and/or driverless vehicle 104 on the private neighborhood community associated with the verified user (e.g., the user of FIG. 1 as described as the verified user 706 in FIG. 7) generating the automotive listing data 102 generated through the mobile device 303 and/or driverless vehicle 104 in the threshold radial distance 119 from the address associated with the claim request of the verified user (e.g., the user of FIG. 1 as described as the verified user 706 in FIG. 7) of the neighborhood curation system (e.g., part of the geospatially constrained social network 142) when automatically publishing the automotive listing data 102 generated through the mobile device 303 and/or driverless vehicle 104 on a set of user profiles (e.g., preseeded user profiles 302 and/or claimed user profiles 304 as described in FIG. 3 having associated verified addresses in a threshold radial distance 119 from the claimed geospatial location (e.g., any of the claimed geospatial locations 700 as described in FIG. 7 of the verified user (e.g., the user of FIG. 1 as described as the verified user 706 in FIG. 7) of the automobile sharing server 100) based on a set of preferences of the verified user (e.g., the user of FIG. 1 as described as the verified user 706 in FIG. 7) using the radial algorithm 240.

A live broadcast module 228 may live broadcast the automotive listing data 102 generated through the mobile device 303 and/or driverless vehicle 104 to the different verified user (e.g., the user of FIG. 1 as described as the verified user 706 in FIG. 7) and/or other verified user (e.g., the user of FIG. 1 as described as the verified user 706 in FIG. 7) in the private neighborhood community and/or currently within the threshold radial distance 119 from the current geospatial location through the automobile sharing server 100 through a multicast algorithm 276 such that a live broadcast multicasts to a plurality of data processing systems associated with each of the different user and/or the other verified user (e.g., the user of FIG. 1 as described as the verified user 706 in FIG. 7) simultaneously when the mobile device 303 of the verified user (e.g., the user of FIG. 1 as described as the verified user 706 in FIG. 7) generating the live-broadcast enables broadcasting of the automotive listing data 102 generated through the mobile device 303 and/or driverless vehicle 104 to any one of a geospatial vicinity around the mobile device 303 of the verified user (e.g., the user of FIG. 1 as described as the verified user 706 in FIG. 7) generating the broadcast and/or in any private neighborhood community in which the verified user (e.g., the user of FIG. 1 as described as the verified user 706 in FIG. 7) has a non-transitory connection.

A summary module 262 may generate a summary data 626 to the verified user (e.g., the user of FIG. 1 as described as the verified user 706 in FIG. 7) generating the broadcast data (e.g., the automotive listing data 102) generated through the mobile device 303 and/or driverless vehicle 104 of how many user profile pages were updated with an alert of the broadcast data (e.g., the automotive listing data 102) generated through the mobile device 303 and/or driverless vehicle 104 when publishing the broadcast data (e.g., the automotive listing data 102) generated through the mobile device 303 and/or driverless vehicle 104 in the private neighborhood community and/or the set of user profiles having associated verified addresses in the threshold radial distance 119 from the claimed geospatial location of the verified user (e.g., the user of FIG. 1 as described as the verified user 706 in FIG. 7) of the automobile sharing server 100 based on the set of preferences of the verified user (e.g., the user of FIG. 1 as described as the verified user 706 in FIG. 7).

A bi-directional communication module 230 may permit the different verified user (e.g., the user of FIG. 1 as described as the verified user 706 in FIG. 7) and/or other verified user (e.g., the user of FIG. 1 as described as the verified user 706 in FIG. 7) in the private neighborhood community to bi-directionally communicate with the verified user (e.g., the user of FIG. 1 as described as the verified user 706 in FIG. 7) generating the broadcast through the automobile sharing server 100. A response module 264 may analyze a response of the owner of the autonomous vehicle (e.g., the owner of the driverless vehicle 301) being a dismiss, a save, a rating, a review and/or a rental acceptance of a renter associated with the automotive listing data 102 through the automobile sharing server. An update module 266 may periodically update the owner of the driverless vehicle 301 and/or the renter (e.g., the recipient 114) based on a time in transit, a time to arrival, a time to destination, and/or the payment earned status.

An application module 274 may determine that an application on the mobile device 303 is communicating the broadcast data to the automobile sharing network 150 when the broadcast data is processed, and/or to associate the verified user (e.g., the user of FIG. 1 as described as the verified user 706 in FIG. 7) with a verified user profile in the automobile sharing network 150 through the application on the mobile device 303.

A download module 268 may automatically download a set of profiles to the mobile device (e.g., the mobile device 303), wherein an owner of the autonomous vehicle may the verified user 706. A connection recommendation module 270 may automatically recommend connections (shown in FIG. 35) to the owner of the autonomous vehicle based on the non-transitory location 3508. The connections may be associated with other users of the geo-spatial social community based on other users of the geo-spatial social community sharing a common interest 3500 with the owner in the threshold radial distance from the non-transitory location 3508, and/or other autonomous vehicles of the geo-spatial social community whose owners share the common interest 3500 with the owner in the threshold radial distance from the non-transitory location 3508. A communication module 260 may automatically initiate a video communication and/or an audio communication between the mobile device 303 of the owner of the autonomous vehicle and/or another mobile device of the renter (e.g., the recipient device 505) through the automobile sharing server 100 based on the profile of the renter associated with the automotive listing data 102 through the automobile sharing server 100.

A review module 207 may permit the renter and/or other renters to view the rating and/or the review provided by the owner of the autonomous vehicle for each of the renters based on a participation criteria set by the owner of the autonomous vehicle (e.g., the owner of the driverless vehicle 301) and/or the renter (e.g., the verified user 706, the recipient 114), such that each renter may be able to view ratings and/or reviews of each participating candidate for the rental associated with the automotive listing data 102. A social connection module 209 may permit each renter for the rental of the autonomous vehicle (e.g., the driverless vehicle 104) associated with the automotive listing data 102 to communicate with each other and/or form common interest 3500 with each other based on the participation criteria 605 set by the owner of the autonomous vehicle and/or the renter, such that each renter may able to form common interest 3500 with each participating candidate for the rental associated with the automotive listing data 102.

A diligence module 205 may permit participating owners of the autonomous vehicles in the automobile sharing server 100 to see previous ratings, comments, reviews, prescreen questions, and/or background checks of across a plurality of renters applying for a plurality autonomous vehicle rentals through the automobile sharing server 100 such that different owner of the autonomous vehicles benefit from previous diligence of at one of previous ratings, comments, reviews, prescreen questions, and/or background checks by participating owner of the autonomous vehicles with each renter that has previously rented through the automobile sharing server. A criteria module 203 may process a criteria associated with an automotive listing data 102 including a description, a photograph, a video, a rental fee, a category, a vehicle make, a vehicle model, and/or a functional status. A crowdsourced moderation algorithm 204 may permit multiple neighbors in a geospatial area to determine what content contributed to the automobile sharing server 100 persists and/or which may be deleted. A predictable behavior algorithm 211 may calculate and/or declare the non-transitory location of the driverless vehicle 104.

FIG. 3 is a broadcast view that demonstrates how the radial distribution module of FIG. 1 is used to communicate an automotive listing data 102 to claimed user profiles, pre-seeded user profiles, and to telephone devices and/or internet-enabled devices through a heterogeneous network formed through the internet protocol network of FIG. 1 and through a cellular network, according to one embodiment.

Particularly, FIG. 3 illustrates a broadcast view 350, according to one embodiment. FIG. 3 introduces a claimed neighborhood 300, an owner of the driverless vehicle 301, a set of preseeded user profiles 302, a mobile device 303, a drone 311, and a claimed user profile 304, and their relationships with elements previously described in FIG. 1. In addition, FIG. 3 explains the set of business establishments 109 of FIG. 1 to include business 309A, an automobile rental agency 309B and a taxi business 309C, a drone 311 and a driverless vehicle 104.

In FIG. 3, the claimed neighborhood 300 may refer to a region that may be claimed by the user as being associated with a non-transitory location (e.g., a work address, a home address) of the user. The preseeded user profiles 302 may refer to address information from people and/or business directories that has been prepopulated in the geospatial social map and/or may be associated with manually placed pushpins on the geospatial map in the geospatially constrained social network 142 of FIG. 1. The claimed user profile 304 may refer to the verified user 706 associated with a verified address in the geospatial social map and/or may be associated with claimed pushpin (e.g., a previously preseeded residential and/or business profile) on the geospatial map in the geospatially constrained social network 142 of FIG. 1. The owner of the driverless vehicle 301 may be a verified user 706.

The business 309A, an automobile rental agency 309B and a taxi business 309C may receive the automotive listing data 102 through their mobile devices, desktop devices, and/or through their cellular telephones. The business 309A, an automobile rental agency 309B and a taxi business 309C may receive the automotive listing data 102 and may bi-directionally interact with the business establishments 109 through either cellular network 108 and/or through the network 101 (e.g., an internet protocol network). When a query of the user interacting with any one of the recipients 114 based on the bi-directional communication is responded to, the user may be able to choose which the business 309A, an automobile rental agency 309B and a taxi business 309C.

The notification data 112 may be communicated through the network 101 to the preseeded user profiles 302 within a threshold radial distance 119 of the epicenter 144. Alternately, the notification data 112 may be communicated through the network 101 to different ones of the claimed user profile 304 within the claimed neighborhood 300 that are located within the threshold radial distance 119 from the epicenter 144. Additionally, as described in FIG. 4, it will be understood that the claimed neighborhood 300 may be situated partially within the threshold radial distance 119 and partially outside the threshold radial distance 119, yet the notification data 112 received by of the recipients 114 (e.g., having a claimed user profile) may be propagated to other claimed user profiles within the claimed neighborhood 300 even though they are outside the threshold radial distance 119.

The notification data 112 may also be communicated through the cellular network 108 or through the network 101 to the set of business establishments 109. For example, the business 309A may use the automobile sharing network 150 to monitor queries (e.g., for rentals) in a neighborhood and publish sales to residents around a geospatial area of the neighborhood. In addition, the business 309A, an automobile rental agency 309B and a taxi business 309C may service a particular neighborhood and may be alerted of a new order and/or query based on a subscription they pay to access broadcasts from areas that they service. Additionally, it should be understood that other types of services and/or businesses may receive the notification data 112. For example, additional services receiving the notification data 112 may include delivery services, businesses with employees that may require transportation, and/or limo services.

In one embodiment, deliveries (e.g., of products from the business establishments 109, neighbors, other users) may be made from a 'neighborhood drone' (e.g., an unmanned aerial vehicle such as the drone 311) operated by the geospatially constrained social network 142. For example, Fatdoor.com may operate a set of drones (e.g., the drone 311 of FIG. 3) that can be dispatched and automatically instructed to pick up various items and deliver them to a resident of a home. The drone 311 may be aircraft without a human pilot on board. A flight path of the drone 311 may be a server of the geo-spatially constrained social network 142 either autonomously by computers in the drone 311 and/or through an automated navigation system based on a mapping algorithm.

In one embodiment, a neighbor offering a used item (e.g., a cup of sugar) may request that a drone operated by Fatdoor.com be summoned by clicking on 'request pickup' on their mobile device. This may instruct the drone to fly to a backyard and/or front yard of a home of a neighbor and physically pick up the cup of sugar and deliver it to a neighbor, minimizing time to do neighborhood errands. A neighbor who is selling and/or giving away an item may receive an alert when a drone arrives through their mobile device. Similarly, the recipient of the item may receive an alert when the drone delivery is ready.

Furthermore, this way, a limited set of drones can be shared by a set of users. The drones 311 may be communicatively coupled with the automobile sharing server 100 through the network 101, the cellular network 108, and/or another network. Alternative to drones, Fatdoor and/or neighbors themselves may instruct driverless vehicles (e.g., the driverless vehicle 104 of FIG. 3) that they operate to pick up and deliver items to each other through their mobile device using the geo-spatial social network 142. The driverless vehicles may be personally owned and/or owned by the geospatially constrained social network. The driverless vehicles 104 may be communicatively coupled with the automobile sharing server 100 through the network 101, the cellular network 108 and/or another method.

For example the driverless vehicle 104 may be an autonomous vehicle (e.g., a self-driving vehicle, robot vehicle) that is an autonomous vehicle capable of fulfilling the transportation capabilities of a traditional vehicle. As an autonomous vehicle, the driverless vehicle 104 may be capable of sensing its environment and navigating without human input.

The driverless vehicle 104 may be an autonomous vehicle that senses its surroundings with such techniques as radar, lidar, GPS, and computer vision. Advanced control systems may interpret sensory information to identify appropriate navigation paths, as well as obstacles and relevant signage to/from a home offering an item for sale in the geospatially constrained social network 142. The driverless vehicle 104 may update its maps based on sensory input, thereby permitting the driverless vehicle 104 to keep track of their position even when conditions change or when they enter uncharted environments in the neighborhood.

Figure 4:
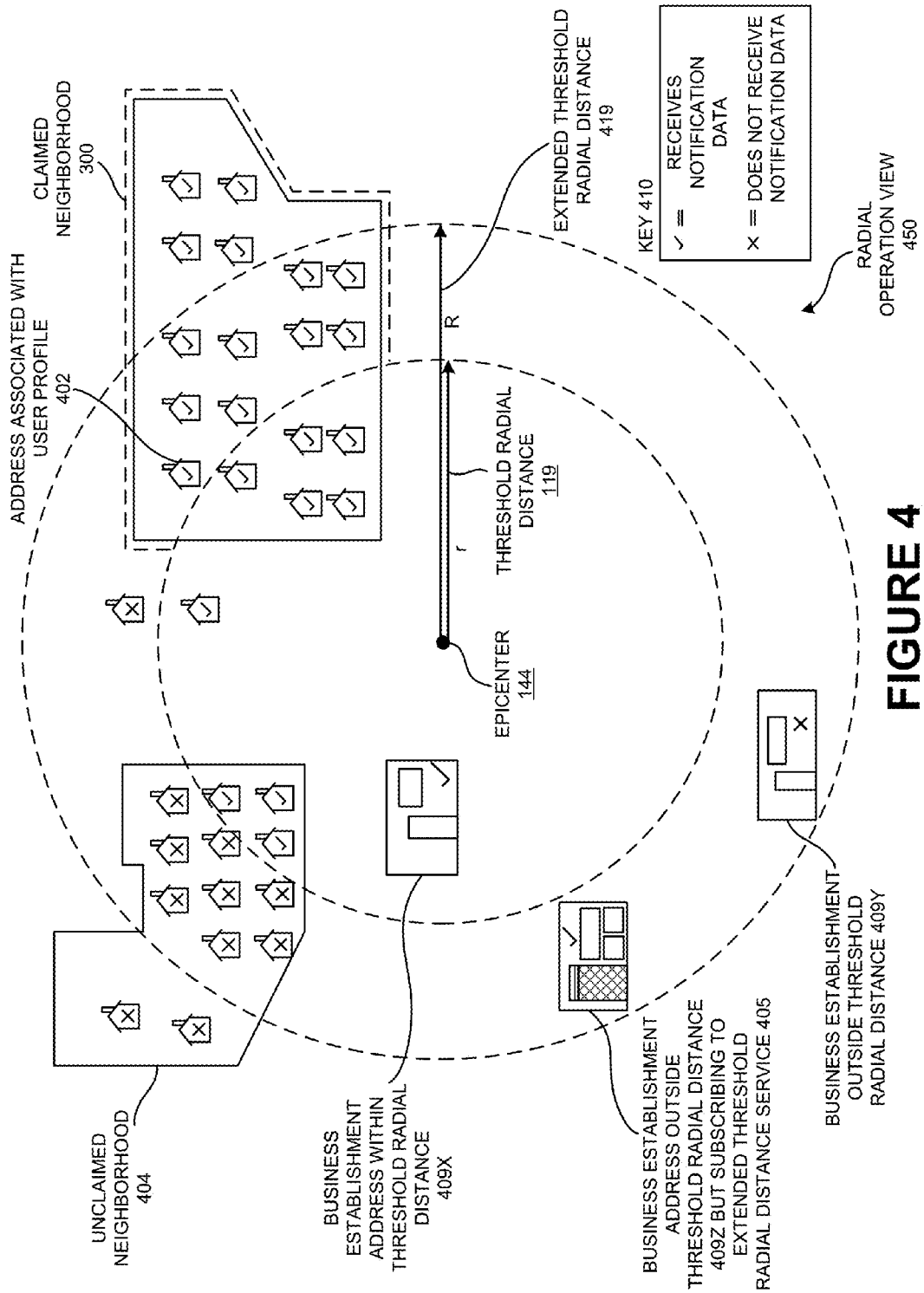
FIG. 4 is a radial operation view that illustrates an expansion of a threshold radial distance based on a claimed neighborhood at a radial boundary surrounding an epicenter formed by geo spatial coordinates of the device of FIG. 1, according to one embodiment.

FIG. 4 is a radial operation view 450 that illustrates an expansion of a threshold radial distance based on a claimed neighborhood 300 at a radial boundary surrounding the epicenter 144 formed by geospatial coordinates of the device of FIG. 1, according to one embodiment. FIG. 4 illustrates a claimed neighborhood 300, an address associated with a user profile 402, an unclaimed neighborhood 404, a business establishment address outside the threshold radial distance as described in operation 409Z but subscribing to extend the threshold radial distance as described in operation 405, a business establishment within the threshold radial distance as described in operation 409X, a business establishment outside the threshold radial distance in operation 409Y, a key 410, and an extended threshold radial distance 419.

The key 410 describes that a 'checkmark' inside a home in either the claimed neighborhood 300 and/or the unclaimed neighborhood 404 indicates that the automotive listing data 102 reaches a user associated with that address at a radial geospatial distance away. In contrast, the key 410 describes that an 'X mark' inside a home in either the claimed neighborhood 300 and/or the unclaimed neighborhood 404 indicates that the automotive listing data 102 does not reach a user associated with that address at a radial geospatial distance away.

Particularly, in FIG. 4, an address associated with each user profile 402 is illustrated, according to one embodiment. In FIG. 4, because the claimed neighborhood 300 is partially within the threshold radial distance 'r', every verified user in the claimed neighborhood 300 receives the automotive listing data 102, according to one embodiment. Thereby, the radial broadcast distance 'r' is extended to a' as illustrated in FIG. 4 (e.g., the extended threshold radial distance 419 of FIG. 4). It should be understood that in an alternate embodiment, the radial broadcast of the automotive listing data 102 may not extend to the entire group of users of the claimed neighborhood 300. However, to promote neighborhood communication and cooperation, the automotive listing data 102 is illustrated as being extended to the claimed neighborhood 300 in the embodiment of FIG. 4.

It should be also noted that in some embodiments, the "preseeded user profiles" may be users that have previously signed up for the geospatially constrained social network 142, as opposed to users that have been preseeded there in a social network. For example, in one alternate embodiment, each of the claimed neighborhood 300 may serve as an approximate to actual radial distribution, in that broadcast messages are solely sent to claimed neighborhoods (e.g., private claimed neighborhoods) of actual users in a vicinity of a broadcast (rather than to public profiles).

FIG. 4 also illustrates an unclaimed neighborhood 404. The unclaimed neighborhood 404 may be preseeded based on public data, according to one embodiment. The unclaimed neighborhood has within it a series of addresses (e.g., associated with non-transitory homes and/or business locations), according to one embodiment as illustrated in FIG. 4. Those addresses in the unclaimed neighborhood 404 to whom the automotive listing data 102 is delivered have a 'checkmark', according to one embodiment. In contrast, those addresses in the unclaimed neighborhood 404 to whom the automotive listing data 102 is not delivered have an 'X mark', as illustrated in FIG. 4. Particularly, addresses in the radial boundary 'r' have a check mark, whereas addresses that are outside the radial boundary 'r' (e.g., and therefore outside the threshold radial distance 119) are marked with the 'X mark'. In this example embodiment of FIG. 4 showing the unclaimed neighborhood 404, the addresses within the threshold radial distance 119 are the addresses that receive the automotive listing data 102.

Also illustrated in FIG. 4 is the concept of the business establishment address within the threshold radial distance as shown in operation 409X, the business establishment address outside the threshold radial distance but subscribing to extend threshold radial distance service as shown in operation 405 (e.g., a service that extends the threshold radial distance to 'R', the extended threshold radial distance 419), and the business establishment outside the threshold radial distance as illustrated in operation 409Y. Each of these different operations will be compared and contrasted. The business establishment address in operation 409X may receive the automotive listing data 102 because the service provider in this example embodiment of FIG. 4 is within the threshold radial distance 119, according to one embodiment.

The business establishment address in operation 405 may receive the automotive listing data 102 because they provide a consideration (e.g., pay a monthly subscription, annual fee, and/or pay per access/use fee) to the geospatially constrained social network 142, even though the business establishment in operation 405 does not have a physical address within the threshold radial distance 119. In an alternate embodiment, the business establishments need not pay a consideration for this service due to the beneficial societal nature of their participation in the geospatially constrained social network 142. The geospatially constrained social network 142 (e.g., or automobile sharing server 100) may verify, confirm, and/or ask for an assurance that the business establishment actually provides services in the threshold radial distance 119. The geospatially constrained social network 142 (and other the automobile sharing server 100) may request feedback, reviews, and comments from homes/businesses in the geospatially constrained social network 142 for the business establishments in operation 405 and operation 409X to ensure that they continue to be recommended and/or are permitted to participate in the threshold radial distance 119 around the epicenter 144 (e.g., where the broadcast originates) in the geospatially constrained social network 142. Operation 409Y indicates that a service provider (e.g., business establishment 109) outside the threshold radial distance 119 does not receive the automotive listing data 102, and therefore cannot participate bi-directionally in the geospatially constrained social network 142.

Figure 5:
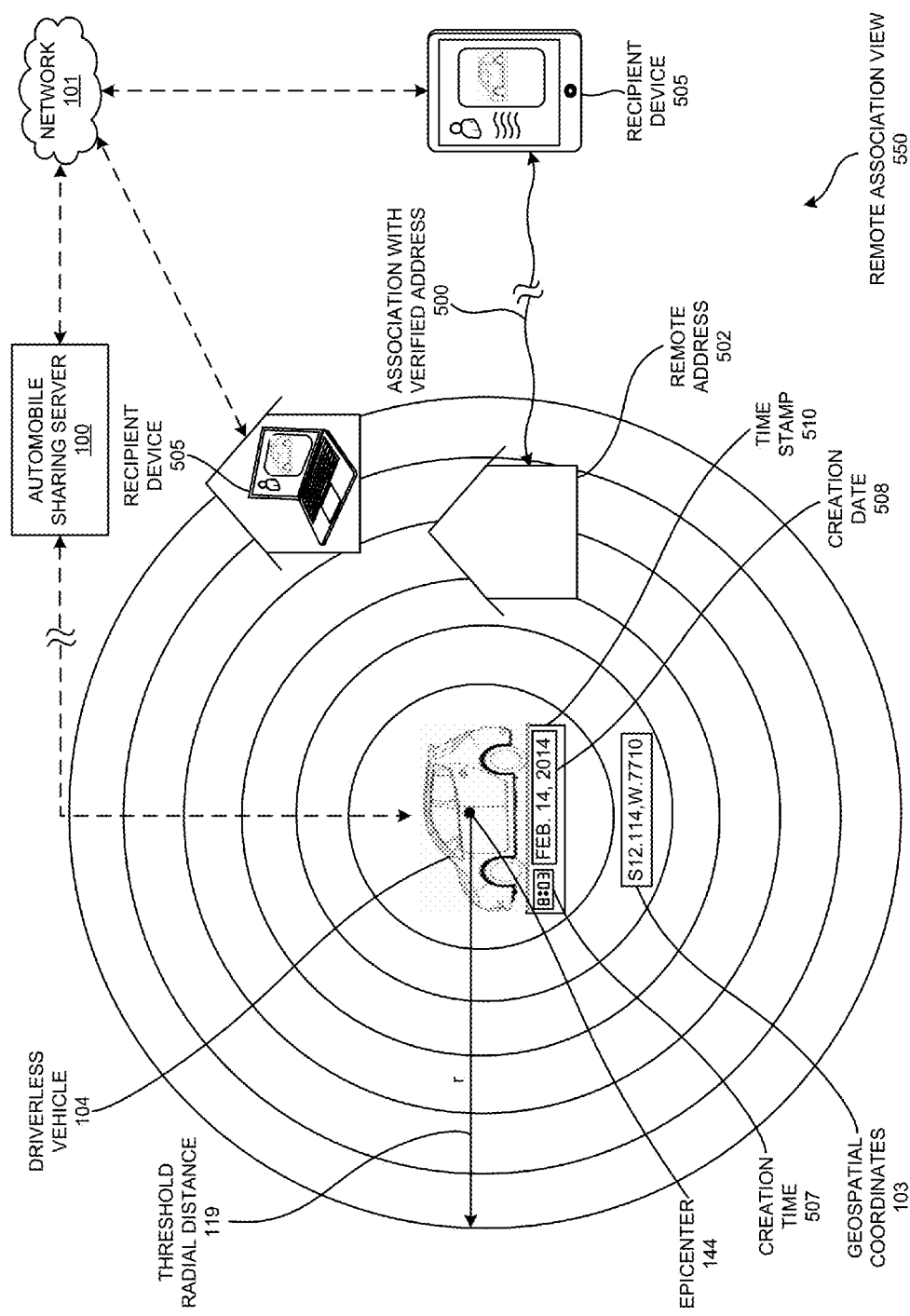
FIG. 5 illustrates a remote association view in which a recipient device receives the automotive listing data from a mobile device based on a non-transitory claimed address associated with a profile of the recipient even when the mobile device is outside a threshold radial distance of a broadcast, according to one embodiment.

FIG. 5 illustrates a remote association view 550 in which a recipient device 505 (e.g., a cellphone, mobile phone, a computer, a tablet) of an recipient receives the automotive listing data 102 of FIG. 3 based on a non-transitory claimed address associated with a profile of the recipient even when the recipient's device is outside a threshold radial distance of a broadcast, according to one embodiment.

Particularly, FIG. 5 illustrates an operation of an association with verified address 500 which illustrates the recipient device 505 can be associated to a remote address 502, and a time stamp 510 associated with a creation time 507, a creation date 508, and a set of geospatial coordinates 103 generated from a driverless vehicle 104 and/or mobile device 303. The remote address 502 may be a non-transitory location such as a home and/or a work address of the recipient 114 (e.g., the user generating the automotive listing data 102), according to one embodiment. The non-transitory location may be a place of domicile (e.g., a home) and/or a place of work (e.g., a physical location and/or a principle place of business) of a property (e.g., a work address) and/or business associated with the user), according to one embodiment.

The concept illustrates that the recipient device 505 may be located at a physical location outside the threshold radial distance 119 and still get the automotive listing data 102 and/or the notification data 112 if the recipient device 505 (e.g., a mobile phone) has verified an address at a location that they care about and/or are associated with (e.g., a location in which they live, work, and/or have guest access) that is within the threshold radial distance 119. In other words, the user may receive broadcast (e.g., the notification data 112 and/or the automotive listing data 102 which may be live streamed and/or through after the event notifications) related to a radial distance from their home and/or work even when physically at a location outside their claimed non-transitory location.

Figure 6A:
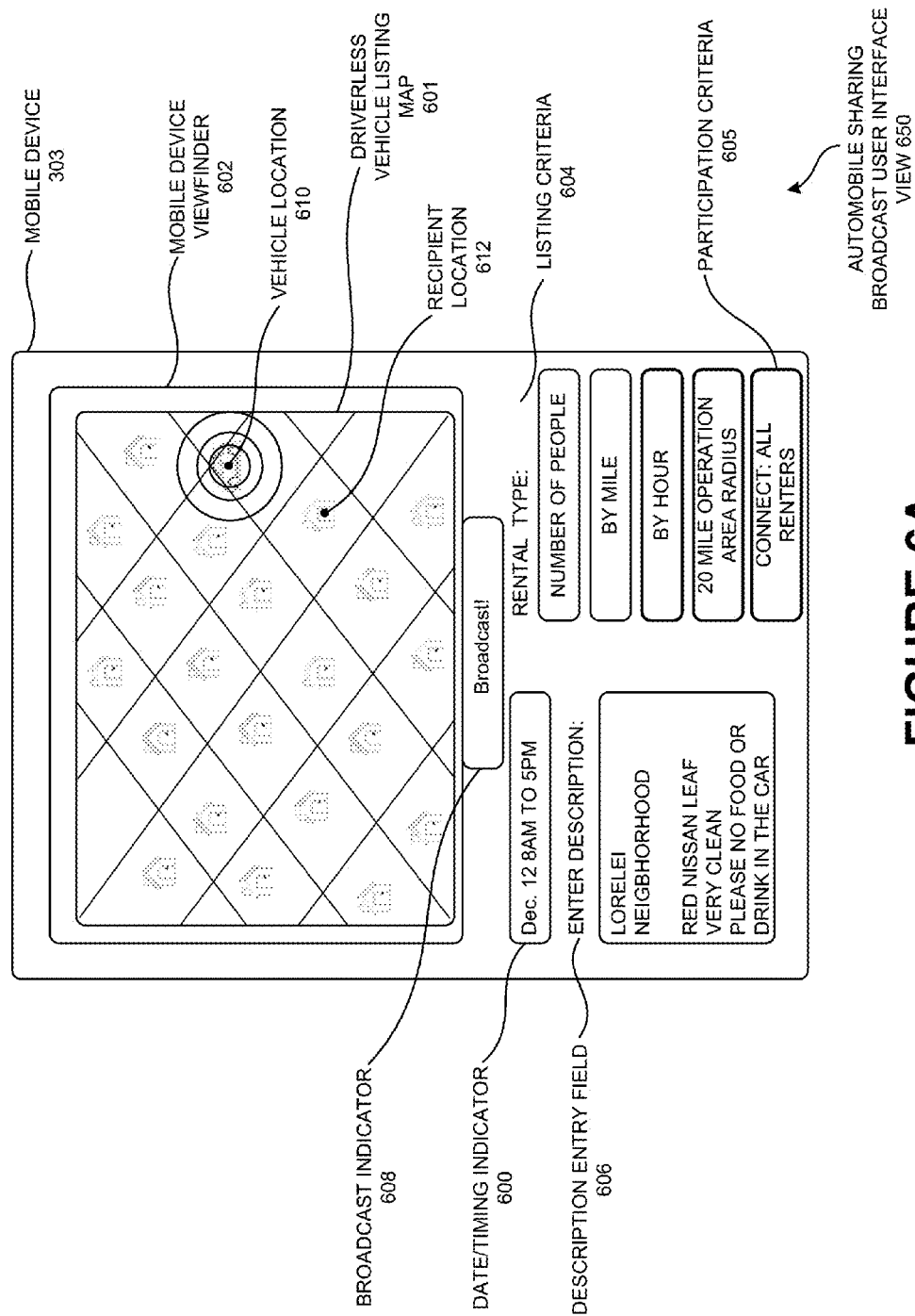
FIG. 6A is an automobile sharing broadcast user interface view of the mobile device of FIG. 3 that shows how the user can generate and broadcast the broadcast data, according to one embodiment.

FIG. 6A is an automobile sharing broadcast user interface view 650 of the mobile device of FIG. 3 that shows how the user can generate and broadcast the broadcast data, according to one embodiment. FIG. 6A shows a date/time indicator 600, a driverless vehicle listing map 601, a mobile device viewfinder 602, a listing criteria 604, a participation criteria 605, a description entry field 606, a broadcast indicator 608, and a recipient location 612, according to one embodiment.

The user (e.g., the owner of the driverless vehicle 301) may be able to set the listing criteria 604 for renting their driverless vehicle. The listing criteria may include a rental type, a number of people, a specification of payment (e.g., by mile, by hour), an operating radius, and/or a participation criteria. The participation criteria 605 may enable the user (e.g., the renter, the owner of the driverless vehicle 301) to allow communication between users (e.g., all renters, all verified users, all recipients of the broadcast). The user (e.g., the owner of the driverless vehicle 301) may be able to enter details about their vehicle and/or rules (e.g., no pets in the vehicle) in the description entry field 606. The date/time indicator 600 may enable the user of the mobile device 303 to indicate the date and/or times that their vehicle is available to be rented. In one embodiment, the date/time indicator 600 and/or the description entry field 606 may be included in the listing criteria 604. The broadcast indicator 608 may allow the user to broadcast the information they have entered to other users (e.g., all verified users in a threshold radial distance from the driverless vehicle 104 and/or the owner of the driverless vehicle's current location).

The vehicle location 610 may be the current location of the driverless vehicle 104 and/or the non-transitory location of the driverless vehicle 3508. The recipient location 612 may indicate the geospatial location of an individual who received the broadcast. The driverless vehicle listing map 601 may be a geospatial map of the user's (e.g., the owner of the driverless vehicle 301) current location and/or claimed geospatial locations (e.g., claimed neighborhoods 300) on which the vehicle location 610 and/or the recipient location 612 is shown.

FIG. 6B is a driverless vehicle renter user interface view 651 of the recipient device of FIG. 5, in which a broadcast data generated through the user interface of FIG. 6A enables the user to request a rental of the driverless vehicle, according to one embodiment. FIG. 6B shows a rental details 607, a driverless vehicle locator map 613, a user location 614, and a rental time indicator 617.

A user (e.g., a verified user 706) may be able to enter rental details 607 through their mobile device (e.g., the recipient device 505) including a desired make and/or model of vehicle, a number of passengers, a duration of the rental, a desired start and/or end time of the rental, a payment method (e.g., credit card, by mile, by hour), a color of the vehicle. The renter (e.g., user of the recipient device 505) may be able to view their location on the driverless vehicle locator map 613 as the user location 614. Available vehicles and/or all registered vehicles within a certain proximity to the user and/or the user's claimed geospatial locations 700 may be visible on the driverless vehicle locator 613 and/or may display automobile sharing alert pushpins 609. The user (e.g., the renter) may be able to view the movement of vehicles on the map. The rental indicator 617 may allow the user to see the time of pick up (e.g., when the vehicle they requested and/or are viewing could be at their location). In one embodiment, only driverless vehicles 104 with listing criteria 604 that match the rental details 607 may be presented on the driverless vehicle locator map 613.

Figure 6C:
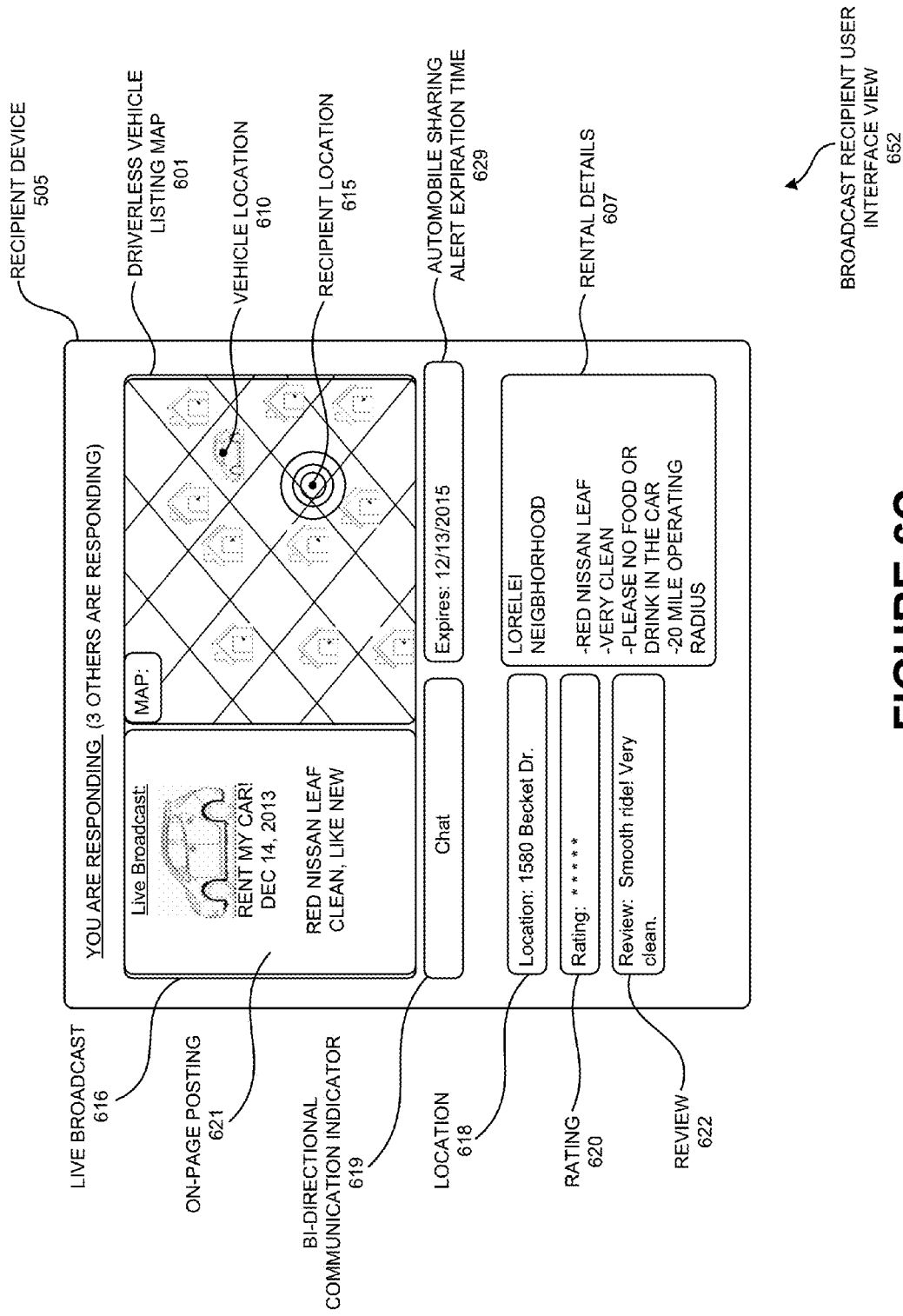
FIG. 6C is a broadcast recipient user interface view of the recipient device of FIG. 5 in which the recipient device is receiving a live broadcast, according to one embodiment.

FIG. 6C is a broadcast recipient user interface view 652 of the recipient device of FIG. 5 in which the recipient device is receiving a live broadcast, according to one embodiment. FIG. 6C shows a recipient location 615, a live broadcast 616, a location 618, a bi-directional communication indicator 619, a rating 620, a review 622, and a rental details 607.

The recipient 114 may be able to view the live broadcast 616 (e.g., as an on-page posting, push notification, update) on the recipient device 505. The user (e.g., the recipient, the renter) may be able to view their location as a recipient location 615 on the driverless vehicle listing map 601. The user may also be able to view the source location of the broadcast (e.g., the vehicle location 610, the location of the user making the broadcast, the non-transitory location of the driverless vehicle 3508). The recipient 114 may be able to view the location associated with the broadcast (e.g., the non-transitory location of the driverless vehicle 3508) as an address, set of geospatial coordinates, etc.

The recipient of the live broadcast 116 may be able to view a rating 620 of the user making the broadcast and/or the driverless vehicle associated with the broadcast. The ratings may be a single rating and/or a collection of any number of ratings of the user making the broadcast and/or the driverless vehicle associated with the broadcast. The review 622 may be a single review and/or a collection of any number of reviews of the user making the broadcast and/or the driverless vehicle associated with the broadcast. The rental details 607 may be details regarding the make, model and/or color of the driverless vehicle 104 and/or listing criteria 604 and/or additional information.

In one embodiment, the live broadcast 616 may be made about a user and/or driverless vehicle 104 from a renter and broadcasted to other recipients 114 and the ratings 620 and/or review 622 and/or rental description 624 may be that of the renter making the broadcast. The bi-directional communication indicator 619 may enable the recipient 114 to communicate with other recipients of the live broadcast 616 and/or the user making the broadcast. The update may be automatically deleted at a specified automobile sharing alert expiration time 629.

Figure 6D:
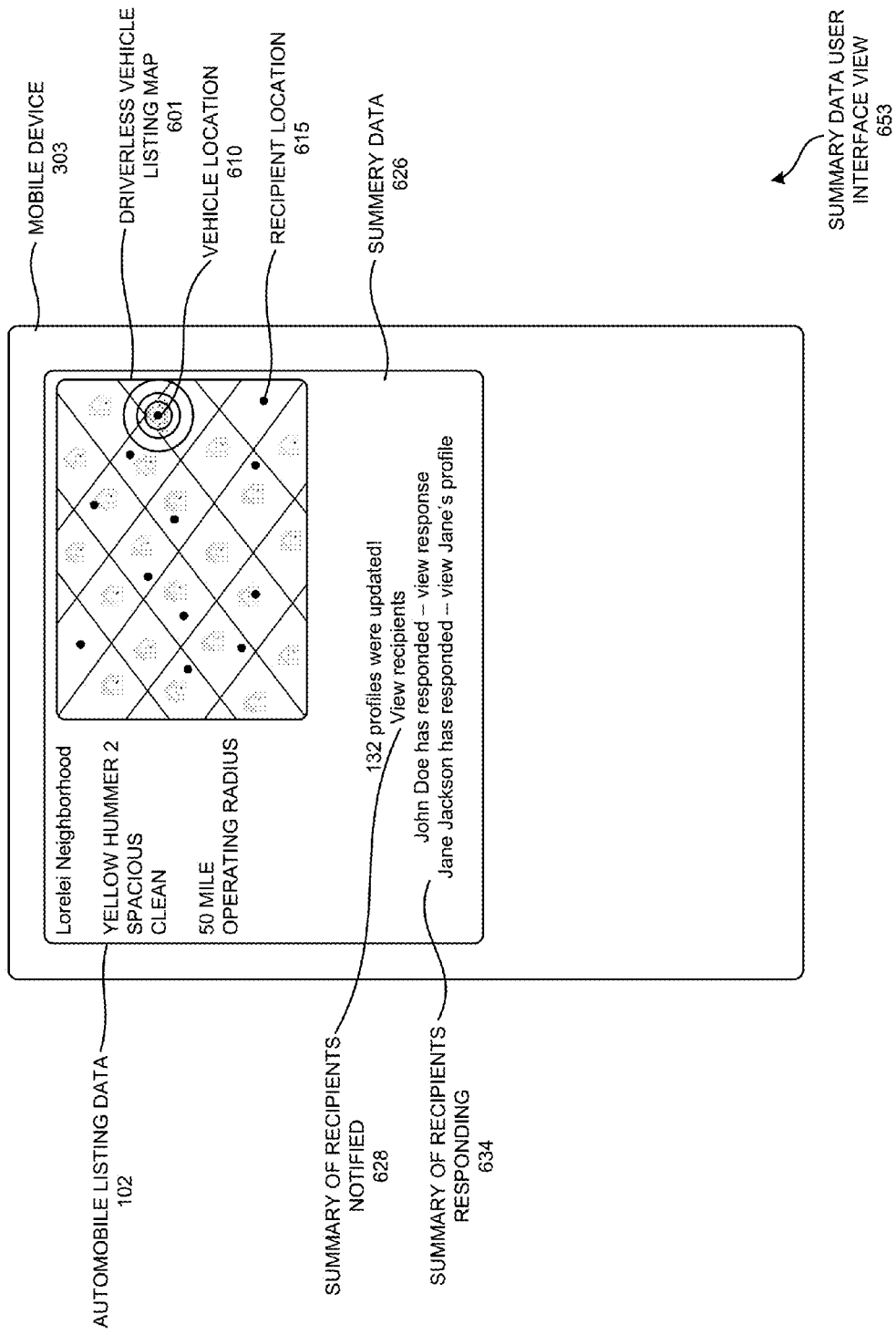
FIG. 6D is a summary data user interface view of the mobile device of FIG. 3 in which the user may see the recipients of the broadcast and the recipients viewing the live broadcast of FIG. 6C, according to one embodiment.

FIG. 6D is a summary data user interface 653 view of the mobile device of FIG. 3 in which the user may see the recipients of the broadcast and the recipients viewing the live broadcast of FIG. 6C, according to one embodiment.

FIG. 6D shows a summary data 626, a summary of recipients notified 628, and a summary of recipients responding 634.

In the example embodiment of FIG. 6D, the user (e.g., the verified user that made the broadcast (e.g., the owner of the driverless vehicle 301) may be able to view a summary data 626 of the number of profiles that were updated with the user's broadcast. The user may be presented with a summary of recipients notified 628 and may be able to select profile links to view the profiles of the recipients that received the broadcast. The user may be able to view a summary of recipients responding 634 to the broadcast. In one embodiment, the user may be able to view the responses from the recipients 114.

In the embodiment of FIG. 6, the user is presented with a collection of the summary data 626. The summary data 626 may display on the mobile device 303 how many recipients received the live broadcast 616. The summary data 626 may also show by the summary of recipients notified 628 how many user profile pages were updated with an alert of the automotive listing data 102 generated through the mobile device 303 and/or driverless vehicle 104 when publishing the automotive listing data 102 generated through the mobile device 303 and/or driverless vehicle 104 in the private neighborhood community and/or the set of user profiles (e.g., preseeded user profiles 302 and/or claimed user profiles 304 as described in FIG. 3 having associated verified addresses (in the threshold radial distance 119 from the claimed geospatial location (e.g., any of the claimed geospatial locations 700 as described in FIG. 7 of the verified user (e.g., the user of FIG. 1 as described as the verified user in FIG. 7) of the automobile sharing server 100))) based on the set of preferences of the verified user (e.g., the user of FIG. 1 as described as the verified user in FIG. 7). Additionally, the user may also be able to see the summary of recipients responding 634 to the broadcast.

FIG. 7 is a claimed location user interface view 750 that explains how a claimed user reviews their broadcasts that they made and manages the neighborhoods that they have claimed, according to one embodiment.

FIG. 7 is a claimed location user interface view 750 that explains how a user manages notifications in neighborhoods that they have claimed and reviews their previous broadcasts, according to one embodiment. Particularly, FIG. 7 describes claimed geospatial locations 700 of a verified user ('Joe'). The claimed geospatial locations 700 will show up when the user becomes the verified user (e.g., by proving the addresses of the claimed geospatial locations 700 by proving utility bills associated with that address). FIG. 7 also shows a broadcasting history of the user, including the rental listing criteria 704, the creation time 507, the creation date 508, the time stamp 510, and the unique submission identifier 636 of past broadcasts.

Figure 8:
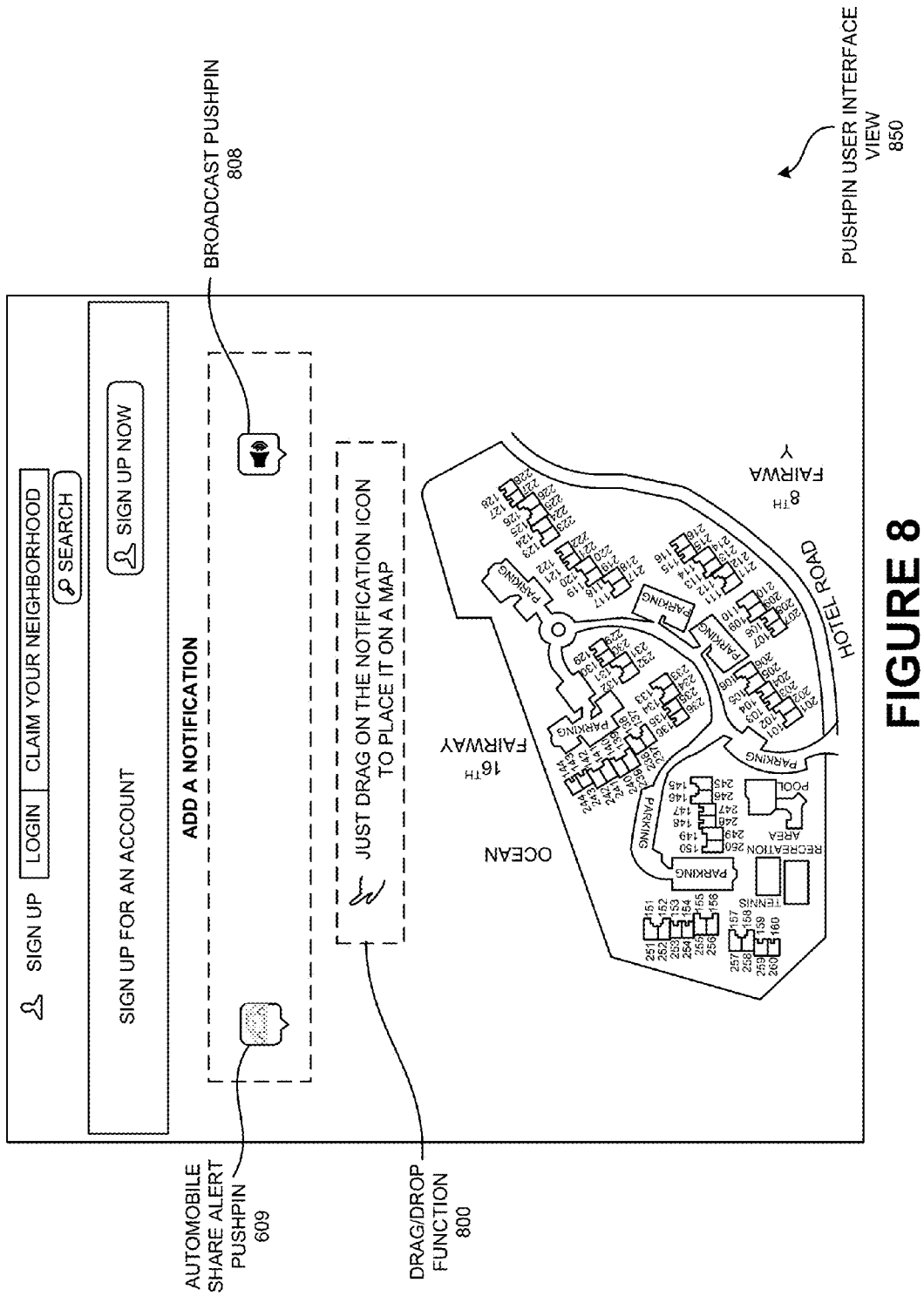
FIG. 8 is a pushpin user interface view that explains how a user drags pushpins to a map including a broadcast pushpin, which is different than other pushpins in that a time and a location of the broadcast pushpin is fixed based on a set of geospatial coordinates associated with a mobile device of the claimed user of FIG. 7, according to one embodiment.

FIG. 8 is a pushpin user interface view 850 that explains how the user drags pushpins to a map including a broadcast pushpin, which is different than other pushpins in that a time and a location of the broadcast pushpin is fixed based on a set of geospatial coordinates associated with a mobile device of the claimed user of FIG. 7, according to one embodiment. Particularly, FIG. 8 illustrates a drag/drop function 800, the automobile share alert pushpin 609, and a broadcast pushpin 808, according to one embodiment.

In FIG. 8, the broadcast pushpin 808 (e.g., that may generate the automotive listing data 102) may be unique in that it can only be placed through a device that has a geo-spatial chip and which can verify a geo-spatial location of a device making the broadcast. In this way, the broadcast pushpin 808 is fixed in time and place, whereas the other pushpins can be manually dragged to the map through the drag/drop function 800.

Figure 9:
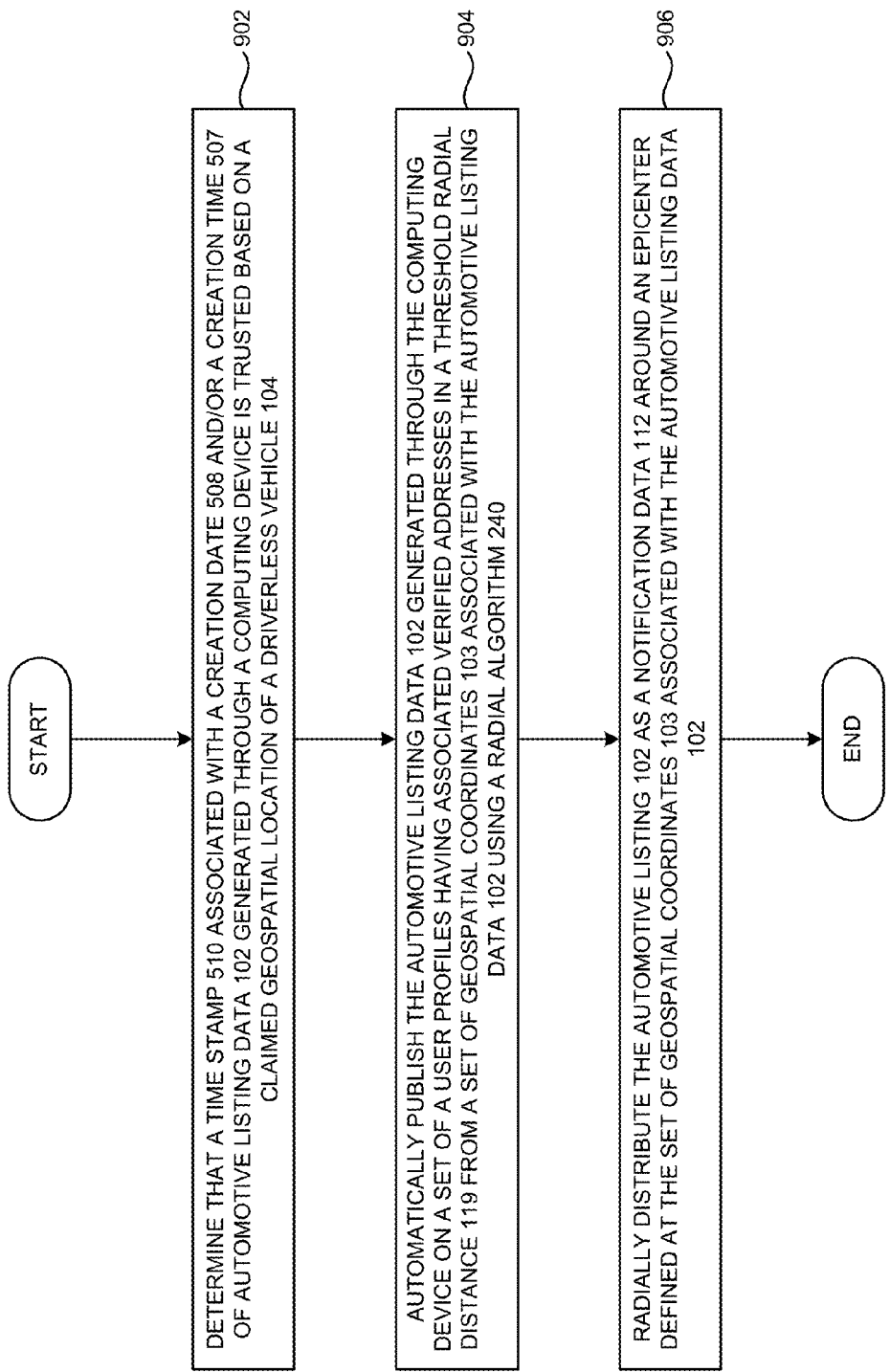
FIG. 9 is a process flow of radially distributing the automotive listing data 102 of FIG. 1 as a notification data around an epicenter defined at the set of geospatial coordinates of FIG. 1 associated with the automotive listing data, according to one embodiment.

FIG. 9 is a process flow of radially distributing the automotive listing data 102 of FIG. 3 as a notification data around an epicenter defined at the set of geospatial coordinates of FIG. 8 associated with the automotive listing data 102, according to one embodiment. Particularly, in FIG. 9, operation 902 may determine that a time stamp 510 associated with a creation date 508 and/or a creation time 507 of the automotive listing data 102 generated through a computing device (e.g., the mobile device 303, the driverless vehicle 104) is trusted based on a claimed geospatial location of a user (e.g., the owner of the driverless vehicle 104), according to one embodiment. Then, in operation 904, the automotive listing data 102 generated through the computing device may be automatically published on a set of user profiles having associated verified addresses in a threshold radial distance 119 from a set of geospatial coordinates 103 associated with the automotive listing data 102 using a radial algorithm 240. Next, in operation 906, the automotive listing data 102 may be radially distributed as the notification data 112 around an epicenter defined at the set of geospatial coordinates 103 associated with the automotive listing data 102.

Figure 10:
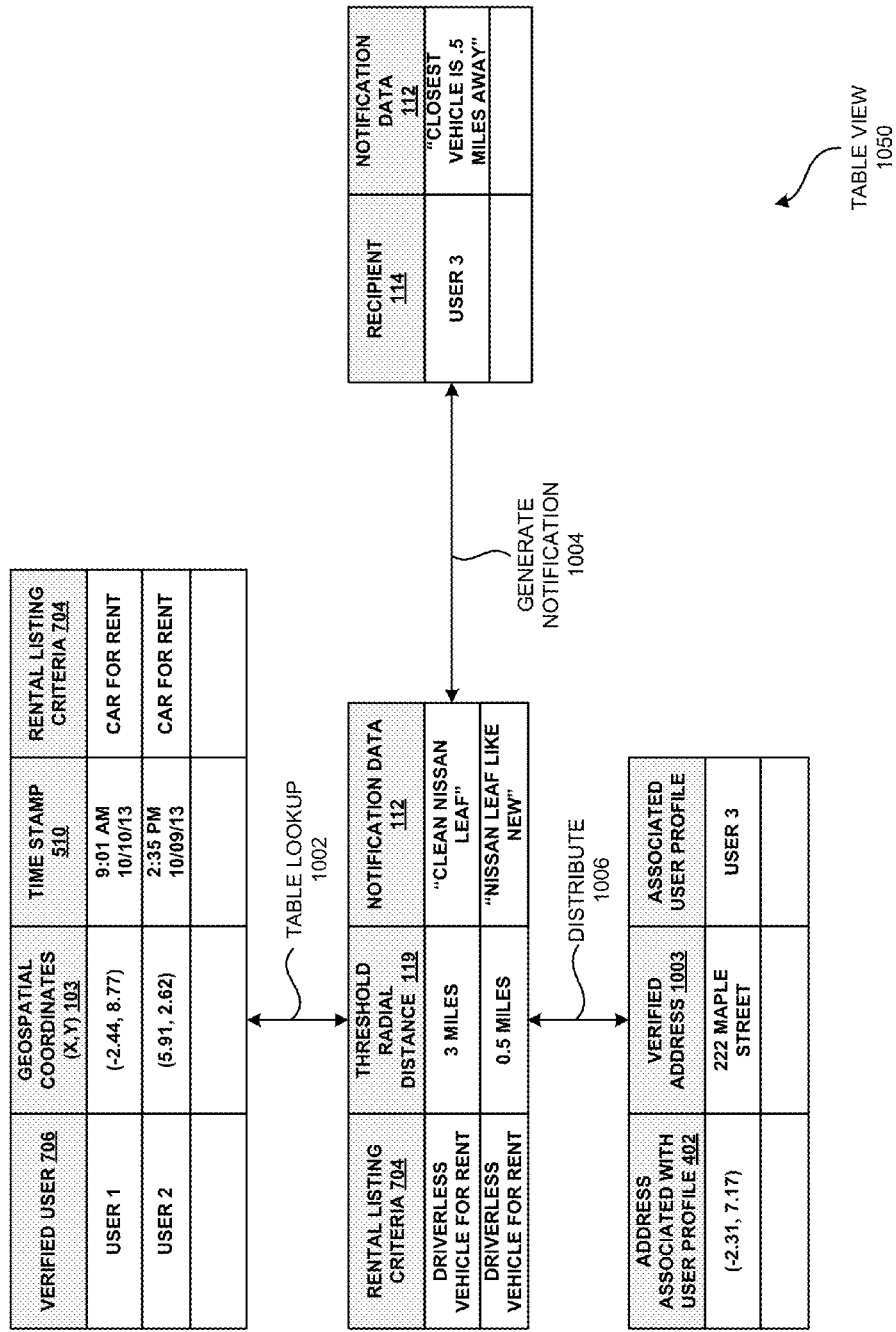
FIG. 10 is a table view illustrating data relationships between users, locations, and with a set of notification types needed to generate a broadcast, according to one embodiment.

FIG. 10 is a table view 1050 illustrating data relationships between users, locations, and with a set of notification types needed to generate a broadcast, according to one embodiment. In FIG. 10, a table lookup 1002 may be performed in which a rental listing criteria 704 is matched with a threshold radial distance 119 and a notification data 112. Then, a notification may be generated using the generate notification operation 1004 from the recipient 114, and distributed to the verified address (e.g., the verified address 1003) in the threshold radial distance 119 using the distribute operation 1006, according to one embodiment. The associated user profile may be the claimed user profile 304.

Figure 11:
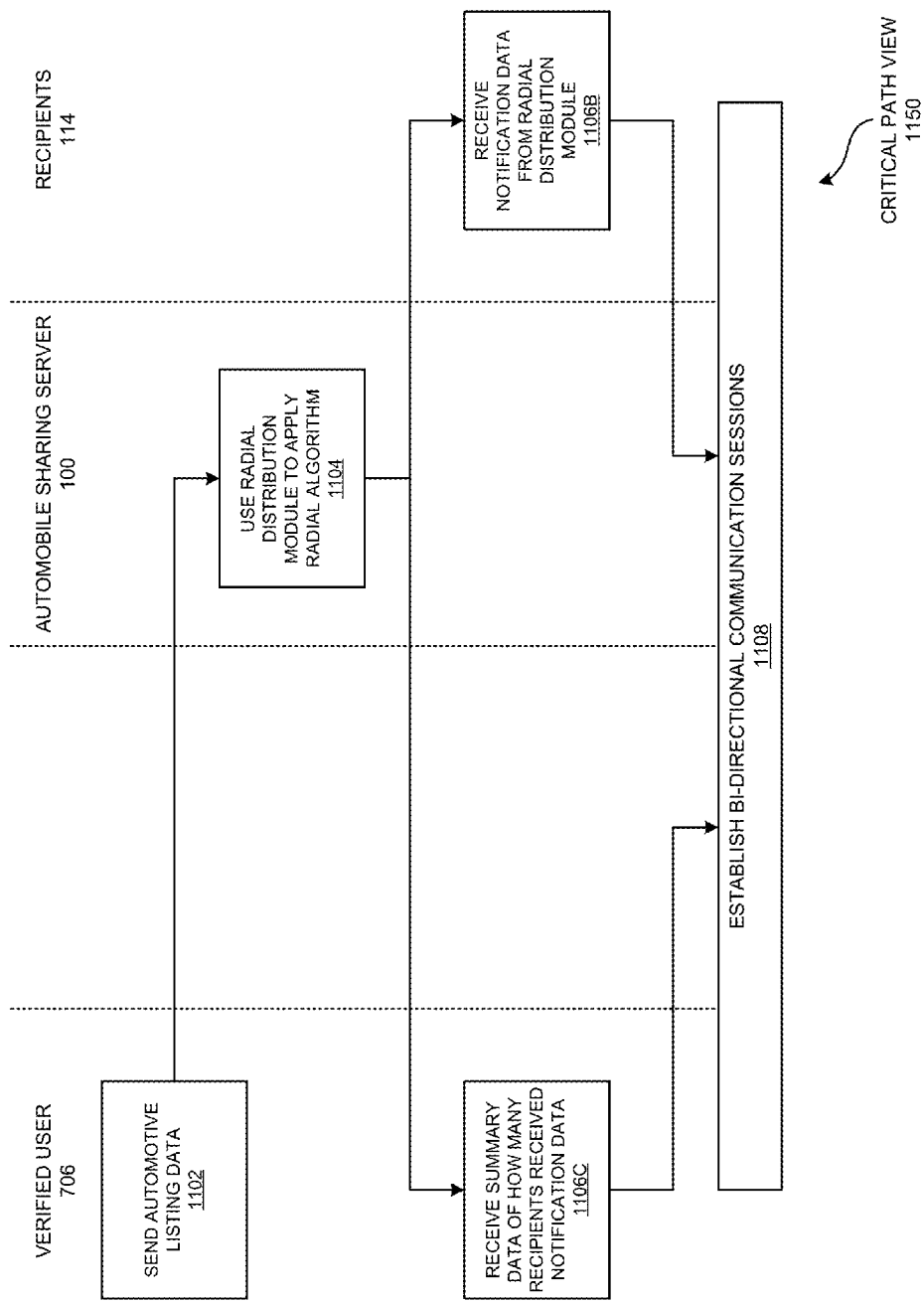
FIG. 11 is a critical path view illustrating a flow based on time in which critical operations in establishing a bi-directional session between a verified user and those individuals receiving the automotive listing data of FIG. 3 is established, according to one embodiment.

FIG. 11 is a critical path view 1150 illustrating a flow based on time in which critical operations in establishing a bi-directional session between a verified user and those individuals receiving the automotive listing data 102 of FIG. 3 is established, according to one embodiment. In FIG. 11, a verified user sends an automotive listing data 102 to the automobile sharing server 100 in operation 1102. The automobile sharing server 100 uses the radial distribution module 140 to apply the radial algorithm 240 in operation 1104. Then, the recipients 114 receive the notification data 112 from the radial distribution module 140 of the automobile sharing server 100 in operation 1106B, according to one embodiment. Based on operation 1106B, the verified user may automatically receive a summary (e.g., the summary data 626) of how many recipients received the notification data 112 in operation 1106C. Next, bidirectional communication sessions are established between the verified user and the recipients 114 in operation 1108.

Figure 12:
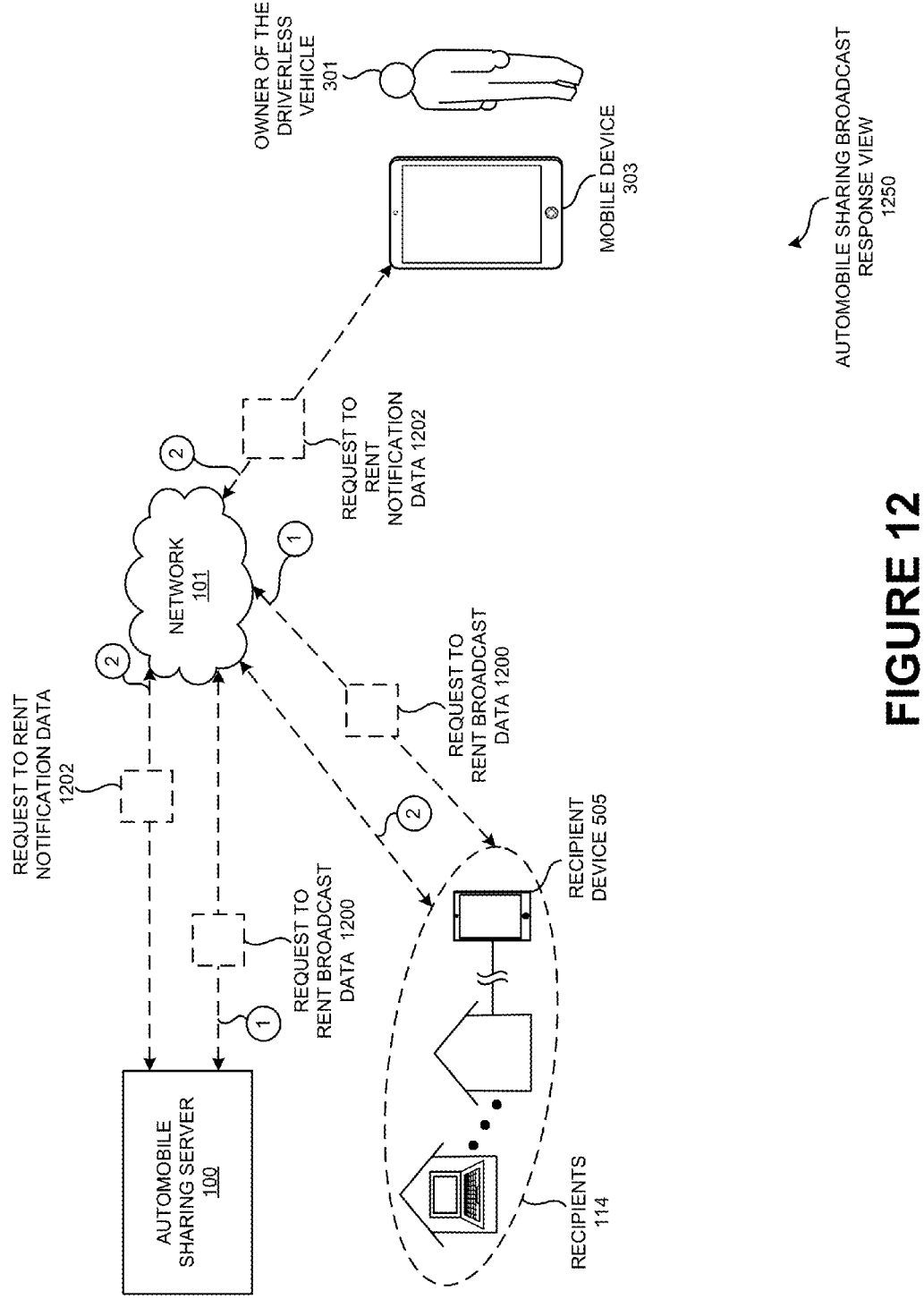
FIG. 12 is an automobile sharing broadcast response view illustrating a response being generated and broadcast by recipients in response to an automobile sharing broadcast made from the mobile device of FIG. 3, according to one embodiment.

FIG. 12 is an automobile sharing broadcast response view 1250 illustrating a response being generated and broadcast by recipients in response to an automotive listing broadcast made from the driverless vehicle of FIG. 1, according to one embodiment.

Particularly, FIG. 12 further illustrates a request to rent broadcast data 1200 and a request to rent notification data 1202. After the user's 106 broadcast reaches recipients 114 with verified addresses within a threshold radial distance 119 from the epicenter 144 (illustrated in FIG. 1), the recipients 114 may broadcast responses (illustrated in FIG. 6D) as request to rent broadcast data 1200 along path circle '1' through the network 101 and/or the cellular network 108 (not shown). The request to rent broadcast data 1200 may be generated by the recipient device 505 and sent via the network 101 to the automobile sharing server 100. Second, the request to rent notification data 1202 may be automatically generated using the request to rent broadcast data 1200 by the automobile sharing server 100.

The request to rent notification data 1202 may then be broadcasted to the driverless vehicle 114 (not shown) and/or owner of the driverless vehicle 301 and/or recipients 114 along path circle '2' using the radial distribution module 140. The request to rent notification data 1202 may move along path circle '2' through the network 101 to the driverless vehicle associated with the user and/or other recipients that may have received the original broadcast from the user. In one embodiment, the communication illustrated in FIG. 12 may happen between the recipients 114 and the driverless vehicle 104. Upon receiving the request to rent notification data 1202, the owner of the driverless vehicle 301 may respond in the form of a dismiss, a save, a rating, a review and/or a rental acceptance of a renter (e.g., recipient 114) associated with the automotive listing data 102. The automobile sharing server 100 may analyze the response of the owner of the driverless vehicle 301.

Figure 13:
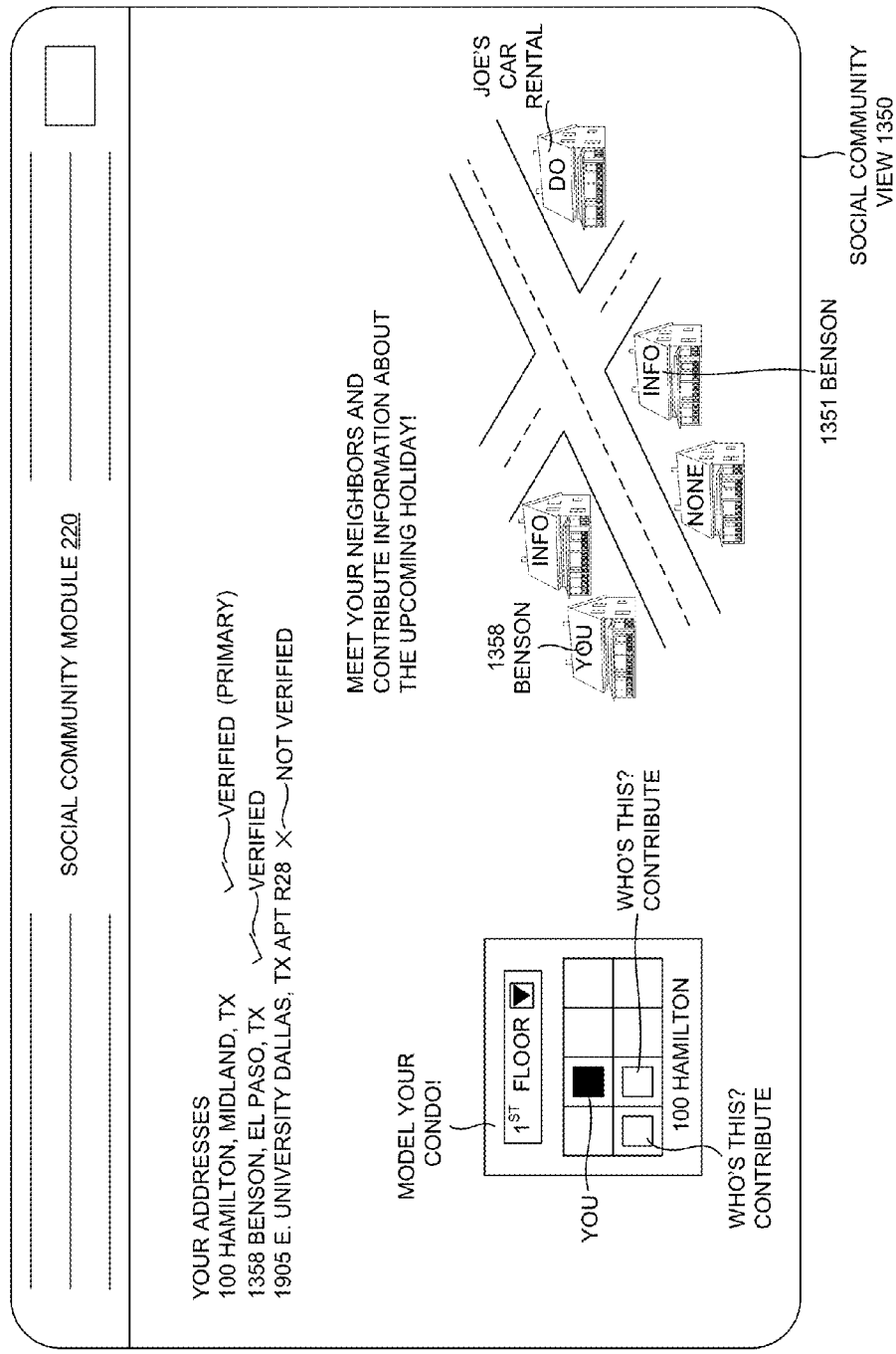
FIG. 13 is a social community view of a social community module, according to one embodiment.

FIG. 13 is a user interface view of the social community module 220, according to one embodiment. The social community view 1350 may display the information associated with the social community module 220 (e.g., the social community module 220 of FIG. 2). The social community view 1350 may display a map of the specific geographic location associated with the user profile of the social community module 220 (e.g., the social community module 220 of FIG. 2). The social community view 1350 may display the map based geographic location associated with the user profile (e.g., the user profile 1700 of FIG. 17A) only after verifying the address of the registered user of the global neighborhood environment 2300 (e.g., the geospatially constrained social network 142 of FIG. 1).

In addition, the social community view 1350 may provide a building creator (e.g., the building builder 2102 of FIG. 21), in which the registered users of the global neighborhood environment 2300 (e.g., the geospatially constrained social network 142 of FIG. 1) may create and/or modify empty unclaimed profiles (i.e., wiki profiles such as the unclaimed profile 1706 of FIG. 17A-17B, a unclaimed profile 1802 of FIG. 18A, a unclaimed profile 2204 of FIG. 22), building layouts, social network pages, etc. The social community view 1350 of the social community module 220 may enable access to the user (e.g., the user of FIG. 1) to model a condo on any floor (e.g., basement, ground floor, first floor, etc.) selected through the drop down box by the registered user of the global neighborhood environment 2300 (e.g., the geospatially constrained social network 142 of FIG. 1). The social community view 1350 of the social community module 220 (e.g., the social community module 220 of FIG. 2) may enable the registered user of the global neighborhood environment 2300 (e.g., the geospatially constrained social network 142 of FIG. 1) to contribute information about their neighbors (e.g., the other addresses associated with user profiles 402 of FIG. 4).

Figure 14:
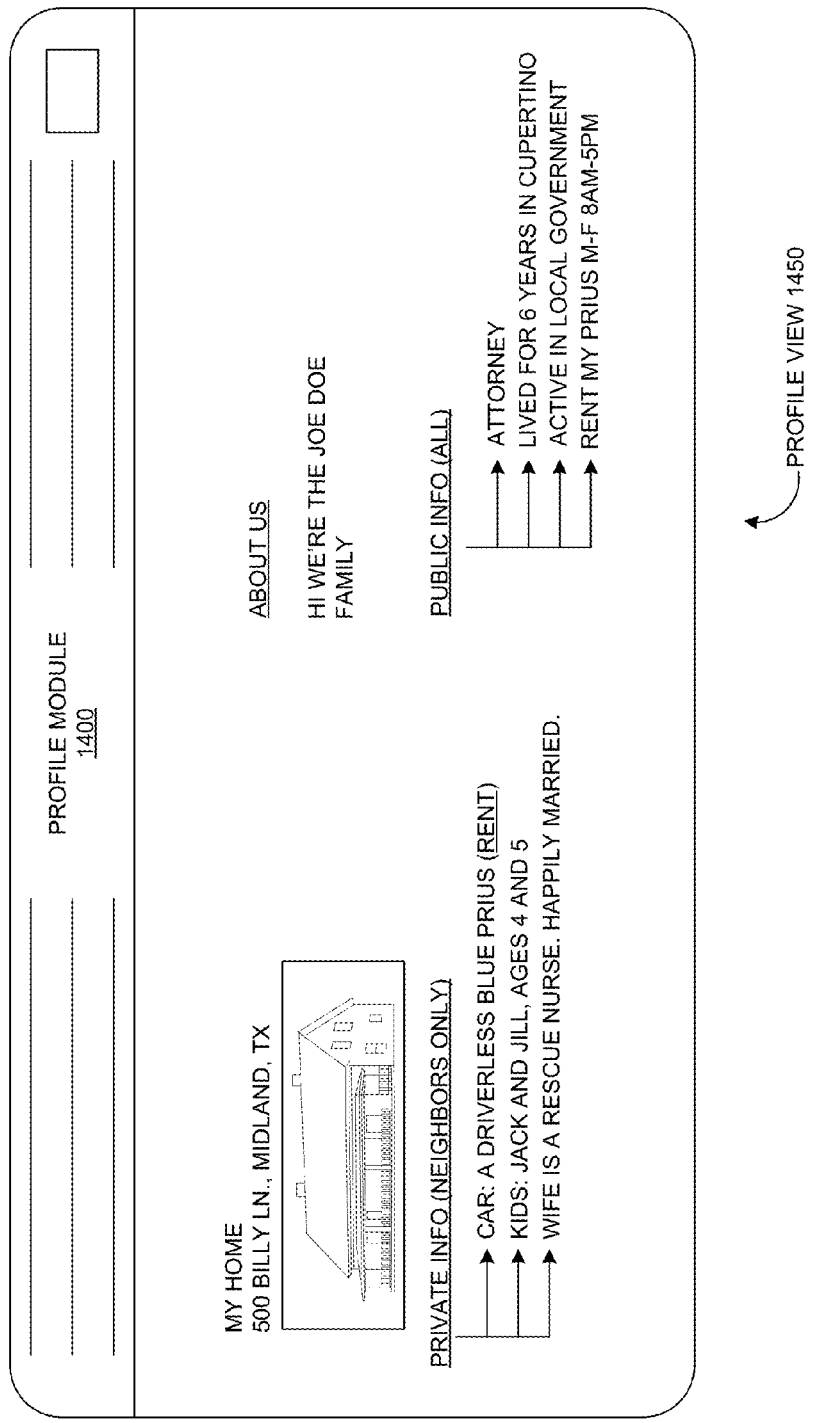
FIG. 14 is a profile view of a profile module, according to one embodiment.

FIG. 14 is a profile view 1450 of a profile module 1400, according to one embodiment. The profile view 1450 of profile module 1400 may offer the registered user to access the profile about the neighbors (e.g., the other addresses associated with user profiles 402 of FIG. 4). The profile view 1450 of profile module 1400 may indicate the information associated with the profile of the registered user of the global neighborhood environment 2300 (e.g., the geospatially constrained social network 142 of FIG. 1). The profile view 1450 may display the address of the registered user. The profile view 1450 may also display events organized by the neighbors (e.g., the other addresses associated with user profiles 402 of FIG. 4), history of the neighbors (e.g., the other addresses associated with user profiles 402 of FIG. 4), and/or may also offer the information (e.g., public, private, etc.) associated with the family of the neighbors (e.g., the other addresses associated with user profiles 402 of FIG. 4) located in the locality of the user (e.g., the user(s) 106 of FIG. 1) of the global neighborhood environment 2300 (e.g., the geospatially constrained social network 142 of FIG. 1).

Figure 15:
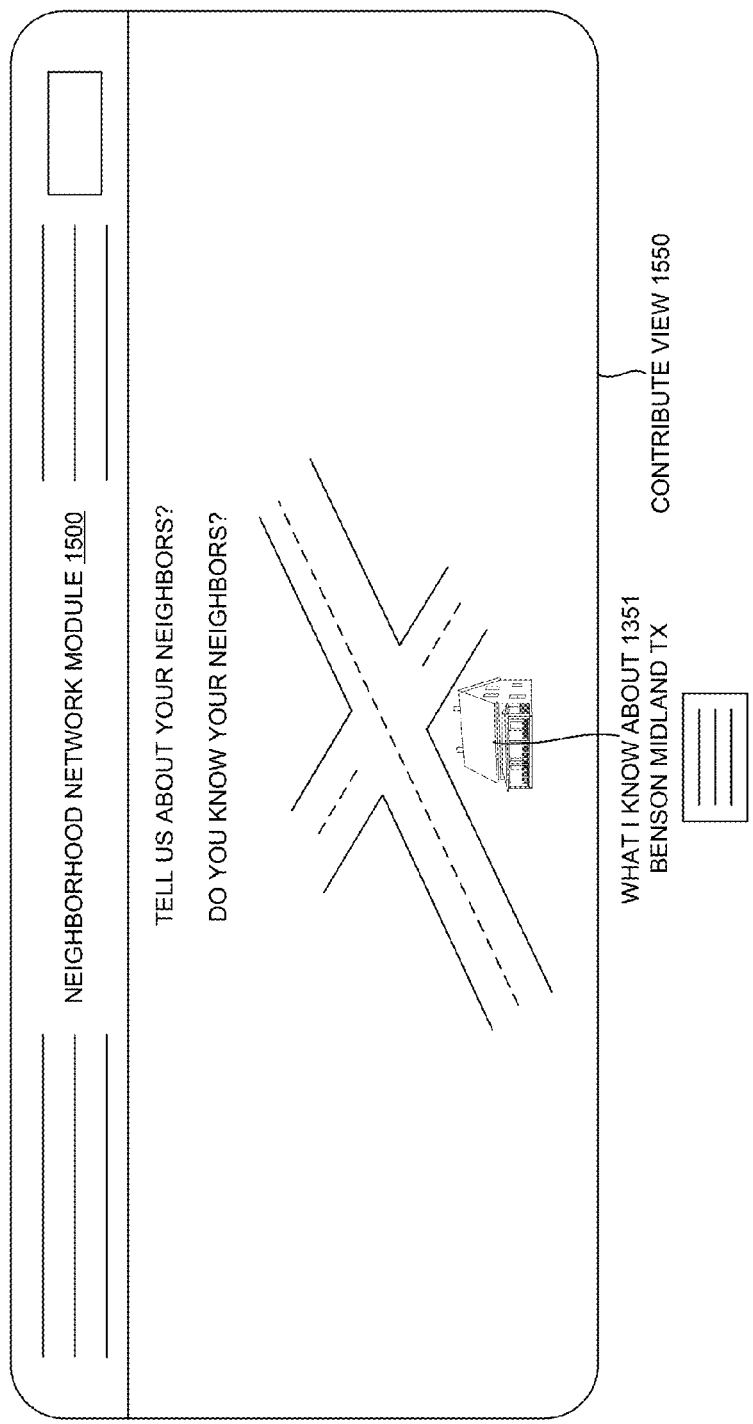
FIG. 15 is a contribute view of a neighborhood network module, according to one embodiment.

FIG. 15 is a contribute view 1550 of a neighborhood network module 1500, according to one embodiment. The contribute view 1550 of the neighborhood network module 1500 may enable the registered user of the global neighborhood environment 2300 (e.g., the geospatially constrained social network 142 of FIG. 1) to add information about their neighbors in the neighborhood network. The contribute view 1550 of the neighborhood network module 1500 may offer registered user of the global neighborhood environment 2300 (e.g., the geospatially constrained social network 142 of FIG. 1) to add valuable notes associated with the family, vehicle, events, private information, etc.

Figure 16:
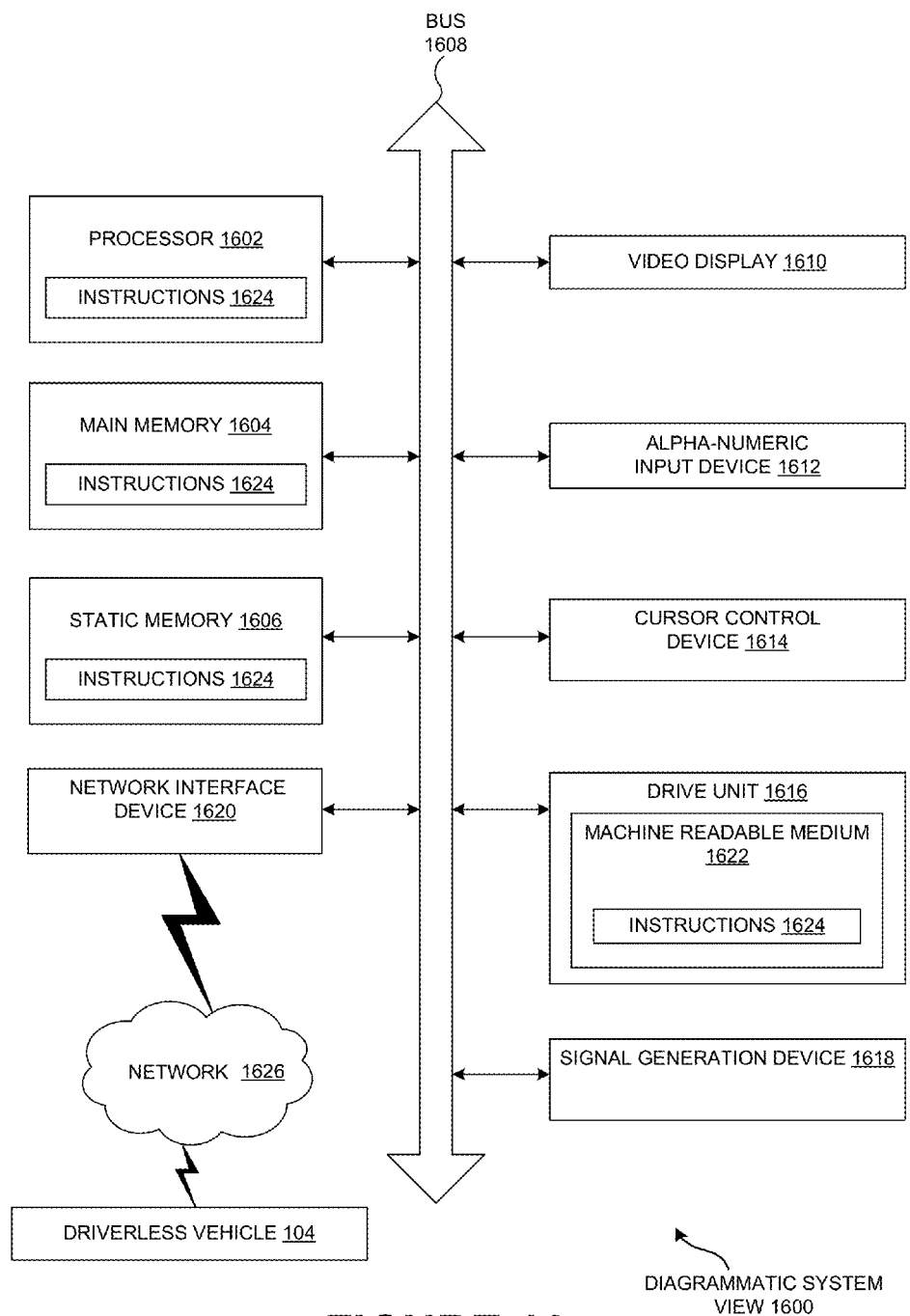
FIG. 16 is a diagrammatic system view of a data processing system in which any of the embodiments disclosed herein may be performed, according to one embodiment.

FIG. 16 is a diagrammatic system view, according to one embodiment. FIG. 16 is a diagrammatic system view 1600 of a data processing system in which any of the embodiments disclosed herein may be performed, according to one embodiment. Particularly, the diagrammatic system view 1600 of FIG. 16 illustrates a processor 1602, a main memory 1604, a static memory 1606, a bus 1608, a video display 1610, an alpha-numeric input device 1612, a cursor control device 1614, a drive unit 1616, a signal generation device 1618, a network interface device 1620, a machine readable medium 1622, instructions 1624, and a network 1626, according to one embodiment.

The diagrammatic system view 1600 may indicate a personal computer and/or a data processing system (e.g., the driverless vehicle 104) in which one or more operations disclosed herein are performed. The processor 1602 may be a microprocessor, a state machine, an application specific integrated circuit, a field programmable gate array, etc. (e.g., Intel® Pentium® processor). The main memory 1604 may be a dynamic random access memory and/or a primary memory of a computer system. The network interface device 1620 may be communicatively coupled with the network 1626. The driverless vehicle 104 may be communicatively coupled with the network 1626.

The static memory 1606 may be a hard drive, a flash drive, and/or other memory information associated with the data processing system. The bus 1608 may be an interconnection between various circuits and/or structures of the data processing system. The video display 1610 may provide graphical representation of information on the data processing system (e.g., the driverless vehicle 104). The alpha-numeric input device 1612 may be a keypad, keyboard and/or any other input device of text (e.g., a special device to aid the physically handicapped). The cursor control device 1614 may be a pointing device such as a mouse.

The drive unit 1616 may be a hard drive, a storage system, and/or other longer term storage subsystem. The signal generation device 1618 may be a bios and/or a functional operating system of the data processing system. The machine readable medium 1622 may provide instructions on which any of the methods disclosed herein may be performed. The instructions 1624 may provide source code and/or data code to the processor 1602 to enable any one/or more operations disclosed herein. The driverless vehicle 104 may be communicatively coupled with the network 1626.

Figure 17A:
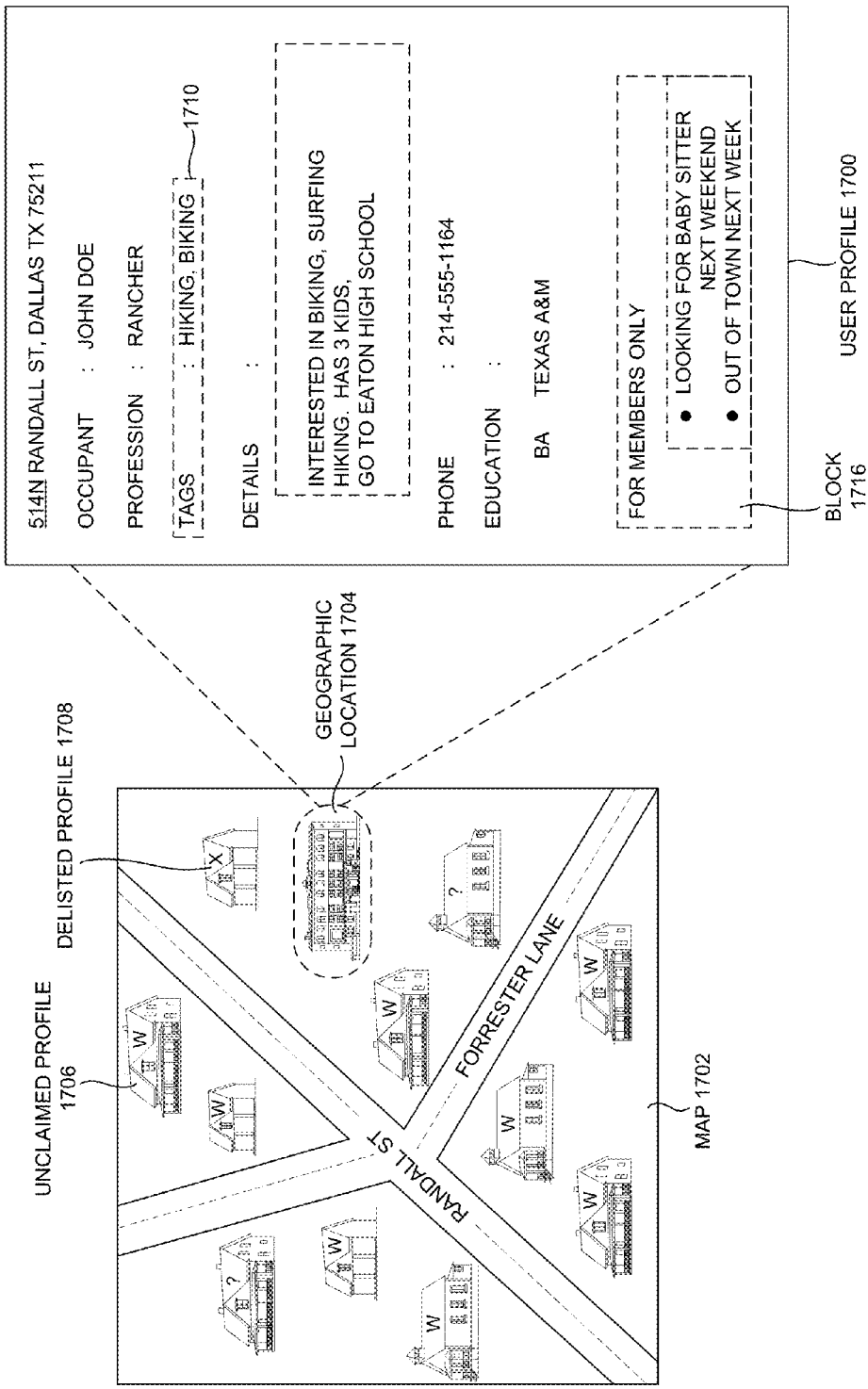
FIG. 17A is a user interface view of mapping user profile of the geographical location, according to one embodiment.

FIG. 17A is a user interface view of mapping a user profile 1700 of the geographic location 1704, according to one embodiment. In the example embodiment illustrated in FIG. 17A, the user profile 1700 may contain the information associated with the geographic location 1704. The user profile 1700 may contain the information associated with the registered user. The user profile 1700 may contain information such as address user of the specific geographic location, name of the occupant, profession of the occupant, details, phone number, educational qualification, etc.

The map 1702 may indicate the global neighborhood environment 2300 (e.g., the geospatially constrained social network 142 of FIG. 1) of the geographical location 1704, an unclaimed profile 1706 (e.g., the unclaimed profile 1802 of FIG. 18A, the unclaimed profile 2204 of FIG. 22), and a delisted profile 1708. The geographical location 1704 may be associated with the user profile 1700. The unclaimed profile 1706 may be the unclaimed profile 1706 associated with the neighboring property surrounding the geographic location 1704. The delisted profile 1708 illustrated in example embodiment of FIG. 17A, may be the unclaimed profile 1706 that may be delisted when the registered user claims the physical property. The block 1710 illustrated in the example embodiment of FIG. 17A may be associated with hobbies, personal likes, etc. The block 1716 may be associated with events, requirements, etc. that may be displayed by the members of the global neighborhood environment 2300 (e.g., the geospatially constrained social network 142 of FIG. 1).

For example, a verified registered user (e.g., a verified registered user 1810 of FIG. 18A-B, a verified registered user 1810 of FIG. 21) may be associated with a user profile 1700. The user profile 1700 may be associated with a specific geographic location. A map concurrently displaying the user profile 1700 and the specific geographic location 1704 may be generated. Also, the unclaimed profiles 1706 associated with different geographic locations surrounding the specific geographic location associated with the user profile 1700 may be simultaneously generated in the map. In addition, a query of the user profile 1700 and/or the specific geographic location may be processed.

Similarly, a tag data (e.g., the tags 1710 of FIG. 17A) associated with the specific geographic locations, a particular geographic location, and the delisted geographic location may be processed. A frequent one of the tag data (e.g., the tags 1710 of FIG. 17A) may be displayed when the specific geographic location and/or the particular geographic location is made active, but not when a geographic location is delisted.

Figure 17B:
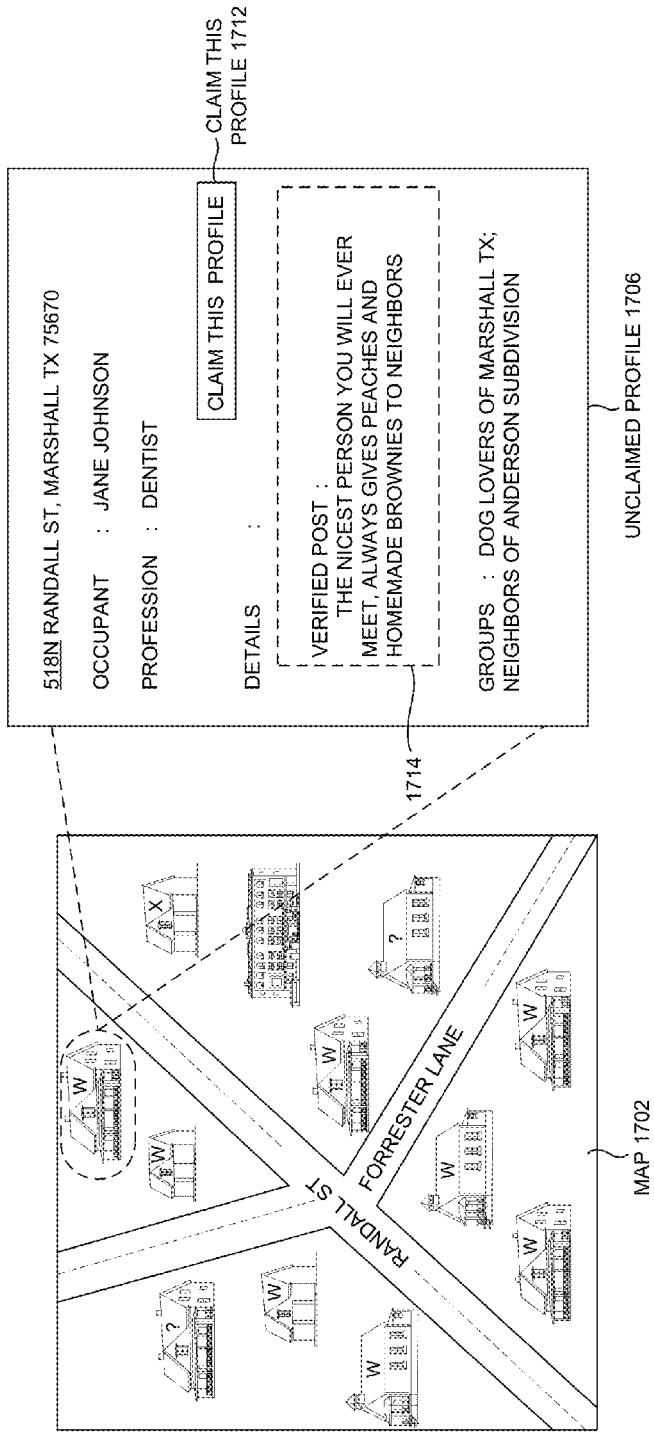
FIG. 17B is a user interface view of mapping of the unclaimed profile, according to one embodiment.

FIG. 17B is a user interface view of mapping of the unclaimed profile 1706, according to one embodiment. In the example embodiment illustrated in FIG. 17B, the map 1702 may indicate the geographic locations in the global neighborhood environment 2300 (e.g., the geospatially constrained social network 142 of FIG. 1) and/or may also indicate the geographic location of the unclaimed profile 1706. The unclaimed profile 1706 may display the information associated with the registered user of the global neighborhood environment 2300 (e.g., the geospatially constrained social network 142 of FIG. 1). The link claim this profile 1712 may enable the registered user to claim the unclaimed profile 1706 and/or may also allow the verified registered user (e.g., the verified registered user 1810 of FIG. 18A-B) to edit any information in the unclaimed profiles 1706. The block 1714 may display the information posted by any of the verified registered users (e.g., the verified registered user 1810 of FIG. 18A-B, the verified registered user 1810 of FIG. 21) of the global neighborhood environment 2300 (e.g., the geospatially constrained social network 142 of FIG. 1).

For example, a particular unclaimed profile (e.g., the particular unclaimed profile may be associated with a neighboring property to the specific property in the neighborhood) of the unclaimed profiles (e.g., the unclaimed profile 1802 of FIG. 18A, the unclaimed profile 2204 of FIG. 22) may be converted to another user profile (e.g., the user profile may be tied to a specific property in a neighborhood) when a different registered user (e.g., the user of FIG. 1) claims a particular geographic location to the specific geographic location associated with the particular unclaimed profile.

In addition, a certain unclaimed profile of the unclaimed profiles may be de-listed when a private registered user claims a certain geographic location (e.g., the geographical location 1704 of FIG. 17A) adjacent to the specific geographic location and/or the particular geographic location. Also, the certain unclaimed profile in the map 1702 may be masked when the certain unclaimed profile is de-listed through the request of the private registered user.

Furthermore, a tag data (e.g., the tags 1710 of FIG. 17A) associated with the specific geographic location, the particular geographic location, and the de-listed geographic location may be processed. A frequent one of the tag data may be displayed when the specific geographic location and/or the particular geographic location are made active, but not when a geographic location is de-listed.

Moreover, the verified registered user (e.g., the verified registered user 1810 of FIG. 18A-B, the verified registered user 1810 of FIG. 21) may be permitted to edit any information in the unclaimed profiles 1706 including the particular unclaimed profile 1706 and/or the certain unclaimed profile until the certain unclaimed profile may be claimed by the different registered user and/or the private registered user. In addition, a claimant of any unclaimed profile 1706 may be enabled to control what information is displayed on their user profile. Also, the claimant may be allowed to segregate certain information on their user profile 1700 such that only other registered users directly connected to the claimant are able to view data on their user profile 1700.

Figure 18A:
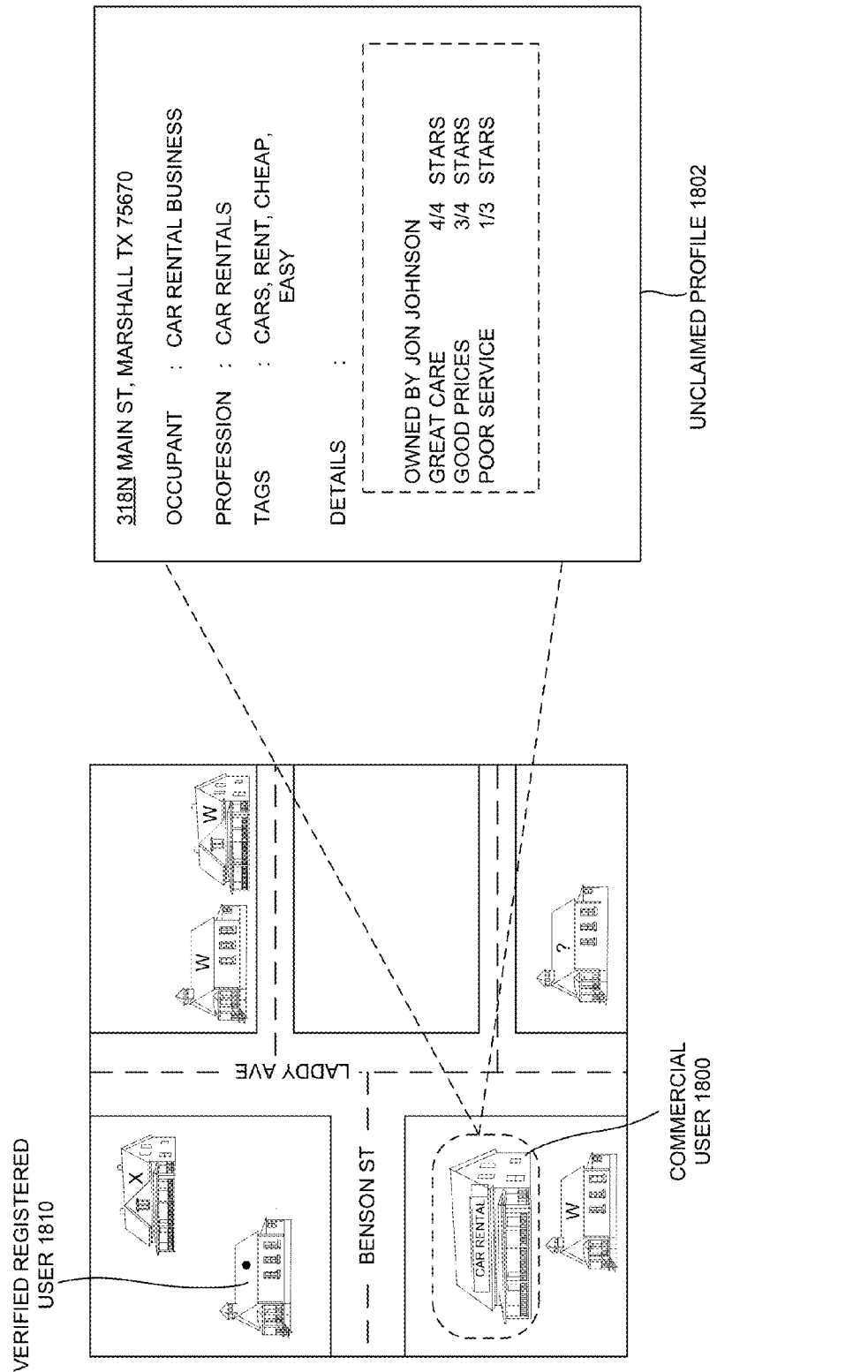
FIG. 18A is a user interface view of mapping of the unclaimed profile of the commercial user, according to one embodiment.

FIG. 18A is a user interface view of mapping of an unclaimed profile 1802 of the commercial user 1800, according to one embodiment. In the example embodiment illustrated in FIG. 18A, the commercial user 1800 may be associated with the customizable business profile 1804 located in the commercial geographical location. The unclaimed profile 1802 may contain the information associated with the commercial user 1800. The unclaimed profile 1802 may contain the information such as address, name, profession, tag, details (e.g., ratings), and educational qualification etc. of the commercial user 1800. The verified registered user 1810 may be user associated with the global neighborhood environment 2300 (e.g., the geospatially constrained social network 142 of FIG. 1) and may communicate a message to the neighborhood commercial user 1800. For example, a payment of the commercial user 1800 and the verified registered user 1810 may be processed.

Figure 18B:
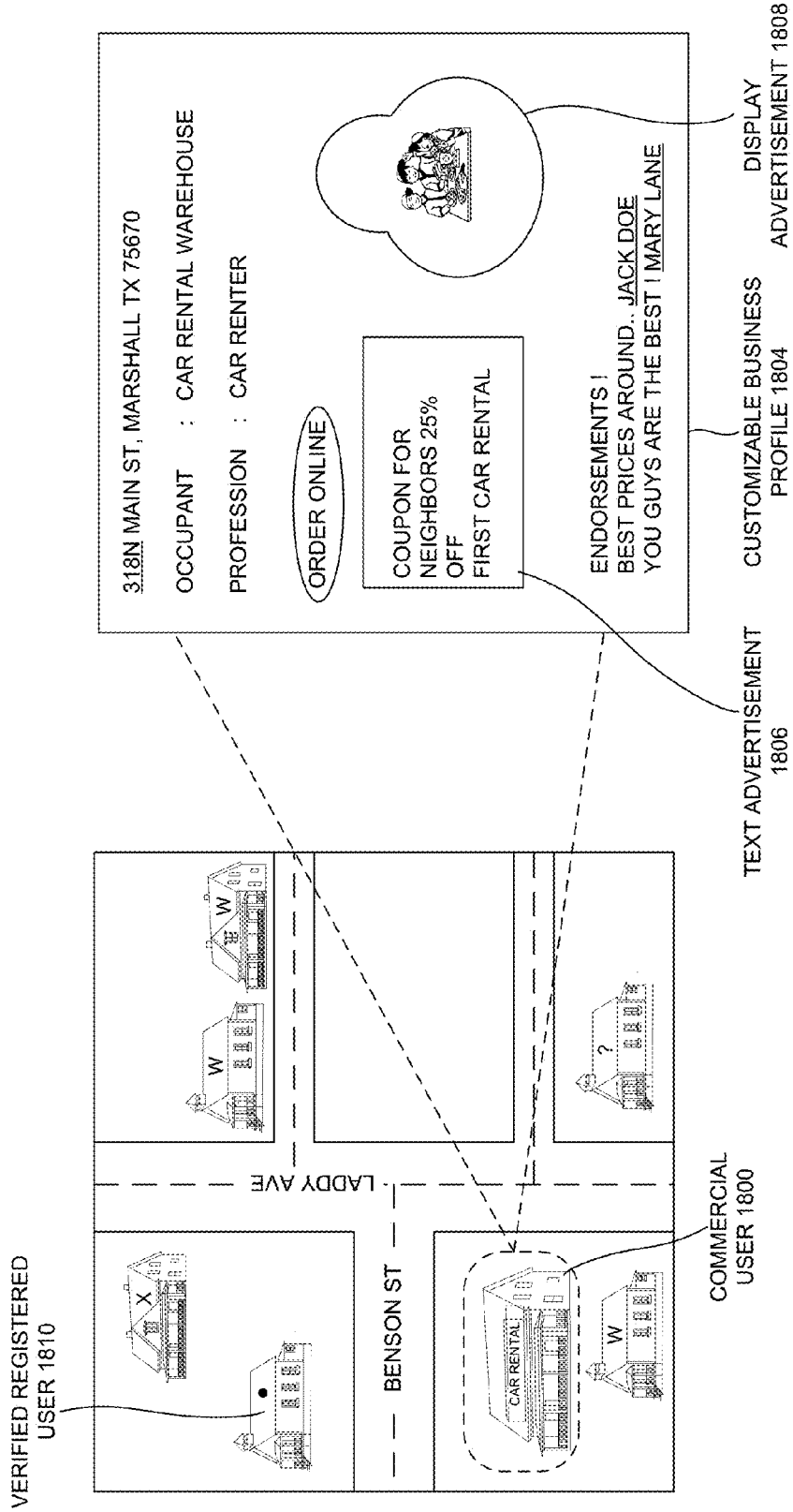
FIG. 18B is a user interface view of mapping of customizable business profile of the commercial user, according to one embodiment.

FIG. 18B is a user interface view of mapping of customizable business profile 1804 of the commercial user 1800, according to one embodiment. In the example embodiment illustrated in FIG. 18B, the commercial user 1800 may be associated with the customizable business profile 1804. The customizable business profile 1804 may be profile of any business firm (e.g., car rental establishment, restaurant, hotels, supermarket, etc.) that may contain information such as address, occupant name, profession of the customizable business. The customizable business profile 1804 may also enable the verified registered user 1810 to place online order for the products and/or services.

For example, the commercial user 1800 may be permitted to purchase a customizable business profile 1804 associated with a commercial geographic location. Also, the verified registered user 1810 may be enabled to communicate a message to the global neighborhood environment 2300 (e.g., the geospatially constrained social network 142 of FIG. 1) based on a selectable distance range away from the specific geographic location. In addition, a payment of the commercial user 1800 and/or the verified registered user 1810 may be processed.

A text advertisement 1806 may display the information associated with the offers and/or events of the customizable business. The display advertisement 1808 may display ads of the products of the customizable business that may be displayed to urge the verified registered user 1810 to buy the products of the customizable business. The verified registered user 1810 may be user associated with the global neighborhood environment 2300 (e.g., the geospatially constrained social network 142 of FIG. 1) that may communicate a message to the commercial user 1800 and/or may be interested in buying the products of the customizable business.

Figure 19:
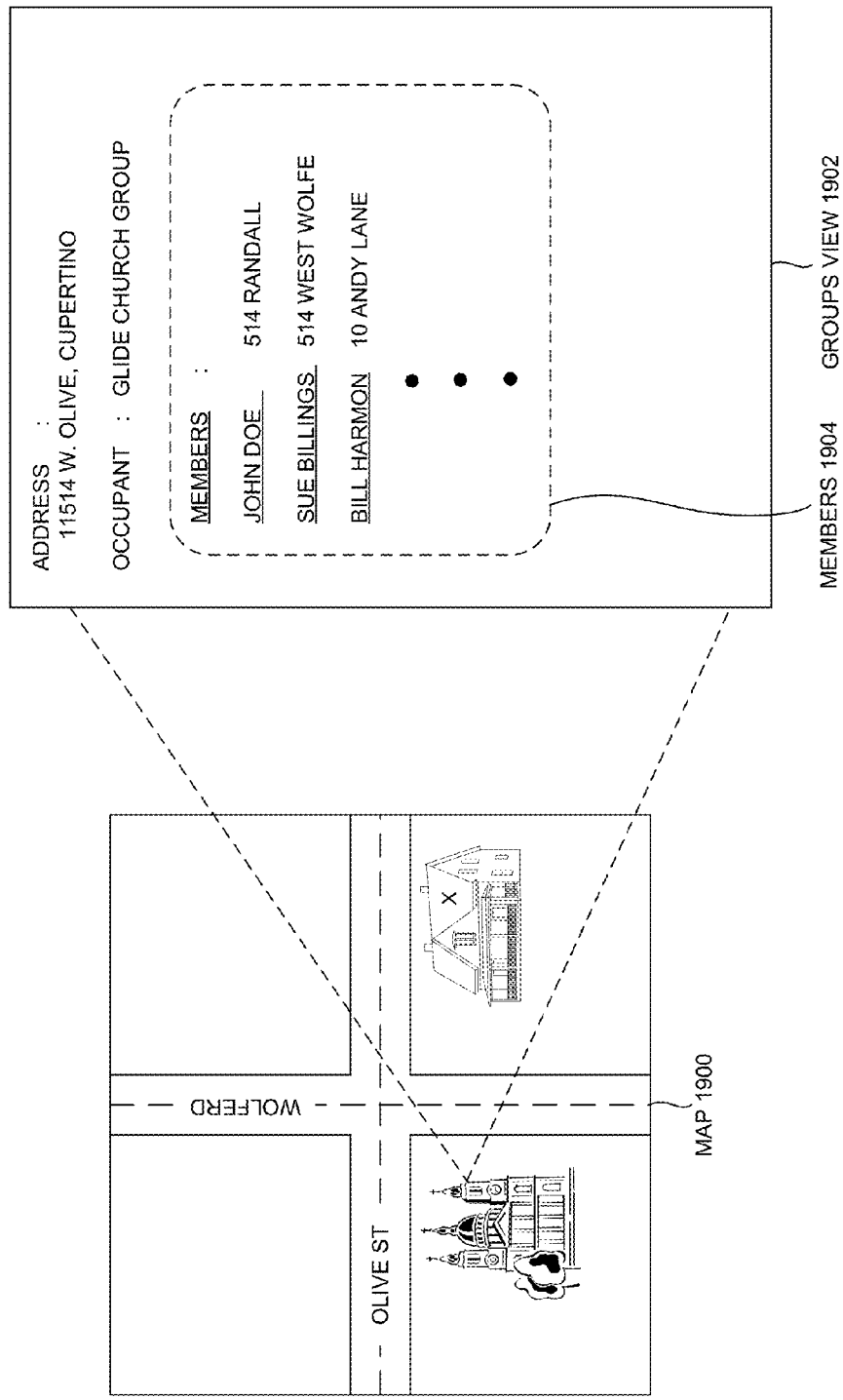
FIG. 19 is a user interface view of a group view associated with particular geographical location, according to one embodiment.

FIG. 19 is a user interface view of a groups view 1902 associated with particular geographical location, according to one embodiment. Particularly FIG. 19 illustrates, a map 1900, a groups view 1902, according to one embodiment. In the example embodiment illustrated in FIG. 19, the map view 1900 may display map view of the geographical location of the specific group of the global neighborhood environment 2300 (e.g., the geospatially constrained social network 142 of FIG. 1). The groups view 1902 may contain the information (e.g., address, occupant, etc.) associated with the particular group of the specific geographical location (e.g., the geographical location displayed in the map 1900) of the global neighborhood environment 2300 (e.g., the geospatially constrained social network 142 of FIG. 1). The members 1904 may contain the information about the members associated with the group (e.g., the group associated with geographical location displayed in the map) of the global neighborhood environment 2300 (e.g., the geospatially constrained social network 142 of FIG. 1).

Figure 20:
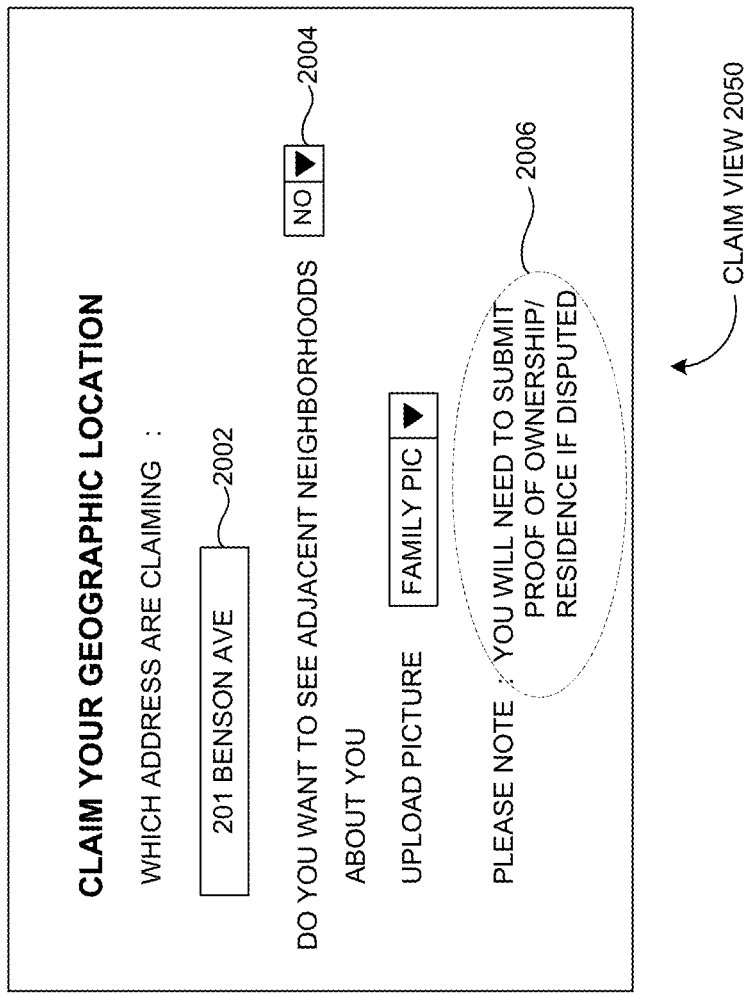
FIG. 20 is a user interface view of claim view, according to one embodiment.

FIG. 20 is a user interface view of claim view 2050, according to one embodiment. The claim view 2050 may enable the user to claim the geographical location of the registered user. Also, the claim view 2050 may facilitate the user of the global neighborhood environment 2300 (e.g., the geospatially constrained social network 142 of FIG. 1) to claim the geographical location of property under dispute.

In the example embodiment illustrated in FIG. 20, the operation 2002 may allow the registered user of the global neighborhood environment 2300 (e.g., the geospatially constrained social network 142 of FIG. 1) to claim the address of the geographic location claimed by the registered user. The operation 2004 illustrated in example embodiment of FIG. 20, may enable the user to access adjacent neighborhoods. The operation 2006 may offer information associated with the document to be submitted by the registered users of the global neighborhood environment 2300 (e.g., the geospatially constrained social network 142 of FIG. 1) to claim the geographical location.

Figure 21:
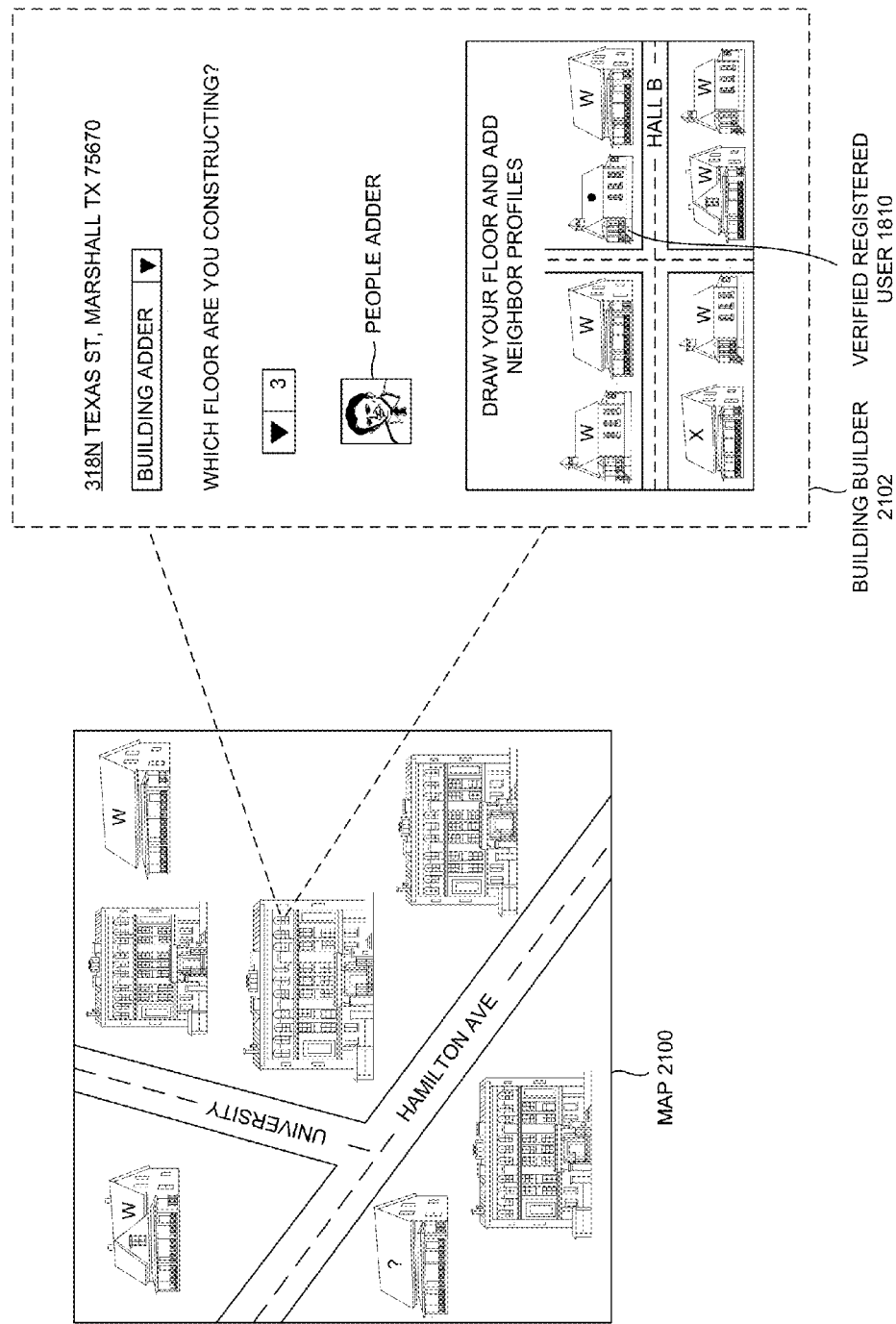
FIG. 21 is a user interface view of a building builder, according to one embodiment.

FIG. 21 is a user interface view of a building builder 2102, according to one embodiment. Particularly the FIG. 21 illustrates, a map 2100, a building builder 2102, according to one embodiment. The map 2100 may display the geographical location in which the verified registered user (e.g., the verified registered user 1810 of FIG. 18A-B) may create and/or modify empty unclaimed profiles (e.g., the unclaimed profile 1706 of FIG. 17A-17B, the unclaimed profile 1802 of FIG. 18A, the unclaimed profile 2204 of FIG. 22), building layouts, social network pages, and floor levels structures housing residents and businesses in the neighborhood (e.g., the claimed neighborhood 300 of FIG. 4, the unclaimed neighborhood 404 of FIG. 4). The building builder 2102 may enable the verified registered users (e.g., the verified registered user 1810 of FIG. 18A-B) of the global neighborhood environment 2300 (e.g., the geospatially constrained social network 142 of FIG. 1) to draw floor level structures, add neighbor's profiles and/or may also enable to select the floor number, type, etc. as illustrated in example embodiment of FIG. 21.

The verified registered user 1810 may be verified registered user of the global neighborhood environment 2300 (e.g., the geospatially constrained social network 142 of FIG. 1) interested in creating and/or modifying unclaimed profiles (e.g., the unclaimed profile 1706 of FIG. 17A-17B, the unclaimed profile 1802 of FIG. 18A, the unclaimed profile 2204 of FIG. 22), building layouts, social network pages, and floor level structure housing residents and businesses in the neighborhood (e.g., the claimed neighborhood 300 of FIG. 4, the unclaimed neighborhood 404 of FIG. 4) in the building builder 2102.

For example, a social community module 220 (e.g., a social community module 220 of FIG. 2) of the global neighborhood environment 2300 (e.g., the geospatially constrained social network 142 of FIG. 1) may generate a building creator (e.g., the building builder 2102 of FIG. 21) in which the registered users may create and/or modify empty unclaimed profiles (e.g., the unclaimed profile 1706 of FIG. 17A-17B, the unclaimed profile 1802 of FIG. 18A, the unclaimed profile 2204 of FIG. 22), building layouts, social network pages, and floor levels structures housing residents and/or businesses in the neighborhood (e.g., the claimed neighborhood 300 of FIG. 4, the unclaimed neighborhood 404 of FIG. 4).

Figure 22:
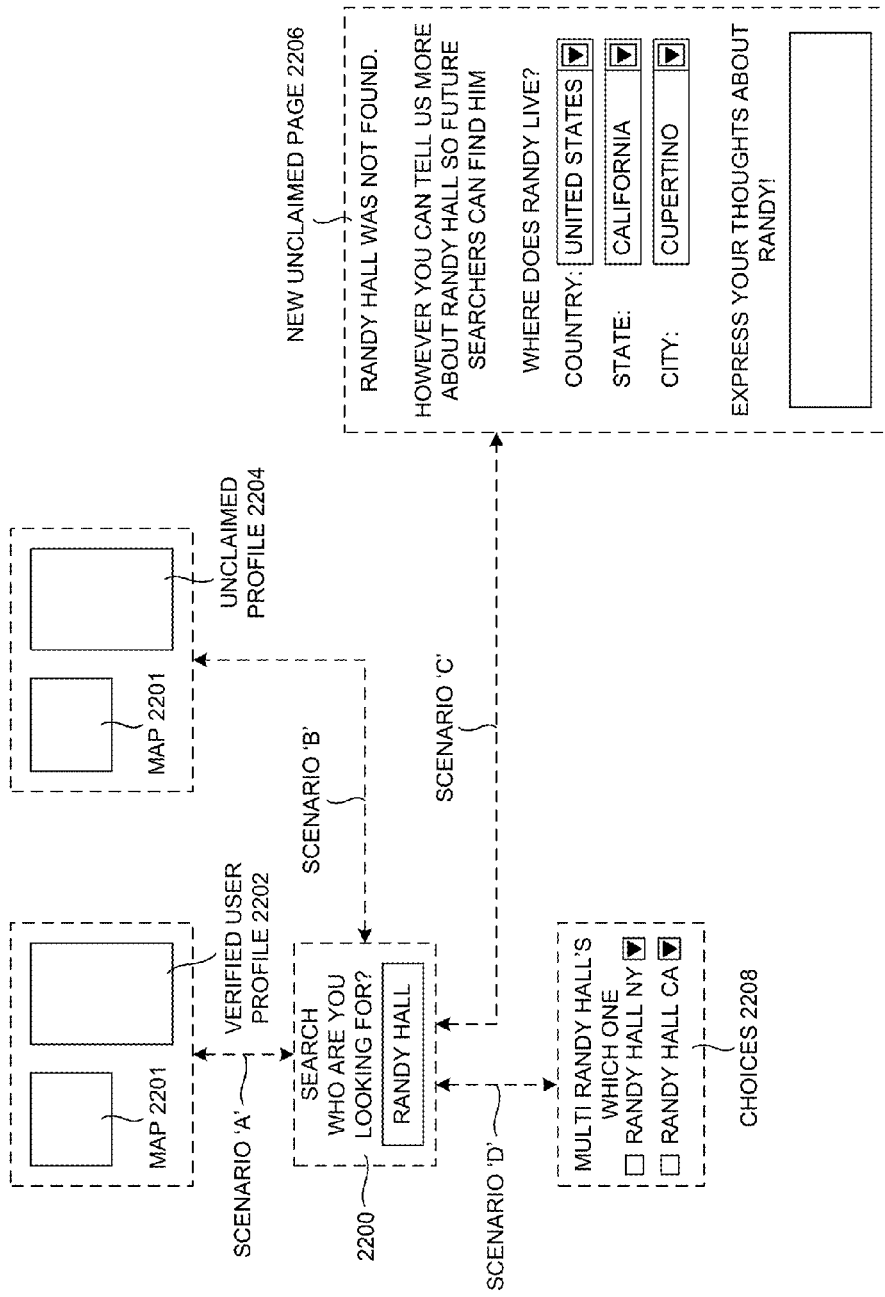
FIG. 22 is a systematic view of communication of wiki data, according to one embodiment.

FIG. 22 is a systematic view of communication of data, according to one embodiment. Particularly FIG. 22 illustrates a map 2201, verified user profile 2202, choices 2208 and a new unclaimed page 2206, according to one embodiment. The map 2201 may locate the details of the address of the registered user of the global neighborhood environment 2300 (e.g., the geospatially constrained social network 142 of FIG. 1). The verified user profile 2202 may store the profiles of the verified user of the global neighborhood environment 2300 (e.g., the geospatially constrained social network 142 of FIG. 1. The unclaimed profile 2204 may be the profiles of the registered user who may claim them in the global neighborhood environment 2300 (e.g., the geospatially constrained social network 142 of FIG. 1).

In operation 2200 the search for the user profile (e.g., the user profile 1700 of FIG. 17A) may be carried out by the registered user. The new unclaimed page 2206 (i.e., a new wiki page) may solicit for the details of a user whom the registered user is searching for in the global neighborhood environment 2300 (e.g., the geospatially constrained social network 142 of FIG. 1). The choices 2208 may ask whether the requested search is any among the displayed names. The new unclaimed page 2206 may request for the details of location such as country, state and/or city. The operation 2200 may communicate with the choices 2208, and the new unclaimed page 2206.

For example, a no-match module (e.g., a no-match module) of the search module (e.g., the search module) to request additional information from the verified registered user about a person, place, and business having no listing in the global neighborhood environment 2300 (e.g., the geospatially constrained social network 142 of FIG. 1) when no matches are found in a search query of the verified registered user (e.g., the verified registered user 1810 of FIG. 18A-B), and to create a new unclaimed page 2206 based on a response of the verified registered user 2202 about the at least one person, place, and business not previously indexed in the global neighborhood environment 2300 (e.g., the geospatially constrained social network 142 of FIG. 1).

Figure 23:
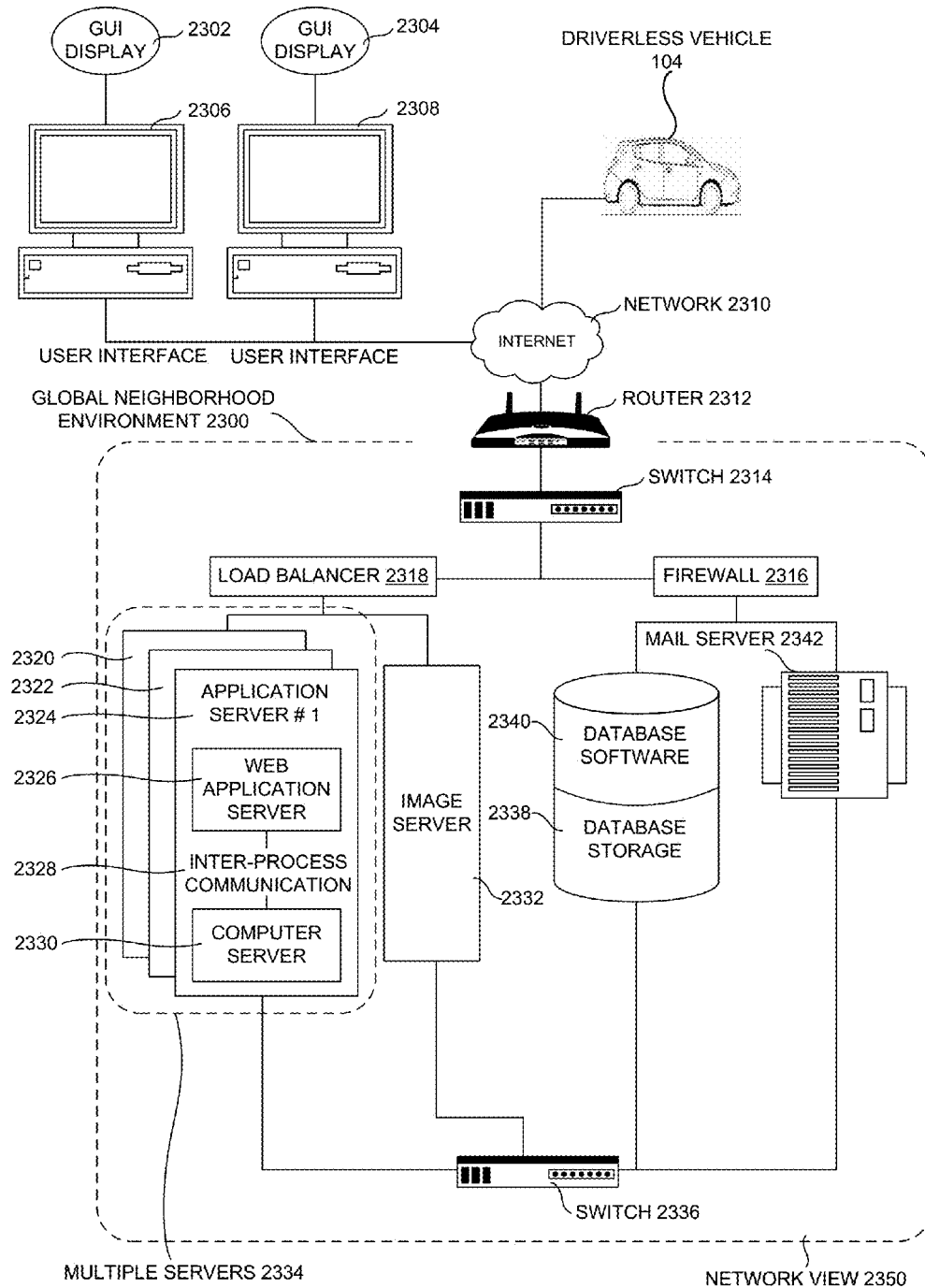
FIG. 23 is a systematic view of a network view, according to one embodiment.

FIG. 23 is a systematic view of a network view 2350, according to one embodiment. Particularly it may include a GUI display 2302, a GUI display 2304, user interface 2306, a user interface 2308, a network 2310, a router 2312, a switch 2314, a firewall 2316, a load balancer 2318, a global neighborhood environment 2300, an application server#1 2324, a web application server 2326, an inter-process communication 2328, a computer server 2330, an image server 2332, a multiple servers 2334, a switch 2336, a database storage 2338, database software 2340 and a mail server 2342, according to one embodiment.

The GUI display 2302 and GUI display 2304 may display particular case of user interface for interacting with a device capable of representing data (e.g., computer, cellular telephones, television sets etc.) which employs graphical images and widgets in addition to text to represent the information and actions available to the user (e.g., the user of FIG. 1). The user interface 2306 and user interface 2308 may be any device capable of presenting data (e.g., computer, cellular telephones, television sets etc.). The network 2310 may be any collection of networks (e.g., internet, private networks, university social system, private network of a company etc.) that may transfer any data to the user (e.g., the user of FIG. 1) and the global neighborhood environment 2300 (e.g., the geospatially constrained social network 142 of FIG. 1).

The router 2312 may forward packets between networks and/or information packets between the global neighborhood environment 2300 (e.g., the geospatially constrained social network 142 of FIG. 1) and registered user over the network (e.g., internet). The switch 2314 may act as a gatekeeper to and from the network (e.g., internet) and the device. The firewall 2316 may provide protection (e.g., permit, deny or proxy data connections) from unauthorized access to the global neighborhood environment 2300 (e.g., the geospatially constrained social network 142 of FIG. 1. The load balancer 2318 may balance the traffic load across multiple mirrored servers in the global neighborhood environment 2300 (e.g., the geospatially constrained social network 142 of FIG. 1) and may be used to increase the capacity of a server farm beyond that of a single server and/or may allow the service to continue even in the face of server down time due to server failure and/or server maintenance.

The application server 2322 may be server computer on a computer network dedicated to running certain software applications of the global neighborhood environment 2300 (e.g., the geospatially constrained social network 142 of FIG. 1). The web application server 2326 may be server holding all the web pages associated with the global neighborhood environment 2300 (e.g., the geospatially constrained social network 142 of FIG. 1). The inter-process communication 2328 may be set of rules for organizing and un-organizing factors and results regarding the global neighborhood environment 2300 (e.g., the geospatially constrained social network 142 of FIG. 1). The computer server 2330 may serve as the application layer in the multiple servers of the global neighborhood environment 2300 (e.g., the geospatially constrained social network 142 of FIG. 1) and/or may include a central processing unit (CPU), a random access memory (RAM) temporary storage of information, and/or a read only memory (ROM) for permanent storage of information regarding the global neighborhood environment 2300 (e.g., the geospatially constrained social network 142 of FIG. 1).

The image server 2332 may store and provide digital images of the registered user of the global neighborhood environment 2300 (e.g., the geo spatially constrained social network 142 of FIG. 1). The multiple servers 2334 may be multiple computers or devices on a network that may manage network resources connecting the registered user and the global neighborhood environment 2300 (e.g., the geospatially constrained social network 142 of FIG. 1). The database storage 2338 may store software, descriptive data, digital images, system data and any other data item that may be related to the user (e.g., the user of FIG. 1) of the global neighborhood environment 2300 (e.g., the geospatially constrained social network 142 of FIG. 1). The database software 2340 may be provided a database management system that may support the global neighborhood environment 2300 (e.g., the geospatially constrained social network 142 of FIG. 1). The mail server 2342 may be provided for sending, receiving and storing mails. The user interface 2306 and 2308 may communicate with the GUI display(s) 2302 and 2304, the router 2312 through the network 2310 and the global neighborhood environment 2300 (e.g., the geospatially constrained social network 142 of FIG. 1). The driverless vehicle 104 may be communicatively coupled with the network 2310.

Figure 24:
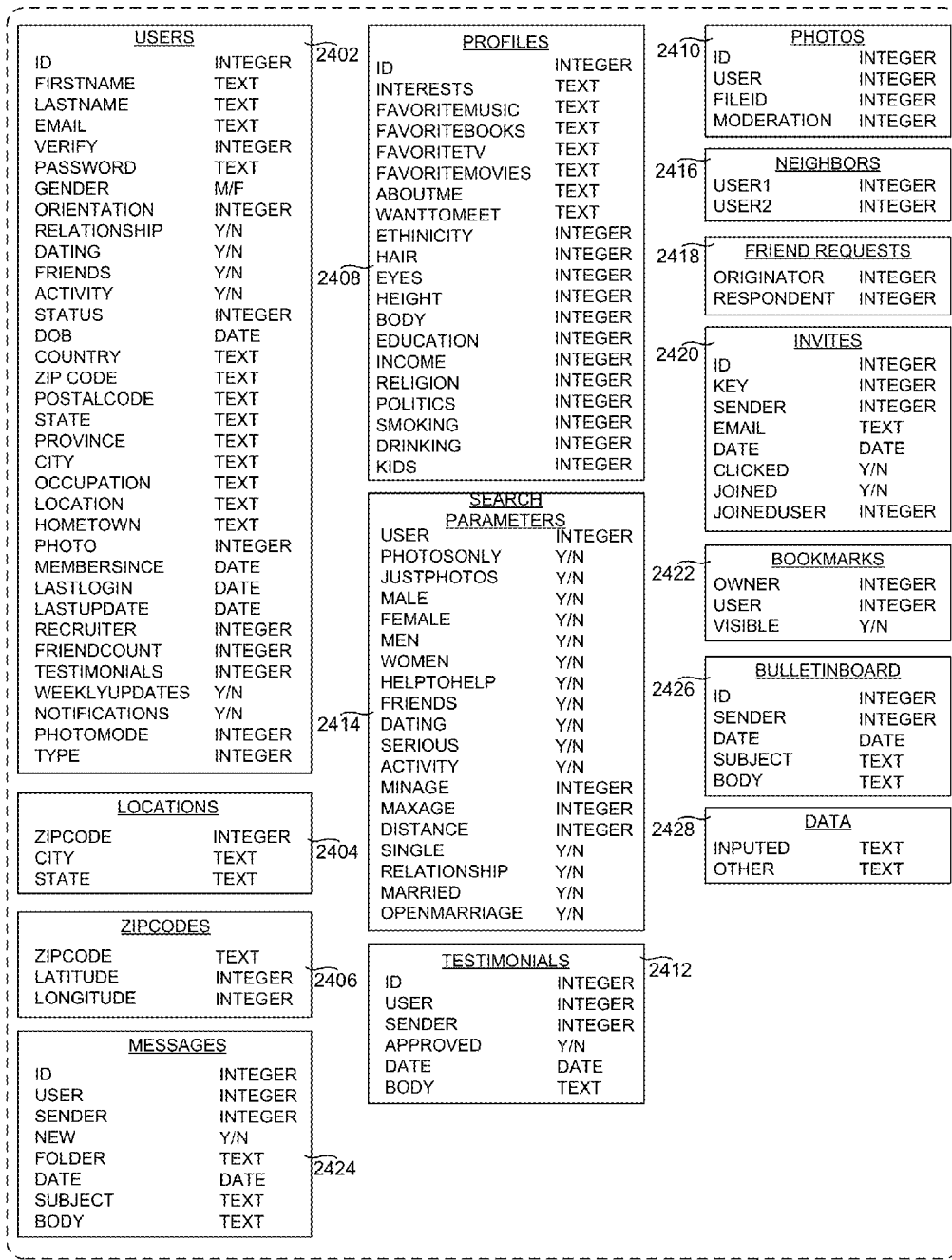
FIG. 24 is a block diagram of a database, according to one embodiment.

FIG. 24 is a block diagram of a database, according to one embodiment. Particularly the block diagram of the database 2400 of FIG. 24 illustrates a user data 2402, a location data, a zip codes data 2406, a profiles data 2408, a photos data 2410, a testimonials data 2412, a search parameters data 2414, a neighbor's data 2416, a friends requests data 2418, a invites data 2420, a bookmarks data 2422, a message data 2424 and a bulletin board data 2426, and a data 2428, according to one embodiment.

The database 2400 be may include descriptive data, preference data, relationship data, and/or other data items regarding the registered user of the global neighborhood environment 2300 (e.g., the geospatially constrained social network 142 of FIG. 1.

The user data 2402 may be a descriptive data referring to information that may describe a user (e.g., the user of FIG. 1). It may include elements in a certain format for example Id may be formatted as integer, Firstname may be in text, Lastname may be in text, Email may be in text, Verify may be in integer, Password may be in text, Gender may be in m/f, Orientation may be in integer, Relationship may be in y/n, Dating may be in y/n, Friends may be in y/n, Activity may be in y/n, Status may be in integer, Dob may be in date, Country may be in text, Zipcode may be in text, Postalcode may be in text, State may be in text, Province may be in text, City may be in text, Occupation may be in text, Location may be in text, Hometown may be in text, Photo may be in integer, Membersince may be in date, Lastlogin may be in date, Lastupdate may be in date, Recruiter may be in integer, Friendcount may be in integer, Testimonials may be in integer, Weeklypdates may be in y/n, Notifications may be in y/n, Photomode may be in integer and/or Type may be in integer.

The locations data 2404 may clarify the location details in formatted approach. For example Zip code may be formatted as integer, City may be in text and/or State may be in text. The zip codes data 2406 may provide information of a user location in formatted manner. For example Zip code may be formatted as text, Latitude may be in integer and/or Longitude may be in integer. The profile data 2408 may clutch personnel descriptive data that may be formatted.

For examples ID may be formatted as integer, Interests may be in text, Favoritemusic may be in text, Favaoritebooks may be in text, Favoritetv may be in text, Favoritemovies may be in text, Aboutme may be in text, Wanttomeet may be in text, Ethnicity may be in integer, Hair may be in integer, Eyes may be in integer, Height may be in integer, Body may be in integer, Education may be in integer, Income may be in integer, Religion may be in integer, Politics may be in integer Smoking may be in integer, Drinking may be in integer and/or Kids may be in integer.

The photos data 2410 may represent a digital image and/or a photograph of the user formatted in certain approach. For example Id may be formatted as integer, User may be in integer, Fileid may be in integer and/or Moderation may be in integer. The testimonials data 2412 may allow users to write "testimonials" 2412, or comments, about each other and in these testimonials, users may describe their relationship to an individual and their comments about that individual. For example the user might write a testimonial that states "Rohan has been a friend of mine since graduation days. He is smart, intelligent, and a talented person." The elements of testimonials data 2412 may be formatted as Id may be in integer, User may be in integer, Sender may be integer, Approved may be in y/n, Date may be in date and/or Body may be formatted in text.

The search parameters data 2414 may be preference data referring to the data that may describe preferences one user has with respect to another (For example, the user may indicate that he is looking for a female who is seeking a male for a serious relationship). The elements of the search parameters data 2414 may be formatted as User 2402 may be in integer, Photosonly may be in y/n, Justphotos may be in y/n, Male may be in y/n, Female may be in y/n, Men may be in y/n, Women may be in y/n, Helptohelp may be in y/n, Friends may be in y/n, Dating may be in y/n, Serious may be in y/n, Activity may be in y/n, Minage may be in integer, Maxage may be in integer, Distance may be in integer, Single may be in y/n, Relationship may be in y/n, Married may be in y/n and/or Openmarriage may be in y/n.

The neighbor's data 2416 may generally refer to relationships among registered users of the global neighborhood environment 2300 (e.g., the geospatially constrained social network 142 of FIG. 1) that have been verified and the user has requested another individual to join the system as neighbor's data 2416, and the request may be accepted. The elements of the neighbors data 2416 may be formatted as user1 may be in integer and/or user2 may be in integer. The friend requests data 2418 may tracks requests by users within the neighborhood (e.g., the claimed neighborhood 300 of FIG. 4, the unclaimed neighborhood 404 of FIG. 4) to other individuals, which requests have not yet been accepted and may contain elements originator and/or respondent formatted in integer. The invites data 2420 may describe the status of a request by the user to invite an individual outside the neighborhood (e.g., the claimed neighborhood 300 of FIG. 4, the unclaimed neighborhood 404 of FIG. 4) to join the neighborhood (e.g., the claimed neighborhood 300 of FIG. 4, the unclaimed neighborhood 404 of FIG. 4) and clarify either the request has been accepted, ignored and/or pending.

The elements of the invites data 2420 may be formatted as Id may be in integer, Key may be in integer, Sender may be in integer, Email may be in text, Date may be in date format, Clicked may be in y/n, Joined may be in y/n and/or Joineduser may be in integer. The bookmarks data 2422 may provide the data for a process allowed wherein a registered user of the global neighborhood environment 2300 (e.g., the geospatially constrained social network 142 of FIG. 1) may indicate an interest in the profile of another registered user. The bookmark data 2422 elements may be formatted as Owner may be in integer, User may be in integer and/or Visible may be in y/n. The message data 2424 may allow the users to send one another private messages.

The message data 2424 may be formatted as Id may be in integer, (e.g., User may be in integer, Sender may be in integer, New may be in y/n, Folder may be in text, Date may be in date format, Subject may be in text and/or Body may be in text format) The bulletin board data 2426 may support the function of a bulletin board that users may use to conduct online discussions, conversation and/or debate. The data 2428 may share the user profiles (e.g., the user profile 1700 of FIG. 17A) in the neighborhood (e.g., the claimed neighborhood 300 of FIG. 4, the unclaimed neighborhood 404 of FIG. 4) and its elements may be formatted as wikis inputted and/or others may be in text format.

FIG. 25 is an exemplary graphical user interface view for data collection, according to one embodiment. Particularly FIG. 25 illustrates exemplary screens 2502, 2504 that may be provided to the user (e.g., the user of FIG. 1) through an interface may be through the network (e.g., Internet), to obtain user descriptive data. The screen 2502 may collect data allowing the user (e.g., the user of FIG. 1) to login securely and be identified by the neighborhood (e.g., the neighborhood 602A-N of FIG. 1). This screen 2502 may allow the user to identify the reason he/she is joining the neighborhood. For example, a user may be joining the neighborhood for "neighborhood watch". The screen 2504 may show example of how further groups may be joined. For example, the user (e.g., the user of FIG. 1) may be willing to join a group "Raj for city council". It may also enclose the data concerning Dob, country, zip/postal code, hometown, occupation and/or interest. The user may be able to enter their vehicle in screens 2502 and/or 2504 and/or may be able to register their vehicle (e.g., the driverless vehicle 104) and/or list it as available for rent, according to one embodiment.

Figure 26:
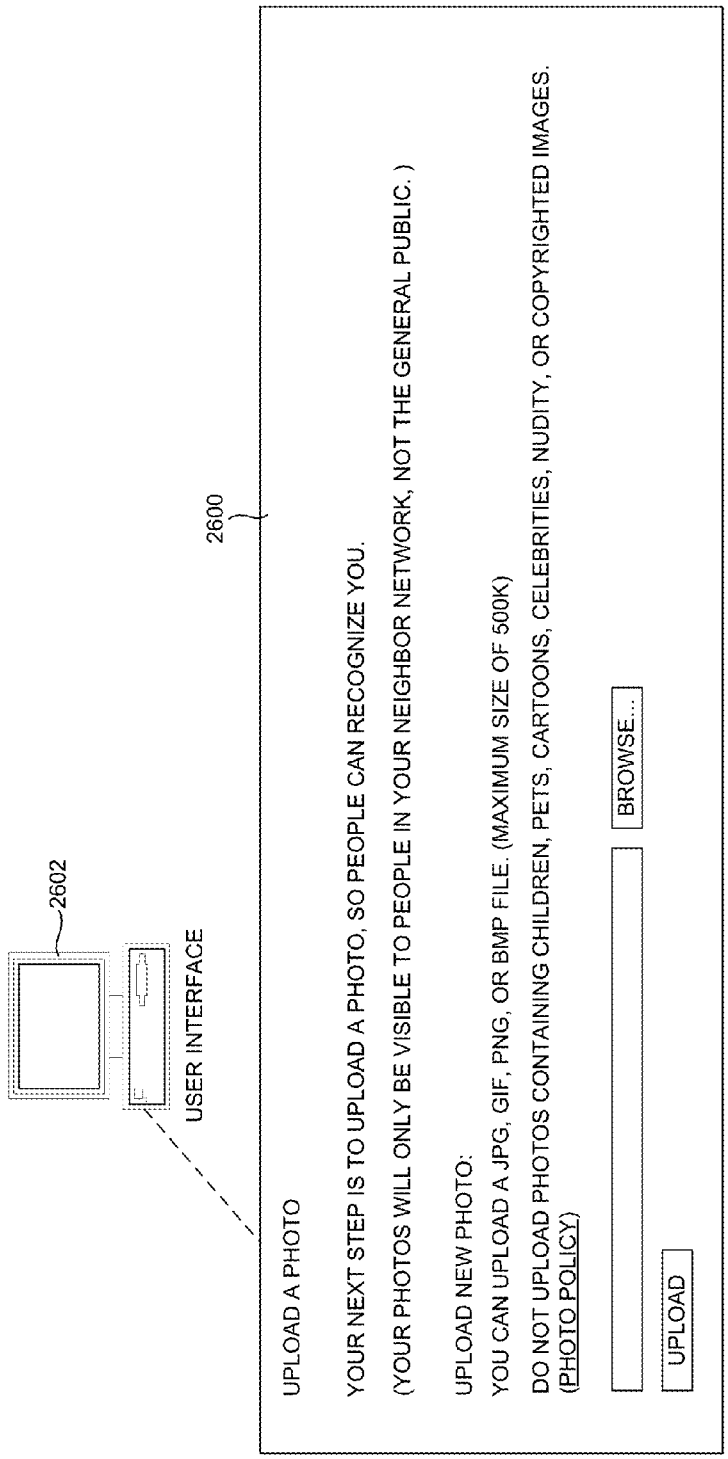
FIG. 26 is an exemplary graphical user interface view of image collection, according to one embodiment.

FIG. 26 is an exemplary graphical user interface view of image collection, according to one embodiment. A screen 2600 may be interface provided to the user (e.g., the user of FIG. 1) over the network (e.g., internet) may be to obtain digital images from system user. The user interface 2602 may allow the user (e.g., the user of FIG. 1) to browse files on his/her computer, select them, and then upload them to the neighborhood (e.g., the claimed neighborhood 300 of FIG. 4, the unclaimed neighborhood 404 of FIG. 4). The user (e.g., the user of FIG. 1) may upload the digital images and/or photo that may be visible to people in the neighbor (e.g., the other addresses associated with user profiles 402 of FIG. 4) network and not the general public. The user may be able to upload a JPG, GIF, PNG and/or BMP file in the screen 2600.

FIG. 27 is an exemplary graphical user interface view of an invitation, according to one embodiment. An exemplary screen 2700 may be provided to a user through a user interface 2702 may be over the network (e.g., internet) to allow users to invite neighbor or acquaintances to join the neighborhood (e.g., the claimed neighborhood 300 of FIG. 4, the unclaimed neighborhood 404 of FIG. 4). The user interface 2702 may allow the user (e.g., the user of FIG. 1) to enter one or a plurality of e-mail addresses for friends they may like to invite to the neighborhood (e.g., the claimed neighborhood 300 of FIG. 4, the unclaimed neighborhood 404 of FIG. 4). The exemplary screen 2700 may include the "subject", "From", "To", "Optional personnel message", and/or "Message body" sections. In the "Subject" section a standard language text may be included for joining the neighborhood (e.g., Invitation to join Fatdoor from John Doe, a neighborhood.).

The "From" section may include the senders email id (e.g., user@domain.com). The "To" section may be provided to add the email id of the person whom the sender may want to join the neighborhood (e.g., the claimed neighborhood 300 of FIG. 4, the unclaimed neighborhood 404 of FIG. 4). The message that may be sent to the friends and/or acquaintances may include standard language describing the present neighborhood, the benefits of joining and the steps required to join the neighborhood (e.g., the claimed neighborhood 300 of FIG. 4, the unclaimed neighborhood 404 of FIG. 4). The user (e.g., the user of FIG. 1) may choose to include a personal message, along with the standard invitation in the "Optional personal message" section.

In the "Message body" section the invited friend or acquaintance may initiate the process to join the system by clicking directly on an HTML link included in the e-mail message (e.g., http://www.fatdoor.com/join.jsp?Invite=140807). In one embodiment, the user (e.g., the user of FIG. 1) may import e-mail addresses from a standard computerized address book. The system may further notify the inviting user when her invitee accepts or declines the invitation to join the neighborhood (e.g., the claimed neighborhood 300 of FIG. 4, the unclaimed neighborhood 404 of FIG. 4).

Figure 28:
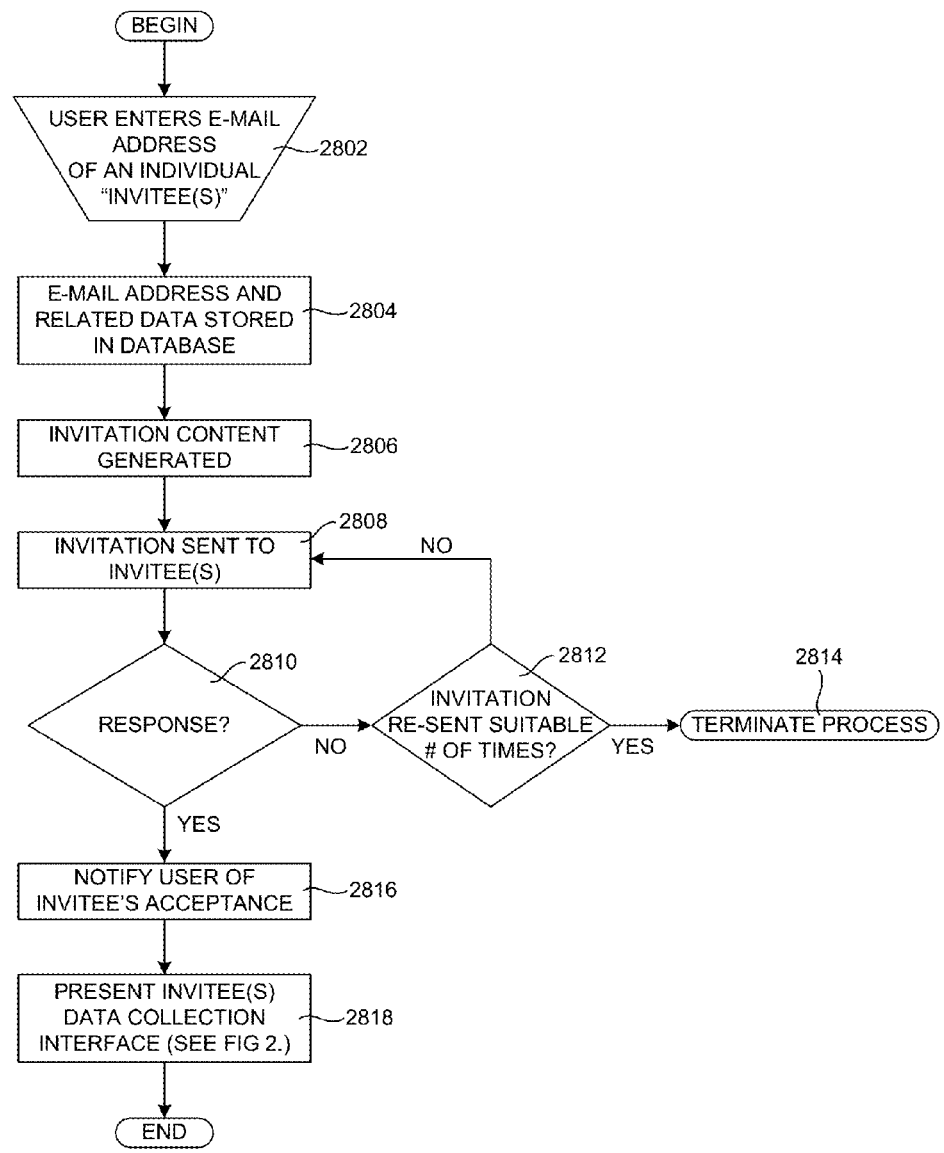
FIG. 28 is a flowchart of inviting the invitee(s) by the registered user, notifying the registered user upon the acceptance of the invitation by the invitee(s) and, processing and storing the input data associated with the user in the database, according to one embodiment.

FIG. 28 is a flowchart of inviting the invitee(s) by the registered user, notifying the registered user upon the acceptance of the invitation by the invitee(s) and, processing and storing the input data associated with the user (e.g., the user of FIG. 1) in the database, according to one embodiment. In operation 2802, the verified registered user (e.g., the verified registered user 1810 of FIG. 18A-B, the verified registered user 1810 of FIG. 21) willing to invite the individual enters the email addresses of an individual "invitee". In operation 2804, the email address and the related data of the invitee may be stored in the database. In operation 2806, the invitation content for inviting the invitee may be generated from the data stored in the database. In operation 2808, the registered user sends invitation to the invitee(s).

In operation 2810, response from the user (e.g., the user of FIG. 1) may be determined. In operation 2812, if the invitee doesn't respond to invitation sent by the registered user then registered user may resend the invitation for a predefined number of times. In operation 2814, if the registered user resends the invitation to the same invitee for predefined number of times and if the invitee still doesn't respond to the invitation the process may be terminated automatically.

In operation 2816, if the invitee accepts the invitation sent by the registered user then system may notify the registered user that the invitee has accepted the invitation. In operation 2818, the input from the present invitee(s) that may contain the descriptive data about the friend (e.g., registered user) may be processed and stored in the database.

For example, each registered user associated e-mail addresses of individuals who are not registered users may be stored and identified by each registered user as neighbors. An invitation to become a new user (e.g., the user of FIG. 1) may be communicated out to neighbor (e.g., other addresses associated with a verified user profile 402) of the particular user. An acceptance of the neighbor (e.g., the other addresses associated with user profiles 402 of FIG. 4) to whom the invitation was sent may be processed.

The neighbor (e.g., the other addresses associated with user profiles 402 of FIG. 4) may be added to a database and/or storing of the neighbor (e.g., the other addresses associated with user profiles 402 of FIG. 4), a user ID and a set of user IDs of registered users who are directly connected to the neighbor (e.g., the other addresses associated with user profiles 402 of FIG. 4), the set of user IDs stored of the neighbor (e.g., the other addresses associated with user profiles 402 of FIG. 4) including at least the user ID of the verified registered user (e.g., the verified registered user 1810 of FIG. 18A-B, the verified registered user 1810 of FIG. 21). Furthermore, the verified registered user may be notified that the invitation to the neighbor (e.g., the other addresses associated with user profiles 402 of FIG. 4) has been accepted when an acceptance is processed. Also, inputs from the neighbor (e.g., the other addresses associated with user profiles 402 of FIG. 4) having descriptive data about the friend may be processed and the inputs in the database may be stored.

Figure 29:
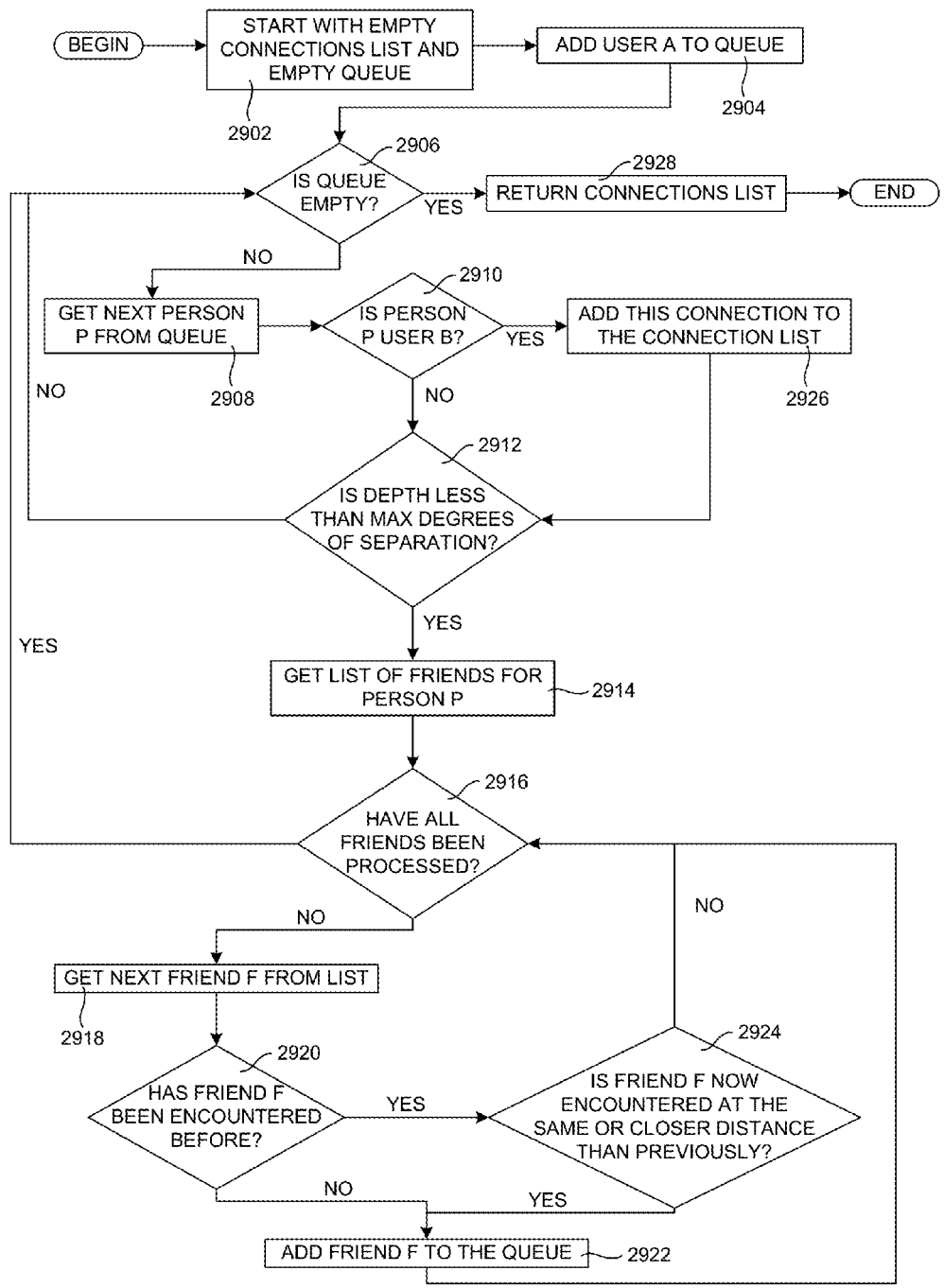
FIG. 29 is a flowchart of adding the neighbor to the queue, according to one embodiment.

FIG. 29 is a flowchart of adding the neighbor (e.g., the other addresses associated with user profiles 402 of FIG. 4) to the queue, according to one embodiment. In operation 2902, the system may start with the empty connection list and empty queue. In operation 2904, the user may be added to the queue. In operation 2906, it is determined whether the queue is empty. In operation 2908, if it is determined that the queue is not empty then the next person P may be taken from the queue. In operation 2910, it may be determined whether the person P from the queue is user B or not. In operation 2912, if the person P is not user B then it may be determined whether the depth of the geographical location is less than maximum degrees of separation.

If it is determined that depth is more than maximum allowable degrees of separation then it may repeat the operation 2908. In operation 2914, it may be determined that the depth of the geographical location (e.g., the geographical location 1704) is less than maximum degrees of separation then the neighbors (e.g., the other addresses associated with user profiles 402 of FIG. 4) list for person P may be processed. In operation 2916, it may be determined whether all the neighbors (e.g., the other addresses associated with user profiles 402 of FIG. 4) in the neighborhood (e.g., the claimed neighborhood 300 of FIG. 4, the unclaimed neighborhood 404 of FIG. 4) have been processed or not. If all the friends are processed it may be determined the queue is empty.

In operation 2918, if all the neighbors (e.g., the other addresses associated with user profiles 402 of FIG. 4) for person P are not processed then next neighbor N may be taken from the list. In operation 2920, it may be determined whether the neighbor (e.g., the other addresses associated with user profiles 402 of FIG. 4) N has encountered before or not. In operation 2922, if the neighbor (e.g., the other addresses associated with user profiles 402 of FIG. 4) has not been encountered before then the neighbor may be added to the queue. In operation 2924, if the neighbor N has been encountered before it may be further determined whether the geographical location (e.g., the geographical location 1704 of FIG. 17A) from where the neighbor (e.g., the other addresses associated with user profiles 402 of FIG. 4) has encountered previously is the same place or closer to that place.

If it is determined that the neighbor (e.g., the other addresses associated with user profiles 402 of FIG. 4) has encountered at the same or closer place then the friend may be added to the queue. If it may be determined that friend is not encountered at the same place or closer to that place then it may be again checked that all the friends have processed. In operation 2926, if it is determined that the person P is user B than the connection may be added to the connection list and after adding the connection to connection list it follows the operation 2912. In operation 2928, if it may be determined that queue is empty then the operation may return the connections list.

For example, a first user ID with the verified registered user (e.g., the verified registered user 1810 of FIG. 18A-B, the verified registered user 1810 of FIG. 21) and a second user ID may be applied to the different registered user. The verified registered user (e.g., the verified registered user 1810 of FIG. 18A-B, the verified registered user 1810 of FIG. 21) with the different registered user may be connected with each other through at least one of a geo-positioning data associated with the first user ID and the second user ID. In addition, a maximum degree of separation (Nmax) of at least two that is allowed for connecting any two registered users, (e.g., the two registered users who may be directly connected may be deemed to be separated by one degree of separation and two registered users who may be connected through no less than one other registered user may be deemed to be separated by two degrees of separation and two registered users who may be connected through not less than N other registered users may be deemed to be separated by N+1 degrees of separation).

Furthermore, the user ID of the different registered user may be searched (e.g., the method limits the searching of the different registered user in the sets of user IDs that may be stored as registered users who are less than Nmax degrees of separation away from the verified registered user (e.g., the verified registered user 1810 of FIG. 18A-B, the verified registered user 1810 of FIG. 21), such that the verified registered user (e.g., the verified registered user 1810 of FIG. 18A-B, the verified registered user 1810 of FIG. 21) and the different registered user who may be separated by more than Nmax degrees of separation are not found and connected) in a set of user IDs that may be stored of registered users who are less than Nmax degrees of separation away from the verified registered user (e.g., the verified registered user 1810 of FIG. 18A-B, the verified registered user 1810 of FIG. 21), and not in the sets of user IDs that may be stored for registered users who are greater than or equal to Nmax degrees of separation away from the verified registered user (e.g., the verified registered user 1810 of FIG. 18A-B, the verified registered user 1810 of FIG. 21), until the user ID of the different registered user may be found in one of the searched sets. Also, the verified registered user (e.g., the verified registered user 1810 of FIG. 18A-B, the verified registered user 1810 of FIG. 21) may be connected to the different registered user if the user ID of the different registered user may be found in one of the searched sets.

Moreover, the sets of user IDs that may be stored of registered users may be searched initially who are directly connected to the verified registered user (e.g., the verified registered user 1810 of FIG. 18A-B, the verified registered user 1810 of FIG. 21). A profile of the different registered user may be communicated to the verified registered user (e.g., the verified registered user 1810 of FIG. 18A-B, the verified registered user 1810 of FIG. 21) to display through a marker associating the verified registered user (e.g., the verified registered user 1810 of FIG. 18A-B, the verified registered user 1810 of FIG. 21) with the different registered user. A connection path between the verified registered user (e.g., the verified registered user 1810 of FIG. 18A-B, the verified registered user 1810 of FIG. 21) and the different registered user, the connection path indicating at least one other registered user may be stored through whom the connection path between the verified registered user (e.g., the verified registered user 1810 of FIG. 18A-B, the verified registered user 1810 of FIG. 21) and the different registered user is made.

In addition, the connection path between the verified registered user (e.g., the verified registered user 1810 of FIG. 18A-B, the verified registered user 1810 of FIG. 21) and the different registered user may be communicated to the verified registered user to display. A hyperlink in the connection path of each of the at least one registered users may be embedded through whom the connection path between the verified registered user (e.g., the verified registered user 1810 of FIG. 18A-B, the verified registered user 1810 of FIG. 21) and the different registered user is made.

Figure 30:
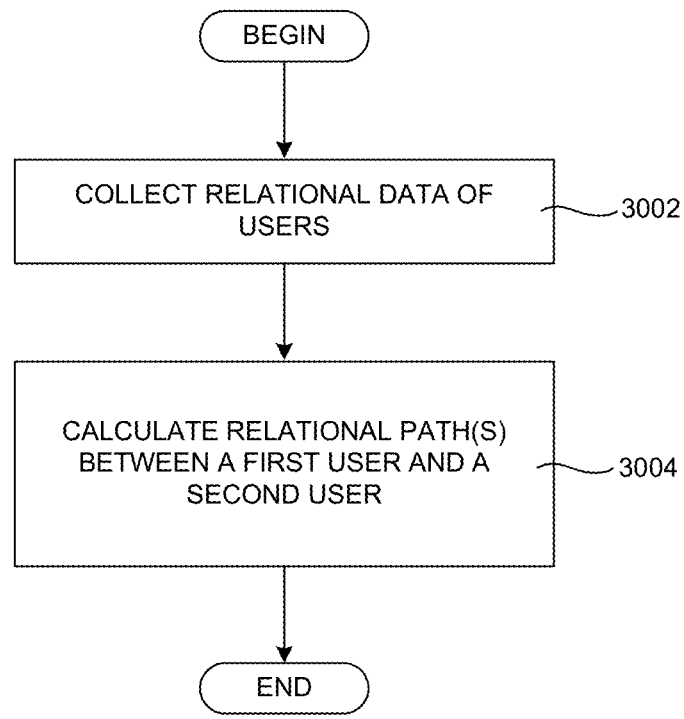
FIG. 30 is a flowchart of communicating brief profiles of the registered users, processing a hyperlink selection from the verified registered user and calculating and ensuring the Nmax degree of separation of the registered users away from verified registered users, according to one embodiment.

FIG. 30 is a flowchart of communicating brief profiles of the registered users, processing a hyperlink selection from the verified registered user (e.g., the verified registered user 1810 of FIG. 18A-B, the verified registered user 1810 of FIG. 21) and calculating and ensuring the Nmax degree of separation of the registered users away from verified registered users (e.g., the verified registered user 1810 of FIG. 18A-B, the verified registered user 1810 of FIG. 21), according to one embodiment. In operation 3002, the data of the registered users may be collected from the database. In operation 3004, the relational path between the first user and the second user may be calculated (e.g., the Nmax degree of separation between verified registered user (e.g., the verified registered user 1810 of FIG. 18A-B, the verified registered user 1810 of FIG. 21) and the registered user).

For example, the brief profiles of registered users, including a brief profile of the different registered user, to the verified registered user (e.g., the verified registered user 1810 of FIG. 18A-B, the verified registered user 1810 of FIG. 21) for display, each of the brief profiles including a hyperlink to a corresponding full profile may be communicated.

Furthermore, the hyperlink selection from the verified registered user (e.g., the verified registered user 1810 of FIG. 18A-B, the verified registered user 1810 of FIG. 21) may be processed (e.g., upon processing the hyperlink selection of the full profile of the different registered user, the full profile of the different registered user may be communicated to the verified registered user (e.g., the verified registered user 1810 of FIG. 18A-B, the verified registered user 1810 of FIG. 21) for display). In addition, the brief profiles of those registered users may be ensured who are more than Nmax degrees of separation away from the verified registered user (e.g., the verified registered user 1810 of FIG. 18A-B, the verified registered user 1810 of FIG. 21) are not communicated to the verified registered user (e.g., the verified registered user 1810 of FIG. 18A-B, the verified registered user 1810 of FIG. 21) for display.

Figure 31:
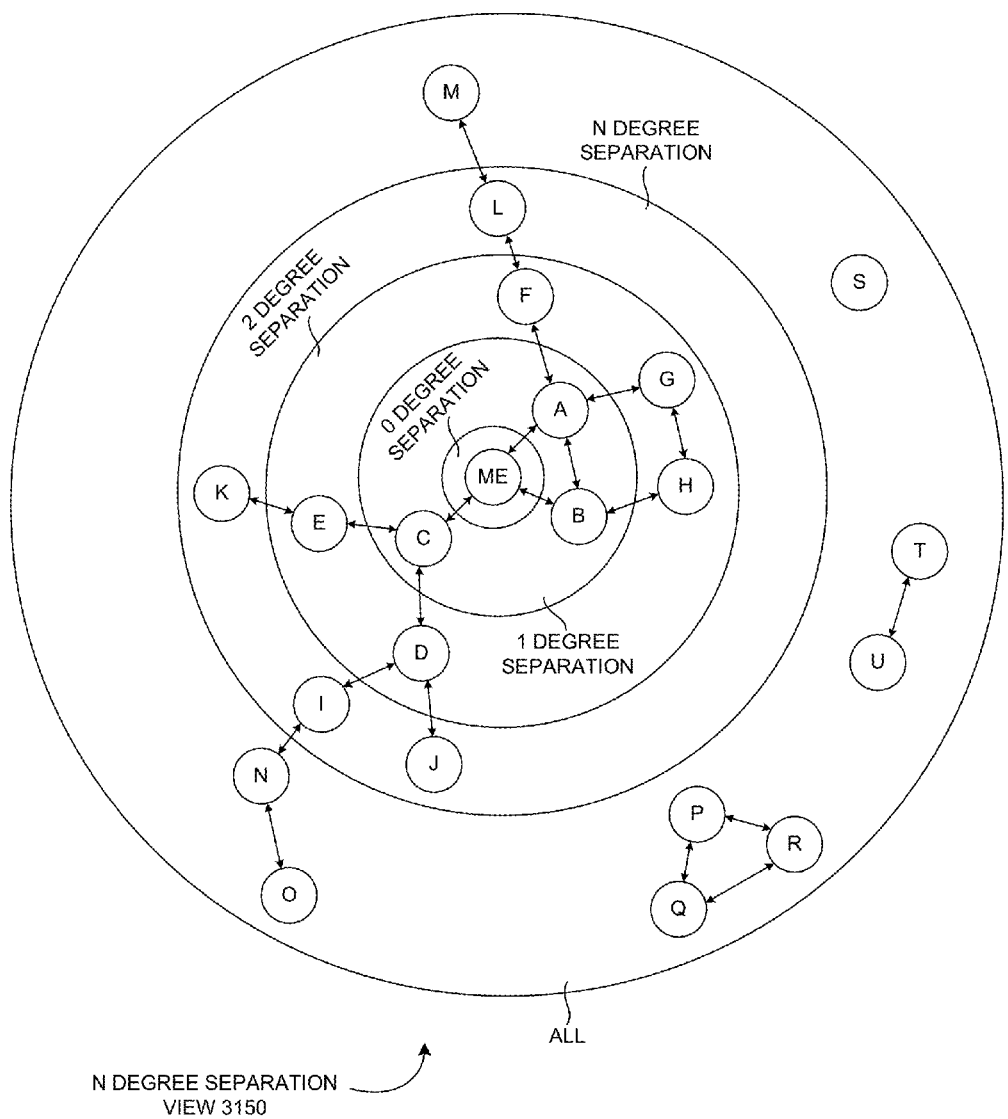
FIG. 31 is an N degree separation view, according to one embodiment.

FIG. 31 is an N degree separation view 3150, according to one embodiment. ME may be a verified registered user (e.g., the verified registered user 1810 of FIG. 18A-B, the verified registered user 1810 of FIG. 21) of the global neighborhood environment 2300 (e.g., the geospatially constrained social network 142 of FIG. 1) centered in the neighborhood network. A, B, C, D, E, F, G, H, I, J, K, L, M, N, O, P, Q, R, S, T, and/or U may be the other registered user of the neighborhood network. The member of the neighborhood network may be separated from the centered verified registered user (e.g., the verified registered user 1810 of FIG. 18A-B, the verified registered user 1810 of FIG. 21) ME of the neighborhood network by certain degree of separation.

The registered user A, B and C may be directly connected and may be deemed to be separated by one degree of separation from verified registered user (e.g., the verified registered user 1810 of FIG. 18A-B, the verified registered user 1810 of FIG. 21) ME. The registered user D, E, F, G, and H may be connected through no less than one other registered user may be deemed to be separated by two degree of separation from verified registered user (e.g., the verified registered user 1810 of FIG. 18A-B, the verified registered user 1810 of FIG. 21) ME. The registered user I, J, K, and L may be connected through no less than N−1 other registered user and may be deemed to be separated by N degree of separation from verified registered user (e.g., the verified registered user 1810 of FIG. 18A-B, the verified registered user 1810 of FIG. 21) ME. The registered user M, N, O, P, Q, R S, T and U may be all registered user.

Figure 32:
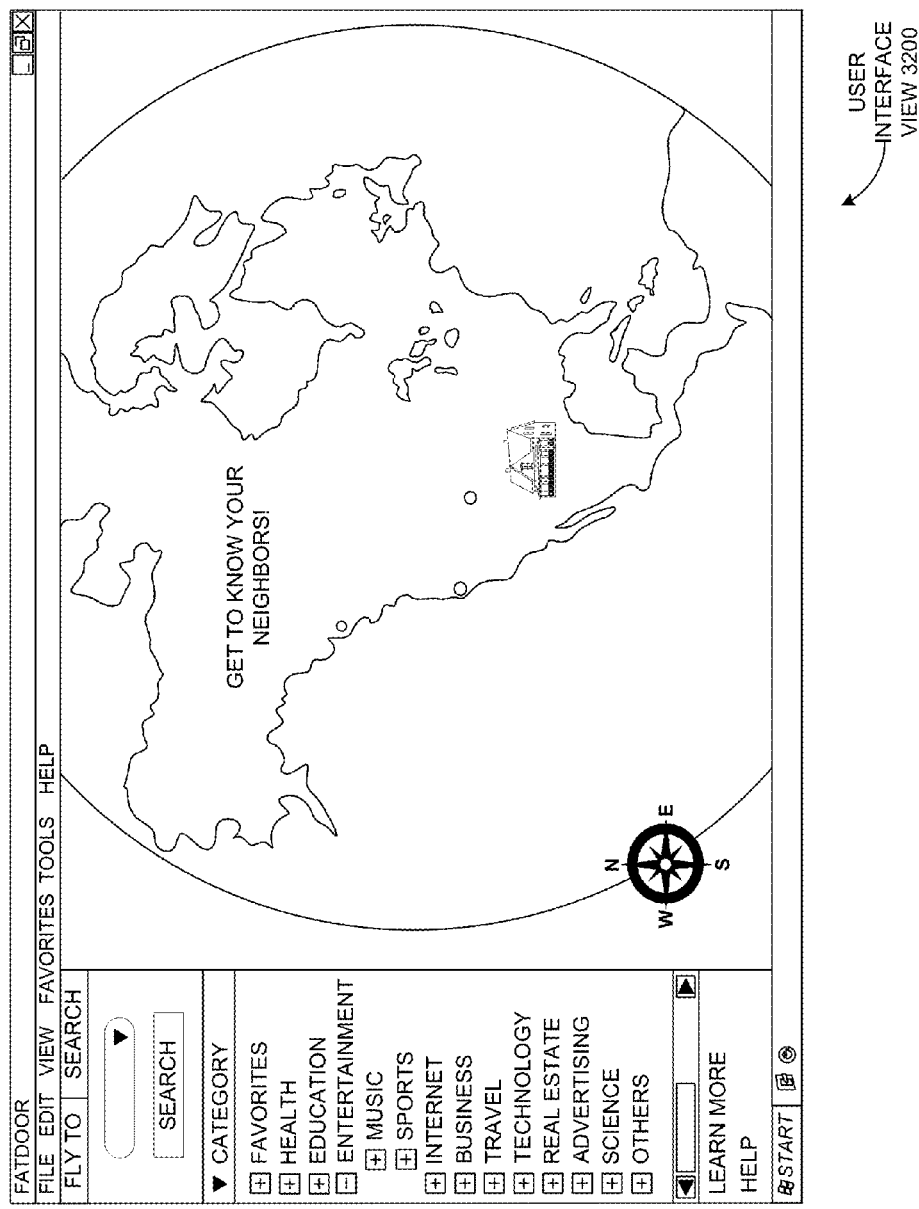
FIG. 32 is a user interface view showing a map, according to one embodiment.

FIG. 32 is a user interface view 3200 showing a map, according to one embodiment. Particularly FIG. 32 illustrates a satellite photo of a physical world. The registered user of the global neighborhood environment 2300 (e.g., the geo spatially constrained social network 142 of FIG. 1) may use this for exploring the geographical location (e.g., the geographical location 1704 of FIG. 17A) of the neighbors (e.g., the other addresses associated with user profiles 402 of FIG. 4). The registered user (e.g., the verified registered user 1810 of FIG. 18A-B, the verified registered user 1810 of FIG. 21) may navigate, zoom, explore and quickly find particular desired geographical locations of the desired neighbors (e.g., the other addresses associated with user profiles 402 of FIG. 4). This may help the registered user to read the map and/or plot the route of the neighbors (e.g., the other addresses associated with user profiles 402 of FIG. 4) on the world map.

Figure 33:
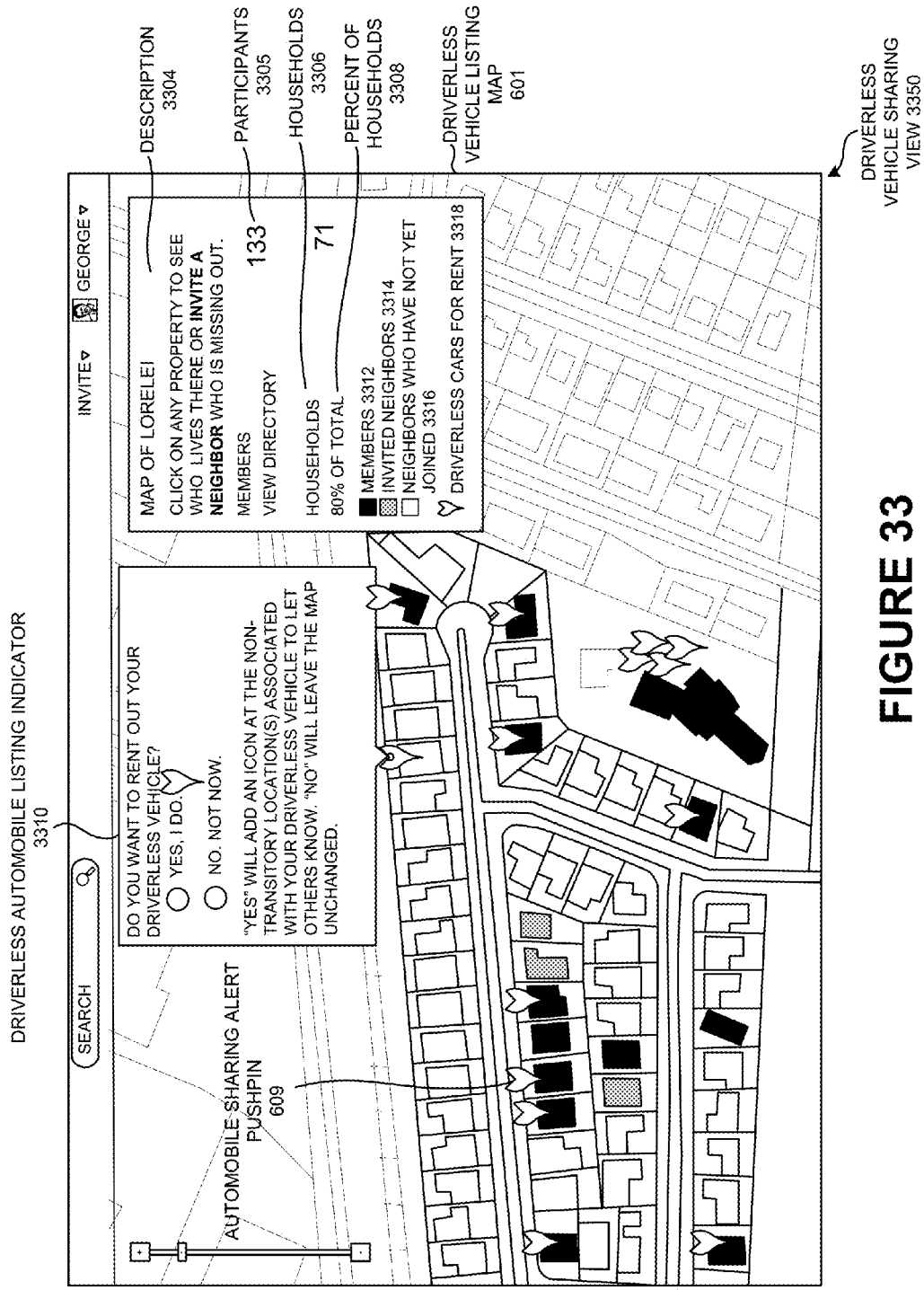
FIG. 33 is a driverless vehicle sharing view of the driverless vehicle listing map of FIG. 6A in which users may indicate to other users of the geospatially constrained social network that the user's driverless vehicle is available for rent and may view the locations of other driverless vehicles for rent in the user's claimed neighborhood, according to one embodiment.

FIG. 33 is a driverless vehicle sharing view 3350 of the driverless vehicle listing map 601, according to one embodiment. FIG. 33 shows the driverless vehicle listing map 601, a description 3304, a set of participants 3305, a set of households 3306, a percent of households 3308, a driverless automobile listing indicator 3310, a members 3312, an invited neighbors 3314, a neighbors who have not yet joined 3316, and driverless vehicles for rent 3318. The driverless vehicle listing map 601 may be a geospatial map of the neighborhood in which the verified user has a claimed geospatial location. The description 3304 may be a description of the rentals and/or neighborhood. The participants 3305 may be the number of users in the neighborhood that have claimed their geospatial location in the neighborhood. The households 3306 may be the number of households and/or businesses (e.g., claimed geospatial locations) that have indicated participation via the driverless automobile listing indicator 3310.

In one embodiment, the percent of households 3308 may be the percentage of total houses and/or businesses in the neighborhood that have indicated participation via the driverless automobile listing indicator 3310. The driverless automobile listing indicator 3310 may allow the verified user to declare whether or not their driverless vehicle 104 is available for rent. According to one embodiment, the verified user may indicate the time, date, type of vehicle, listing criteria 604 etc. on the representation of their claimed geospatial location on the driverless vehicle listing map.

In one embodiment, members 3312 may be indicated on the map by the aesthetic disposition of the representation of their claimed geospatial location (e.g., by the color, shading etc.). Invited neighbors 3314 may be neighbors that have not claimed their geospatial location in the neighborhood but have been invited to join the geospatially constrained social network 142 by at least on of another neighbor. The invited neighbor 3314 may be indicated on the driverless vehicle listing map 601 by the aesthetic disposition of the representation of their claimed geospatial location (e.g., by the color, shading etc.). The neighbors who have not yet joined 3316 may be neighbors who have not joined the geospatially constrained social network and have not yet been invited by at least on of another neighbor, according to one embodiment. The neighbors who have not yet joined 3316 may be indicated on the driverless vehicle listing map 601 by the aesthetic disposition of the representation of their claimed geospatial location (e.g., by the color, shading etc.).

The driverless vehicles for rent 3318 may indicate that the user associated with the claimed geospatial location has indicated that their driverless vehicle(s) are available to rent via the driverless automobile listing indicator 3310. In one embodiment, the automobile sharing alert pushpin 609 may mark the claimed geospatial location to show that the user associated with the claimed geospatial location has indicated their participation via the driverless automobile listing indicator 3310. Users may update the driverless vehicle listing map 601 to include at least one of an availability, a rating, a review, and/or another update of various items listed in the driverless vehicle listing map.

Figure 34:
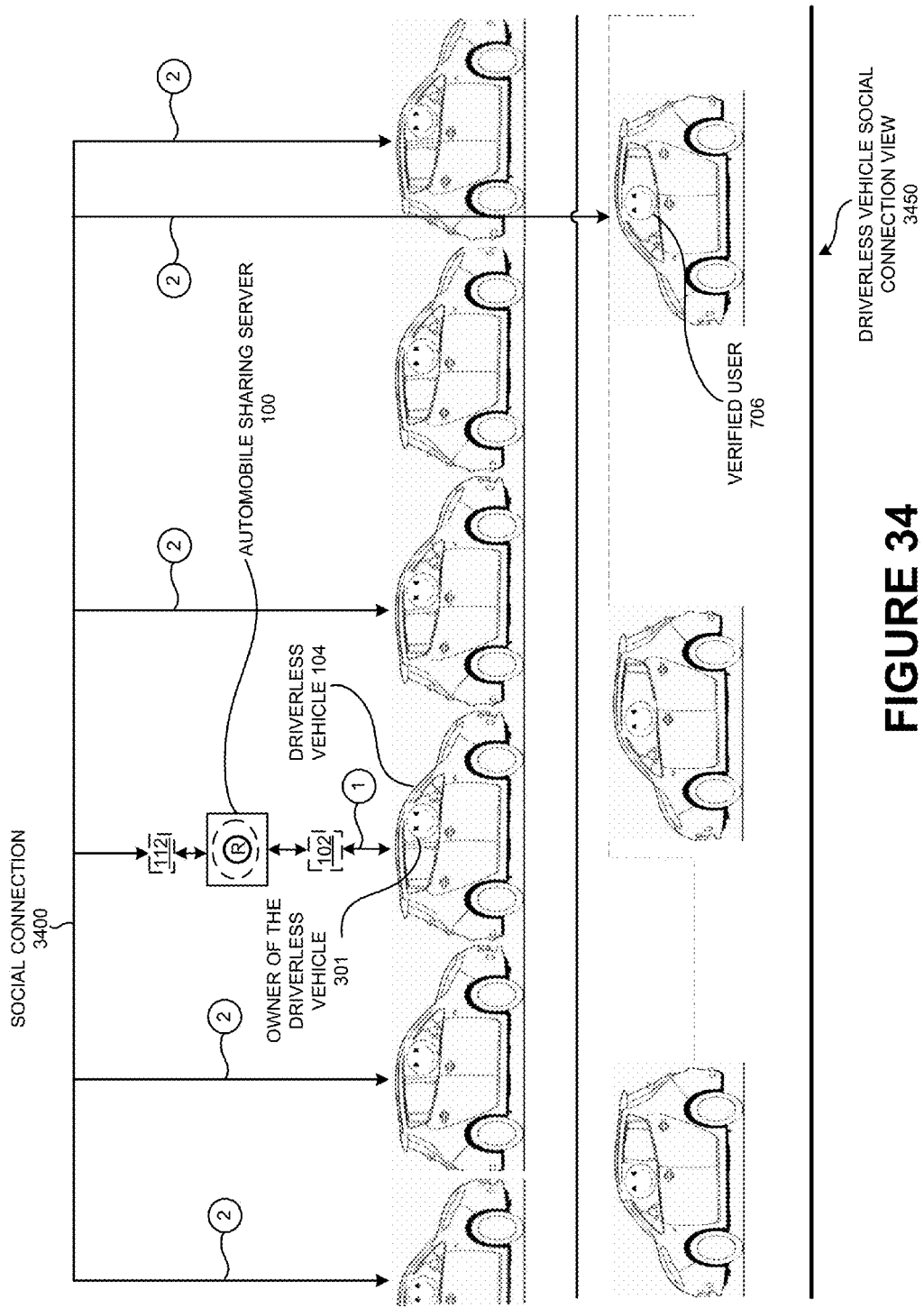
FIG. 34 is a driverless vehicle social connection view of a social connection between passengers of the driverless vehicles in a traffic jam, according to one embodiment.

FIG. 34 is a driverless vehicle social connection view 3450 of a social connection between passengers of the driverless vehicles in a traffic jam, according to one embodiment. Particularly, FIG. 34 shows a social connection 3400 formed between an owner of the driverless vehicles 301 and other passengers on the road. Passengers (e.g., renters, owners of the driverless vehicle) may be able to form social connections with other passengers within a threshold radial distance from the driverless vehicle in which they are riding based on a set criteria (e.g., criteria set by the user on their profile (e.g., verified user profile 2202)). This may enable the passengers to communicate, share traffic information, form connections, and/or chat. In one embodiment, users of the geospatially constrained social network may be able to view the location of a driverless vehicle owned and/or rented by a friend and/or another user with whom the user has formed a social connection (e.g., as depicted in FIG. 34 and/or recommended as illustrated in FIG. 35).

Figure 35:
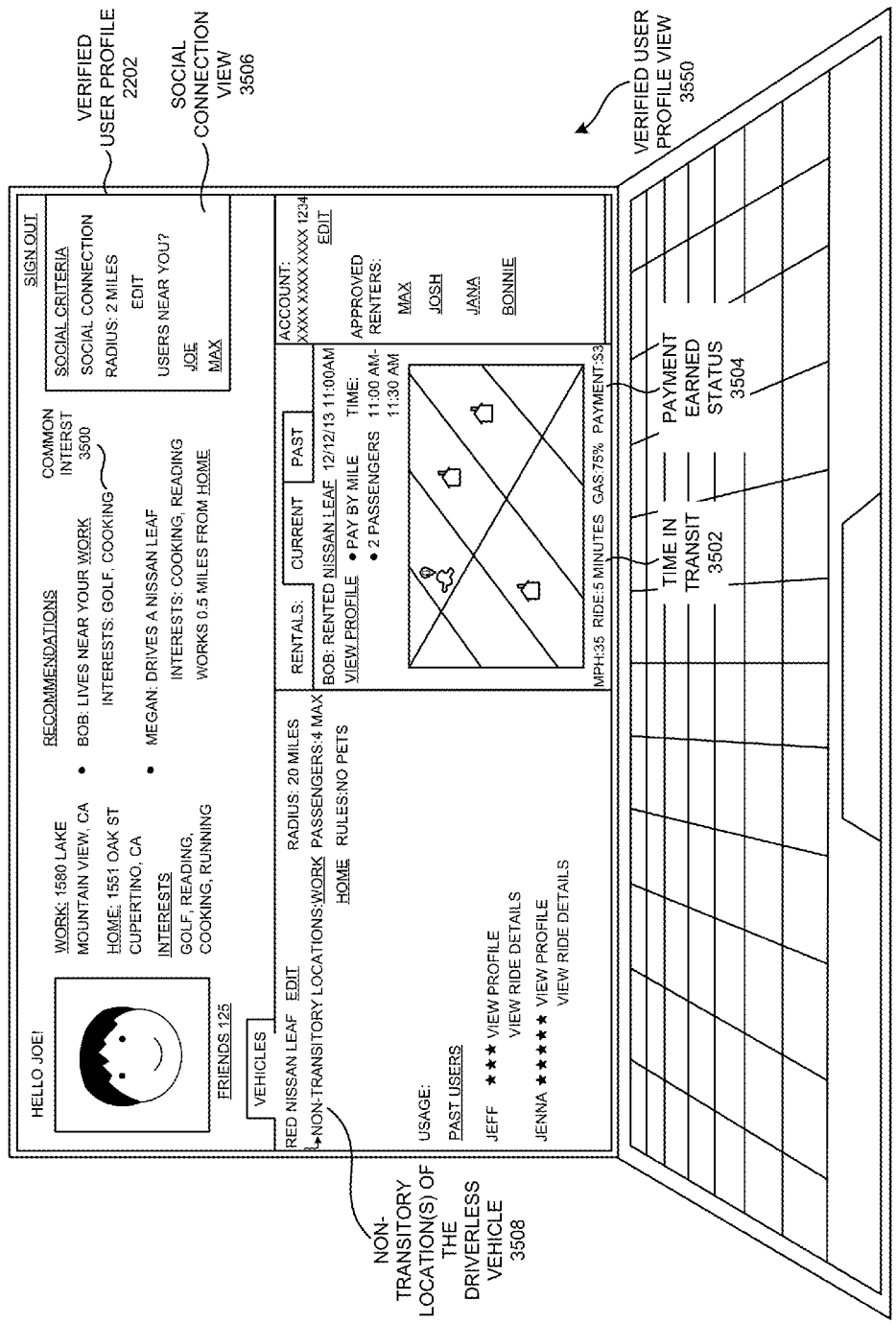
FIG. 35 is a verified user profile view of updates sent to the profile of the owner of the driverless vehicle, according to one embodiment.

FIG. 35 is a verified user profile view 3550 of updates sent to the profile of the owner of the driverless vehicle, according to one embodiment. FIG. 35 shows a common interest 3500, a time in transit 3502, a payment earned status 3504, a social connection view 3506, and a non-transitory location(s) of the driverless vehicle 3508. In the embodiment illustrated in FIG. 35, the verified user 706 (e.g., the owner of the driverless vehicle 301) may receive and/or view updates regarding the state of their driverless vehicle and/or the current and/or past rentals.

Particularly, the owner of the driverless vehicle 301 may be able to view a time in transit 3502, a payment earned status 3504, a time to arrival, a time to destination, an energy status (e.g., amount of gas remaining, amount of electricity remaining, amount of energy remaining, miles remaining in an energy reserve), a number of passengers, the vehicle location 610 (e.g., on a geospatial map), and/or rental details (as shown in FIG. 6B). The user (e.g., the owner of the driverless vehicle) may be able to view and/or edit their claimed geospatial locations 700 and/or the non-transitory location(s) of the driverless vehicle 3508 and/or view, rate, and/or review the profiles of past renters. The user may also be able to alter the date and/or time of rental availability, the listing criteria 604 and/or the description (e.g., the description in the description entry field 606).

The user (e.g., the owner of the driverless vehicle 301, the renter, the verified user 706) may be able to enter interests on their verified user profile 2202 and/or receive recommendation of connections based on other users of the geo-spatial social community (e.g., the geospatially constrained social network 142) who share and/or other driverless vehicles whose owners share a common interest with the user in the threshold radial distance from the non-transitory location. In one embodiment, the user may be able to enter and/or alter account information (e.g., a credit card number), view and/or edit an approved list of renters/owners of the driverless vehicles from whom the user is willing to rent. The user may also be able to view the location (e.g., distance away, geospatial coordinates, on a geospatial map) of other users with whom the user has formed a connection (e.g., friends, users who were recommended based on shared interests, other users the user has formed a social connection with) that are within the threshold radial distance from the non-transitory location of the driverless vehicle, the current location of the driverless vehicle, the current location of the user (e.g., the verified user 706), and/or the claimed geospatial locations 700.

Figure 36A:
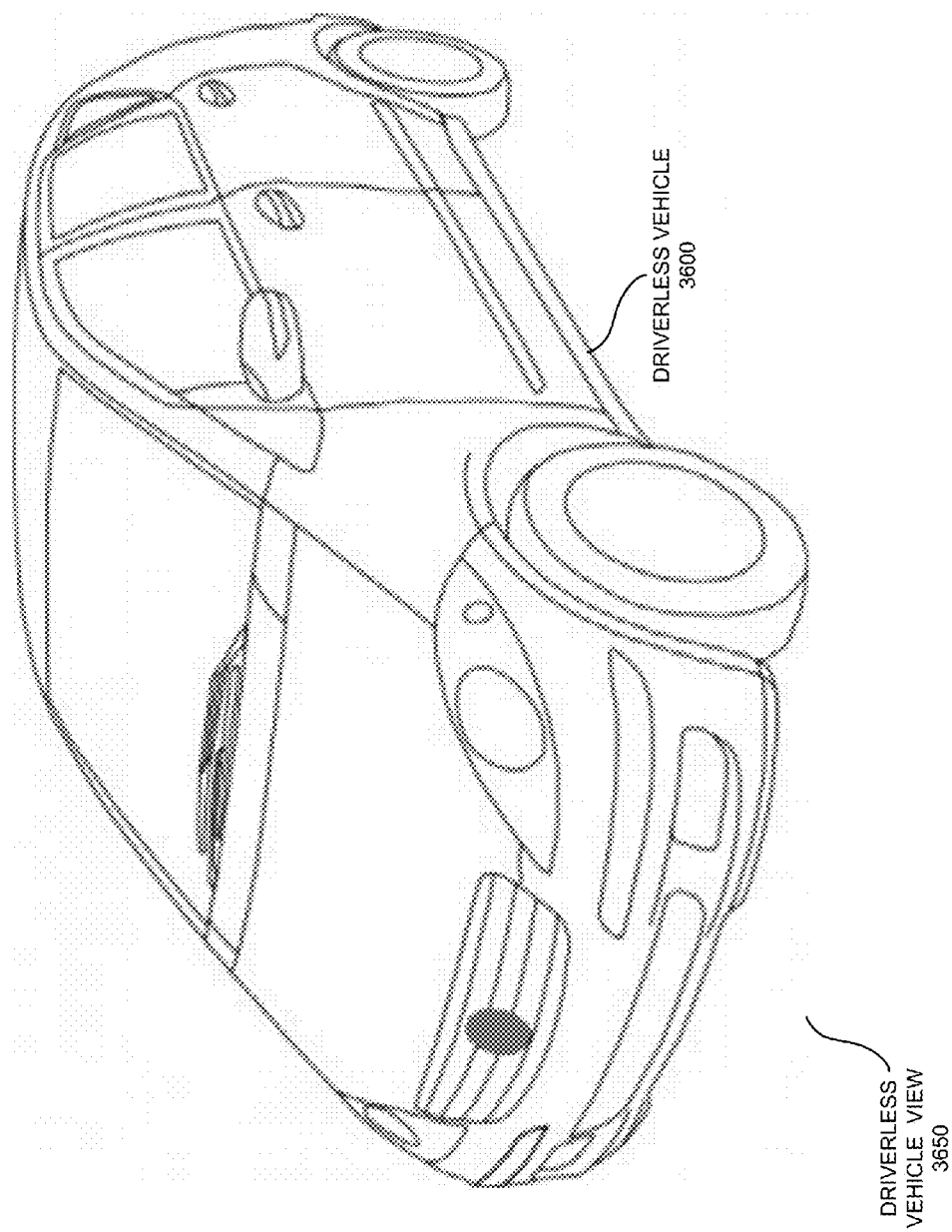
FIG. 36A is a driverless vehicle view of a driverless vehicle, according to one embodiment.
Figure 36B:
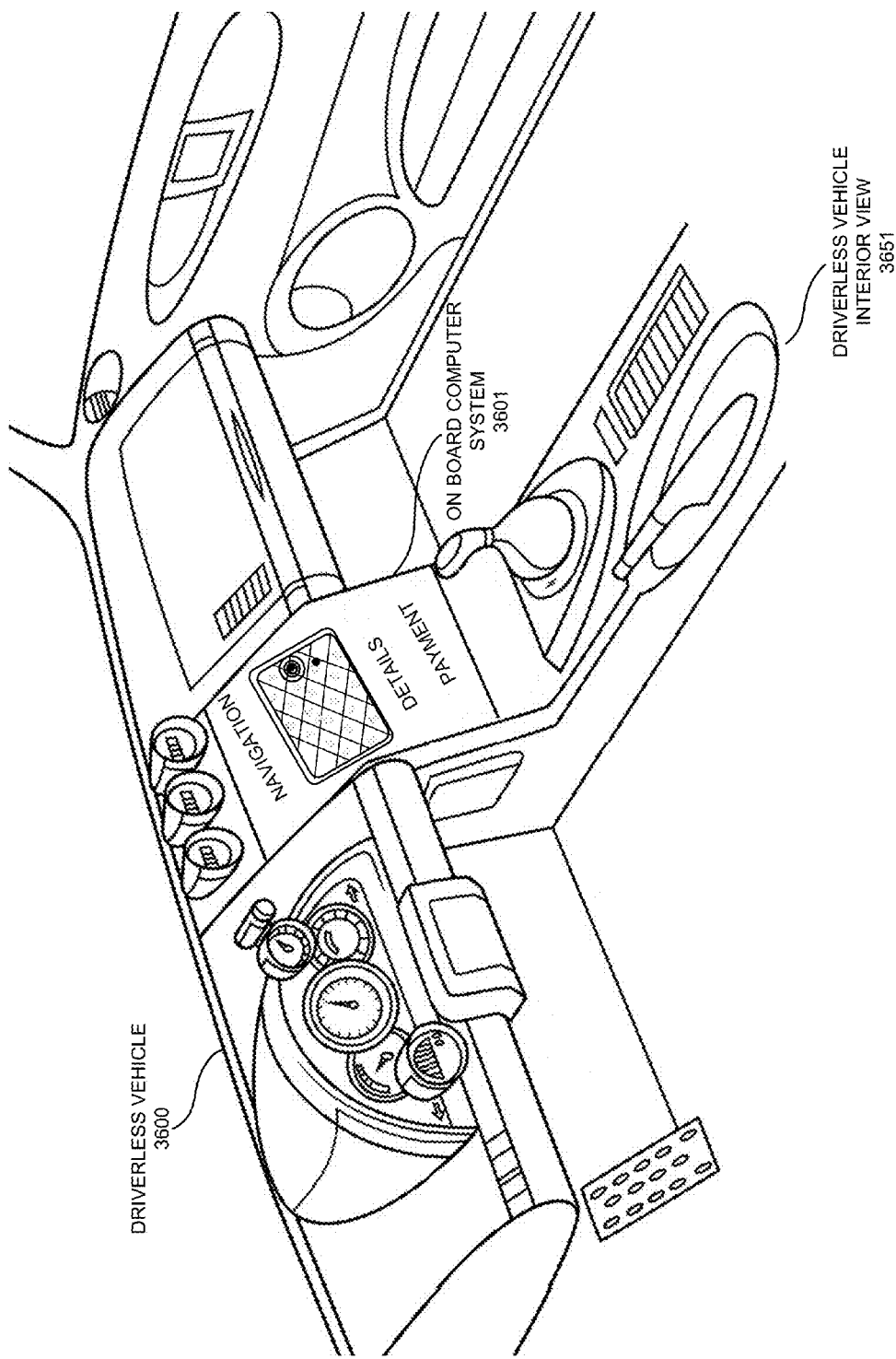
FIG. 36B is a driverless vehicle interior view of the driverless vehicle of FIG. 36A showing an on board computer system, according to one embodiment.

FIG. 36A is a driverless vehicle view of a driverless vehicle, according to one embodiment. The driverless vehicle view 3650 shows the driverless vehicle 3600. FIG. 36B is a driverless vehicle interior view 3651 of the driverless vehicle 3600 (shown in FIG. 36A) showing an on board computer system 3601, according to one embodiment. Particularly, the on board computer system 3601 displays an auto navigation system 3602 (shown in FIG. 36C), a details of rental display and a payment display. In one embodiment, the interior seating of the driverless vehicle 3600 may be easily rearranged to allow passengers to customize the seating orientations to their liking (e.g., to swivel the front seats so they are facing the rear seats, to relocate the seats so all are at a ninety degree angle from the front of the vehicle and facing inward toward each other, etc.).

Figure 36C:
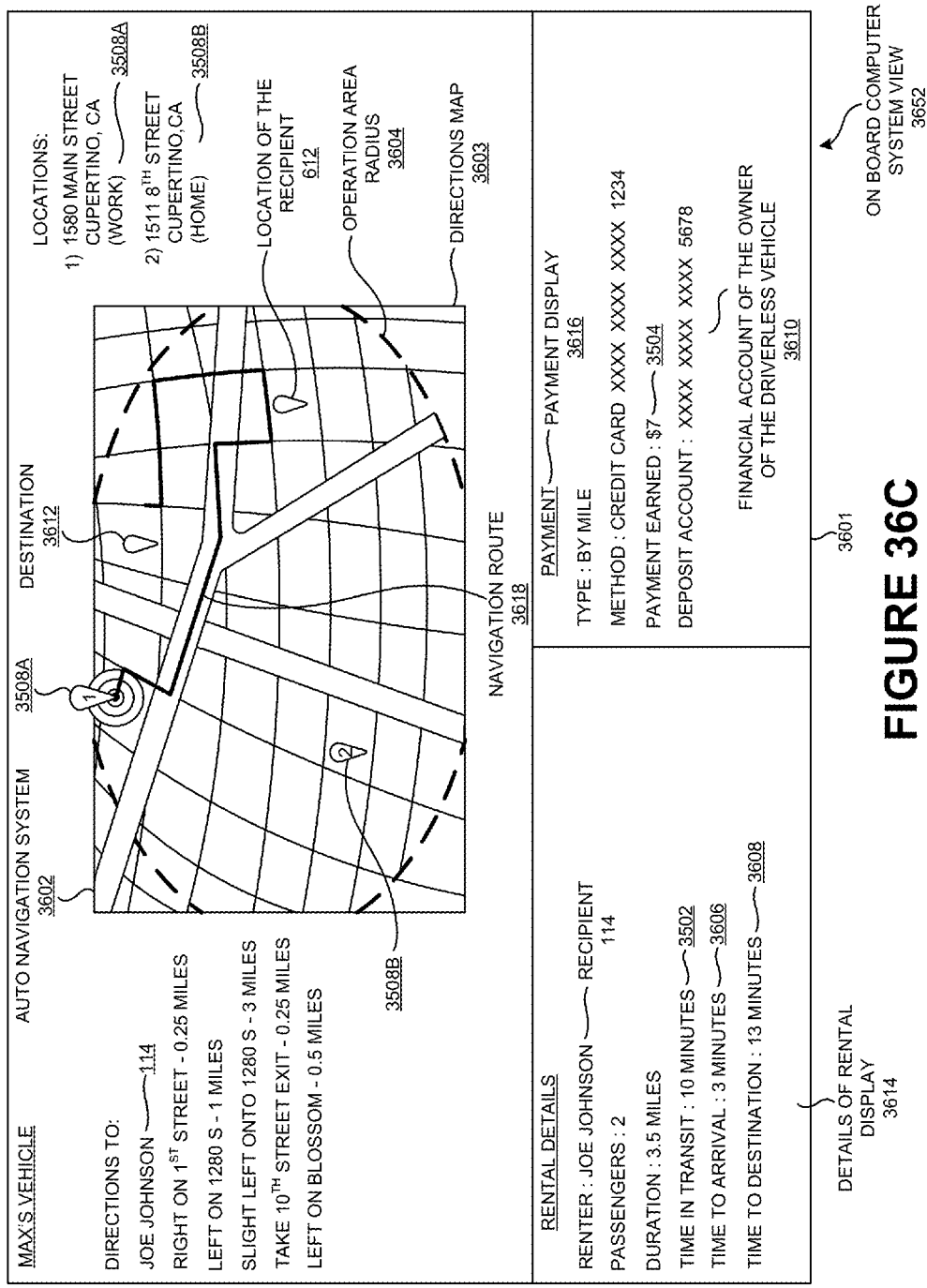
FIG. 36C is an on board computer system view of the on board computer system of FIG. 36B showing an auto navigation system, rental details and payment information, according to one embodiment.

FIG. 36C is an on board computer system view of the on board computer system of FIG. 36B showing an auto navigation system, rental details and payment information, according to one embodiment. Particularly, the on board computer system view 3652 shows the on board computing system 3601, an auto navigation system 3602, a directions map 3603, an operation area radius 3604, a time to arrival 3606, a time to destination 3608, a financial account of the owner of the driverless vehicle 3610, a destination 3612, a details of rental display 3614, a payment display 3616 and a navigation route 3618.

The auto navigation system 3602 may automatically set a navigation route 3618 from the driverless vehicle's location (e.g., the non-transitory location(s) of the driverless vehicle 3508) to the location of the renter (e.g., the location of the recipient 612) and/or any other location within the operation area radius 3604 specified by the renter (e.g., the destination 3612). The auto navigation system 3602 may provide written directions, visual directions (e.g., on the directions map 3603), and/or auditory directions. In one embodiment, the renter (e.g., passenger) may be able to give voice commands and/or written commands (e.g., typed into the auto navigation system 3602) to the driverless vehicle 3600. The directions map 3603 may show the current location of the driverless vehicle 3600, the non-transitory location(s) of the driverless vehicle 3508 (shown in FIG. 36C as 3508A and 3508B), the location of the recipient 612, the destination 3612 and/or the operation area radius 3604, according to one embodiment.

The on board computer system 3601 may store and/or show the rental details in the details of rental display 3614. The detail of rental display 3614 may contain the identity of the renter (e.g., their name, profile etc.), the number of passengers, the nature of the rental (e.g., a ride, a pick up and drop off of items etc.), the duration of the trip (e.g., the total miles and/or time to complete the rental from the starting location of the driverless vehicle until it is back at the starting location), the time in transit 3502, the time to arrival 3606 (e.g., at the location of the recipient 612) and/or the time to destination 3608. The renter (e.g., passenger) may be able to alter the details of their rental while in the driverless vehicle through written (e.g., typed into the on board computer system 3601) and/or through verbal commands.

The payment display 3616 may store and/or show the payment details of the rental. The payment details may include a type of payment (e.g., by mile, by minute, by hour, by passenger, by gallon of gas, by amount and/or percent of the vehicle's energy used, by destination), a method of payment (e.g., a credit card associated with the renter's account and/or profile of the automobile sharing server 100), the payment earned 3504 and/or the financial account of the owner of the driverless vehicle. The renter may be able to alter any number of these details while in the driverless vehicle through written and/or voice commands. In one embodiment, the owner of the driverless vehicle 301 may be updated with all of the information shown in FIG. 36C through a computing device (e.g., their mobile device (e.g., the mobile device 303), a stationary device, a tablet, a computer, a personal organizer) associated with the owner of the driverless vehicle 301.

Figure 37A:
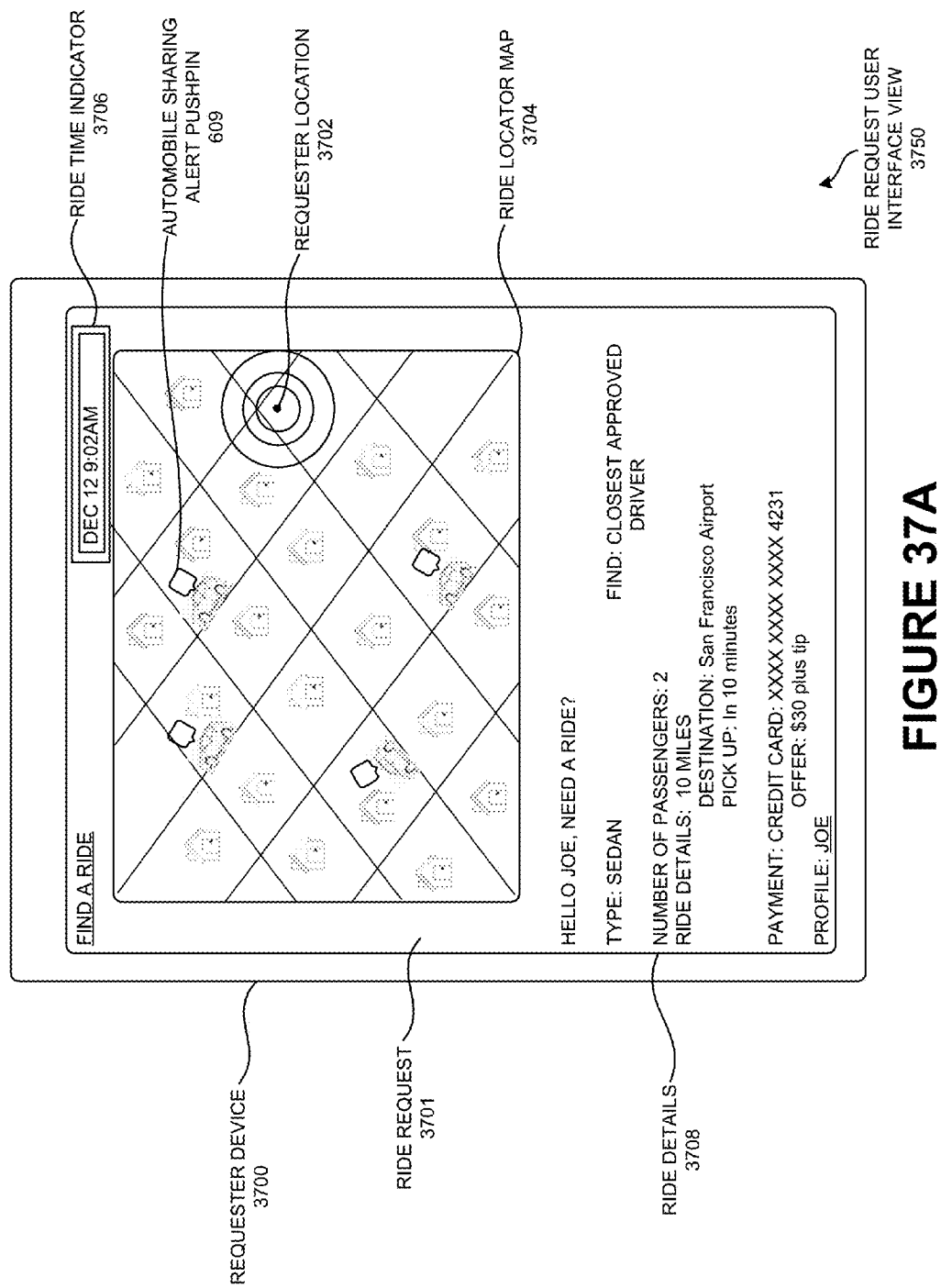
FIG. 37A is a ride request user interface view of a ride request being broadcast, according to one embodiment.

FIG. 37A shows an example embodiment without the presence of driverless vehicles 104. Even without driverless vehicles 104, the geospatially constrained social network 142 may be a crowdsourced community that may allow users to share their vehicle(s) through the network, according to one embodiment. This private community may be a new form of safe, secure, and legal hitchhiking that may allow users of the geospatially constrained social network 142 to register via the automobile sharing server 100 and/or offer rides to other users and/or request rides from other users of the geospatially constrained social network 142. This may enable users (e.g., verified users 706) to act as private lift service providers using their own vehicles to provide rides to other users (e.g., verified users 706) within a certain threshold radial distance from their claimed geospatial locations 700 and/or current location.

A user may be able to 'ping' any number of registered drivers within a certain threshold distance away (e.g., all registered drivers, only those drivers the user has preapproved) and/or offer a payment for a ride (e.g., by mile, hour, destination) through an application (e.g., a Fatdoor android application, a Fatdoor iOS application) on a mobile device associated with the user (shown in FIG. 37A). The drivers may then receive the request from the user through their mobile device (e.g., the mobile device 303) and/or respond (e.g., with an accept, a reject and/or a referral to another user (e.g., registered driver)). The driver may be able to communicate with the user requesting the ride through their mobile device (e.g., through the application on the mobile device). Upon an acceptance of a request, the mobile device of the driver may automatically set a navigation route (shown in FIG. 37B) from the current location of the driver to the location of the user requesting the ride.

The application may be able to keep track of how far and/or long the user has driven and conduct payment through the application. In one embodiment, users may need to be registered (e.g., verified users 706) to give and/or request a ride through the automobile sharing server 100. In another embodiment, the user requesting a ride may offer a maximum and/or minimum payment amount (e.g., by mile, hour, destination, amount of gas and/or energy used) allowing drivers that received the 'ping' (e.g., ride request) to bid over providing the ride to the user. In one embodiment, multiple users may be able to bid over a specific driver. The driver may be able to set a minimum and/or maximum offer (e.g., per ride, mile, hour, energy used, destination)

In one embodiment, the user may be able to set a list of any and all drivers they wish to receive their request for a ride. Similarly, drivers (e.g., verified users 706) may be able to set a criteria for the types of requests about which they receive a ride request 3701 (e.g., ping). The criteria may include a set of approved other users, a set of other users from whom the user does not wish to receive ride requests 3701, a minimum payment offer (e.g., by hour, by mile, in total), and/or a minimum trip length (e.g., mile, time). Users may be able to rate and/or review one another through the automobile sharing server 100 (e.g., using a rating 620 and/or a review 622 shown in FIG. 37B).

In the 19th Century, trains may have been the dominant way of traveling long distances and wagons and horses may have been good for short trips. In the 20th Century, automobiles and trucks may have become the most dominant mode of transportation. So, when the Depression hit, people with little money may have been forced to find new ways of getting around. "Hitching a ride" in a car or truck may have gained in popularity around this time. Riding the rails may have been an established practice, but it may have been dangerous and illegal. Hitchhiking may have been legal and slightly safer, even if it was more uncertain. In later years, hitching may have developed into an entire subculture. Actually, hitchhiking may have been known from the earliest days of the automobile. The various technologies described herein may make hitchhiking safer, more trusted, and legal.

Figure 37B:
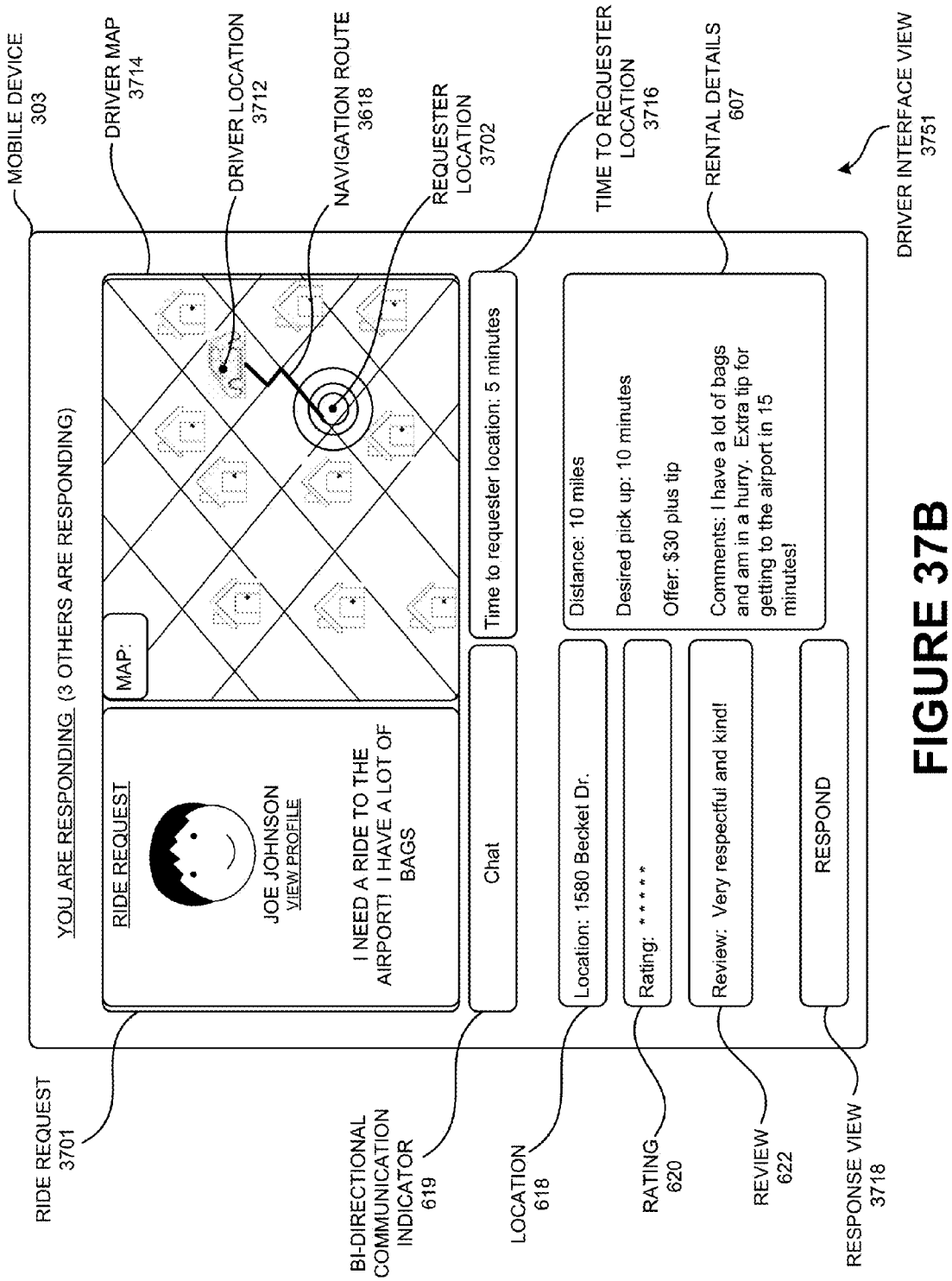
FIG. 37B is a driver interface view of the ride request of FIG. 37A being received by a driver, according to one embodiment.

Hitchhiking (also known as thumbing or hitching) may be a means of transportation that is gained by asking people (e.g., strangers) for a ride in their automobile or other road vehicle (e.g., a ride request 3701 shown in FIG. 37B). The latter may require many rides from different people. A ride may be, but may not always be, free. If the hitchhiker (e.g., the requester of FIG. 37A) wishes to indicate that they need a ride, they may simply make a physical gesture or display a written sign. Hitchhiking may be part of the American psyche and many people may continue to stick out their thumbs. Hitchhiking may be one of the cheapest ways of traveling. By tradition, hitchhiking may be defined as soliciting a ride by standing at the edge of a road, facing traffic, with one's thumb extended/upwards. A hitchhiker may be able to meet a lot of people and make lots of friends. They may also become very frustrated and/or encounter danger on the way. However, people who do pick up hitchhikers tend to be very friendly. Still, hitchhikers also risk being picked up by someone who is an unsafe driver or even personally dangerous as there may be no effective way to vet potential drivers and/or hold the driver accountable for their actions. The various embodiments described herein overcome some of the challenges of the past faced with hitchhiking by creating a trusted community and sharing platform of driverless cars.

Contrary to many preconceived notions, hitchhiking can be a safe, positive experience, allowing travelers to connect with locals and form unexpected friendships through the various embodiments described in FIGS. 1-37.

FIG. 37A is a ride request user interface view of a ride request being broadcast, according to one embodiment. Particularly, the ride request user interface 3750 shows the ride request, a requester device 3700, a requester location 3702, a ride locator map 3704, a ride time indicator 3706 and a ride details 3708. A user (e.g., requester) of the automobile sharing server 100 of the geospatially constrained social network 142 may broadcast a request for a ride through an application (e.g., Fatdoor android application, Fatdoor iOS application) on the requester device 3700. The requester (e.g., verified user 706) may view the locations of registered users (e.g., drivers) within a threshold radial distance 119 of the requester's current location and/or claimed geospatial location(s) 700 on the ride locator map 3704. The user may be able to see their location (e.g., requester location 3702) and/or the proximity of their location in relation to the drivers (e.g., registered drivers).

The requester may be able to view automobile sharing alert pushpins 609 above the locations of the drivers (e.g., driver location 3712). The user may be able to select the automobile sharing alert pushpins 609 and view a short profile of the driver, a full profile of the driver, a rating of the driver (e.g., an overall rating, a collection of ratings, a past rating by the requester), a review of the driver (e.g., an overall review, a collection of reviews, a past review by the requester), an estimated time of pick up, rules of the driver (e.g., car rules), etc. The requester may be able to communicate with a driver by selecting the automobile sharing alert pushpin 609 or by other means. The ride time indicator may show a ride time (e.g., an estimated time of arrival at the destination from pick up and/or an estimated time of arrival at the destination from that very moment).

The requester (e.g., the verified user 706) may be able to enter details of their ride request in the ride details 3708. The requester may be able to enter a type of vehicle desired, a category of drivers (e.g., verified users 700, vehicles, user profiles) to show as options (e.g., in a list, on the ride locator map 3704). For example, the requester may wish to only view ride options within a certain distance from their location, drivers that the requester has ridden with before, drivers on a favorites list of the requester, specific drivers, drivers with certain ratings, drivers with certain rules for the car etc. The requester may be able to enter a number of passengers, a destination, a desired pick up and/or arrival time, a duration of the ride (e.g., the number of miles and/or time), a payment method (e.g., a credit card associated with the account of the requester), and/or an offer for the ride.

FIG. 37B is a driver interface view of the ride request of FIG. 37A being received by a driver, according to one embodiment. The driver interface view 3751 of FIG. 37B shows the ride request 3701, a driver location 3712, a driver map 3714, a time to requester location 3716, and a response view 3718. The driver (e.g., verified user 700) may receive the ride request 3701 from the requester through the application on the mobile device 303 associated with the driver. The driver may be able to view their location (e.g., the driver location 3712), the navigation route 3618 (e.g., the navigation route from the driver location 3712 to the requester location 3702) and/or the requester location 3702 on the driver map 3714. In one embodiment, the navigation route 3618 may be set automatically on the mobile device 303 once the driver accepts the ride request 3701.

The driver may also be able to view the time to requester location 3716. This may enable the driver to assess if they will be able to pick the requester up by the desired pick up time specified by the requester. In one embodiment, only certain drivers (e.g., drivers within a certain distance from the requester and/or drivers the automobile sharing server 100 assesses to be able to pick the requester up by the specified pick up time) will receive the ride request 3701. The driver may be able to view the ride details 3708 which may include the distance and/or duration of the ride, the desired pick up time, the offer, the destination, the desired arrival time, and/or additional comments from the requester.

According to one embodiment, the driver may be able to bi-directionally communicate with the requester and/or any other user (e.g., users within a threshold radial distance 119 from the driver location 3712) through the bi-directional communication indicator 619. The location 618 may allow the driver to view the address of the requester location 3716. The rating 620 may be a combined rating of the requester and/or a set of any number of reviews of the requester made by other users including the driver, according to one embodiment. The driver may be able to view reviews 622 of the requester (e.g., all previous reviews and/or previous reviews submitted by the driver). The response view 3718 may allow the driver to respond to the ride request with at least one of an accept, a deny and/or a referral to another user (e.g., another driver). In one embodiment, the driver may be able to participate in bidding for the ride request with other drivers in a threshold distance from the requester location 3702.

It should be noted that there are a number of different 'user' roles described in the various embodiments described herein. The user roles include a 'user', a 'claimed user', and a 'verified user'. The user is someone that has signed up for and/or accessed the automobile sharing server 100 through the geospatially constrained social network 142. The user can 'claim' an existing profile (e.g., prepopulated and/or created by another user through a wiki like creation process), and/or 'claim' an address with a new location, thereby transforming the user to the 'claimed user'. The claimed user can verify that they actually live at a particular home address and/or work at a particular business address (e.g., thereby showing their affiliation with a non-transitory location) by submitting a response to a verification code on a postcard, submitting a utility bill, and/or being invited by and/or getting vouched for by an existing verified user. This can transform the claimed user to a 'verified user', in one embodiment. It will be understood by those with skill in the art that the user may refer to either a user that has not yet claimed, the claimed user, and/or the verified user.

In various embodiments, the automobile sharing network 150 may be a decentralized peer to peer system in which there is no central organization that controls the distribution, maintenance, adoption of standards, car rules, payment rules, adoption and/or standards for drivers, etc. In one embodiment, government regulations may not apply to the users (e.g., drivers and/or requesters) of the automobile sharing server 100 because each peer may choose how to operate his or her vehicle (e.g., how to conduct payment, when, how and/or where they offer rides). The automobile sharing server 100 may serve as a third party enabler of interactions between parties to enable these private parties to engage in private transactions without a central intermediary. Thus, parties may be able to freely interact and/or set their own standards for interactions without the control and/or dictation of a central organization.

In one embodiment, the users (e.g., drivers) of the automobile sharing network 150 may pay a percentage of what they earn and/or a flat rate (e.g., a membership, a monthly, yearly, daily, flat rate by trip fee etc.) for using the network. In one embodiment, the users of the automobile sharing network may be able to set their own payment standards (e.g., by bidding for rides, by setting a flat rate by destination, by paying by mile, by time, by amount of energy (e.g., gas) used). Once a payment standard is set by the driver and/or the user (e.g., requester), the deal may be locked by the automobile sharing server 100 and/or payment may be conducted through the application on the mobile device(s) (e.g., through a verified credit card associated with the requester's profile on the automobile sharing network 150).

In one aspect, a method of an automobile sharing server 100 includes associating a unique identifier 105 associated with a driverless vehicle 104 with the automobile sharing server 100, periodically analyzing a location of the driverless vehicle 104 based on a geospatial data associated with a location of the driverless vehicle 104, and declaring a non-transitory location of the driverless vehicle 3508 based on a predictable behavior algorithm 211. The method permits an owner of the driverless vehicle 301 to list the driverless vehicle 104 on an automobile sharing network 150. In addition, the method processes a payment of a renter (e.g., recipient 114, verified user 706) of the driverless vehicle 104 in a threshold radial distance 119 from the driverless vehicle 104 when the driverless vehicle 104 is predictable at the non-transitory location for a predictably available period of time. Furthermore, a financial account of the owner of the driverless vehicle 3610 is credited with the payment of the renter of the driverless vehicle 104 in the threshold radial distance 119 from the driverless vehicle 104 when the driverless vehicle 104 is predictable at the non-transitory location for a predictably available period of time.

The unique identifier 105 of the driverless vehicle 104 may be a license plate of the driverless vehicle 104, and/or a social networking profile of the user in a geo-spatial social community (e.g., geospatially constrained social network 142). The method may include automatically recommending connections to the owner of the driverless vehicle 301 based on the non-transitory location (e.g., the non-transitory location of the driverless vehicle 3508, the claimed geospatial locations 700). The connections may be associated with other users of the geo-spatial social community based on other users of the geo-spatial social community sharing a common interest 3500 with the owner in the threshold radial distance 119 from the non-transitory location, and/or other driverless vehicles 104 of the geo-spatial social community whose owners share the common interest 3500 with the owner in the threshold radial distance 119 from the non-transitory location. The method may include automatically instructing the driverless vehicle to navigate to a location of the renter, and/or periodically updating the owner and/or the renter based on a time in transit 3502, a time to arrival 3606, a time to destination 3608, and/or the payment earned status 3504. A criteria (e.g., the listing criteria 604) associated with an automotive listing data 102 including a description, a photograph, a video, a rental fee, a category, a vehicle make, a vehicle model, and/or a functional status may be processed.

In addition, an availability chart may be populated when the driverless vehicle 104 associated with the listing criteria 604 is posted. The availability chart may include an operation area radius, a start timing, an end timing, an hours per day, and/or an hours per user. The method may further include determining that the automotive listing data 102 is generated by the verified user 706 of the neighborhood broadcast system when validating that the automotive listing data 102 is associated with the mobile device 303. It may be determined that an application on the mobile device 303 is communicating the automotive listing data 102 to the automobile sharing network 150 when the automotive listing data 102 may processed.

The verified user 706 may be associated with a verified user 706 profile 2202 in the automobile sharing network 150 through the application on the mobile device 303. The automotive listing data 102 generated through the mobile device 303 may be presented as an automobile sharing alert pushpin 609 of the automotive listing data 102 in a geospatial map surrounding pre-populated residential and/or business listings in a surrounding vicinity, such that the automobile sharing alert pushpin 609 of the automotive listing data 102 may automatically presented on the geospatial map in addition to being presented on the set of user profiles having associated verified addresses in the threshold radial distance 119 from the set of geospatial coordinates 103 associated with the automotive listing data 102 generated through the mobile device 303 of the verified user 706 of the automobile sharing server 100.

The automotive listing data 102 generated through the mobile device 303 may be radially distributed through an on-page posting 621, an electronic communication, and/or a push notification delivered to desktop and/or mobile devices (e.g., recipient devices 505) associated with users and/or their user profiles around an epicenter 144 defined at the set of geospatial coordinates 103 associated with the automotive listing data 102 that may be generated through the mobile device 303 to all subscribed user profiles in a circular geo-fenced area (defined by the threshold distance from the set of geospatial coordinates 103 associated with the automotive listing data 102 generated through the mobile device 303) through the radial algorithm 140 of the automobile sharing network 150 that measures a distance away of each address associated with each user profile from the current geospatial location at the epicenter 144.

The method may include permitting the verified user 706 to drag and/or drop the automobile sharing alert pushpin 609 on any location on the geospatial map, and/or automatically determining a latitude and/or a longitude associated a placed location. The method may further include automatically notifying a user, a business (e.g., business establishment 109), and/or an automobile rental agency in a surrounding geospatial area to the set of geospatial coordinates 103 associated with the automotive listing data 102 generated through the mobile device 303. The geospatial coordinates 103 may be extracted from a metadata associated with the automotive listing data 102 generated through the mobile device 303 when verifying that the set of geospatial coordinates 103 associated with the automotive listing data 102 generated through the mobile device 303 are trusted based on the claimed geospatial location 700 of the verified user 706 of the automobile sharing server 100.

A relative match between a persistent clock 226 associated with the automobile sharing server 100 and/or a digital clock of the mobile device 303 may be determined to determine that the time stamp 510 associated with the creation date 508 and/or time of the automotive listing data 102 generated through the mobile device 303 may accurate and/or therefore trusted. A publishing of the automotive listing data 102 generated through the mobile device 303 may be automatically deleted on a set of user profiles (e.g., verified user profiles 2202) having associated verified addresses in the threshold radial distance 119 from the set of geospatial coordinates 103 associated with the automotive listing data 102 generated through the mobile device 303 of the verified user 706 of the automobile sharing server 100 based on an automobile sharing alert expiration time 629.

The method may also include geocoding a set of residential addresses each of which may be associated with a resident name in a neighborhood surrounding the mobile device 303. The set of residential addresses each associated with the resident name may be prepopulated as the set of user profiles in the threshold radial distance 119 from the claimed geospatial location 700 of the verified user 706 of the automobile sharing server 100 in a neighborhood curation system communicatively coupled with the automobile sharing server 100. The verified user 706 may be permitted to modify content in each of the set of user profiles. The modified content may be tracked through the neighborhood curation system.

A reversible history journal associated with each of the set of user profiles may be generated such that a modification of the verified user 706 can be undone on a modified user profile page. An editing credibility of the verified user 706 may be determined based on an edit history of the verified user 706 and/or a community contribution validation of the verified user 706 by other users of the neighborhood curation system. The method may include automatically publishing the automotive listing data 102 generated through the mobile device 303 to a set of user profiles having associated verified addresses in a threshold radial distance 119 from the claimed geospatial location 700 of the verified user 706 of the automobile sharing server 100 using the radial algorithm 140.

A claim request of the verified user 706 generating the automotive listing data 102 generated through the mobile device 303 to be associated with an address of the neighborhood curation system may be processed. It may be determined if the claimable neighborhood in the neighborhood curation system may be associated with a private neighborhood community in the claimable neighborhood of the neighborhood curation system. The verified user 706 may be associated with the private neighborhood community in the claimable neighborhood of the neighborhood curation system if the private neighborhood community has been activated by the verified user 706 and/or a different verified user 706. The verified user 706 may be permitted to draw a set of boundary lines in a form of a geospatial polygon such that the claimable neighborhood in a geospatial region surrounding the claim request may create the private neighborhood community in the neighborhood curation system if the private neighborhood community may be inactive.

The method may verify the claim request of the verified user 706 generating the automotive listing data 102 generated through the mobile device 303 to be associated with a neighborhood address of the neighborhood curation system when the address may be determined to be associated with a work address and/or a residential address of the verified user 706. The automotive listing data 102 generated through the mobile device 303 may be simultaneously published on the private neighborhood community associated with the verified user 706 generating the automotive listing data 102 generated through the mobile device 303 in the threshold radial distance 119 from the address associated with the claim request of the verified user 706 of the neighborhood curation system when automatically publishing the automotive listing data 102 generated through the mobile device 303 on a set of user profiles having associated verified addresses in a threshold radial distance 119 from the claimed geospatial location 700 of the verified user 706 of the automobile sharing server 100 based on a set of preferences of the verified user 706 using the radial algorithm 140.

A set of profiles may be automatically downloaded to the mobile device 303. A driverless vehicle owner (e.g., the owner of the driverless vehicle 301) may the verified user 706. An interface may be provided to the owner of the driverless vehicle such that the owner of the driverless vehicle may be able to use a haptic 'flick' gesture in a horizontal and/or a vertical fashion to switch a viewing pane associated with a profile. The method may include analyzing a response of the driverless vehicle owner being a dismiss, a save, a rating, a review and/or a rental acceptance of a renter associated with the automotive listing data 102 through the automobile sharing server 100. A video communication and/or an audio communication may be automatically initiated between the mobile device 303 of the driverless vehicle owner and/or another mobile device 303 the renter through the automobile sharing server 100 based on the profile of the renter associated with the automotive listing data 102 through the automobile sharing server 100.

The renter and/or other renters may be permitted to view the rating and/or the review provided by the driverless vehicle owner for each of the renters based on a participation criteria 605 set by the driverless vehicle owner and/or the renter, such that each renter may able to view ratings and/or reviews of each participating candidate for the rental associated with the automotive listing data 102. Each renter for the rental of the driverless vehicle 104 associated with the automotive listing data 102 may be permitted to communicate with each other and/or form social connections with each other based on the participation criteria 605 set by the driverless vehicle owner and/or the renter, such that each renter may able to form social connections with each participating candidate for the rental associated with the automotive listing data 102.

The method may also include permitting participating driverless vehicle owners (e.g., owners of the driverless vehicles 301) in the automobile sharing server 100 to see previous ratings, comments, reviews, prescreen questions, and/or background checks of across a plurality of renters applying for a plurality driverless vehicle rentals through the automobile sharing server 100 (such that different driverless vehicle owners benefit from previous diligence of at one of previous ratings, comments, reviews, prescreen questions, and/or background checks by participating driverless vehicle owners with each renter that has previously rented through the automobile sharing server 100). A summary data 626 may be provided to the driverless vehicle owner generating the automotive listing data 102 generated through the mobile device 303 of how many user profile pages were updated with an alert of the automotive listing data 102 generated through the mobile device 303 when publishing the automotive listing data 102 generated through the mobile device 303 in the private neighborhood community and/or the set of user profiles having associated verified addresses in the threshold radial distance 119 from the claimed geospatial location 700 of the verified user 706 of the automobile sharing server 100 based on the set of preferences of the verified user 706.

The automotive listing data 102 generated through the mobile device 303 may be live broadcasted to the different verified user 706 and/or other verified users 706 in the private neighborhood community (and/or currently within the threshold radial distance 119 from the current geospatial location) through the automobile sharing server 100 through a multicast algorithm 276 such that a live broadcast multicasts to a plurality of data processing systems associated with each of the different user and/or the other verified users 706 simultaneously (when the mobile device 303 of the verified user 706 generating the live-broadcast 616 enables broadcasting of the automotive listing data 102 generated through the mobile device 303 to any one of a geospatial vicinity around the mobile device 303 of the verified user 706 generating the broadcast and/or in any private neighborhood community in which the verified user 706 has a non-transitory connection). The different verified user 706 and/or other verified users 706 in the private neighborhood community may be permitted to bi-directionally communicate with the verified user 706 generating the broadcast through the automobile sharing server 100.

Any private neighborhood community in which the verified user 706 has a non-transitory connection may be a residential address of the verified user 706 and/or a work address of the verified user 706 that has been confirmed by the automobile sharing server 100 as being associated with the verified user 706. The threshold distance may between 0.2 and/or 0.4 miles from the set of geospatial coordinates 103 associated with the automotive listing data 102 generated through the mobile device 303 to optimize a relevancy of the live-broadcast 616. The automobile sharing server 100 may include a crowd-sourced moderation algorithm 204 in which multiple neighbors in a geospatial area determine what content contributed to the automobile sharing server 100 persists and/or which may deleted. The automobile sharing server 100 may permit users to mute messages of specific verified users 706 to prevent misuse of the automobile sharing server 100. The automobile sharing server 100 may permit the automotive listing data 102 to be disseminated to adjacent neighborhoods that have been claimed by different users in a manner such that the automotive listing data 102 may optionally disseminated to the surrounding claimed neighborhoods 300 based on a preference of the verified user 706.

A claimed neighborhood 300 of the verified user 706 may be activated based on a minimum number of other verified users 706 in the threshold radial distance 119 that have been verified through a primary residential address associated with each of the other verified users 706 through a post card verification, a utility bill verification, a privately-published access code, and/or a neighbor vouching method. Access to the automotive listing data 102 may be restricted to the claimed neighborhood 300 of the verified user 706. Access to the automotive listing data 102 may denied to users having verified addresses outside the claimed neighborhood 300 of the verified user 706.

In another aspect, the method of the driverless vehicle 104 includes communicating a unique identifier 105 associated with the driverless vehicle 104 with an automobile sharing server 100 and periodically determining a location of the driverless vehicle 104 based on a geospatial data associated with a location of the driverless vehicle 104. The method further includes automatically setting a navigation route 3618 of the driverless vehicle 104 when the driverless vehicle 104 is located at a non-transitory location of the driverless vehicle 3508 based on a predictable behavior algorithm 211. In addition, a payment of a renter of the driverless vehicle 104 in a threshold radial distance 119 from the driverless vehicle 104 is processed when the renter is picked up by the driverless vehicle 104.

A unique identifier 105 associated with a driverless vehicle 104 may be associated with the automobile sharing server 100. A location of the driverless vehicle 104 may be periodically analyzed based on a geospatial data associated with a location of the driverless vehicle 104. A non-transitory location of the driverless vehicle 3508 may be declared based on a predictable behavior algorithm 211. An owner of the driverless vehicle 301 may be permitted to list the driverless vehicle 104 on an automobile sharing network 150, wherein the driverless vehicle the navigation route 3618 automatically instructed to navigate to a location of the renter (e.g., recipient location 615).

In yet another aspect, a system includes a network 101 and an autonomous vehicle to automatically set a navigation route 3618 of the autonomous vehicle (e.g., the driverless vehicle 104) to a location of a renter of the autonomous vehicle (e.g., location of the recipient 612) when the autonomous vehicle is located at a non-transitory location of the autonomous vehicle based (e.g., the non-transitory location of the driverless vehicle 3508) on a predictable behavior algorithm 211. The system also includes an automobile sharing server 100 communicatively coupled with the autonomous vehicle to credit a financial account of an owner of the autonomous vehicle 3610 with a payment of the renter (e.g., the recipient 114) of the autonomous vehicle in the threshold radial distance 119 from the autonomous vehicle when the autonomous vehicle is predictable at the non-transitory location for a predictably available period of time.

A unique identifier 105 associated with a driverless vehicle 104 may be associated with the automobile sharing server 100. A location of the driverless vehicle 104 may be periodically analyzed based on a geospatial data associated with a location of the driverless vehicle 104. A non-transitory location of the driverless vehicle 3508 may be declared based on a predictable behavior algorithm 211. An owner of the driverless vehicle 301 may be permitted to list the driverless vehicle 104 on an automobile sharing network 150, wherein the driverless vehicle the navigation route 3618 automatically instructed to navigate to a location of the renter.

The unique identifier 105 may be a license plate of the autonomous vehicle, and/or a social networking profile of the user in a geo-spatial social community. A connection recommendation module 270 may automatically recommend connections to the owner of the autonomous vehicle based on the non-transitory location. The connections may be associated with other users of the geo-spatial social community (e.g., the geospatially constrained social network 142) based on other users of the geo-spatial social community sharing a common interest 3500 with the owner in the threshold radial distance 119 from the non-transitory location, and/or other autonomous vehicles of the geo-spatial social community whose owners share the common interest 3500 with the owner in the threshold radial distance 119 from the non-transitory location. A navigation module 218 may automatically instruct the autonomous vehicle to navigate to a location of the renter. An update module 266 may periodically update the owner and/or the renter based on a time in transit 3502, a time to arrival 3606, a time to destination 3608, and/or the payment earned status 3504.

A criteria module 203 may process a criteria associated with an automotive listing data 102 including a description, a photograph, a video, a rental fee, a category, a vehicle make, a vehicle model, and/or a functional status. A charting module 272 may populate an availability chart when the autonomous vehicle associated with the listing criteria 604 is posted. The availability chart may include an operation area radius, a start timing, an end timing, an hours per day, and/or an hours per user. A validation module 200 may determine that the automotive listing data 102 is generated by the verified user 706 of the neighborhood broadcast system when validating that the automotive listing data 102 is associated with the mobile device 303. An application module 274 may determine that an application on the mobile device 303 is communicating the automotive listing data 102 to the automobile sharing network 150 when the automotive listing data 102 is processed. An association module 216 may associate the verified user 706 with a verified user 706 profile 2202 in the automobile sharing network 150 through the application on the mobile device 303.

A pushpin module 206 may present the automotive listing data 102 generated through the mobile device 303 as an automobile sharing alert pushpin 609 of the automotive listing data 102 in a geospatial map surrounding pre-populated residential and/or business listings in a surrounding vicinity (such that the automobile sharing alert pushpin 609 of the automotive listing data 102 may be automatically presented on the geospatial map in addition to being presented on the set of user profiles having associated verified addresses in the threshold radial distance 119 from the set of geospatial coordinates 103 associated with the automotive listing data 102 generated through the mobile device 303 of the verified user 706 of the automobile sharing server 100).

The automotive listing data 102 generated through the mobile device 303 may be radially distributed through an on-page posting 621, an electronic communication, and/or a push notification delivered to desktop and/or mobile devices 303 associated with users and/or their user profiles around an epicenter 144 defined at the set of geospatial coordinates 103 associated with the automotive listing data 102 generated through the mobile device 303 to all subscribed user profiles in a circular geo-fenced area (defined by the threshold distance from the set of geospatial coordinates 103 associated with the automotive listing data 102 generated through the mobile device 303) through the radial algorithm 140 of the automobile sharing network 150 that may measure a distance away of each address associated with each user profile from the current geospatial location at the epicenter 144. A placement module 232 may permit the verified user 706 to drag and/or drop the automobile sharing alert pushpin 609 on any location on the geospatial map, and/or automatically determine a latitude and/or a longitude associated a placed location. A notification module 208 may automatically notify a user, a business, and/or an automobile rental agency in a surrounding geospatial area to the set of geospatial coordinates 103 associated with the automotive listing data 102 generated through the mobile device 303.

An extraction module 234 may extract the geospatial coordinates 103 from a metadata associated with the automotive listing data 102 generated through the mobile device 303 when verifying that the set of geospatial coordinates 103 associated with the automotive listing data 102 generated through the mobile device 303 are trusted based on the claimed geospatial location 700 of the verified user 706 of the automobile sharing server 100. A matching module 210 may determine a relative match between a persistent clock 226 associated with the automobile sharing server 100 and/or a digital clock of the mobile device 303 to determine that the time stamp 510 associated with the creation date 508 and/or time of the automotive listing data 102 generated through the mobile device 303 may accurate and/or therefore trusted. A deletion module 236 may automatically delete a publishing of the automotive listing data 102 generated through the mobile device 303 on a set of user profiles having associated verified addresses in the threshold radial distance 119 from the set of geospatial coordinates 103 associated with the automotive listing data 102 generated through the mobile device 303 of the verified user 706 of the automobile sharing server 100 based on an automobile sharing alert expiration time 629.

A plotting module 238 may geocode a set of residential addresses each associated with a resident name in a neighborhood surrounding the mobile device 303. A data-seeding module 241 may prepopulate the set of residential addresses each associated with the resident name as the set of user profiles in the threshold radial distance 119 from the claimed geospatial location 700 of the verified user 706 of the automobile sharing server 100 in a neighborhood curation system communicatively coupled with the automobile sharing server 100. A modification module 242 may permit the verified user 706 to modify content in each of the set of user profiles. A discovery module 244 may track the modified content through the neighborhood curation system. An undo module 246 may generate a reversible history journal associated with each of the set of user profiles such that a modification of the verified user 706 can be undone on a modified user profile page.

A reputation module 248 may determine an editing credibility of the verified user 706 based on an edit history of the verified user 706 and/or a community contribution validation of the verified user 706 by other users of the neighborhood curation system. A publication module 214 may automatically publish the automotive listing data 102 generated through the mobile device 303 to a set of user profiles having associated verified addresses in a threshold radial distance 119 from the claimed geospatial location 700 of the verified user 706 of the automobile sharing server 100 using the radial algorithm 140.

A claiming module 250 may process a claim request of the verified user 706 generating the automotive listing data 102 generated through the mobile device 303 to be associated with an address of the neighborhood curation system. A private-neighborhood module 252 may determine if the claimable neighborhood in the neighborhood curation system may be associated with a private neighborhood community in the claimable neighborhood of the neighborhood curation system. An association module 216 may associate the verified user 706 with the private neighborhood community in the claimable neighborhood of the neighborhood curation system if the private neighborhood community has been activated by the verified user 706 and/or a different verified user 706. A boundary module 254 may permit the verified user 706 to draw a set of boundary lines in a form of a geospatial polygon such that the claimable neighborhood in a geospatial region surrounding the claim request may create the private neighborhood community in the neighborhood curation system if the private neighborhood community may inactive.

An address type module 256 may verify the claim request of the verified user 706 generating the automotive listing data 102 generated through the mobile device 303 to be associated with a neighborhood address of the neighborhood curation system when the address is determined to be associated with a work address and/or a residential address of the verified user 706. A concurrency module 258 may simultaneously publish the automotive listing data 102 generated through the mobile device 303 on the private neighborhood community associated with the verified user 706 generating the automotive listing data 102 generated through the mobile device 303 in the threshold radial distance 119 from the address associated with the claim request of the verified user 706 of the neighborhood curation system (when automatically publishing the automotive listing data 102 generated through the mobile device 303 on a set of user profiles having associated verified addresses in a threshold radial distance 119 from the claimed geospatial location 700 of the verified user 706 of the automobile sharing server 100 based on a set of preferences of the verified user 706 using the radial algorithm 140).

A download module 268 may automatically download a set of profiles to the mobile device 303, wherein an owner of the autonomous vehicle may the verified user 706. A flick module 213 may provide an interface to the owner of the autonomous vehicle such that the owner of the autonomous vehicle 301 can use a haptic 'flick' gesture in a horizontal and/or a vertical fashion to switch a viewing pane associated with a profile. A response module 264 may analyze a response of the owner of the autonomous vehicle being a dismiss, a save, a rating, a review and/or a rental acceptance of a renter associated with the automotive listing data 102 through the automobile sharing server 100.

A communication module 260 may automatically initiate a video communication and/or an audio communication between the mobile device 303 of the owner of the autonomous vehicle and/or another mobile device 303 of the renter through the automobile sharing server 100 based on the profile of the renter associated with the automotive listing data 102 through the automobile sharing server 100. A review module 207 may permit the renter and/or other renters to view the rating and/or the review provided by the owner of the autonomous vehicle for each of the renters based on a participation criteria 605 set by the owner of the autonomous vehicle and/or the renter, such that each renter may be able to view ratings and/or reviews of each participating candidate for the rental associated with the automotive listing data 102. A social connection module 209 may permit each renter for the rental of the autonomous vehicle associated with the automotive listing data 102 to communicate with each other and/or form social connections 3400 with each other based on the participation criteria 605 set by the owner of the autonomous vehicle and/or the renter, such that each renter may able to form social connections 3400 with each participating candidate for the rental associated with the automotive listing data 102.

A diligence module 205 may permit participating owners of the autonomous vehicles in the automobile sharing server 100 to see previous ratings 620, comments, reviews 622, prescreen questions, and/or background checks of across a plurality of renters applying for a plurality autonomous vehicle rentals through the automobile sharing server 100 such that different owner of the autonomous vehicles benefit from previous diligence of at one of previous ratings 620, comments, reviews 622, prescreen questions, and/or background checks by participating owner of the autonomous vehicles with each renter that has previously rented through the automobile sharing server 100. A summary module 262 may provide a summary data 626 to the owner of the autonomous vehicle generating the automotive listing data 102 generated through the mobile device 303 of how many user profile pages were updated with an alert of the automotive listing data 102 generated through the mobile device 303 when publishing the automotive listing data 102 generated through the mobile device 303 in the private neighborhood community and/or the set of user profiles having associated verified addresses in the threshold radial distance 119 from the claimed geospatial location 700 of the verified user 706 of the automobile sharing server 100 based on the set of preferences of the verified user 706.

A live broadcast module 228 may live broadcast the automotive listing data 102 generated through the mobile device 303 to the different verified user 706 and/or other verified users 706 in the private neighborhood community and/or currently within the threshold radial distance 119 from the current geospatial location through the automobile sharing server 100 through a multicast algorithm 276 such that a live broadcast multicasts to a plurality of data processing systems associated with each of the different user and/or the other verified users 706 simultaneously (when the mobile device 303 of the verified user 706 generating the live-broadcast 616 enables broadcasting of the automotive listing data 102 generated through the mobile device 303 to any one of a geospatial vicinity around the mobile device 303 of the verified user 706 generating the broadcast and/or in any private neighborhood community in which the verified user 706 has a non-transitory connection).

A bi-directional communication module 230 may permit the different verified user 706 and/or other verified users 706 in the private neighborhood community to bi-directionally communicate with the verified user 706 generating the broadcast through the automobile sharing server 100. Any private neighborhood community in which the verified user 706 has a non-transitory connection may be a residential address of the verified user 706 and/or a work address of the verified user 706 that has been confirmed by the automobile sharing server 100 as being associated with the verified user 706. The threshold distance may be between 0.2 and/or 0.4 miles from the set of geospatial coordinates 103 associated with the automotive listing data 102 generated through the mobile device 303 to optimize a relevancy of the live-broadcast 616. The automobile sharing server 100 may include a crowd-sourced moderation algorithm 204 in which multiple neighbors in a geospatial area may determine what content contributed to the automobile sharing server 100 persists and/or which may be deleted. The automobile sharing server 100 may permit users to mute messages of specific verified users 706 to prevent misuse of the automobile sharing server 100.

The automobile sharing server 100 may permit the automotive listing data 102 to be disseminated to adjacent neighborhoods that have been claimed by different users in a manner such that the automotive listing data 102 may be optionally disseminated to the surrounding claimed neighborhoods 300 based on a preference of the verified user 706. A claimed neighborhood 300 of the verified user 706 may be activated based on a minimum number of other verified users 706 in the threshold radial distance 119 that have been verified through a primary residential address associated with each of the other verified users 706 through a post card verification, a utility bill verification, a privately-published access code, and/or a neighbor vouching system. Access to the automotive listing data 102 may be restricted to the claimed neighborhood 300 of the verified user 706. Access to the automotive listing data 102 may be denied to users having verified addresses outside the claimed neighborhood 300 of the verified user 706.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

Embodiments described herein in FIGS. 1-11 govern a new kind of social network for neighborhoods, according to one embodiment (e.g., may be private and/or wild-editable search engine based). It should be noted that in some embodiments, the address of a user may be masked from the public search (but still may be used for privacy considerations), according to one embodiment. Some embodiments have no preseeded data, whereas others might. Embodiments described herein may present rich, location specific information on individual residents and businesses.

A user can "Claim" one or more Business Pages and/or a Residential Pages, according to one embodiment. In order to secure their Claim, the user may verify their location associated with the Business Page and/or Residential page within 30 days, or the page becomes released to the community, according to one embodiment. A user can only have a maximum of 3 unverified Claims out at any given time, according to one embodiment. When a user clicks on "Claim this Page" on Business Profile page and/or a Residential Profile page, they can indicate the manner in which they intend to verify their claim, according to one embodiment. Benefits of Claiming a Business Page and/or Residential page may enable the user to mark their page 'Self-Editable only' from the default 'Fully Editable' status, and see "Private" listings in a claimed neighborhood around the verified location, according to one embodiment. Each edit by a user on a Residential Profile page and/or a Business Profile page may be made visible on the profile page, along with a date stamp, according to one embodiment.

Browse Function:

Based on the user's current location, the browse function may display a local map populated with pushpins for location-specific information, and a news feed, made up of business page edits, public people page edits, any recent broadcasts, etc., according to one embodiment. The news feed may show up on each Business Page and each Residential Page, based on activity in the surrounding area, according to one embodiment. Secure a Neighborhood function: May allow the user to identify and "secure" a neighborhood, restricting certain types of access to verified residents, according to one embodiment. Add a Pushpin function: May allow any registered or verified user to add any type of Pushpin (as described in FIG. 8), according to one embodiment.

In addition to the map, the search results page may display a news feed, made up of business page edits, public people page edits, any recent broadcasts, and autogenerated alerts who has moved into the neighborhood, who has moved out of the neighborhood, any recent reviews in the neighborhood, any pushpins placed in the immediate area, etc., according to one embodiment. The news feed may prioritize entries relating to the search results, and will take into account privacy policies and preferences, according to one embodiment.

Example Newsfeeds may include:

Joe Smith moved into the neighborhood in September 2013. Welcome Joe! Like Share; 43 neighbors (hyperlink) moved in to the Cupertino library neighborhood in July 2013. Like Share; 12 neighbors (hyperlink) verified in to the Cupertino library neighborhood in July 2013. Like Share; Raj Abhyanker invited Paul Smith, a guest to the Cupertino neighborhood. Raj indicates Paul is a friend from college looking to move into the neighborhood. Welcome Paul!: Raj Abhyanker posted a Nissan Leaf for rent $35 a day, in mountain view Rent now. Like Share This content may feed each Profile Page and helps to increase Search Engine value for content on the site, according to one embodiment. Alerts may be created and curated (prioritized, filtered) automatically and/or through crowd-sourcing, to keep each page vibrant and actively updating on a regular basis (ideally once a day or more), according to one embodiment.

A Multi-Family Residence page will display a list of residents in the entire building, according to one embodiment. Clicking on any resident will display a Single Family Residence page corresponding to the individual living unit where that person resides, according to one embodiment.

For example, suppose that John Smith and Jane Smith live in apartment 12 of a large building. Their names are included in the list of residents. When a user clicks on either John Smith or Jane Smith, we will display a "Single Family Residence" page showing both John and Jane, just as if apartment 12 was a separate structure, according to one embodiment.

The broadcast feature (e.g., associated with the automotive listing data 102 and generated by the radial algorithm 240 of the radial distribution module 140) may be a "Radio" like function that uses the mobile device's current geospatial location to send out information to neighbors around the present geospatial location of the user, according to one embodiment. Broadcasts may be posted to neighbor pages in the geospatial vicinity (e.g., in the same neighborhood) on public and private pages in the geospatial social network, according to one embodiment. These broadcasts may enable any user, whether they live in a neighborhood or not to communicate their thoughts to those that live or work (or have claimed) a profile in the neighborhood around where the broadcaster is physically at, regardless of where the broadcaster lives, according to one embodiment. Broadcasts can be audio, video, pictures, and or text, according to one embodiment. For accountability, the broadcaster may be a verified user and their identity made public to all users who receive the broadcast in one embodiment.

This means that the broadcast feature may be restricted to be used only by devices (e.g., mobile phones) that have a GPS chip (or other geolocation device) that an identify a present location of where the broadcast is originating from, according to one embodiment. The broadcast may be sent to all users who have claimed a profile in the geo spatial vicinity where the broadcast originates, according to one embodiment. This can either be broadcast live to whoever is "tuned" in to a broadcast of video, audio, picture, and text in their neighborhood, or can be posted on each users profile if they do not hear the broadcast to the neighborhood in a live mode in one embodiment.

When a broadcast is made neighbors, around where the broadcast is made, they may receive a message that says something like:

Raj Abhyanker, a user in Menlo Park just broadcast "Japanese cultural program" video from the Cupertino Union church just now. Watch, Listen, View This broadcast may be shared with neighbors around Menlo Park, and or in Cupertino. This way, Raj's neighbors and those in Cupertino can know what is happening in their neighborhoods, according to one embodiment. In one embodiment, the broadcast only goes to one area (Cupertino or Menlo Park in the example above).

Broadcasts could be constrained to devices that have geospatial accuracy of present location and a current only (mobile devices for example). Otherwise, broadcasts won't mean much, according to one embodiment (would otherwise be just like thoughts/video upload without this). Broadcasts shouldn't be confused with 'upload videos', according to one embodiment. Different concepts. Why? Broadcasts have an accuracy of time and location that cannot be altered by a user, according to one embodiment. Hence, mobile is the most likely medium for this not desktop computer, according to one embodiment. We should not let the user set their own location for broadcasts (like other pushpin types), according to one embodiment. Also time is fixed, according to one embodiment. Fixing and not making these two variables editable give users confidence that the broadcast was associated with a particular time and place, and creates a very unique feature, according to one embodiment. For example, it would be not useful if the broadcast is untrusted as to location of origination, according to one embodiment. E.g., I broadcast when I am somewhere only about the location I am at, according to one embodiment.

Broadcasts are different that other pushpins because location of where a broadcast, and time of broadcast is

*current location* and *current time*, according to one embodiment. They are initiated wherever a broadcaster is presently at, and added to the news feed in the broadcasters neighborhood and in the area wherever a broadcaster is presently at, according to one embodiment.

Broadcast rules may include:

1. If I post a Broadcast in my secured neighborhood, only my neighbors can see it, according to one embodiment.

2. If I post a Broadcast in different secured neighborhood then my own, my neighbors can see it (e.g., unless I turn this off in my privacy setting) and neighbors in the secured neighborhood can see it (e.g., default not turn-offable, but I can delete my broadcast), according to one embodiment.

3. If I post a Broadcast in different unsecured neighborhood then my own, my neighbors can see it (unless I turn this off in my privacy setting) and the broadcast is publicly visible on user pages of public user profiles in the unsecured neighborhood until profiles are claimed and/or the neighborhood is secured, according to one embodiment.

4. If an outsider in a secure neighborhood posts a broadcast in my secure neighborhood, it's not public, according to one embodiment.

5. If an outsider in a unsecure neighborhood posts a broadcast in my secure neighborhood, the system does not post on profiles in his unsecure neighborhood (to prevent stalking, burglary), but does post in my secure neighborhood, according to one embodiment.

Privacy settings. For each verified residential or business location, the user may set Privacy to Default, Public, Private, or Inactive, according to one embodiment. The Default setting (which is the default) means that the profile will be public, until the neighborhood is secured; in a secured neighborhood, the profile will be Private, according to one embodiment. By changing this setting, the user may force the profile to be Public or Private, regardless of whether the neighborhood is secured, according to one embodiment.

For each verified residential location, the user may set edit access to Group Editable or Self Editable, according to one embodiment.

Residential Privacy example. The residential profiles can be: Public: anyone can search, browse, or view the user profile, according to one embodiment. This is the default setting for unsecured neighborhoods (initially, all the content on the site), according to one embodiment. Private: only people in my neighborhood can search, browse, or view the user's profile, according to one embodiment. This is the default for secured neighborhoods, according to one embodiment. Inactive: nobody can search, browse, or view the profile, even within a secured neighborhood, according to one embodiment. A user may have at least one active (public or private), verified profile in order to have edit capabilities, according to one embodiment; if the user makes all profiles inactive, that user is treated (for edit purposes) as an unverified user, according to one embodiment.

Verified users can edit the privacy setting for their profile and override the default, according to one embodiment. Group Editable: anyone with access to a profile based on the privacy roles above can edit the profile, according to one embodiment. This is the default setting, according to one embodiment Self Editable, only the verified owner of a profile can edit that profile, according to one embodiment.

Exceptions Guest User. A verified user in another neighborhood is given "Guest" access to a neighborhood for a maximum of 60 days by a verified user in the neighborhood in which the guest access is given, according to one embodiment. In effect, the guest becomes a member of the neighborhood for a limited period, according to one embodiment. Friend. When a user has self-elected being friends with someone in a different neighborhood, they can view each other's profiles only (not their neighbors), according to one embodiment. One way for a user to verify a location is to submit a scanned utility bill, according to one embodiment.

When a moderator selects the Verify Utility Bills function, the screen will display a list of items for processing, according to one embodiment. Accept the utility bill as a means of verification, according to one embodiment. This will verify the user's location, and will also generate an e-mail to the user, according to one embodiment. Or Decline the utility bill as a means of verification, according to one embodiment. There will be a drop-down list to allow the moderator to select a reason, according to one embodiment; this reason will be included in an e-mail message to the user. Reasons may include: Name does not match, address does not match, name/address can't be read, not a valid utility bill, according to one embodiment.

Additionally, for example, the broadcast may even occur automatically and simultaneously when a user lists and/or rents a driverless vehicle. Upon listing, viewing and/or renting a driverless vehicle through the user interfaces of FIGS. 6A-6D, recipients 114 within a threshold radial distance 119 (e.g., selected by the user) from the claimed geospatial location 700 and/or current location of the user may be updated and/or may be able to contact the user indicating that they have a similar driverless vehicle for rent and/or require a driverless vehicle like the one listed. This may allow users to share driverless vehicles and/or find optimal rental arrangements quickly and/or conveniently.

The driverless vehicle 114 described in the various embodiments may have anti-lock brakes that may need the driver to step on the brake pedal in order to work, but they may perform a function that drivers used to have to do themselves. When the driverless vehicle 114 is braking hard and does not have anti-lock brakes, the wheels may lock up, which may send the vehicle into an out-of-control skid.

The driverless vehicle 114 may use sensors to provide traction and stability control. They may use the sensors at the wheels to detect when a vehicle might go into an out-of-control skid and/or roll over, and/or then they may use ABS and engine management to keep the vehicle on the road and right side up. Unlike a driver, these systems may apply the brakes and increase or decrease power to individual wheels, which may be often better than brakes or power being applied to all four wheels by a human foot mashing the brake pedal in a blind panic. Already the driverless vehicle 114 may be a better driver than the driver with these technologies. The systems may differ depending on the driverless vehicle 114, but what the driverless vehicle 114 may have in common may be that they can anticipate crashes and/or prepare the vehicle to keep the occupants safe.

For example, the driverless vehicle 114 may come around a corner only to find a garbage truck stopped in its lane. In the driverless vehicle 114 with a pre-safe system, an alarm might go off as the vehicle nears the truck. The driverless vehicle 114 may reduce engine power, which may slow the driverless vehicle 114 and reduce the severity of the crash, if there is one to come. Finally, if the system detects that a crash cannot be avoided; the system (e.g., the on board computer system 3601 of FIG. 36B) may prepare the airbags for deployment and tighten all of the seat belts. The system of the driverless vehicle 114 may do all that in less time than it takes the driver to simply slam on the brakes.

Several manufacturers may offer automatic parking systems on everything from SUVs to compact versions of the driverless vehicle 114 and hybrids, as shown and described in FIGS. 1-37B. The systems may use sensors all around the driverless vehicle 114 to guide it into a parallel parking space with no human input required. Before it can work, the driverless vehicle 114 may have to find a parking space, position the vehicle next to it, and/or use the navigation screen to tell the driverless vehicle 114 where it should go. Still, the self-parking system may be a big achievement in driverless vehicle technology. With it, the driverless vehicle 114 may behave like a driver might—reading the area around it, reacting accordingly and/or going safely from point A to point B, as shown and described in FIGS. 1-37B.

Semi-driverless and/or driverless systems may not have hands, as shown and described in FIGS. 1-37B. It should be noted that the driverless vehicle 114 may be a "semi-driverless" vehicle in some embodiments. As the technology progresses, the legal issues may follow.

Semi-autonomous systems of the driverless vehicle 114 may do more than just see the road. Using an array of sensors, lasers, radar, cameras, and GPS technology, they may be able to actually analyze a vehicle's surroundings. Semi-autonomous systems may be a combination of two technologies. The first may be adaptive cruise control of the driverless vehicle 114, which may use a long-range radar (e.g., more than 100 meters) in the grille to keep the vehicle a uniform distance behind another vehicle while maintaining a set speed, as shown and described in FIGS. 1-37B. The second, lane-centering may use multiple cameras with machine-vision software to read road lines and detect objects near the driverless vehicle 114.

This information may then be sent to a computer (e.g., a geospatially constrained network of a car manufacturer) that processes the data and adjusts the electrically assisted steering to keep the vehicle centered in the lane, as shown and described in FIGS. 1-37B. Because semiautonomous systems may be intended only for highways, manufacturers may use the driverless vehicle 114' sGPS to determine its location before allowing the driver to engage the feature. In addition, manufacturers may also considering using short-range radars (e.g., 30 to 50 meters) and/or extra ultrasonic sensors (e.g., 3 meters) to enhance the driverless vehicle 114' soverall awareness, as shown in FIGS. 1-37B. The driverless vehicle 114 with park-assist systems may already have four similar sensors in the front and in the rear of the vehicle. Manufacturers may also be experimenting with cost-effective LIDAR units, which may use lasers instead of sound and may be more powerful and accurate than ultrasonic sensors, as shown in FIGS. 1-37B. It is unclear whether LIDAR will make it into the same driverless vehicle 114 as some semiautonomous systems.

The heart of these semiautonomous systems may be a laser range finder mounted on the roof of the driverless vehicle 114. The device (e.g., a Velodyne 64-beam laser) may generate a detailed 3D map of the environment, as shown in FIGS. 1-37B. The driverless vehicle 114 then may combine the laser measurements with high-resolution maps of the world which may allow the device to produce different types of data models that may allow it to drive itself while avoiding obstacles and respecting traffic laws. The driverless vehicle 104 (shown in FIG. 1) may also be associated with other sensors, which may include: four radars, mounted on the front and/or rear bumpers, that may allow the vehicle to "see" far enough to be able to deal with fast traffic on freeways; a camera, which may be positioned near the rear-view mirror, that detects traffic lights; and/or a GPS, inertial measurement unit, and/or wheel encoder, that may determine the vehicle's location and/or keep track of its movements, as shown in FIGS. 1-37B. The driverless vehicle 104 may rely on very detailed maps of the roads and/or terrain, something that may be essential to determine accurately where the driverless vehicle 104 is, as shown in FIGS. 1-37B. Using GPS-based techniques alone, the location may be off by several meters.

Before sending the driverless vehicle 104 on a road test (e.g., without a driver), the driverless vehicle 104 may need to drive along the route one or more times to gather data about the environment. When it is the driverless vehicle's 104 turn to drive itself, it may compare the data it acquires to the previously recorded data, an approach that may be useful to differentiate pedestrians from stationary objects like poles and/or mailboxes FIGS. 1-37B. Sometimes, however, the driverless vehicle (e.g., the driverless vehicle 3600 of FIG. 36A) may need to be more "aggressive." When going through a four-way intersection, for example, it may yield to other vehicles based on road rules; but if other vehicles don't reciprocate, it may advance a bit to show to the other drivers and/or driverless vehicles 104 its intention, as shown in FIGS. 1-37B. Without programming that kind of behavior, it may be impossible for the driverless vehicle 104 to drive in the real world.

Driverless vehicles 104 could help make transportation safer and/or more efficient: Driverless vehicles may be able to drive closer to each other (shown in FIG. 34), making better use of the 80 percent to 90 percent of empty space on roads, and/or also form speedy convoys on freeways. Driverless vehicles 104 may react faster than humans to avoid accidents, potentially saving thousands of lives, as shown in FIGS. 1-37B. Making vehicles smarter may require lots of computing power and data.

The
Cruise Control: Cruise control systems of the driverless vehicle 114 may work in order to keep a vehicle in constant speed, without the driver having to apply gas.

Anti-Lock Brakes: This may be a system that automatically prevents the locking of brakes, when the driverless vehicle 114 applies the brakes in full. The system may perform a better job than the driver as far as pumping the brakes in order to prevent the vehicle to spin and fall out of control.

The driverless vehicle 104 of FIG. 1 and/or the driverless vehicle 3600 of FIG. 36A may include:

Stability and Traction Control: These may be the systems that use different sensors in order to determine when the driverless vehicle 114 might skid or roll over and work in order to prevent it, and may be much more complicated in comparison to the above mentioned systems. The driverless vehicle 114 direction, speed, the contact pressure between the road and/or the wheels may be constantly monitored and/or when it is determined that the vehicle is going out of control, the system may take over and apply brakes and/or adjust the pressure on each wheel, which may almost always be better and/or more optimized than a human driver might be able to do, as shown in FIGS. 1-37B. The system may use digital encoders similar to the ones used in anti-lock braking systems, in order to precisely measure wheel rotation.

Pre-Accident Systems: These may be the systems that sense an imminent crash and/or prepare the driverless vehicle 114 just before it, in order to save lives and reduce injuries, as shown in FIGS. 1-37B. The system may prepare airbags, reduce engine power and/or tighten the seat belts, in a very short time, even before the driver has the time to apply the brakes in full.

Traffic Jam Assist: Another step to full autonomy may be the traffic jam assist system, which may relieve drivers from the tiring work of stop and go traffic, as shown in FIGS. 1-37B.

Improved Cruise Control: In addition to the regular cruise control, using radar sensors placed in front of the driverless vehicle 114, the system may be able to sense the vehicle in front and/or may adjust the speed accordingly, in order to maintain a safe distance between two vehicles, as shown in FIGS. 1-37B.

Self-Parking Systems: The driverless vehicle 114 may self park according to one embodiment.

The driverless vehicles 104 and/or 3600 may be:
Fully driverless vehicles: The driverless vehicle 104 may be able to completely manage itself from point A to point B, without any human intervention whatsoever, as shown in FIGS. 1-37B. The driverless vehicle 114 may need to do basically two things to find their way and drive: First, the driverless vehicle 104 may require the complete map of its surrounding area including the objects and the travel path defined in that area, and/or its relative position and/or what it is doing with respect to that defined map—here defined may mean that the vehicle "knows" the meaning of the objects in that map, as shown in FIGS. 1-37B. The map and/or the relative position of the vehicle versus that map may be dynamic and/or may be continuously updated, as shown in FIGS. 1-37B. In order to come up with this map, the driverless vehicles of FIGS. 1 and/or 36A may use equipment such as:

Radar sensors: Radar sensors may mainly be used to detect various obstacles near the driverless vehicle 114, as shown in FIGS. 1-37B.

Cameras: May be currently used for distinguishing the lanes and/or backup assistance in the driverless vehicle 114, as shown in FIGS. 1-37B.

Image-processing software may detect traffic signs and/or lights, lane stripes, and/or other objects, as shown in FIGS. 1-37B.

GPS Units: Global Positioning System may be used for determining a vehicle's location by getting input from satellites, as shown in FIGS. 1-37B.

Accelerometer: may help with navigation of the driverless vehicle 114 when the signal received from GPS devices are poor, as shown in FIGS. 1-37B.

Ultrasound Sensor: Currently ultrasound sensors may be mainly used for detecting obstacles in front and/or back of the vehicle while manually and/or automatically parking the driverless vehicle 114, as shown in FIGS. 1-37B.

Wheel Sensor: may also be used in Stability and Anti-Lock braking systems, another use of the wheel sensors may be to keep track of the driverless vehicle's location when the GPS systems are temporarily unavailable due to poor signals, as shown in FIGS. 1-37B.

Laser range Finder (Lidar): may refer to lasers that spin in order to constantly take horizontal distance measurements. Lidar systems may include a number of infrared sensor units placed on top of the driverless vehicle 114. The information taken from these measurements may be combined with the information coming from cameras and/or the radar in order to create a detailed map of surrounding. With this sensor taking so many measurements of the immediate surroundings of the vehicle, a detailed 3D map can be produced, as shown in FIGS. 1-37B.

Benefits of Driverless Vehicles 104

Reduced Accidents: Each year, an estimated number of 1.3 Million people may die in traffic accidents, which may be the 10th leading cause of all deaths overall, and 50 million more may suffer injuries, according to World Health Organization data. Widespread use of driverless vehicles 104 may reduce this number, because the leading cause of all traffic accidents may be human error. Even if there are rare machine errors and they cause deaths or injuries, the total may be much less in numbers, in comparison to what occurs today, as shown in FIGS. 1-37B.

Traffic Reduction: Machines may be very precise. They may be incredibly fast in reacting as well, as shown in FIGS. 1-37B. In traffic, each time a vehicle moves, some seconds may be lost between two vehicles. Multiplying this by the number of all the vehicles on the highway may yield a very large number in terms of delayed traffic. Plus humans may need more of a safety gap in between vehicles due to slower reaction time. With driverless vehicles 104, this inefficient process may be history.

Driverless vehicles (e.g., the driverless vehicle 114) may be able to react instantly to the moving traffic ahead with closer distances to each other, and this may create a much more efficient and/or continuous flow of traffic, which may increase highway capacities, even in packed situations. It may essentially create a "train of vehicles" on a highway. It may not only be the reaction time or shorter distance of the individual vehicles in question, as shown in FIGS. 1-37B. By swarm robotics concepts, these vehicles may also be able to communicate between themselves, and/or with the surroundings, thanks to chips becoming cheaper and smaller and/or they may very easily be placed (may be even by spraying at some point) on every physical object we can think of, which may lead to further improvement of the communication process using the various technologies described herein, increasing the safety and efficiency of driving. In the event of a traffic jam, driverless vehicles 104 may be able to communicate with one another and/or allow passengers to communicate with one another and/or with other driverless vehicles, forming social connections 3400 (e.g., to discuss the cause of the traffic) as shown in FIG. 34.

Higher safe speeds: As the reaction times and safety of driverless vehicles 114 may be far greater than those of humans, the speed limits may be increased, as shown in FIGS. 1-37B.

More space and/or easier parking: The parking process may be much easier both in terms of space and time. An owner of the driverless vehicle 301 may be dropped off wherever he/she wants and/or his/her vehicle may park itself at a location where parking space is abundant, as shown in FIGS. 1-37B. This may save the passenger's time and/or may also help solve parking space problems as the vehicle may park far away and come back when it is needed again.

Traffic Police: There may be a dramatically reduced need for traffic police, if at all.

Insurance: Vehicle insurance premiums may decrease. The main cause of higher premiums may be accidents and reduction in this number may make premiums cheaper.

Time Saving: Instead of spending time by paying attention to the road, the passenger may be able to do something more productive in their vehicle, such as reading and/or getting work done, as shown in FIGS. 1-37B.

Less Vehicles and Lower Costs: Overall, there may be a reduced number of vehicles needed and the average cost of transportation by vehicle may decrease, as shown in FIGS. 1-37B.

One reason may be the elimination of a redundant passenger in many cases. This may in turn increase the vehicle crying capacity of the vehicles, which may mean less vehicles may be needed, and it may also save on fuel overall, as the weight of an unnecessary passenger may go away and less vehicles may operate on the road, as shown in FIGS. 1-37B.

Another contributing factor may be that the people may be able to lend, rent and/or borrow vehicles easier (shown throughout the Figures), as the driverless vehicles may be able to just drive where they are needed (shown in FIG. 36C). At present, most of the time vehicles just wait to be used, occupying parking space. Driverless vehicles 104 could drive and carry others instead of just waiting for its owner to use it, as shown in FIGS. 1-37B. The operational time of driverless vehicles 104 on average may increase, which in turn may mean, the same total amount of transportation we need as a society may be achieved by less number of vehicles. Today even if one wanted to lend their vehicle to someone, the renter may need to come to the owner's physical location to get the vehicle and the keys. This may actually make it redundant and/or very inconvenient to get a vehicle because in order to get to where the vehicle is, they would need to use another vehicle or at least some sort of transportation.

Vehicle renting, borrowing and taxi concepts may be transformed this way, as shown in FIGS. 1-37B. One may not even have to be near their driverless vehicle 104 to start their driverless vehicle 104. The owner of the driverless vehicle 301 and/or renter (e.g., recipient 114) may be able to enter their credentials by a phone app (e.g., Fatdoor android application, Fatdoor iOS application) and/or on the internet (e.g., through Fatdoor.com), and it may start the driverless vehicle 104 through its internet connection and/or the user (e.g., renter, owner of the driverless vehicle 301) may tell the driverless vehicle 104 where to go and/or when to come back as shown in FIG. 6A. There may even be internet sites (e.g., Fatdoor.com, Nextdoor.com) and/or phone apps arranging all these instantly between people who want to lend and/or borrow (e.g., rent), as shown in FIGS. 1-37B. An individual may also be able to go to the street and pull a cab—without a driver, which may basically operate for much longer hours than a regular cab as it may have no driver to wait for when he sleeps and/or eats, which may mean less taxis on the road also, as shown in FIGS. 1-37B.

There may be daily and/or monthly tickets for vehicle usage such as metro, train and/or bus passes of today, where the geospatially constrained social network 142, local municipality, a local taxi and/or rental vehicle company can provide for you.

Improved transportation of goods: Driverless vehicles 104 may even be sent to do the tasks that will not need to carry passengers at all, but just goods, as shown in FIGS. 1-37B. Someone may be able to order goods online and/or by phone and then send their vehicle to pick it up, if a buyer does not want to wait for delivery or pay for shipping, where the seller may just load the goods into the vehicle for pickup. Or the seller might do the delivery, like today, but as there may be no more drivers needed (discussed in FIG. 6B), the shipping cost may decrease. So the retail and shipping industries may be impacted also. In many cases when we go shopping, we may drive to a retail shop, just to load the goods into our vehicle and bring them home, unless we want to see or do something inside. Eliminating all this and just sending a driverless vehicle 104 to pick up things may therefore have effects on the retail industry. It may also mean much free time for the owner of the driverless vehicle 104 at home, doing more useful things, as shown in FIGS. 1-37B.

Impacts on economy: Driverless vehicles 104 may not mean losing jobs to robots. Each automation may create higher quality and more information based jobs even if it eliminates some old professions. Just like the industrial revolution replaced almost people working in the farms with machines, who started doing something else, other professions which may have been created by the new technologies themselves. For instance in this case, taxi drivers may lessen in numbers, but more people may be needed to create and/or manage the software and/or the process.

Fewer vehicles may mean less auto mechanics of course. Driverless vehicles 104 may make fewer accidents too, and they may drive less abusively and/or in an optimum way, which may mean less repair jobs per vehicle also, except the regular maintenance jobs which may be needed, as shown in FIGS. 1-37B. But again, all these lost jobs and/or economy due to increased efficiency of vehicle transportation, may be compensated by the new professions created by the new technology.

Driverless vehicles may lead to less number of vehicles combined with increased highway capacities, increased speed limits, much better parking and/or safer transportation, as shown in FIGS. 1-37B. Each vehicle could operate independently, reacting to events that happen as they go, just like standard driving is today, only robotically, as shown in FIGS. 1-37B. Or it could function as part of an infrastructure, with each vehicle working together and communicating on a mass scale of efficiency (e.g., through the automobile sharing server 100 and/or massively parallel computing architecture 146 of FIG. 1). With a central hub or intelligence center, the driverless vehicle 104 may communicate with all the vehicles, as shown in FIGS. 1-37B. If there was an accident or backup, the driverless vehicle-to-infrastructure vehicle may already know 20 minutes before it gets there, thus alternating the route and avoiding the situation altogether, as shown in FIGS. 1-37B. Driverless vehicles 104 could offer more mobility to disadvantaged populations, including the elderly and/or those who are disabled, who may often be unable to access adequate transportation. Older adults may be the fastest-growing segment of the nation's population, and access to transportation may be critical to helping individuals remain independent as they age.

Another place where adopting the technologies described herein may help our society is by improving our carbon footprint. A McKinsey research study estimates that 300 million tons of carbon dioxide emissions could be saved annually with the adoption of driverless vehicles.

The techonlogies described herein could also improve everyday efficiency by eliminating congestion and/or saving time, as shown in FIGS. 1-37B. Driverless vehicles 104 may be able to follow the other vehicles in front of them more efficiently, reducing the accordion effect that results from when vehicles follow each other in a line. This improved traffic flow could help everyone on the road, whether they drive a driverless vehicle 104 or not. The driverless vehicle 104 may be an electric vehicle (discussed in FIG. 35). The owner of the driverless vehicle 301 may be able to be dropped off at their front door. The driverless vehicle 104 may then head to the garage where it may neatly park itself over a wireless charging hotspot. The next morning, it may be fully fueled and ready to go.

It will be understood with those skill in the art that in some embodiments, the radial distribution module 140 may restrict dissemination of broadcast data by verified users to claimed neighborhoods in a private neighborhood social network (e.g. the geospatially constrained social network 142 may be a private social network, the neighborhood curation system described herein may also be part of the private neighborhood social network) in which the broadcaster resides (e.g., has a home) using the radial algorithm 140. The geo-spatially constrained social network 142 may include online communities designed to easily create private websites to facilitate communication among neighbors and build stronger neighborhoods (e.g., to help neighbors build stronger and safer neighborhoods).

Further, it follows that the threshold radial distance 119 may take on a variety of shapes other than purely circular and is defined to encompass a variety of shapes based on associated geographic, historical, political and/or cultural connotations of associated boundaries of neighborhoods and/or as defined by a city, municipality, government, and/or data provider (e.g., Maponics®, Urban Mapping®), in one embodiment. For example, the threshold radial distance 119 may be based on a particular context, such as a school boundary, a neighborhood boundary, a college campus boundary, a subdivision boundary, a parcel boundary, and/or a zip code boundary.

In an alternative embodiment, the threshold radial distance 119 generated by the geospatially constrained social network 142 may be restricted to a shared apartment building (e.g., and/or an office building). In addition, it will be understood with those skilled in the art that the automobile sharing server 100 may be operate as a function of the geo-spatially constrained social network 142 (e.g., a neighborhood social network).

In addition, it will be understood that the automotive listing data 102 may appear in a 'feed' provided to users of the geo-spatially constrained social network 142 (e.g., a private social network for neighbors) on their profile pages based on access control privileges set by the radial broadcast module 140 using the radial algorithm 240. For example, access to the automotive listing data 102 may be limited to just a claimed neighborhood (e.g., as defined by neighborhood boundaries) and/or optionally adjacent neighborhoods.

In one embodiment, the geo-spatially constrained social network 142 may provide business establishments with a separate login in which they can invite neighbors themselves. For example, communications defined from one broadcasting user to an adjacent neighborhood may involve sharing information about a vehicle for rent, a service for sale, to rally support from neighbors from multiple neighborhoods to address civic issues, to spread the word about events like local theater production or neighborhood garage sales, and/or to ask for advice or recommendations from the widest range of people in a community). In one embodiment, the geospatially constrained social network 142 may prevent self-promotional messages that are inappropriate (e.g., a user sending such messages may be suspended from the geospatially constrained social network using the crowd sourced moderation algorithm module 204).

In one embodiment, the user may personalize nearby neighborhoods so that the user can choose exactly which nearby neighborhoods (if any) they wish to communicate with. The user may be able to flag a neighborhood feeds from adjacent neighborhoods. In addition, leaders from a particular neighborhood may be able to communicate privately with leaders of an adjoining neighborhood to plan and organize on behalf of an entire constituency. Similarly, users 106 may be able to filter feeds to only display messages from the neighborhood that they reside in. The user may be able to restrict posts (e.g., pushpin placements) only in the neighborhood they are presently in. In one embodiment, nearby neighbors may (or may not) be able to access profiles of adjacent neighborhoods.

It will also be understood that in some embodiments, that users may be 'verified through alternate means, for example through a utility bill verification (e.g., to verify that a user's address on a utility bill matches the residential address they seek to claim), a credit card verification (e.g., or debit card verification), a phone number verification (e.g., reverse phone number lookup), a privately-published access code (e.g., distributed to a neighborhood association president, and/or distributed at a neighborhood gathering), and a neighbor vouching method (e.g., in which an existing verified neighbor 'vouches' for a new neighbor as being someone that they personally know to be living in a neighborhood.

In one embodiment, the geospatially constrained social network 142 ensures a secure and trusted environment for a neighborhood website by requiring all members to verify their address. In this embodiment, verification may provide assurance the assurance that new members are indeed residing at the address they provided when registering for an account in the geo-spatially constrained social network 142. Once a neighborhood has launched out of pilot status, only members who have verified their address may be able access to their neighborhood website content.

It will be understood that among the various ways of verifying an address, a user of the geo-spatially constrained social network 142 may uses the following methods to verify the address of every member:

A. Postcard.

The geo-spatially constrained social network 142 can send a postcard to the address listed on an account of the user with a unique code printed on it (e.g., using the Fatmail postcard campaign). The code may allow the user to log in and verify their account.

B. Credit or Debit Card.

The geo-spatially constrained social network 142 may be able to verify a home address through a credit or debit card billing address. In one embodiment, billing address may be confirmed without storing personally identifiable information and/or charging a credit card.

C. Home Phone.

If a user has a landline phone, the user may receive an automated phone call from the geo-spatially constrained social network 142 that may provide with a unique code to verify an account of the user.

D. Neighborhood Leader.

A neighborhood leader of the geo-spatially constrained social network can use a verify neighbors feature of the geo-spatially constrained social network 142 to vouch for and verify neighbors.

E. Mobile Phone.

A user may receive a call to a mobile phone associated with the user to verify their account.

F. Neighbor Invitations.

A neighbor who is a verified member of the geo-spatially constrained social network 142 can vouch for, and may invite another neighbor to join the geo-spatially constrained social network 142. Accepting such an invitation may allow the user to join the geo-spatially constrained social network 142 as a verified member, according to one embodiment.

H. Social Security Number (SSN).

The geo-spatially constrained social network 142 can verify a home address when the user provides the last 4 digits of a SSN (e.g., not stored by the geospatially constrained social network 142 for privacy reasons).

It will be also understood that in a preferred embodiment neighborhood boundaries defined by the radial distribution module 140 using the radial algorithm 140 may be constrained to work in neighborhoods having a threshold number of homes (e.g., 100 homes in a neighborhood) and more (e.g., up to thousands of homes) as this may be needed to reach the critical mass of active posters that is needed to help the geo-spatially constrained social network 142 succeed. In one embodiment, 'groups' may be creatable in smaller neighborhoods having fewer than the threshold number of homes for communications in micro-communities within a claimed neighborhood.

It will also be appreciated that in some embodiments, a mobile driverless vehicle 104 may be a desktop computer, a laptop computer, and/or a non-transitory broadcasting module. In addition, it will be understood that the prepopulated data (e.g., preseeded data) described herein may not be created through data licensed from others, but rather may be user generated content of organically created profiles in the geo-spatial social network created by different users who have each verified their profiles.

An example embodiment is described here. Sally may have lost her job. Unable to afford car payments, she may have lost he car as well. Sally may have been forced to take public transportation as a result. However, buses and trains are slow and she may have been delayed several times. This may have caused her to miss interviews and professional meetings. Sally may not have a bicycle and/or may live in a large city where biking may be unrealistic and/or unsafe. Additionally, Sally may not have enough money to take taxis every day and/or may not have time to wait for a taxi service to take her call and/or pick her up. This may worsen Sally's financial and personal situations, making it nearly impossible for her to get back on her feet.

Luckily, Sally may have a close friend who is familiar with the geospatially constrained social network 142. Sally's friend may recommend that Sally rent a driverless vehicle 104 from a neighbor. Sally may use her computer to find that a family in her apartment building has an extra car that is available for rent Monday through Friday from 8 am to 6 pm. Sally may be familiar with the family and find that the rental is quite cheap. Sally may be able to easily gain access to a vehicle and be able to get to appointments on time and with ease. This may enable Sally to regain a sense of independence and/or confidence. With her new reliable vehicle, Sally may be relaxed as she makes it on time to the interview for her dream job. Sally may be hired for the job and be able to get her life back on track. Having experienced the convenience of renting a driverless vehicle through the automobile sharing server 100, Sarah may decide not to get her old car back and continue renting from the family in her apartment building. Thus, Sally may be able to get back on her feet and arrive at her dream job on time every day and the family that owns the driverless vehicle may be able to make a financial gain while aiding Sally.

Another example embodiment of the various disclosures described herein will now be described. John, a prominent banker may have his driverless car (that John lovingly named 'Hobbie') chauffer him to downtown Dallas every morning from Monday through Friday at the Stock Tower. As a result, Hobbie may remain parked at the Stocked Tower predictably between 9:15 am and 5:45 pm each and every day (e.g., because sometimes John comes late and leaves early, this window is known to be a predictable non-transitory window in which John is at work). This time might be characterized as Hobbie's 'work-idle time'. Similarly, it may be known that John never uses his driverless car Hobbie between midnight and 4 am in the morning because he is always in bed ('home-idle time'). Sometimes, when John goes on vacation, John may set a vacation responder on the driverless car social network as 'vacation-idle time'.

Hobbie may be connected to a driverless car social network and commerce community (e.g., Fatdoor.com, Nextdoor.com) through a wireless internet connection. John may have self signed himself and Hobbie to join this driverless car social network and commerce community by entering a vehicle identification number of Hobbie (e.g., a VIN number of Hobbie, a driver's license of Hobbie). For example, the driverless car social network may use an application programming interface of Hobbie (e.g., Google®, Tesla®, Apple®, Ford®, General Motors®, Toyota®, Nissan®, Honda®) to verify and authenticate/communicatively couple between the driverless car social network (Fatdoor) and Hobbie. Once coupled, Hobbie may be directable to various locations and/or may receive instructions for navigation through the driverless car social network. In addition, when this pairing/coupling has been done, Hobbie may transmit its idle time (e.g., 'work-idle time' and 'home idle time') to a central server maintained by the driverless car social network.

The driverless car may employ an algorithm (e.g., a radial algorithm 240) to calculate a predictably idle window of time for Hobbie (e.g., when Hobbie is not being used). In addition, John may login to the driverless car social network and enter his preferences for renting Hobbie. For example, John may describe how much he is willing to rent Hobbie for when Hobbie is idle (e.g., by the mile and/or by the hour), what minimum star rating a potential rater should have before rentin, and whether John wants notifications to his mobile phone whenever someone requests a rental of Hobbie when Hobbie is idle (e.g., so that John can approve and/or deny a rental).

Jane may not have a car and live next to where John works. She may need to leave to her office each day by 2 pm and return home at 1am each morning (e.g., she may have the evening shift at the hospital). This may correspond to the 'work idle time' for Hobbie. Jane may find it convenient to search and request idle driverless cars near her through the driverless car social network. She may discover Hobbie through this driverless car social network (Nextdoor.com, Fatdoor.com) using the various embodiments and modules described herein and in FIGS. 1-37. Jane may also see that Hobbie and/or his driver John have a 4 star rating (e.g., for cleanliness inside the car, comfort, etc.). Jane may request to rent Hobbie through her mobile phone. John may receive a push notification on his phone that a person named Jane (e.g., with a 5 star rating) living near where he works wants to rent Hobbie during this window when Hobbie is idle (e.g., for a single time and/or daily for a week) for $20 per day.

John may approve the rental to Hobbie to Jane based on a number of factors such as Jane's rating, where she is heading, how long she will need the car for, and how much she is willing to pay for it using the various embodiments and modules described herein and in FIGS. 1-37. Instantly, Jane may pay John through her mobile phone when John accepts. In addition, Hobbie may know that Jane will be coming for a ride at 2 pm. When Jane is in front of Hobbie, Jane may press a button on her mobile phone to automatically unlock Hobbie's door (e.g., doing this will allow Hobbie to automatically unlock his/her doors because Jane would be transmitting a message to the driverless car social network, which now has the ability to control Hobbie because of the pairing/authentication provided by John and/or verify that Jane is geospatially right next to Hobbie) using the various embodiments and modules described herein and in FIGS. 1-37.

Five minutes before Jane is scheduled to arrive at Hobbie (e.g., at 1:55 pm), Hobbie run his engine and turn on the air conditioning for Jane's arrival (and perhaps tuned into her favorite classical music radio station) using the various embodiments and modules described herein and in FIGS. 1-37. When Jane is seated, Hobbie might welcome Jane by speaking 'Welcome Jane, I'm ready to take you to work!". The driverless car social network may automatically set a route and drive Jane to work. During the drive, Hobbie may communicate verbally an expected time of arrival to Jane and/or to John through the driverless car social network. In addition, Hobbie may transmit this information to the driverless car social network, which may in turn push notifications of the status of the trip to John (e.g., based on his notification preferences) when the car arrives and/or returns to the Stock Tower using the various embodiments and modules described herein and in FIGS. 1-37.

John may set Hobbie to 'auto charge' mode. When Hobbie is running low on energy, John may automatically direct Hobbie to self buy gasoline and/or plug into a charging station through the driverless car social network and commerce community using the various embodiments and modules described herein and in FIGS. 1-37. In addition, John may instruct Hobbie through the driverless car social network and commerce community (e.g., Fatdoor.com, Nextdoor.com) to pick up an order for weekly groceries and some fancy clothes that he recently placed at Target.com® (e.g., and/or Walmart®) available at a physical store location nearby Stock Tower (e.g., th Target store on Main Street) using the various embodiments and modules described herein and in FIGS. 1-37. This information may be communicated to Hobbie through an API to Fatdoor that Target® has integrated using the various embodiments and modules described herein and in FIGS. 1-37. Based on this, Hobbie may dutifully drive over and go to the pickup counter at Target on Main Street. Target will know that Hobbie is arriving, and a person in the warehouse area may load up the purchases that John has recently made online into Hobbie. This will free up John from doing errands that take up a significant portion of his day. The various embodiments described herein are implementable through the various technologies, methods, modules, and/or circuits described in FIGS. 1 through 37.

Over time, Jane and John may become friends in the driverless social community. In addition, Jane may meet others through the driverless social community that share a similar route path as she does to work every day and who may therefore wish to carpool in Hobbie with her using the various embodiments and modules described herein and in FIGS. 1-37. To save money, Jane may decide to carpool with a neighbor Bob and have Hobbie pick up both of them during their driving window (e.g., a fully automated Super Shuttle®). For example, Bob may live in Jane's apartment complex, and need to leave for work everyday by 2:15. Bob may travel to a location near where Jane works, about a mile away. To create incremental revenue for John, John may choose to charge Jane and John less of an individual rate each (e.g. but a combined rate that is 1.5× of what Jane was paying). This may allow John to make more money from Hobbie, and Jane and Bob to save money individually in commuting to work. Jane, John, and Bob may all become friends through the driverless car social network and commerce community.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system. Accordingly, the specification and drawings are to be regarded in an illustrative rather than a restrictive sense.

What is claimed is:

1. A method of an automobile sharing server comprising:
associating a unique identifier associated with a driverless vehicle with the automobile sharing server;
periodically analyzing a location of the driverless vehicle based on a geospatial data associated with the location of the driverless vehicle;
declaring a non-transitory location of the driverless vehicle based on a predictable behavior algorithm;
permitting an owner of the driverless vehicle to list the driverless vehicle on an automobile sharing network;
processing a payment of a renter of the driverless vehicle in a threshold radial distance from the driverless vehicle when the driverless vehicle is predictable at the non-transitory location for a predictably available period of time;
crediting a financial account of the owner of the driverless vehicle with the payment of the renter of the driverless vehicle in the threshold radial distance from the driverless vehicle when the driverless vehicle is predictable at the non-transitory location for the predictably available period of time;
automatically instructing the driverless vehicle to navigate to a location of the renter;
periodically updating the owner and the renter based on at least one of a time in transit, a time to arrival, a time to destination, and a payment earned status;
processing a criteria associated with an automotive listing data including at least one of a description, a photograph, a video, a rental fee, a category, a vehicle make, a vehicle model, and a functional status;
populating an availability chart when the driverless vehicle associated with a listing criteria is posted, wherein the availability chart includes at least one of an operation area radius, a start timing, an end timing, an hours per day, an hours per user;
determining that the automotive listing data is generated by a verified user of a neighborhood broadcast system when validating that the automotive listing data is associated with a mobile device;
determining that an application on the mobile device is communicating the automotive listing data to the automobile sharing network when the automotive listing data is processed;
associating the verified user with a verified user profile in the automobile sharing network through the application on the mobile device; and
presenting the automotive listing data generated through the mobile device as an automobile sharing alert pushpin of the automotive listing data in a geospatial map surrounding pre-populated residential and business listings in a surrounding vicinity, such that the automobile sharing alert pushpin of the automotive listing data is automatically presented on a geospatial map in addition to being presented on a set of user profiles having associated verified addresses in the threshold radial distance from a set of geospatial coordinates associated with the automotive listing data generated through the mobile device of the verified user of the automobile sharing server;
wherein the automotive listing data generated through the mobile device is radially distributed through at least one of an on-page posting, an electronic communication, and a push notification delivered to desktop and mobile devices associated with users and their user profiles around an epicenter defined at the set of geospatial coordinates associated with the automotive listing data generated through the mobile device to all subscribed user profiles in a circular geo-fenced area defined by a threshold distance from the set of geospatial coordinates associated with the automotive listing data generated through the mobile device through a radial algorithm of the automobile sharing network that measures a distance away of each address associated with each user profile from a current geospatial location at the epicenter.

2. The method of claim 1 where in the unique identifier of the driverless vehicle is at least one of a license plate of the driverless vehicle, and a social networking profile of a user in a geo-spatial social community.

3. The method of claim 2 further comprising:
automatically recommending connections to the owner of the driverless vehicle based on the non-transitory location, wherein a set of connections are associated with other users of the geo-spatial social community based on at least one of:
other users of the geo-spatial social community sharing a common interest with the owner in the threshold radial distance from the non-transitory location, and
other driverless vehicles of the geo-spatial social community whose owners share the common interest with the owner in the threshold radial distance from the non-transitory location.

4. The method of claim 2 further comprising:
permitting a verified user to drag and drop an automobile sharing alert pushpin on any location on a geospatial map, and automatically determining a latitude and a longitude associated a placed location; and
automatically notifying at least one of the user, a business, and an automobile rental agency in a surrounding geospatial area to a set of geospatial coordinates associated with an automotive listing data generated through a mobile device.

5. The method of claim 4 further comprising:
extracting a geospatial coordinates from a metadata associated with the automotive listing data generated through the mobile device when verifying that the set of geospatial coordinates associated with the automotive listing data generated through the mobile device are trusted based on the claimed geospatial location of the verified user of the automobile sharing server.

6. The method of claim 5 further comprising:
determining a relative match between a persistent clock associated with the automobile sharing server and a digital clock of the mobile device to determine that a time stamp associated with a creation date and time of the automotive listing data generated through the mobile device is accurate and therefore trusted; and
automatically deleting a publishing of the automotive listing data generated through the mobile device on a set of user profiles having associated verified addresses in the threshold radial distance from the set of geospatial coordinates associated with the automotive listing data generated through the mobile device of the verified user of the automobile sharing server based on an automobile sharing alert expiration time.

7. The method of claim 6 further comprising:
geocoding a set of residential addresses each associated with a resident name in a neighborhood surrounding the mobile device; and
prepopulating the set of residential addresses each associated with the resident name as the set of user profiles in the threshold radial distance from the claimed geospatial location of the verified user of the automobile sharing server in a neighborhood curation system communicatively coupled with the automobile sharing server.

8. The method of claim 7 further comprising:
permitting the verified user to modify content in each of the set of user profiles;
tracking a modified content through the neighborhood curation system;
generating a reversible history journal associated with each of the set of user profiles such that a modification of the verified user can be undone on a modified user profile page;
determining an editing credibility of the verified user based on an edit history of the verified user and a community contribution validation of the verified user by other users of the neighborhood curation system; and
automatically publishing the automotive listing data generated through the mobile device to the set of user profiles having associated verified addresses in the threshold radial distance from the claimed geospatial location of the verified user of the automobile sharing server using the radial algorithm.

9. The method of claim 8 further comprising:
processing a claim request of the verified user generating the automotive listing data generated through the mobile device to be associated with an address of the neighborhood curation system;
determining if a claimable neighborhood in the neighborhood curation system is associated with a private neighborhood community in the claimable neighborhood of the neighborhood curation system;
associating the verified user with the private neighborhood community in the claimable neighborhood of the neighborhood curation system if the private neighborhood community has been activated by at least one of the verified user and a different verified user;
permitting the verified user to draw a set of boundary lines in a form of a geospatial polygon such that the claimable neighborhood in a geospatial region surrounding the claim request creates the private neighborhood community in the neighborhood curation system if the private neighborhood community is inactive;
verifying the claim request of the verified user generating the automotive listing data generated through the mobile device to be associated with a neighborhood address of the neighborhood curation system when the address is determined to be associated with at least one of a work address and a residential address of the verified user; and
simultaneously publishing the automotive listing data generated through the mobile device on the private neighborhood community associated with the verified user generating the automotive listing data generated through the mobile device in the threshold radial distance from the address associated with the claim request of the verified user of the neighborhood curation system when automatically publishing the automotive listing data generated through the mobile device on the set of user profiles having associated verified addresses in the threshold radial distance from the claimed geospatial location of the verified user of the automobile sharing server based on a set of preferences of the verified user using the radial algorithm.

10. The method of claim 9 further comprising:
automatically downloading a set of profiles to the mobile device, wherein the owner of the driverless vehicle is the verified user;
providing an interface to the owner of the driverless vehicle such that the owner of the driverless vehicle can use a haptic 'flick' gesture in at least one of a horizontal and a vertical fashion to switch a viewing pane associated with a profile;
analyzing a response of the owner of the driverless vehicle being at least one a dismiss, a save, a rating, a review and a rental acceptance of the renter associated with the automotive listing data through the automobile sharing server;
automatically initiating at least one of a video communication and an audio communication between the mobile device of the owner of the driverless vehicle and another mobile device the renter through the automobile sharing server based on the profile of the renter associated with the automotive listing data through the automobile sharing server;
permitting the renter and other renters to view at least one of the rating and the review provided by the owner of the driverless vehicle for each of the renters based on a participation criteria set by at least one of the owner of the driverless vehicle and the renter, such that each renter is able to view ratings and reviews of each participating candidate for a rental associated with the automotive listing data;

permitting each renter for the rental of the driverless vehicle associated with the automotive listing data to communicate with each other and form social connections with each other based on the participation criteria set by at least one of the owner of the driverless vehicle and the renter, such that each renter is able to form social connections with each participating candidate for the rental associated with the automotive listing data;

permitting participating owner of the driverless vehicles in the automobile sharing server to see at least one of previous ratings, comments, reviews, prescreen questions, and background checks of across a plurality of renters applying for a plurality driverless vehicle rentals through the automobile sharing server such that different owner of the driverless vehicles benefit from previous diligence of at one of previous ratings, comments, reviews, prescreen questions, and background checks by participating owner of the driverless vehicles with each renter that has previously rented through the automobile sharing server; and providing a summary data to the owner of the driverless vehicle generating the automotive listing data generated through the mobile device of how many user profile pages were updated with an alert of the automotive listing data generated through the mobile device when publishing the automotive listing data generated through the mobile device in at least one of the private neighborhood community and the set of user profiles having associated verified addresses in the threshold radial distance from the claimed geospatial location of the verified user of the automobile sharing server based on the set of preferences of the verified user.

11. The method of claim 10 further comprising:

live broadcasting the automotive listing data generated through the mobile device to the different verified user and other verified users in at least one of the private neighborhood community and currently within the threshold radial distance from a current geospatial location through the automobile sharing server through a multicast algorithm such that a live broadcast multicasts to a plurality of data processing systems associated with each of a different user and the other verified users simultaneously when the mobile device of the verified user generating the live-broadcast enables broadcasting of the automotive listing data generated through the mobile device to any one of a geospatial vicinity around the mobile device of the verified user generating a broadcast and in any private neighborhood community in which the verified user has a non-transitory connection; and permitting the different verified user and other verified users in at least one of the private neighborhood community to bi-directionally communicate with the verified user generating the broadcast through the automobile sharing server, wherein any private neighborhood community in which the verified user has the non-transitory connection is at least one of the residential address of the verified user and the work address of the verified user that has been confirmed by the automobile sharing server as being associated with the verified user, wherein a threshold distance is between 0.2 and 0.4 miles from the set of geospatial coordinates associated with the automotive listing data generated through the mobile device to optimize a relevancy of the live-broadcast, wherein the automobile sharing server includes a crowd-sourced moderation algorithm in which multiple neighbors to a geospatial area determine what content contributed to the automobile sharing server persists and which is deleted, wherein the automobile sharing server permits users to mute messages of specific verified users to prevent misuse of the automobile sharing server, wherein the automobile sharing server permits the automotive listing data to be disseminated to adjacent neighborhoods that have been claimed by different users in a manner such that the automotive listing data is optionally disseminated to the surrounding claimed neighborhoods based on a preference of the verified user, wherein a claimed neighborhood of the verified user is activated based on a minimum number of other verified users in the threshold radial distance that have been verified through a primary residential address associated with each of the other verified users through at least one of a post card verification, a utility bill verification, a privately-published access code, and a neighbor vouching method, wherein access to the automotive listing data is restricted to the claimed neighborhood of the verified user, and wherein access to the automotive listing data is denied to users having verified addresses outside the claimed neighborhood of the verified user.

12. A method of a driverless vehicle comprising:

communicating a unique identifier associated with the driverless vehicle with an automobile sharing server;

associating the unique identifier associated with the driverless vehicle with the automobile sharing server;

periodically analyzing the location of the driverless vehicle based on the geospatial data associated with the location of the driverless vehicle;

declaring the non-transitory location of the driverless vehicle based on the predictable behavior algorithm;

permitting an owner of the driverless vehicle to list the driverless vehicle on an automobile sharing network, wherein the driverless vehicle the navigation route automatically instructed to navigate to a location of the renter;

periodically determining a location of the driverless vehicle based on a geospatial data associated with the location of the driverless vehicle;

automatically setting a navigation route of the driverless vehicle when the driverless vehicle is located at a non-transitory location of the driverless vehicle based on a predictable behavior algorithm;

processing a payment of a renter of the driverless vehicle in a threshold radial distance from the driverless vehicle when the renter is picked up by the driverless vehicle;

automatically instructing the driverless vehicle to navigate to a location of the renter;

processing a criteria associated with an automotive listing data including at least one of a description, a photograph, a video, a rental fee, a category, a vehicle make, a vehicle model, and a functional status;

populating an availability chart when the driverless vehicle associated with a listing criteria is posted, wherein the availability chart includes at least one of an operation area radius, a start timing, an end timing, an hours per day, an hours per user;

determining that the automotive listing data is generated by a verified user of a neighborhood broadcast system when validating that the automotive listing data is associated with a mobile device;

determining that an application on the mobile device is communicating the automotive listing data to an automobile sharing network when the automotive listing data is processed; and associating the verified user with a verified user profile in the automobile sharing network through the application on the mobile device; presenting the automotive listing data generated through the mobile device as an automobile sharing alert pushpin of the automotive listing data in a geospatial map surrounding pre-populated residential and business listings in a surrounding vicinity, such that the automobile sharing alert pushpin of the automotive listing data is automatically presented on a geospatial map in addition to being presented on a set of user profiles having associated verified addresses in the threshold radial distance from a set of geospatial coordinates associated with the automotive listing data generated through the mobile device of the verified user of the automobile sharing server;

wherein the automotive listing data generated through the mobile device is radially distributed through at least one of an on-page posting, an electronic communication, and a push notification delivered to desktop and mobile devices associated with users and their user profiles around an epicenter defined at the set of geo spatial coordinates associated with the automotive listing data generated through the mobile device to all subscribed user profiles in a circular geo-fenced area defined by a threshold distance from the set of geospatial coordinates associated with the automotive listing data generated through the mobile device through a radial algorithm of the automobile sharing network that measures a distance away of each address associated with each user profile from a current geospatial location at the epicenter.

13. The method of claim 12 where in the unique identifier of the driverless vehicle is at least one of a license plate of the driverless vehicle, and a social networking profile of a user in a geo-spatial social community.

14. The method of claim 13 further comprising:
automatically recommending connections to the owner of the driverless vehicle based on the non-transitory location, wherein a set of connections are associated with other users of the geo-spatial social community based on at least one of:
  other users of the geo-spatial social community sharing a common interest with the owner in the threshold radial distance from the non-transitory location, and
  other driverless vehicles of the geo-spatial social community whose owners share the common interest with the owner in the threshold radial distance from the non-transitory location.

15. The method of claim 12, further comprising:
periodically updating an owner and the renter based on at least one of a time in transit, a time to arrival, a time to destination, and a payment earned status, and
wherein processing the payment of the renter includes at least crediting a financial account of the owner of the driverless vehicle with the payment of the renter of the driverless vehicle in the threshold radial distance from the driverless vehicle when the driverless vehicle is predictable at the non-transitory location for a predictably available period of time.

16. The method of claim 12 further comprising:
permitting a verified user to drag and drop an automobile sharing alert pushpin on any location on a geospatial map, and automatically determining a latitude and a longitude associated a placed location; and
automatically notifying at least one of a user, a business, and an automobile rental agency in a surrounding geospatial area to a set of geospatial coordinates associated with an automotive listing data generated through a mobile device.

17. The method of claim 16 further comprising:
extracting a geospatial coordinates from a metadata associated with the automotive listing data generated through the mobile device when verifying that the set of geospatial coordinates associated with the automotive listing data generated through the mobile device are trusted based on the claimed geospatial location of the verified user of the automobile sharing server.

18. The method of claim 17 further comprising:
determining a relative match between a persistent clock associated with the automobile sharing server and a digital clock of the mobile device to determine that a time stamp associated with the creation date and time of the automotive listing data generated through the mobile device is accurate and therefore trusted; and
automatically deleting a publishing of the automotive listing data generated through the mobile device on a set of user profiles having associated verified addresses in the threshold radial distance from the set of geospatial coordinates associated with the automotive listing data generated through the mobile device of the verified user of the automobile sharing server based on an automobile sharing alert expiration time.

19. The method of claim 18 further comprising:
geocoding a set of residential addresses each associated with a resident name in a neighborhood surrounding the mobile device; and
prepopulating the set of residential addresses each associated with the resident name as the set of user profiles in the threshold radial distance from the claimed geospatial location of the verified user of the automobile sharing server in a neighborhood curation system communicatively coupled with the automobile sharing server.

20. The method of claim 19 further comprising:
permitting the verified user to modify content in each of the set of user profiles;
tracking a modified content through the neighborhood curation system;
generating a reversible history journal associated with each of the set of user profiles such that a modification of the verified user can be undone on a modified user profile page;
determining an editing credibility of the verified user based on an edit history of the verified user and a community contribution validation of the verified user by other users of the neighborhood curation system; and
automatically publishing the automotive listing data generated through the mobile device to the set of user profiles having associated verified addresses in the threshold radial distance from the claimed geospatial location of the verified user of the automobile sharing server using a radial algorithm.

21. The method of claim 20 further comprising:
processing a claim request of the verified user generating the automotive listing data generated through the mobile device to be associated with an address of the neighborhood curation system;
determining if a claimable neighborhood in the neighborhood curation system is associated with a private neighborhood community in the claimable neighborhood of the neighborhood curation system;
associating the verified user with the private neighborhood community in the claimable neighborhood of the neighborhood curation system if the private neighborhood community has been activated by at least one of the verified user and a different verified user;
permitting the verified user to draw a set of boundary lines in a form of a geospatial polygon such that the claimable neighborhood in a geospatial region surrounding the claim request creates the private neighborhood community in the neighborhood curation system if the private neighborhood community is inactive;
verifying the claim request of the verified user generating the automotive listing data generated through the mobile device to be associated with a neighborhood address of the neighborhood curation system when the address is determined to be associated with at least one of a work address and a residential address of the verified user; and
simultaneously publishing the automotive listing data generated through the mobile device on the private neighborhood community associated with the verified user generating the automotive listing data generated through the mobile device in the threshold radial distance from the address associated with the claim request of the verified user of the neighborhood curation system when automatically publishing the automotive listing data generated through the mobile device on the set of user profiles having associated verified addresses in the threshold radial distance from the claimed geospatial location of the verified user of the automobile sharing server based on a set of preferences of the verified user using the radial algorithm.

22. The method of claim 21 further comprising:
automatically downloading a set of profiles to the mobile device, wherein the owner of the driverless vehicle is the verified user;
providing an interface to the owner of the driverless vehicle such that the owner of the driverless vehicle can use a haptic 'flick' gesture in at least one of a horizontal and a vertical fashion to switch a viewing pane associated with a profile;
analyzing a response of the owner of the driverless vehicle being at least one a dismiss, a save, a rating, a review and a rental acceptance of the renter associated with the automotive listing data through the automobile sharing server;
automatically initiating at least one of a video communication and an audio communication between the mobile device of the owner of the driverless vehicle and another mobile device the renter through the automobile sharing server based on the profile of the renter associated with the automotive listing data through the automobile sharing server;
permitting the renter and other renters to view at least one of the rating and the review provided by the owner of the driverless vehicle for each of the renters based on a participation criteria set by at least one of the owner of the driverless vehicle and the renter, such that each renter is able to view ratings and reviews of each participating candidate for a rental associated with the automotive listing data;
permitting each renter for the rental of the driverless vehicle associated with the automotive listing data to communicate with each other and form social connections with each other based on the participation criteria set by at least one of the owner of the driverless vehicle and the renter, such that each renter is able to form social connections with each participating candidate for the rental associated with the automotive listing data;
permitting participating owner of the driverless vehicles in the automobile sharing server to see at least one of previous ratings, comments, reviews, prescreen questions, and background checks of across a plurality of renters applying for a plurality driverless vehicle rentals through the automobile sharing server such that different owner of the driverless vehicles benefit from previous diligence of at one of previous ratings, comments, reviews, prescreen questions, and background checks by participating owner of the driverless vehicles with each renter that has previously rented through the automobile sharing server; and
providing a summary data to the owner of the driverless vehicle generating the automotive listing data generated through the mobile device of how many user profile pages were updated with an alert of the automotive listing data generated through the mobile device when publishing the automotive listing data generated through the mobile device in at least one of the private neighborhood community and the set of user profiles having associated verified addresses in the threshold radial distance from the claimed geospatial location of the verified user of the automobile sharing server based on the set of preferences of the verified user.

23. The method of claim 22 further comprising:
live broadcasting the automotive listing data generated through the mobile device to the different verified user and other verified users in at least one of the private neighborhood community and currently within the threshold radial distance from a current geospatial location through the automobile sharing server through a multicast algorithm such that a live broadcast multicasts to a plurality of data processing systems associated with each of a different user and the other verified users simultaneously when the mobile device of the verified user generating the live-broadcast enables broadcasting of the automotive listing data generated through the mobile device to any one of a geospatial vicinity around the mobile device of the verified user generating a broadcast and in any private neighborhood community in which the verified user has a non-transitory connection; and
permitting the different verified user and other verified users in at least one of the private neighborhood community to bi-directionally communicate with the verified user generating the broadcast through the automobile sharing server,
wherein any private neighborhood community in which the verified user has the non-transitory connection is at least one of the residential address of the verified user and the work address of the verified user that has been confirmed by the automobile sharing server as being associated with the verified user,
wherein a threshold distance is between 0.2 and 0.4 miles from the set of geospatial coordinates associated with the automotive listing data generated through the mobile device to optimize a relevancy of the live-broadcast, wherein the automobile sharing server includes a crowd-sourced moderation algorithm in which multiple neighbors to a geospatial area determine what content contributed to the automobile sharing server persists and which is deleted, wherein the automobile sharing server permits users to mute messages of specific verified users to prevent misuse of the automobile sharing server, wherein the automobile sharing server permits the automotive listing data to be disseminated to adjacent neighborhoods that have been claimed by different users in a manner such that the automotive listing data is optionally disseminated to the surrounding claimed neighborhoods based on a preference of the verified user, wherein a claimed neighborhood of the verified user is activated based on a minimum number of other verified users in the threshold radial distance that have been verified through a primary residential address associated with each of the other verified users through at least one of a post card verification, a utility bill verification, a privately-published access code, and a neighbor vouching method, wherein access to the automotive listing data is restricted to the claimed neighborhood of the verified user, and wherein access to the automotive listing data is denied to users having verified addresses outside the claimed neighborhood of the verified user.

24. A system comprising:
an autonomous vehicle to automatically set a navigation route of the autonomous vehicle to a location of a renter of the autonomous vehicle when the autonomous vehicle is located at a non-transitory location of the autonomous vehicle based on a predictable behavior algorithm;
a network;
an automobile sharing server communicatively coupled with the autonomous vehicle to credit a financial account of an owner of the autonomous vehicle with a payment of the renter of the autonomous vehicle in a threshold radial distance from the autonomous vehicle when the autonomous vehicle is predictable at the non-transitory location for a predictably available period of time;
a navigation module to automatically instruct the autonomous vehicle to navigate to a location of the renter; and
an update module to periodically update the owner and the renter based on at least one of a time in transit, a time to arrival, a time to destination, and a payment earned status;
a criteria module to process a criteria associated with an automotive listing data including at least one of a description, a photograph, a video, a rental fee, a category, a vehicle make, a vehicle model, and a functional status;
a charting module to populate an availability chart when the autonomous vehicle associated with a listing criteria is posted, wherein the availability chart includes at least one of an operation area radius, a start timing, an end timing, an hours per day, an hours per user;
a validation module to determine that the automotive listing data is generated by a verified user of a neighborhood broadcast system when validating that the automotive listing data is associated with a mobile device;
an application module to determine that an application on the mobile device is communicating the automotive listing data to an automobile sharing network when the automotive listing data is processed;
an association module to associate the verified user with a verified user profile in the automobile sharing network through the application on the mobile device; and
a pushpin module to present the automotive listing data generated through the mobile device as an automobile sharing alert pushpin of the automotive listing data in a geospatial map surrounding pre-populated residential and business listings in a surrounding vicinity, such that the automobile sharing alert pushpin of the automotive listing data is automatically presented on a geospatial map in addition to being presented on a set of user profiles having associated verified addresses in the threshold radial distance from a set of geospatial coordinates associated with the automotive listing data generated through the mobile device of the verified user of the automobile sharing server;
wherein the automotive listing data generated through the mobile device is radially distributed through at least one of an on-page posting, an electronic communication, and a push notification delivered to desktop and mobile devices associated with users and their user profiles around an epicenter defined at the set of geospatial coordinates associated with the automotive listing data generated through the mobile device to all subscribed user profiles in a circular geo-fenced area defined by a threshold distance from the set of geospatial coordinates associated with the automotive listing data generated through the mobile device through a radial algorithm of the automobile sharing network that measures a distance away of each address associated with each user profile from a current geospatial location at the epicenter.

25. The system of claim 24 where in a unique identifier associated with the autonomous vehicle is associated with the automobile sharing server, and wherein the unique identifier is at least one of a license plate of the autonomous vehicle, and a social networking profile of a user in a geo-spatial social community.

26. The system of claim 25 further comprising:
a connection recommendation module to automatically recommend a set of connections to the owner of the autonomous vehicle based on the non-transitory location, wherein the set of connections are associated with other users of the geo-spatial social community based on at least one of:
other users of the geo-spatial social community sharing a common interest with the owner in the threshold radial distance from the non-transitory location, and
other autonomous vehicles of the geo-spatial social community whose owners share the common interest with the owner in the threshold radial distance from the non-transitory location.

27. The system of claim 25 further comprising:
a placement module to permit a verified user to drag and drop an automobile sharing alert pushpin on any location on a geospatial map, and automatically determining a latitude and a longitude associated a placed location; and
a notification module to automatically notify at least one of the user, a business, and an automobile rental agency in a surrounding geospatial area to a set of geospatial coordinates associated with an automotive listing data generated through a mobile device.

28. The system of claim 27 further comprising:
an extraction module to extract a geospatial coordinates from a metadata associated with the automotive listing data generated through the mobile device when verifying that the set of geospatial coordinates associated with the automotive listing data generated through the mobile device are trusted based on the claimed geospatial location of the verified user of the automobile sharing server.

29. The system of claim 28 further comprising:
a matching module to determine a relative match between a persistent clock associated with the automobile sharing server and a digital clock of the mobile device to determine that a time stamp associated with a creation date and time of the automotive listing data generated through the mobile device is accurate and therefore trusted; and
a deletion module to automatically delete a publishing of the automotive listing data generated through the mobile device on a set of user profiles having associated verified addresses in the threshold radial distance from the set of geospatial coordinates associated with the automotive listing data generated through the mobile device of the verified user of the automobile sharing server based on an automobile sharing alert expiration time.

30. The system of claim 29 further comprising:
a plotting module to geocode a set of residential addresses each associated with a resident name in a neighborhood surrounding the mobile device; and
a data-seeding module to prepopulate the set of residential addresses each associated with the resident name as the set of user profiles in the threshold radial distance from the claimed geospatial location of the verified user of the automobile sharing server in a neighborhood curation system communicatively coupled with the automobile sharing server.

31. The system of claim 30 further comprising:
a modification module to permit the verified user to modify content in each of the set of user profiles;
a discovery module to track a modified content through the neighborhood curation system;
an undo module to generate a reversible history journal associated with each of the set of user profiles such that a modification of the verified user can be undone on a modified user profile page;
a reputation module to determine an editing credibility of the verified user based on an edit history of the verified user and a community contribution validation of the verified user by other users of the neighborhood curation system; and
a publication module to automatically publish the automotive listing data generated through the mobile device to the set of user profiles having associated verified addresses in the threshold radial distance from the claimed geospatial location of the verified user of the automobile sharing server using a radial algorithm.

32. The system of claim 31 further comprising:
a claiming module to process a claim request of the verified user generating the automotive listing data generated through the mobile device to be associated with an address of the neighborhood curation system;
a private-neighborhood module to determine if a claimable neighborhood in the neighborhood curation system is associated with a private neighborhood community in the claimable neighborhood of the neighborhood curation system;
an association module to associate the verified user with the private neighborhood community in the claimable neighborhood of the neighborhood curation system if the private neighborhood community has been activated by at least one of the verified user and a different verified user;
a boundary module to permit the verified user to draw a set of boundary lines in a form of a geospatial polygon such that the claimable neighborhood in a geospatial region surrounding the claim request creates the private neighborhood community in the neighborhood curation system if the private neighborhood community is inactive;
an address type module to verify the claim request of the verified user generating the automotive listing data generated through the mobile device to be associated with a neighborhood address of the neighborhood curation system when the address is determined to be associated with at least one of a work address and a residential address of the verified user; and
a concurrency module to simultaneously publish the automotive listing data generated through the mobile device on the private neighborhood community associated with the verified user generating the automotive listing data generated through the mobile device in the threshold radial distance from the address associated with the claim request of the verified user of the neighborhood curation system when automatically publishing the automotive listing data generated through the mobile device on the set of user profiles having associated verified addresses in the threshold radial distance from the claimed geospatial location of the verified user of the automobile sharing server based on a set of preferences of the verified user using the radial algorithm.

33. The system of claim 32 further comprising:
a download to automatically download a set of profiles to the mobile device, wherein the owner of the autonomous vehicle is the verified user;
a flick module to provide an interface to the owner of the autonomous vehicle such that the owner of the autonomous vehicle can use a haptic 'flick' gesture in at least one of a horizontal and a vertical fashion to switch a viewing pane associated with a profile;
a response module to analyze a response of the owner of the autonomous vehicle being at least one a dismiss, a save, a rating, a review and a rental acceptance of the renter associated with the automotive listing data through the automobile sharing server;
a communication module to automatically initiate at least one of a video communication and an audio communication between the mobile device of the owner of the autonomous vehicle and another mobile device of the renter through the automobile sharing server based on the profile of the renter associated with the automotive listing data through the automobile sharing server;
a review module to permit the renter and other renters to view at least one of the rating and the review provided by the owner of the autonomous vehicle for each of the renters based on a participation criteria set by at least one of the owner of the autonomous vehicle and the renter, such that each renter is able to view ratings and reviews of each participating candidate for a rental associated with the automotive listing data;

a social connection module to permit each renter for the rental of the autonomous vehicle associated with the automotive listing data to communicate with each other and form social connections with each other based on the participation criteria set by at least one of the owner of the autonomous vehicle and the renter, such that each renter is able to form social connections with each participating candidate for the rental associated with the automotive listing data;

a diligence module to permit participating owner of an autonomous vehicles in the automobile sharing server to see at least one of previous ratings, comments, reviews, prescreen questions, and background checks of across a plurality of renters applying for a plurality autonomous vehicle rentals through the automobile sharing server such that different owner of an autonomous vehicles benefit from previous diligence of at one of previous ratings, comments, reviews, prescreen questions, and background checks by participating owner of the autonomous vehicles with each renter that has previously rented through the automobile sharing server; and a summary module to provide a summary data to the owner of the autonomous vehicle generating the automotive listing data generated through the mobile device of how many user profile pages were updated with an alert of the automotive listing data generated through the mobile device when publishing the automotive listing data generated through the mobile device in at least one of the private neighborhood community and the set of user profiles having associated verified addresses in the threshold radial distance from the claimed geospatial location of the verified user of the automobile sharing server based on the set of preferences of the verified user.

34. The system of claim 33 further comprising:

a live broadcast module to live broadcast the automotive listing data generated through the mobile device to the different verified user and other verified users in at least one of the private neighborhood community and currently within the threshold radial distance from a current geospatial location through the automobile sharing server through a multicast algorithm such that a live broadcast multicasts to a plurality of data processing systems associated with each of a different user and the other verified users simultaneously when the mobile device of the verified user generating the live-broadcast enables broadcasting of the automotive listing data generated through the mobile device to any one of a geospatial vicinity around the mobile device of the verified user generating the broadcast and in any private neighborhood community in which the verified user has a non-transitory connection; and a bi-directional communication module to permit the different verified user and other verified users in at least one of the private neighborhood community to bi-directionally communicate with the verified user generating the broadcast through the automobile sharing server, wherein any private neighborhood community in which the verified user has the non-transitory connection is at least one of the residential address of the verified user and the work address of the verified user that has been confirmed by the automobile sharing server as being associated with the verified user, wherein a threshold distance is between 0.2 and 0.4 miles from the set of geospatial coordinates associated with the automotive listing data generated through the mobile device to optimize a relevancy of the live-broadcast, wherein the automobile sharing server includes a crowd-sourced moderation algorithm in which multiple neighbors to a geospatial area determine what content contributed to the automobile sharing server persists and which is deleted, wherein the automobile sharing server permits users to mute messages of specific verified users to prevent misuse of the automobile sharing server, wherein the automobile sharing server permits the automotive listing data to be disseminated to adjacent neighborhoods that have been claimed by different users in a manner such that the automotive listing data is optionally disseminated to the surrounding claimed neighborhoods based on a preference of the verified user, wherein a claimed neighborhood of the verified user is activated based on a minimum number of other verified users in the threshold radial distance that have been verified through a primary residential address associated with each of the other verified users through at least one of a post card verification, a utility bill verification, a privately-published access code, and a neighbor vouching system, wherein access to the automotive listing data is restricted to the claimed neighborhood of the verified user, and wherein access to the automotive listing data is denied to users having verified addresses outside the claimed neighborhood of the verified user.

* * * * *